(12) United States Patent
Lapstun et al.

(10) Patent No.: US 7,878,416 B2
(45) Date of Patent: *Feb. 1, 2011

(54) PRODUCT ITEM REGISTRATION

(75) Inventors: Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/628,061

(22) Filed: Nov. 30, 2009

(65) Prior Publication Data

US 2010/0072275 A1 Mar. 25, 2010

Related U.S. Application Data

(63) Continuation of application No. 11/944,449, filed on Nov. 22, 2007, now Pat. No. 7,637,437, which is a continuation of application No. 11/446,240, filed on Jun. 5, 2006, now Pat. No. 7,314,181, which is a continuation of application No. 10/815,631, filed on Apr. 2, 2004, now Pat. No. 7,131,596.

(30) Foreign Application Priority Data

Apr. 7, 2003 (AU) .............................. 2003901617
Apr. 15, 2003 (AU) .............................. 2003901795

(51) Int. Cl.
*G06K 19/06* (2006.01)
(52) U.S. Cl. ....................................... 235/494; 235/380
(58) Field of Classification Search ................. 235/379, 235/380, 375, 382, 494
See application file for complete search history.

(56) References Cited

U.S. PATENT DOCUMENTS

| | | | |
|---|---|---|---|
| 3,808,405 | A | 4/1974 | Johnson et al. |
| 5,442,147 | A | 8/1995 | Burns et al. |
| 5,477,012 | A | 12/1995 | Sekendur |
| 5,515,447 | A | 5/1996 | Zheng et al. |
| 5,554,841 | A | 9/1996 | Kost et al. |
| 5,726,435 | A | 3/1998 | Hara et al. |
| 5,825,015 | A | 10/1998 | Chan |
| 5,917,174 | A | 6/1999 | Moore et al. |
| 5,937,110 | A | 8/1999 | Petrie et al. |
| 6,182,901 | B1 | 2/2001 | Hecht et al. |
| 6,199,048 | B1 | 3/2001 | Hudetz et al. |
| 6,199,753 | B1 | 3/2001 | Tracy et al. |

(Continued)

FOREIGN PATENT DOCUMENTS

EP 1107155 A 6/2001

(Continued)

*Primary Examiner*—Karl D. Frech

(57) ABSTRACT

A method of registering a product item is disclosed. The product item has disposed thereon coded data portions at respective positions on a surface of the product item. Each coded data portion encodes a product item identity and the respective position of the coded data portion. The method starts by a sensing device sensing at least one coded data portion, generating indicating data indicative of the product item identity and the position of the sensed coded data portion, and transferring the indicating data to a computer system. The computer system receives the indicating data, identifies that the position relates to a registration request, obtain owner data associated with the sensing device, determines an entity associated with the product item identity, and register the owner data with the entity.

7 Claims, 92 Drawing Sheets

U.S. PATENT DOCUMENTS

| | | |
|---|---|---|
| 6,497,367 B2 | 12/2002 | Conzola et al. |
| 6,542,927 B2 | 4/2003 | Rhoads |
| 7,131,596 B2 | 11/2006 | Lapstun et al. |
| 7,637,437 B2 * | 12/2009 | Lapstun et al. ............... 235/494 |
| 2003/0041098 A1 | 2/2003 | Lortz |
| 2004/0024693 A1 | 2/2004 | Lawrence |

FOREIGN PATENT DOCUMENTS

| | | |
|---|---|---|
| WO | WO 01/37540 A2 | 5/2001 |
| WO | WO 01/41055 A1 | 6/2001 |

\* cited by examiner

PRODUCT ITEM REGISTRATION

CROSS REFERENCE TO RELATED APPLICATIONS

The present application is a continuation of U.S. application Ser. No. 11/944,449 filed Nov. 22, 2007, which is a continuation of U.S. application Ser. No. 11/446,240 filed Jun. 5, 2006, now issued U.S. Pat. No. 7,314,181, which is a continuation of U.S. application Ser. No. 10/815,631 filed Apr. 2, 2004, now issued U.S. Pat. No. 7,131,596, the entire contents of which are herein incorporated by reference.

FIELD OF INVENTION

This invention relates to unique object identification and, in particular, to methods and systems for identifying and interacting with objects.

CO-PENDING APPLICATIONS

Various methods, systems and apparatus relating to the present invention are disclosed in the following co-pending applications filed by the applicant or assignee of the present invention simultaneously with the present application:

| | | | | |
|---|---|---|---|---|
| 10/815,621 | 7,243,835 | 10/815,630 | 10/815,637 | 10/815,638 |
| 7,251,050 | 10/815,642 | 7,097,094 | 7,137,549 | 10/815,618 |
| 7,156,292 | 10/815,635 | 7,357,323 | 10/815,634 | 7,137,566 |
| 7,128,265 | 7,207,485 | 7,197,374 | 7,175,089 | 10/815,617 |
| 7,537,160 | 7,178,719 | 7,506,808 | 7,207,483 | 7,296,737 |
| 7,270,266 | 10/815,614 | 7,605,940 | 7,128,270 | 7,457,007 |
| 7,150,398 | 7,159,777 | 7,450,273 | 7,188,769 | 7,097,106 |
| 7,070,110 | 7,243,849 | 7,204,941 | 7,282,164 | 7,465,342 |

The disclosures of these co-pending applications are incorporated herein by cross-reference.

CROSS-REFERENCES

Various methods, systems and apparatus relating to the present invention are disclosed in the following co-pending applications filed by the applicant or assignee of the present invention. The disclosures of all of these co-pending applications and granted patents are incorporated herein by cross-reference.

| | | | | |
|---|---|---|---|---|
| 7,156,289 | 7,178,718 | 7,225,979 | 09/575,197 | 7,079,712 |
| 6,825,945 | 7,330,974 | 6,813,039 | 7,190,474 | 6,987,506 |
| 6,824,044 | 6,980,318 | 6,816,274 | 7,102,772 | 7,350,236 |
| 6,681,045 | 6,678,499 | 6,679,420 | 6,963,845 | 6,976,220 |
| 6,728,000 | 7,110,126 | 7,173,722 | 6,976,035 | 6,813,558 |
| 6,766,942 | 6,965,454 | 6,995,859 | 7,088,459 | 6,720,985 |
| 7,286,113 | 6,922,779 | 6,978,019 | 6,847,883 | 7,131,058 |
| 7,295,839 | 7,406,445 | 7,533,031 | 6,959,298 | 6,973,450 |
| 7,150,404 | 6,965,882 | 7,233,924 | 09/575,181 | 7,593,899 |
| 7,175,079 | 7,162,259 | 6,718,061 | 7,464,880 | 7,012,710 |
| 6,825,956 | 7,451,115 | 7,222,098 | 7,590,561 | 7,263,508 |
| 7,031,010 | 6,972,864 | 6,862,105 | 7,009,738 | 6,989,911 |
| 6,982,807 | 7,518,756 | 6,829,387 | 6,714,678 | 6,644,545 |
| 6,609,653 | 6,651,879 | 10/291,555 | 7,293,240 | 7,467,185 |
| 7,415,668 | 7,044,363 | 7,004,390 | 6,867,880 | 7,034,953 |
| 6,987,581 | 7,216,224 | 7,506,153 | 7,162,269 | 7,162,222 |
| 7,290,210 | 7,293,233 | 7,293,234 | 6,850,931 | 6,865,570 |
| 6,847,961 | 10/685,583 | 7,162,442 | 10/685,584 | 7,159,784 |
| 7,557,944 | 7,404,144 | 7,068,382 | 7,007,851 | 6,957,921 |
| 6,457,883 | 7,094,910 | 7,091,344 | 7,122,685 | 7,038,066 |
| 7,099,019 | 7,062,651 | 6,789,194 | 6,789,191 | 6,644,642 |

-continued

| | | | | |
|---|---|---|---|---|
| 6,502,614 | 6,622,999 | 6,669,385 | 6,827,116 | 6,549,935 |
| 6,987,573 | 6,727,996 | 6,591,884 | 6,439,706 | 6,760,119 |
| 7,295,332 | 7,064,851 | 6,826,547 | 6,290,349 | 6,428,155 |
| 6,785,016 | 6,831,682 | 6,741,871 | 6,927,871 | 6,980,306 |
| 6,965,439 | 6,840,606 | 7,036,918 | 6,977,746 | 6,970,264 |
| 7,068,389 | 7,093,991 | 7,190,491 | 6,982,798 | 6,870,966 |
| 6,822,639 | 6,474,888 | 6,627,870 | 6,724,374 | 6,788,982 |
| 7,263,270 | 6,788,293 | 6,946,672 | 6,737,591 | 7,091,960 |
| 7,369,265 | 6,792,165 | 7,105,753 | 6,795,593 | 6,980,704 |
| 6,768,821 | 7,132,612 | 7,041,916 | 6,797,895 | 7,015,901 |
| 7,289,882 | 7,148,644 | 10/778,056 | 10/778,058 | 10/778,060 |
| 7,515,186 | 7,567,279 | 10/778,062 | 10/778,061 | 10/778,057 |
| 7,055,739 | 7,233,320 | 6,830,196 | 6,832,717 | 7,182,247 |
| 7,082,562 | 6,843,420 | 10/291,718 | 6,789,731 | 7,057,608 |
| 6,766,944 | 6,766,945 | 7,289,103 | 7,412,651 | 7,299,969 |
| 7,108,192 | 7,111,791 | 7,564,605 | 7,630,554 | 7,526,128 |
| 6,957,768 | 7,456,820 | 7,170,499 | 7,106,888 | 7,123,239 |
| 6,982,701 | 6,982,703 | 7,227,527 | 6,786,397 | 6,947,027 |
| 6,975,299 | 7,139,431 | 7,048,178 | 7,118,025 | 6,839,053 |
| 7,015,900 | 7,010,147 | 7,133,557 | 6,914,593 | 7,437,671 |
| 6,454,482 | 6,808,330 | 6,527,365 | 6,474,773 | 6,550,997 |
| 7,093,923 | 6,957,923 | 7,131,724 | | |

BACKGROUND

The reference to any prior art in this specification is not, and should not be taken as, an acknowledgement or any form of suggestion that the prior art forms part of the common general knowledge.

For the purposes of automatic identification, a product item is commonly identified by a 12-digit Universal Product Code (UPC), encoded machine-readably in the form of a printed bar code. The most common UPC numbering system incorporates a 5-digit manufacturer number and a 5-digit item number. Because of its limited precision, a UPC is used to identify a class of product rather than an individual product item. The Uniform Code Council and EAN International define and administer the UPC and related codes as subsets of the 14-digit Global Trade Item Number (GTIN).

Within supply chain management, there is considerable interest in expanding or replacing the UPC scheme to allow individual product items to be uniquely identified and thereby tracked. Individual item tagging can reduce "shrinkage" due to lost, stolen or spoiled goods, improve the efficiency of demand-driven manufacturing and supply, facilitate the profiling of product usage, and improve the customer experience.

There are two main contenders for individual item tagging: visible two-dimensional bar codes, and radio frequency identification (RFID) tags.

There are a significant number of different bar code symbologies, which allow data to be encoded as 2D visible markings, and these include, for example:

"Code 49" described in U.S. Pat. No. 4,794,239;

"Data Matrix" described in U.S. Pat. Nos. 4,939,354, 5,053,609 and 5,124,536;

"Datastrip Code", as described for example in U.S. Pat. Nos. 4,692,603, 4,728,783, 4,754,127, and 4,782,221;

"hueCode" described in U.S. Pat. Nos. 5,369,261 and 5,118,369;

"Maxicode" described in U.S. Pat. Nos. 4,874,936, 4,896,029 and 4,998,010;

"MiniCode" described in U.S. Pat. Nos. 5,153,418, 5,189,292 and 5,223,701; and,

"PDF 417" described in U.S. Pat. No. 5,243,655.

Bar codes have the advantage of being inexpensive, but require optical line-of-sight for reading and in some cases appropriate orientation of the bar code relative to the sensor.

Additionally they often detract from the appearance of the product label or packaging. Finally, damage to even a relatively minor portion of the bar code can prevent successful detection and interpretation of the bar code.

RFID tags have the advantage of supporting omnidirectional reading, but are comparatively expensive. Additionally, the presence of metal or liquid can seriously interfere with RFID tag performance, undermining the omnidirectional reading advantage. Passive (reader-powered) RFID tags are projected to be priced at 10 cents each in multi-million quantities by the end of 2003, and at 5 cents each soon thereafter, but this still falls short of the sub-one-cent industry target for low-price items such as grocery. The read-only nature of most optical tags has been cited as a disadvantage, since status changes cannot be written to a tag as an item progresses through the supply chain. However, this disadvantage is mitigated by the fact that a read-only tag can refer to information maintained dynamically on a network.

The Massachusetts Institute of Technology (MIT) Auto-ID Center has developed a standard for a 96-bit Electronic Product Code (EPC), coupled with an Internet-based Object Name Service (ONS) and a Product Markup Language (PML). Once an EPC is scanned or otherwise obtained, it is used to look up, possibly via the ONS, matching product information portably encoded in PML. The EPC consists of an 8-bit header, a 28-bit EPC manager, a 24-bit object class, and a 36-bit serial number. For a detailed description of the EPC, refer to Brock, D. L., *The Electronic Product Code (EPC)*, MIT Auto-ID Center (January 2001), the contents of which are herein incorporated by cross-reference. The Auto-ID Center has defined a mapping of the GTIN onto the EPC to demonstrate compatibility between the EPC and current practices Brock, D. L., *Integrating the Electronic Product Code (EPC) and the Global Trade Item Number (GTIN)*, MIT Auto-ID Center (November 2001), the contents of which are herein incorporated by cross-reference. The EPC is administered by EPCglobal, an EAN-UCC joint venture.

EPCs are technology-neutral and can be encoded and carried in many forms. The Auto-ID Center strongly advocates the use of low-cost passive RFID tags to carry EPCs, and has defined a 64-bit version of the EPC to allow the cost of RFID tags to be minimized in the short term. For detailed description of low-cost RFID tag characteristics, refer to Sarma, S., *Towards the 5c Tag*, MIT Auto-ID Center (November 2001), the contents of which are herein incorporated by cross-reference. For a description of a commercially-available low-cost passive RFID tag, refer to 915 *MHz RFID Tag*, Alien Technology (2002), the contents of which are herein incorporated by cross-reference. For detailed description of the 64-bit EPC, refer to Brock, D. L., *The Compact Electronic Product Code*, MIT Auto-ID Center (November 2001), the contents of which are herein incorporated by cross-reference.

EPCs are intended not just for unique item-level tagging and tracking, but also for case-level and pallet-level tagging, and for tagging of other logistic units of shipping and transportation such as containers and trucks. The distributed PML database records dynamic relationships between items and higher-level containers in the packaging, shipping and transportation hierarchy.

IBM Business Consulting Services, in conjunction with the Auto-ID Center, has carried out a number of case studies analysing and quantifying the costs and benefits of RFID-carried EPCs in the supply chain. They distinguish the benefits which accrue at different stages in the supply chain (e.g. distribution versus retail), at different levels of tagging (i.e. pallet versus case versus item), in response to different sources of loss (e.g. shrinkage versus unsaleables), and across different product categories (e.g. grocery versus apparel versus consumer electronics).

Since the Auto-ID Center exclusively advocates RFID-carried EPCs, the case studies do not clearly distinguish the benefits which accrue from EPCs alone from the benefits which accrue specifically from RFID tags. In addition, the case studies implicitly adopt a very optimistic view of the omni-directional scanning performance of RFID in the presence of radiopaque product, i.e. typically liquid content and metal packaging. More broadly, the case studies do not clearly recognise benefits already beginning to accrue from systemic supply chain changes, such as better utilisation of UPC-based scan data collected at the point-of-sale, increasingly automated reordering and replenishment, and improving levels of communication and data sharing between different participants in the supply chain. In many cases these changes are presented as if predicated on Auto-ID technologies such as RFID-carried EPCs, when in fact they are not. This in turn tends to overstate the benefits of these technologies.

The case studies implicitly assume that tagged units can be accurately scanned in bulk, e.g. when a pallet-load of tagged cases is moved within a distribution center. However, a study by Alien Technology, the first manufacturer of RFID tags conforming to the Auto-ID Center's UHF RFID specifications, shows that cases of radiopaque product (such as soft drinks, shampoo, detergent, and coffee in metal containers) can only be effectively scanned when the case tags are within line-of-sight of tag readers as discussed in Alien Technology, "RFID Supply Chain Applications—Building Test 1", February 2002. In practice this means that pallets of radiopaque product must be split so that individual cases can be conveyed past tag readers, precluding pallet-level operations including storage and dock-to-dock transfer.

Although not directly explored in the Alien study, the same restrictions apply at the item level. For example, while the case study on obsolescence Alexander, K. et al., *Applying Auto-ID to Reduce Losses Associated with Product Obsolescence*, MIT Auto-ID Center, November 2002, assumes that shelf scanners in a retail store can perform a complete scan of shelf stock, and the case study on shrinkage Alexander, K. et al., *Applying Auto-ID to Reduce Losses Associated with Shrink*, MIT Auto-ID Center, November 2002, assumes that exit scanners in a retail store can successfully read items jumbled together in a shopping cart or in grocery bags, in reality the presence of radiopaque product is likely to undermine performance in these situations, thereby compromising some of the claimed benefits of RFID. The Auto-ID Center's own study of supermarket shelf reader design factors concludes that UHF radiopaque product items should have their RFID tags attached to their tops within line-of-sight of shelf readers Cole, P., *A Study of Factors Affecting the Design of EPC Antennas & Readers for Supermarket Shelves*, MIT Auto-ID Center, 1 Jun. 2002.

As with case-level RFID scanning in the distribution center, item-level RFID scanning in the retail store works best when items are handled individually, such as during stock movement to and from shelves, and during the checkout process, i.e. where each item is allowed to fall within line-of-sight of the reader.

The case studies generally conclude that benefits accrue predominantly from case-level tagging when the case is the primary unit of product movement, which remains true right through the supply chain to the retail store backroom.

Benefits from item-level tagging begin to accrue in the retail store once cases are split and product hits the shelves, and these benefits fall into three main categories: a reduced shrinkage rate; a reduced unsaleable rate; and reduced out-of-stocks (with less safety stock). These benefits are discussed in detail below.

Stage-relevant tagging levels are illustrated in FIG. 100.

The case studies assume seven product categories, summarised in Table 1. For every product category except grocery, the case studies conclude that item-level tagging is cost-effective. Specifically, the case studies do not consider item-level RFID tagging in grocery to be cost-effective because of the high cost of RFID tags relative to the average item price.

Note that if partial and incremental item-level RFID tagging of higher-value grocery items occurs (such as of packets of razor blades Alien Technology, "Alien Announces Major Order for Low-cost RFID Tags", 6 Jan. 2003, http://www.alientechnology.com/library/pr/alien_gillette.htm, then from the point of view of per-tag cost it becomes more difficult to justify item-level tagging of remaining products, since the average price of untagged items has been reduced. Conversely, it may become easier to justify from the point of view of sunk investment in reader infrastructure.

TABLE 1

Product categories and average item prices

| product category | average item price |
|---|---|
| grocery | $1.75 |
| apparel | $14 |
| consumer electronics | $130 |
| health & beauty | $9 |
| music & video | $18 |
| pharmacy | $27 |
| toys | $18 |

The case studies therefore make a convincing argument for case-level RFID tagging for all product categories. Additionally item-level RFID tagging may be used for more expensive items.

With item-level tagging, each product item is assigned a unique EPC at time of manufacture. The item's EPC then serves as a key into a distributed PML database which records the characteristics of the item and its evolving history as it proceeds through the supply chain. This includes the item's inclusion in a dynamic hierarchy of packaging, shipping and transportation units, each identified by its own unique EPC. Tracking of higher-level units through the supply chain implicitly support the tracking of lower-level units. For example, once a pallet is loaded and until it is unloaded and split, pallet-level tracking is sufficient to also track its case-level content. Similarly, once a carton is filled and until it is re-opened and split, case-level tracking is sufficient to also track its item-level content. Readers installed in entry and exit portals in factories, warehouses, distribution centers and retail stores can automatically track unit movements and update movement histories. Notwithstanding issues with automatically tracking radiopaque product, RFID readers have benefits for pallet-level and case-level tracking.

At the checkout, the unique EPC of the item prevents it from being recorded as a sale more than once. This allows the checkout to be partially or fully automated. Automatic scanning of a traditional UPC bar code, which only identifies item class, is problematic because multiple scans of the same item are difficult to avoid and impossible to detect from the bar code alone. In an automatic checkout the EPC of an item is typically read many times to ensure that the EPC is read at all, but is only recorded as a sale once. The unique EPC also prevents the checkout operator from multi-scanning a single item to account for a number of similar items, a common time-saving practice which can lead to inventory inaccuracy and thereby undermine automatic reordering and replenishment.

It has been suggested that an RFID-based automatic checkout process can be as simple as wheeling a shopping cart full of RFID-tagged product items through a checkout zone continuously scanned by one or more RFID readers.

In reality, due to issues with radiopaque grocery items, an RFID-based automatic checkout is likely to require each item to pass through the RFID reader's field individually. This may happen when the customer places the item in the cart, i.e. if the cart incorporates a reader, but is more likely to happen at the checkout where the operator or customer either places each item on a conveyor to transport the item through the reader's field, or manually presents each item to the reader's field.

Similarly, whilst the use of item-level RFID tagging arguably makes it possible to construct so-called smart shelves which incorporate RFID readers and continuously monitor RFID-tagged shelf content, practically this is once again subject to performance in the presence of radiopaque product.

The cost of the RFID tag approach is particularly of importance in the grocery sector which is characterised by high-volume sales of low-priced product items, coupled with low net margins. In 2001-2002 the United States grocery sector achieved net profits of 1.36% on net sales of roughly $500 billion.

During the same period the grocery sector experienced a shrinkage rate of 1.42% and an unsaleable rate of 0.95% Lightburn, A., 2002 *Unsaleables Benchmark Report*, Joint Industry Unsaleables Steering Committee 2002. Net profit and shrinkage were therefore roughly equal at $7 billion each, and unsaleables accounted for an additional $5 billion. Out-of-stocks were further estimated to result in a 3% loss in net sales Grocery Manufacturers of America (GMA), *Full-Shelf Satisfaction—Reducing Out-of-Stocks in the Grocery Channel (Executive Summary)*, 2002, which translates into a $200 million reduction in net profit. The grocery sector is also highly labour-intensive, with labour costs accounting for more than 50% of operating expenses.

Profitable operation in the grocery sector therefore relies on maximising efficiency, minimising losses due to shrinkage, minimising losses due to unsaleables, and minimising out-of-stocks while minimising levels of safety stock.

Table 2 summarises these sources of loss in the grocery sector.

TABLE 2

Sources of loss in the grocery sector

| source of loss | contribution | approximate cost ($millions) |
|---|---|---|
| shrinkage | 1.42% | 7,000 |
| unsaleables | 0.95% | 5,000 |
| out-of-stocks | 0.04% | 204 |
| total | 2.41% | 12,204 |

The grocery sector is likely to significantly reduce these sources of loss over the coming decade, independently of item-level tagging, by better utilising UPC-based scan data collected at the point-of-sale, by increasing the level of automation of reordering and replenishment, and by improving communication between different participants in the supply chain. Furthermore, the benefits of item-level tagging itself only accrue if such systemic changes actually take place.

However, the cost of apply RFID tags to provide item level tagging to further enhance loss reduction is currently cost prohibitive.

As shown in Table 2, the cost of shrinkage, unsaleables and out-of-stocks amounts to about 2.41% of net sales. Assuming an average grocery item price of $1.75, this cost equates to about 4.2 cents. Further assuming universal tagging of grocery items, and ignoring other costs and benefits of item-level tagging, such as the cost of the reader infrastructure and the benefit of an improved consumer experience, 4.2 cents represents an absolute upper limit on the threshold cost of a tag in the grocery sector.

The Auto-ID Center hopes to achieve a 5 cent EPC-compatible passive RFID tag within the next couple of years, and Alien Technology are moving towards that goal with a tag design which they expect to price at 10 cents in multi-billion tag volumes by the end of 2003. Alien Technology, 915 *MHz RFID Tag*, .Ghassali, M., *Unsaleables "The U.S. Experience"*, Unilever Bestfoods North America, 27 Mar. 2001. However, the 5 cent tag goal is still highly speculative, and even in multi-billion tag volumes there is currently no projected timeline for achieving an RFID tag price lower than 5 cents. Despite this, the IBM Auto-ID case studies assume a two cent RFID tag within a couple of years in their most optimistic scenarios Alexander, K. et al., *Applying Auto-ID to Reduce Losses Associated with Shrink*, MIT Auto-ID Center, November 2002.

Since even wildly optimistic projected cost savings only marginally justify the cost of the most optimistically-priced RFID tags, it is unlikely that universal item-level RFID tagging in the grocery sector is justified in the foreseeable future.

In addition to this however, other disadvantages of the RFID tagging scheme, such as the difficulty of scanning in the presence of radiopaque products, and issues surrounding privacy, make the use of RFID tags undesirable in item-level tagging of more expensive products even where the RFID cost becomes negligible.

It is therefore desirable to find an alternative to the use of RFID tags for item level tagging which ensures reliable item identification, which does not suffer from drawbacks such as reduced privacy for the consumer. It is also preferable that the technique provides a lower cost alternative thereby allowing it to be economically used on grocery items.

SUMMARY OF THE INVENTION

According to an aspect of the present invention there is provided a method of a product item registration, the product item having disposed thereon coded data portions at respective positions on a surface of the product item, each coded data portion encoding a product item identity and the respective position of the coded data portion, wherein the method includes steps of:

sensing by a sensing device at least one coded data portion;

generating by the sensing device indicating data indicative of the product item identity and the position of the sensed coded data portion, the product item identity and the position being generated by decoding at least one sensed coded data portion;

transferring by the sensing device the indicating data to a computer system;

receiving by the computer system the indicating data;

identifying by the computer system that the position related to a registration request;

obtaining by the computer system owner data associated with the sensing device;

determining an entity associated with the product item identity; and registering by the computer system the owner data with the entity.

Other aspects are also disclosed.

BRIEF DESCRIPTION OF THE DRAWINGS

Preferred and other embodiments of the invention will now be described, by way of non-limiting example only, with reference to the accompanying drawings, in which.

DESCRIPTION OF PREFERRED AND OTHER EMBODIMENTS

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
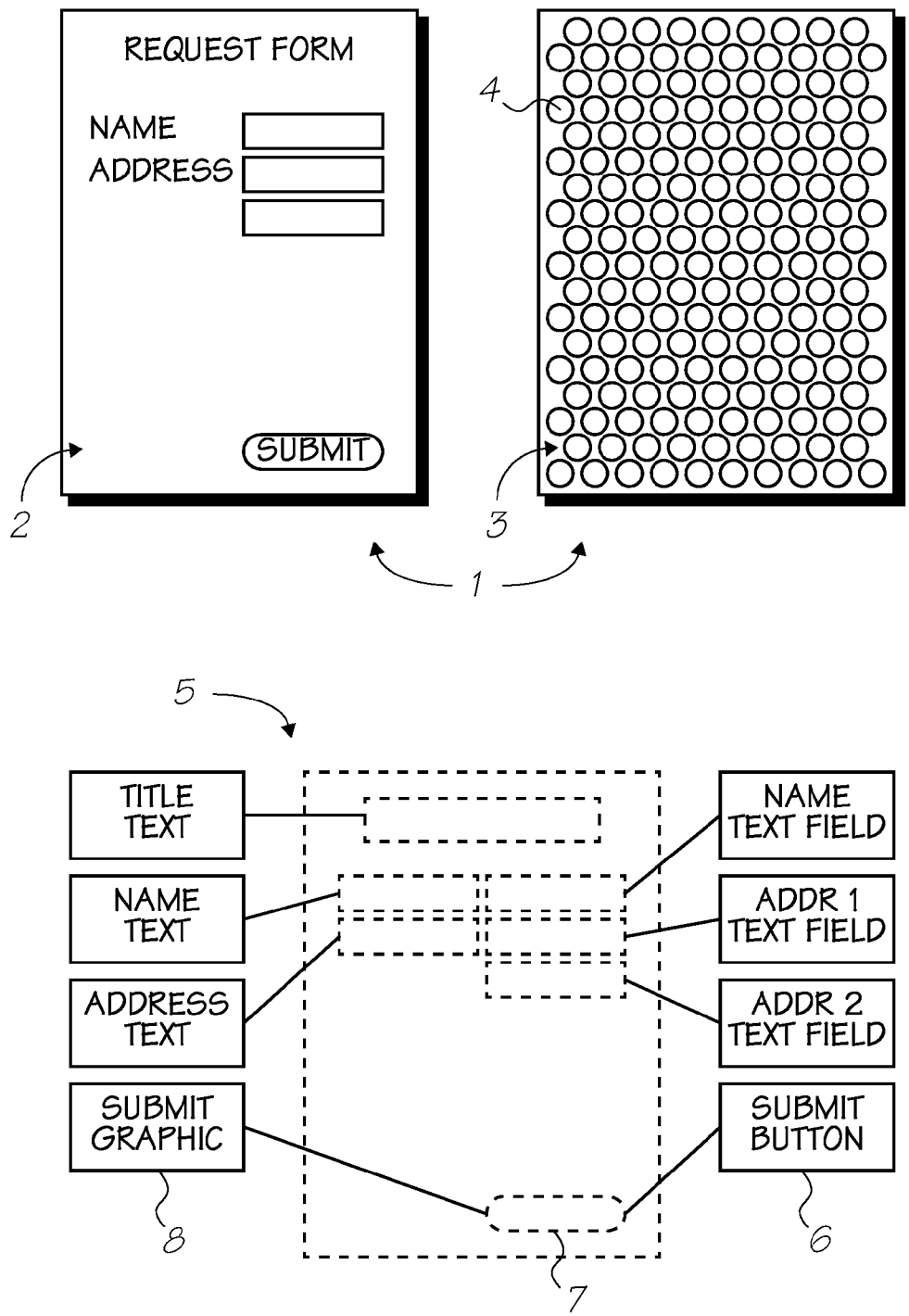
FIG. 1 is a schematic of a the relationship between a sample printed netpage and its online page description.

As illustrated in FIG. 1, a printed netpage 1 can represent an interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
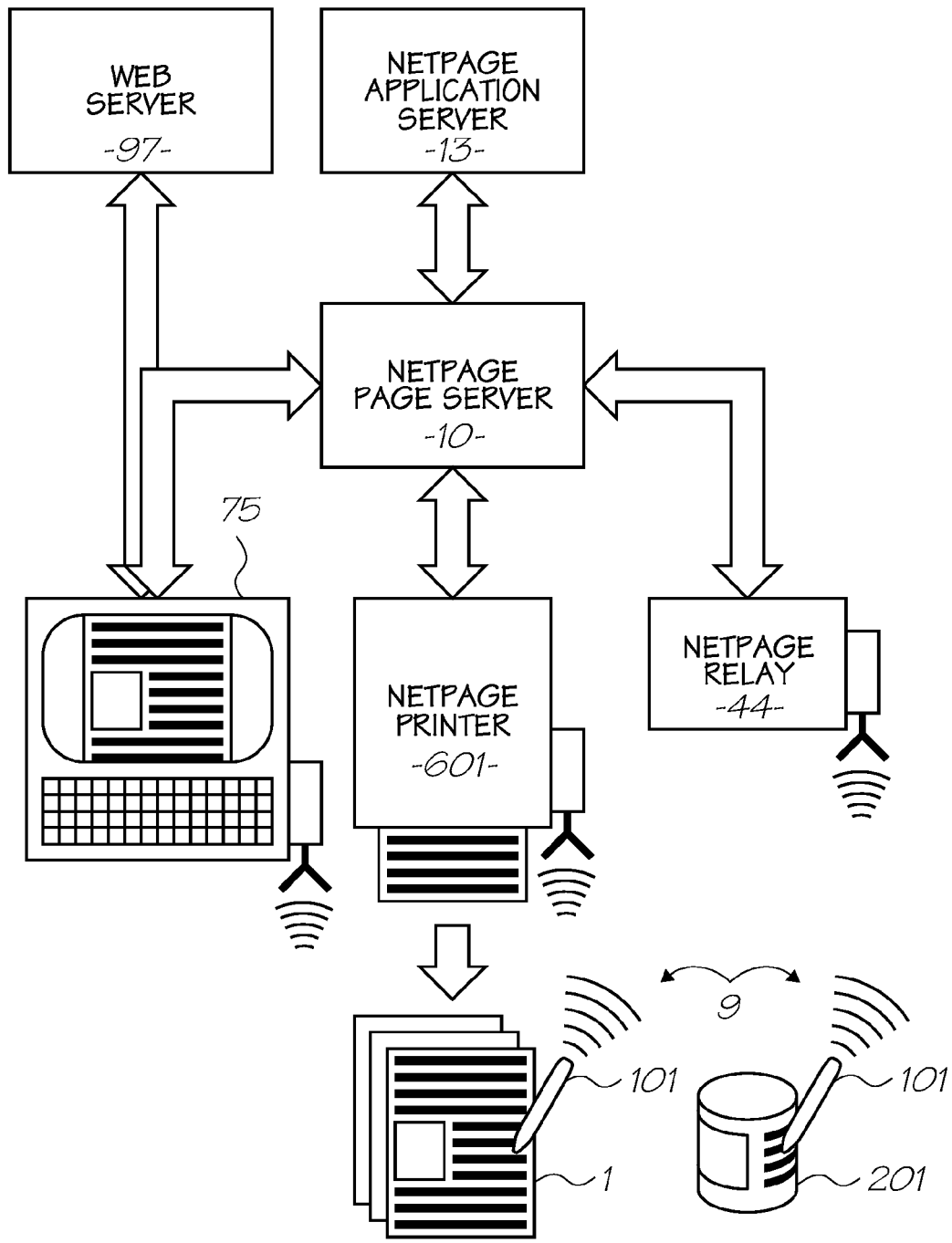
FIG. 2 is a schematic view of a interaction between a netpage pen, a Web terminal, a netpage printer, a netpage relay, a netpage page server, and a netpage application server, and a Web server.
Figure 8:
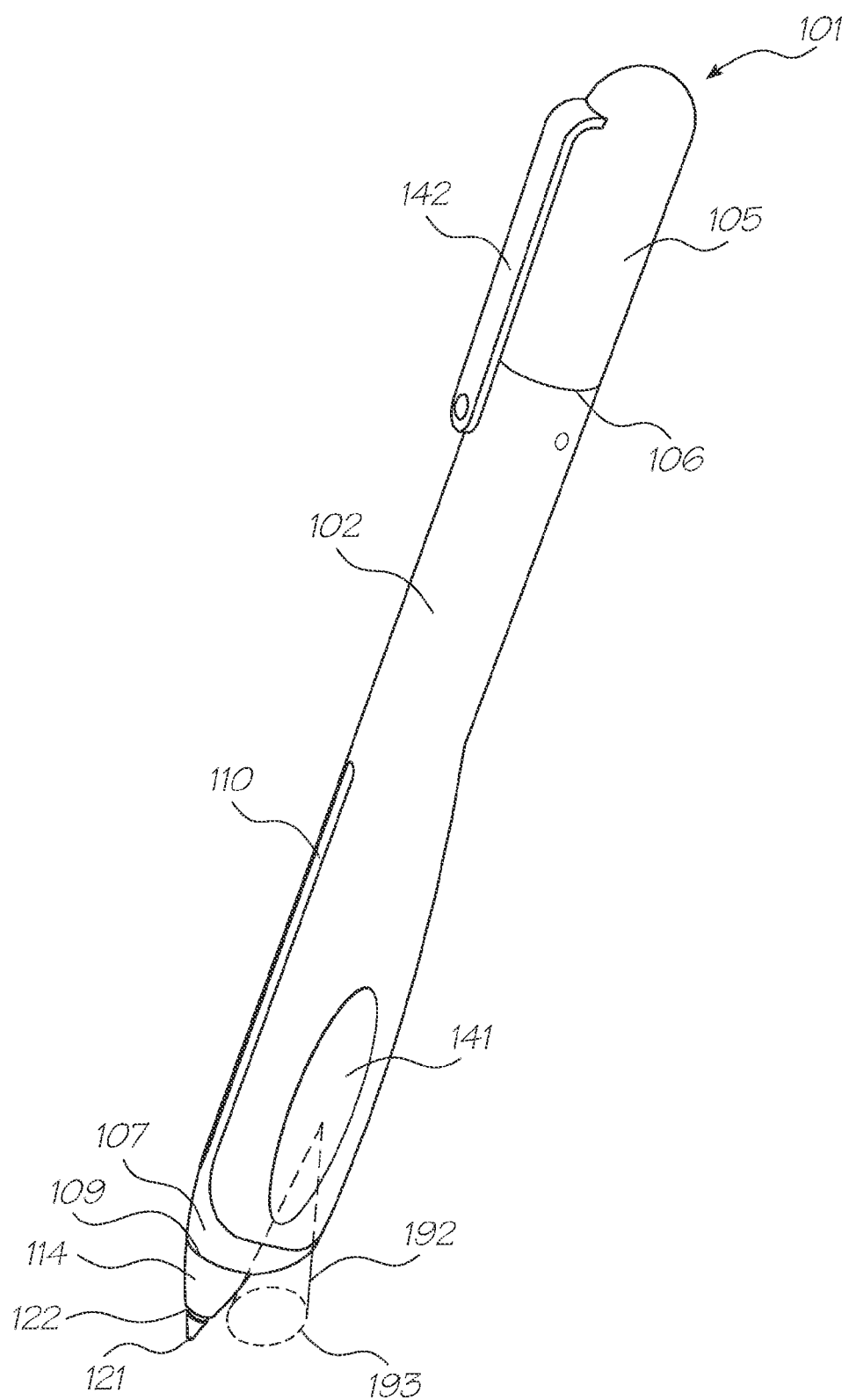
FIG. 8 is a perspective view of a netpage pen and its associated tag-sensing field-of-view cone.
Figure 9:
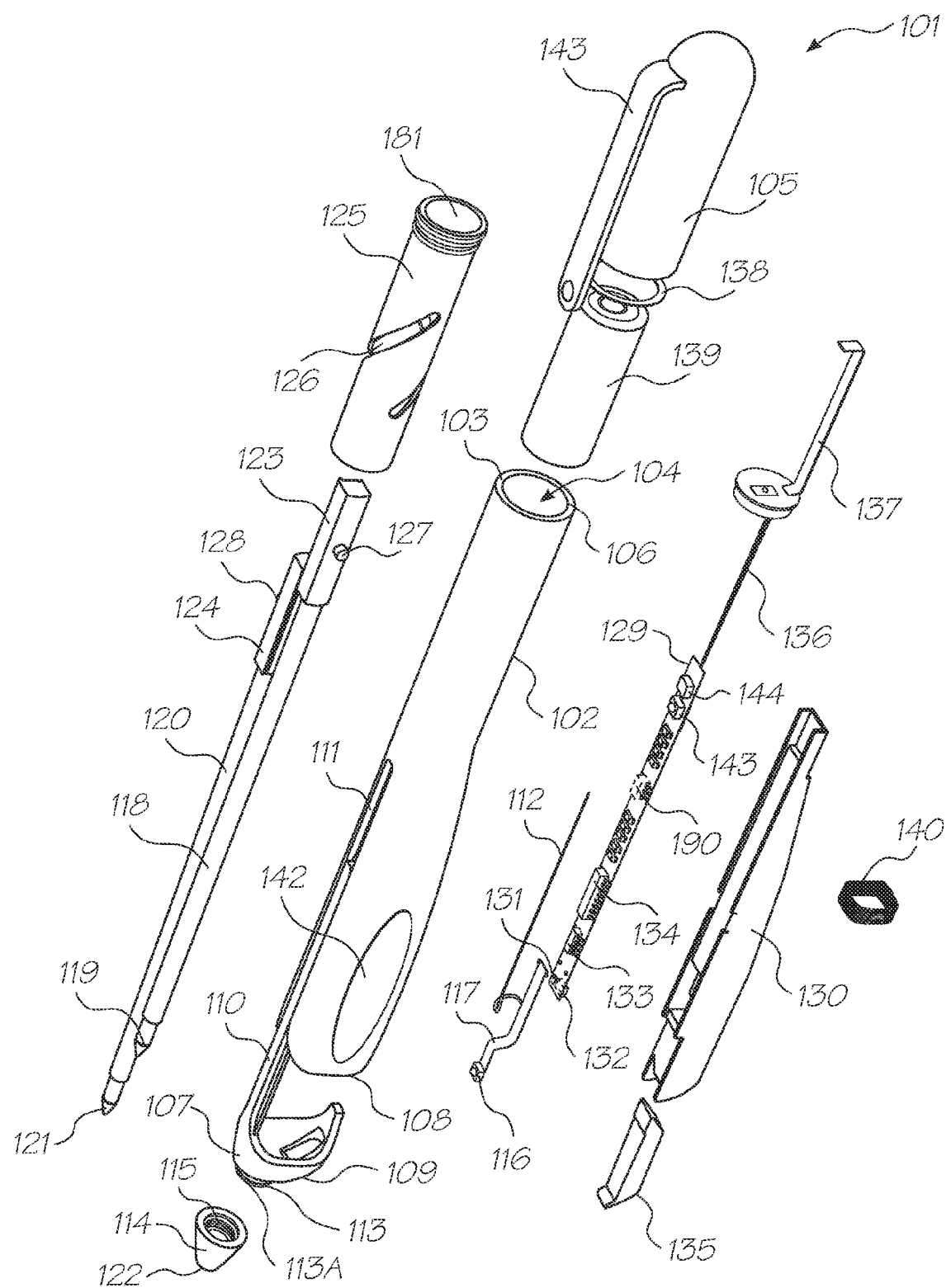
FIG. 9 is a perspective exploded view of the netpage pen shown in FIG. 8.

As illustrated in FIG. 2, the netpage pen 101, a preferred form of which is shown in FIGS. 8 and 9 and described in more detail below, works in conjunction with a personal computer (PC), Web terminal 75, or a netpage printer 601.

The netpage printer is an Internet-connected printing appliance for home, office or mobile use. The pen is wireless and communicates securely with the netpage network via a short-range radio link 9. Short-range communication is relayed to the netpage network by a local relay function which is either embedded in the PC, Web terminal or netpage printer, or is provided by a separate relay device 44. The relay function can also be provided by a mobile phone or other device which incorporates both short-range and longer-range communications functions.

In an alternative embodiment, the netpage pen utilises a wired connection, such as a USB or other serial connection, to the PC, Web terminal, netpage printer or relay device.

Figure 11:
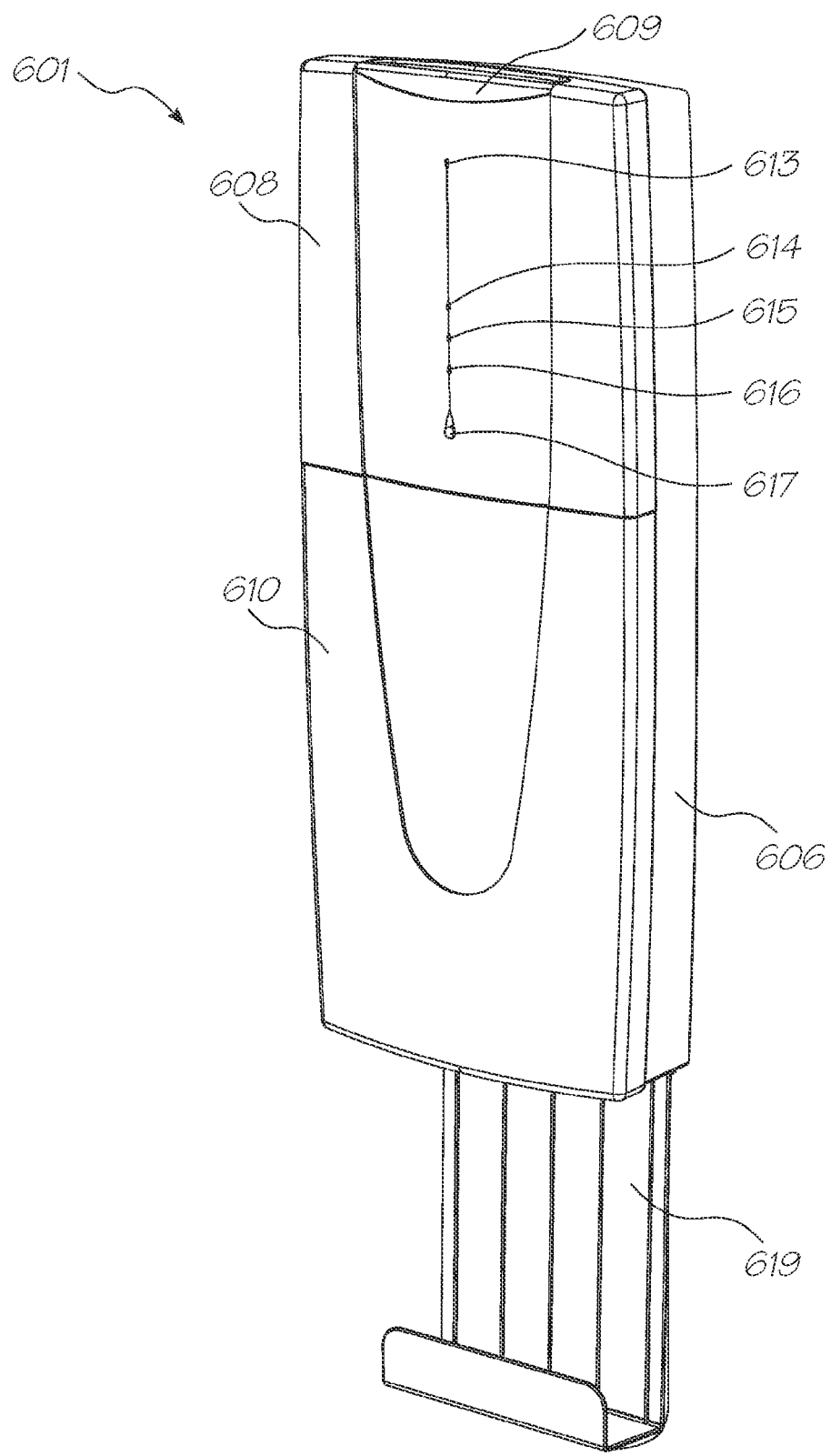
FIG. 11 is a perspective view of a wall-mounted netpage printer.
Figure 12:
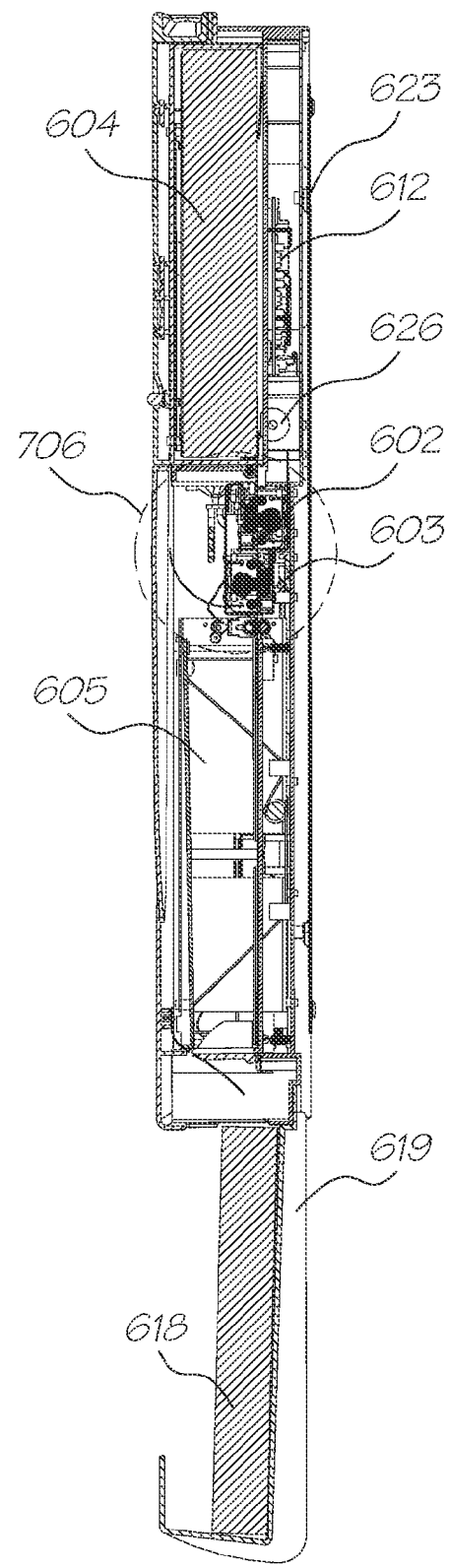
FIG. 12 is a section through the length of the netpage printer of FIG. 11.
Figure 13:
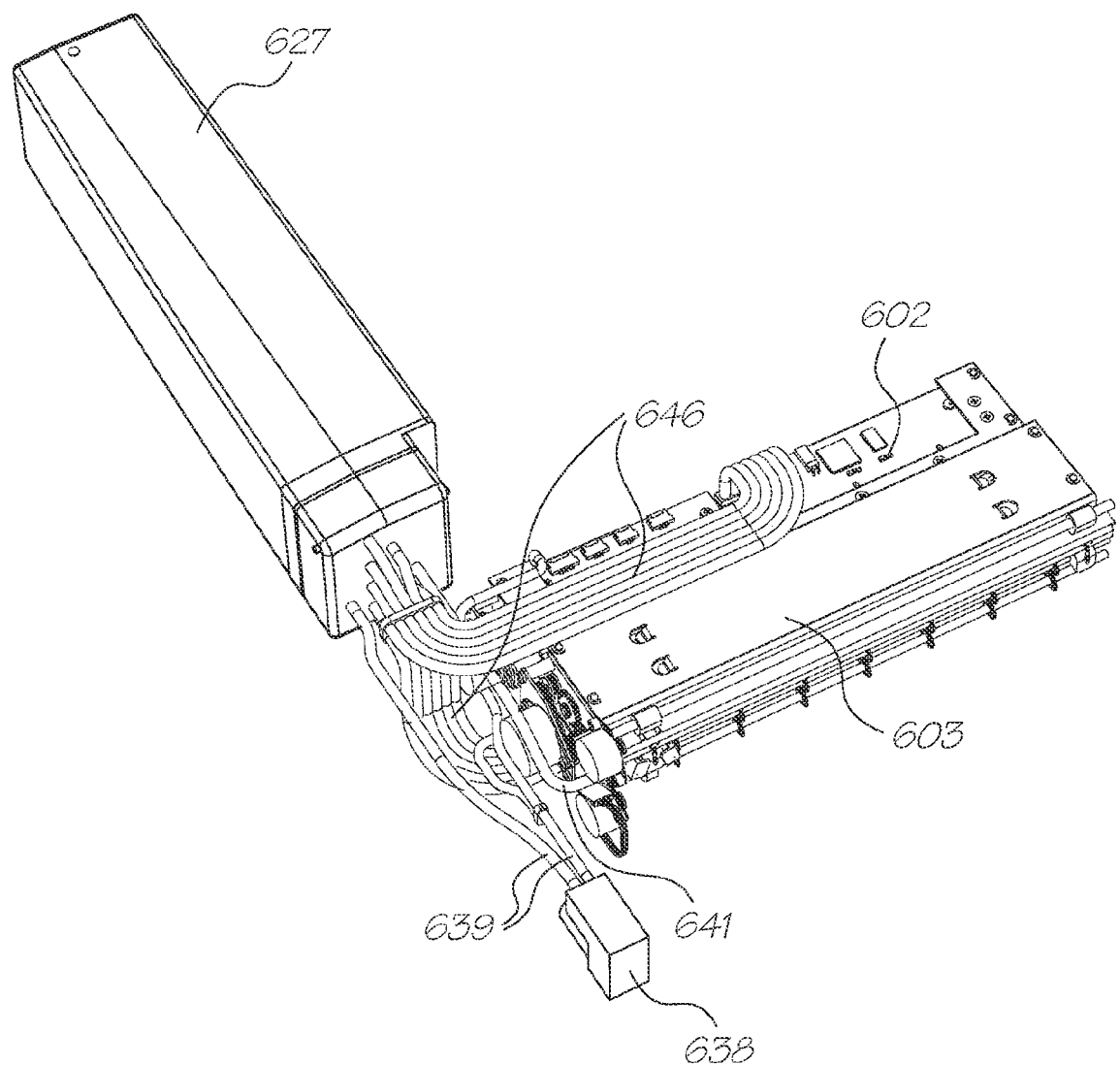
FIG. 13 is a detailed view of the ink cartridge, ink, air and glue paths, and print engines of the netpage printer of FIGS. 11 and 12.

The netpage printer 601, a preferred form of which is shown in FIGS. 11 to 13 and described in more detail below, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

netpages printed at their point of consumption combine the ease-of-use of paper with the timeliness and interactivity of an interactive medium.

As shown in FIG. 2, the netpage pen 101 interacts with the coded data on a printed netpage 1 (or product item 201) and communicates the interaction via a short-range radio link 9 to a relay. The relay sends the interaction to the relevant netpage page server 10 for interpretation. In appropriate circumstances, the page server sends a corresponding message to application computer software running on a netpage application server 13. The application server may in turn send a response which is printed on the originating printer.

In an alternative embodiment, the PC, Web terminal, netpage printer or relay device may communicate directly with local or remote application software, including a local or remote Web server. Relatedly, output is not limited to being printed by the netpage printer. It can also be displayed on the PC or Web terminal, and further interaction can be screen-based rather than paper-based, or a mixture of the two.

The netpage system is made considerably more convenient in the preferred embodiment by being used in conjunction with high-speed microelectromechanical system (MEMS) based inkjet (Memjet™) printers. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. Cable service is available to 95% of households in the United States, and cable modem service offering broadband Internet access is already available to 20% of these. The netpage printer can also operate with slower connections, but with longer delivery times and lower image quality. Indeed, the netpage system can be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or email address.

1 Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1.1 Netpages netpages are the foundation on which a netpage network is built. They provide a paper-based user interface to published information and interactive services.

A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 4:
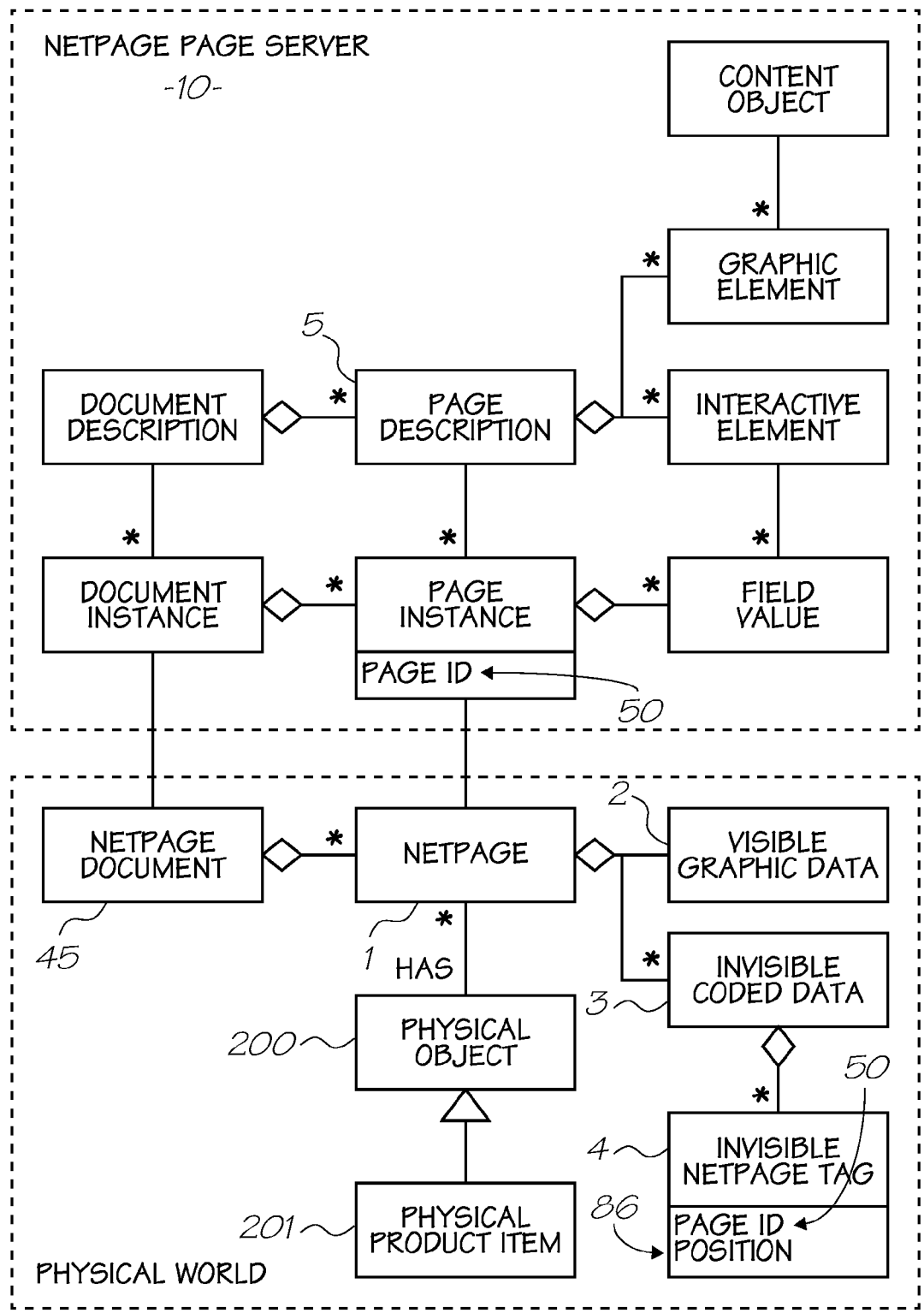
FIG. 4 is a schematic view of a high-level structure of a printed netpage and its online page description.

The relationship between the page description, the page instance, and the printed netpage is shown in FIG. 4. The printed netpage may be part of a printed netpage document 45. The page instance is associated with both the netpage printer which printed it and, if known, the netpage user who requested it.

As shown in FIG. 4, one or more netpages may also be associated with a physical object such as a product item, for example when printed onto the product item's label, packaging, or actual surface.

1.2 Coded Data on Surfaces Using Netpage Tags

Various netpage coding schemes and patterns are described in the present applicants' co-pending U.S. application U.S. Ser. No. 09/575,154 entitled "Identity-Coded Surface with Reference Points", filed 23 May 2000; co-pending U.S. application U.S. Ser. No. 10/120,441 entitled "Cyclic Position Codes", filed 12 Apr. 2002; co-pending U.S. application U.S. Ser. No. 10/309,358 entitled "Rotationally Symmetric Tags", filed 4 Dec. 2002; co-pending U.S. Application U.S. Ser. No. 10/409,864 entitled "Orientation-Indicating Cyclic Position Codes", filed 9 Apr. 2003; and co-pending U.S. application Ser. No. 10/786,631 entitled "Symmetric Tags", filed 4 Mar. 2004.

1.2.1 Tag Data Content

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ ($10^{27}$~ or a thousand trillion trillion) different regions to be uniquely identified. A 100-bit region ID allows $2^{100}$ (~$10^{30}$ or a million trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates. It will be appreciated the region ID and tag ID precision may be more or less than just described depending on the environment in which the system will be used.

1.2.2 Tag Data Encoding

In one embodiment, the 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code can be used in place of a (15, 5) Reed-Solomon code, for example: a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by reference thereto).

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

1.2.3 Tag Structure

Figure 5A:
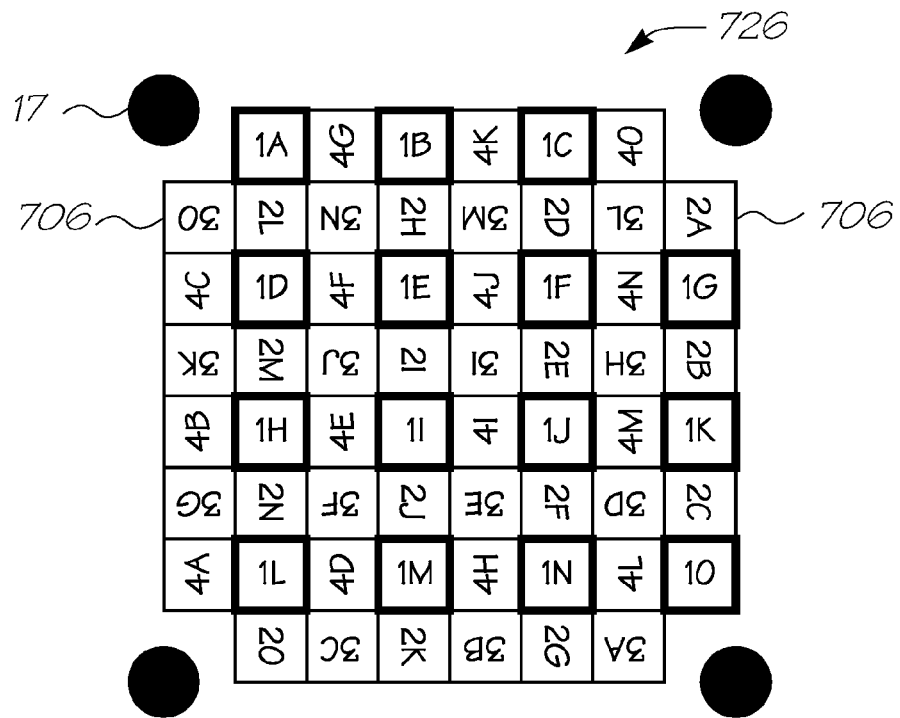
FIG. 5A is a plan view showing the interleaving and rotation of the symbols of four codewords of the tag.
Figure 5C:
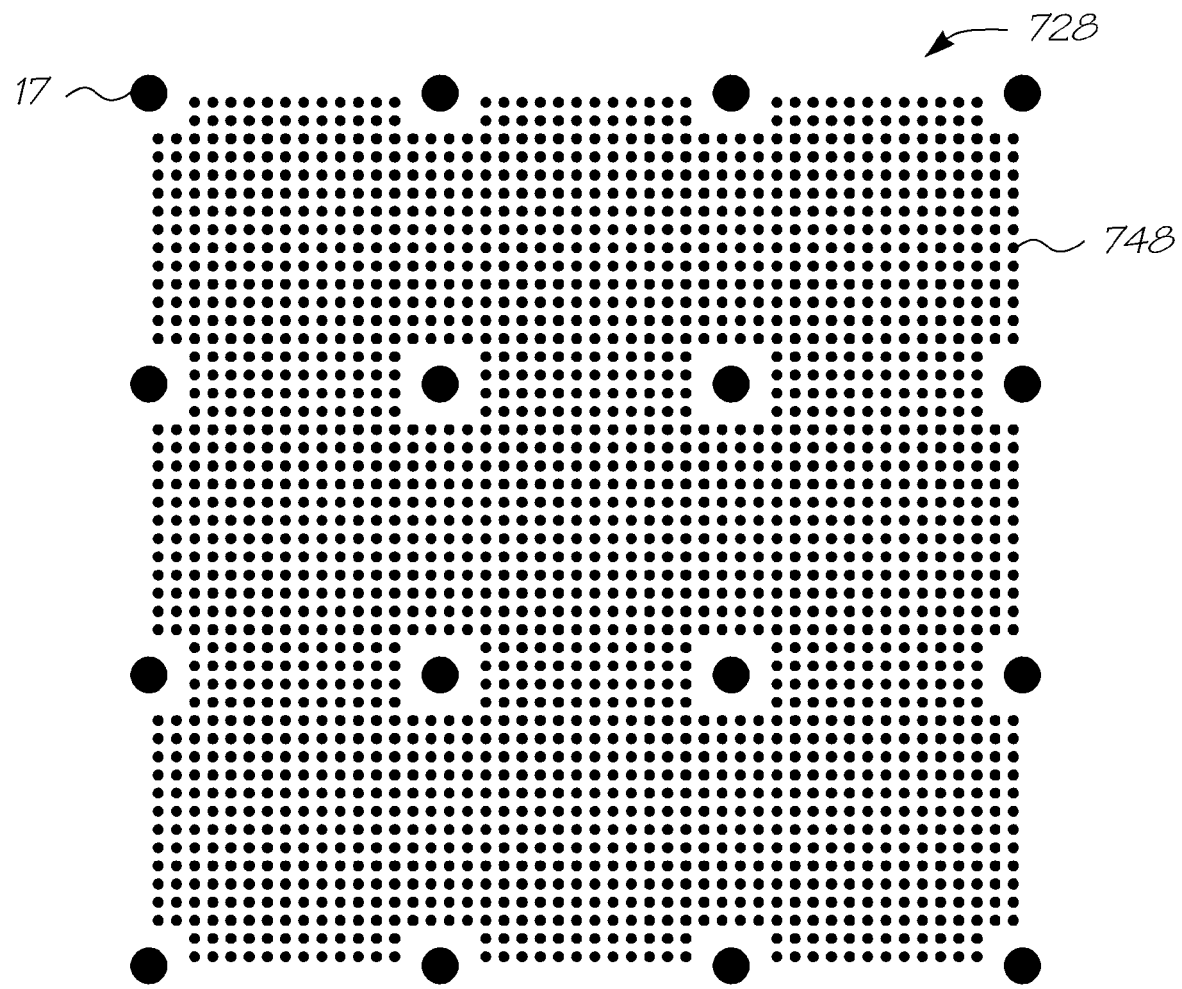
FIG. 5C is a plan view showing an arrangement of nine of the tags shown in FIGS. 5A and 5B, in which targets are shared between adjacent tags.
Figure 6:
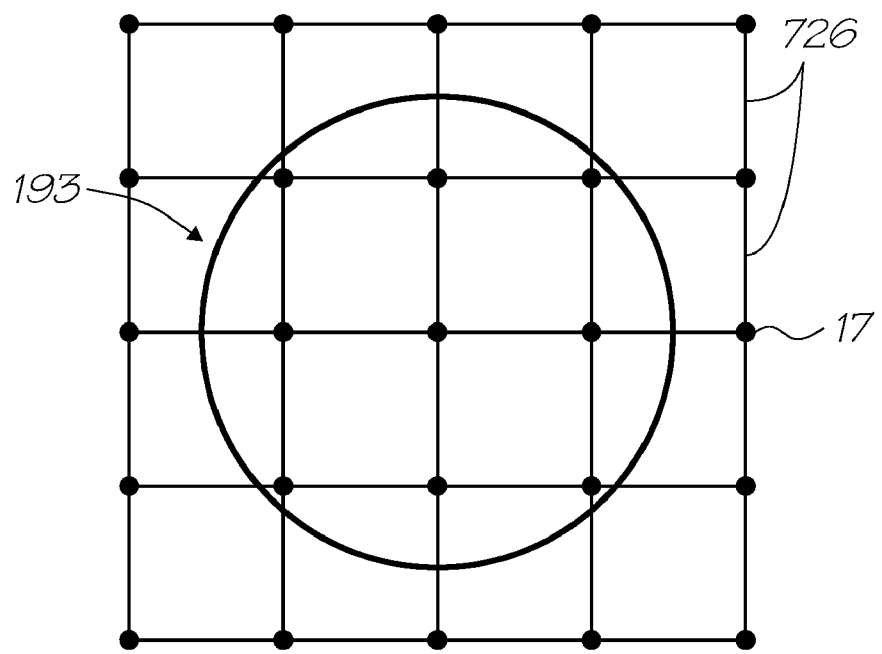
FIG. 6 is a plan view showing a relationship between a set of the tags shown in FIG. 5A and a field of view of a netpage sensing device in the form of a netpage pen.

FIG. 5a shows a tag 4, in the form of tag 726 with four perspective targets 17. The tag 726 represents sixty 4-bit Reed-Solomon symbols 747 (see description of FIGS. 44 to 46 below for discussion of symbols), for a total of 240 bits. The tag represents each "one" bit by the presence of a mark 748, referred to as a macrodot, and each "zero" bit by the absence of the corresponding macrodot. FIG. 5c shows a square tiling 728 of nine tags, containing all "one" bits for illustrative purposes. It will be noted that the perspective targets are designed to be shared between adjacent tags. FIG. 6 shows a square tiling of 16 tags and a corresponding minimum field of view 193, which spans the diagonals of two tags.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits.

The data-bearing macrodots 748 of the tag are designed to not overlap their neighbors, so that groups of tags cannot produce structures that resemble targets. This also saves ink. The perspective targets allow detection of the tag, so further targets are not required.

Although the tag may contain an orientation feature to allow disambiguation of the four possible orientations of the tag relative to the sensor, the present invention is concerned with embedding orientation data in the tag data. For example, the four codewords can be arranged so that each tag orientation (in a rotational sense) contains one codeword placed at that orientation, as shown in FIG. 5a, where each symbol is labelled with the number of its codeword (1-4) and the position of the symbol within the codeword (A-O). Tag decoding then consists of decoding one codeword at each rotational orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. Various such schemes are described in the present applicants' co-pending PCT application PCT/AU01/01274 filed 11 Oct. 2001.

The arrangement 728 of FIG. 5c shows that the square tag 726 can be used to fully tile or tesselate, i.e. without gaps or overlap, a plane of arbitrary size.

Although in preferred embodiments the tagging schemes described herein encode a single data bit using the presence or absence of a single undifferentiated macrodot, they can also use sets of differentiated glyphs to represent single-bit or multi-bit values, such as the sets of glyphs illustrated in the present applicants' co-pending PCT application PCT/AU01/01274 filed 11 Oct. 2001.

1.2.4.1 Macrodot Packing Schemes

Figure 44:
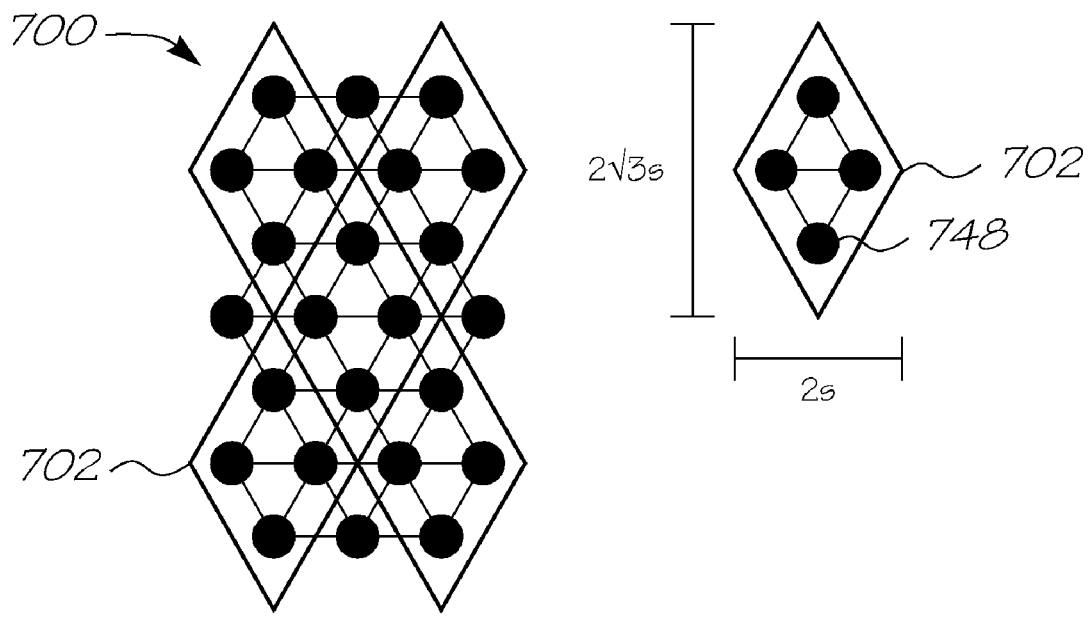
FIG. 44 shows a triangular macrodot packing with a four-bit symbol unit outlined, for use with an embodiment of the invention.
Figure 45:
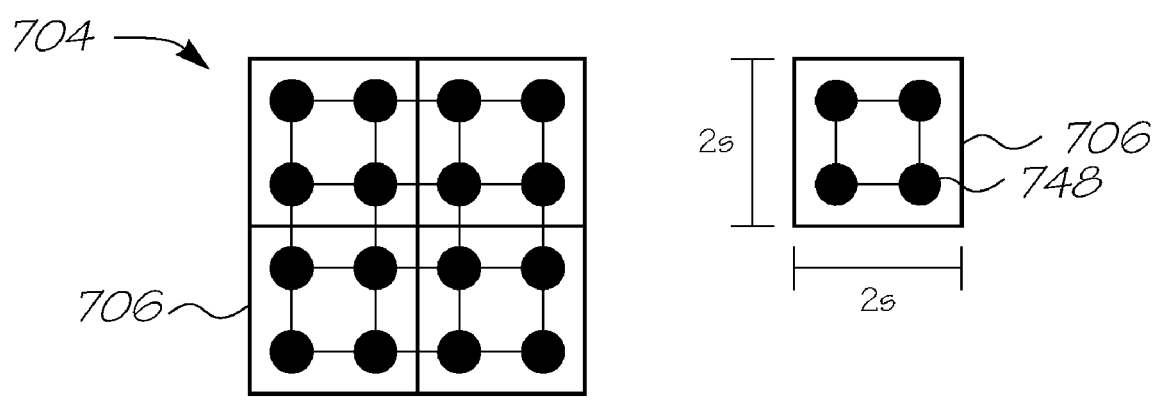
FIG. 45 shows a square macrodot packing with a four-bit symbol unit outlined, for use with an embodiment of the invention such as that described in relation to FIGS. 5a to 5c.

FIG. 44 shows a triangular macrodot packing 700 with a four-bit symbol unit 702 outlined. The area of the symbol unit is given by $$A_{UNIT} = 2\sqrt{3}s^2 \cong 3.5s^2$$

where s the spacing of adjacent macrodots. FIG. 45 shows a square macrodot packing 704 with a four-bit symbol unit 706 outlined. The area of the symbol unit is given by $$A_{UNIT} = 4s^2$$

Figure 46:
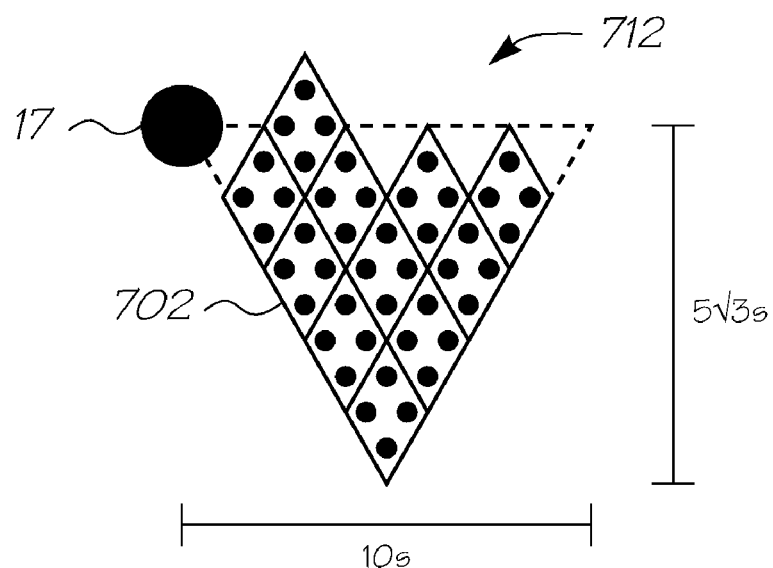
FIG. 46 shows a one-sixth segment of an hexagonal tag, with the segment containing a maximum of 11 four-bit symbols with the triangular macrodot packing shown in FIG. 44.

FIG. 46 shows a hexagonal macrodot packing 708 with a four-bit symbol unit 710 outlined. The area of the symbol unit is given by $$A_{UNIT} = 3\sqrt{3}s^2 \cong 5.2s^2$$

Of these packing schemes, the triangular packing scheme gives the greatest macrodot density for a particular macrodot spacing s.

In preferred embodiments, s has a value between 100 μm and 200 μm.

1.2.4.2 Tag Designs

FIG. 46 shows a one-sixth segment 712 of a hexagonal tag, with the segment containing a maximum of 11 four-bit symbols with the triangular macrodot packing shown in FIG. 44. The target 17 is shared with adjacent segments. Each tag segment can, by way of example, support a codeword of an (11,k) Reed-Solomon code, i.e. a punctured (15,k) code, with the ability to detect u=11−k symbol errors, or correct t=[(11−k)/2] symbol errors. For example, if k=7 then u=4 and t=2.

Figure 47:
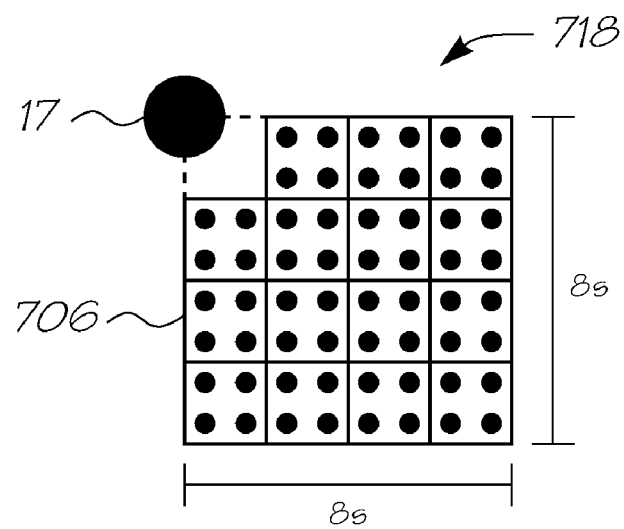
FIG. 47 shows a one-quarter segment of a square tag, with the segment containing a maximum of 15 four-bit symbols with the square macrodot packing shown in FIG. 45.

FIG. 47 shows a one-quarter segment 718 of a square tag, with the segment containing a maximum of 15 four-bit symbols with the square macrodot packing shown in FIG. 45. Each tag segment can, by way of example, support a codeword of a (15,k) Reed-Solomon code, with the ability to detect u=15−k symbol errors, or correct t=[(15−k)/2] symbol errors. For example, if k=7 then u=8 and t=4.

1.2.4.3 Hexagonal Tag Design

Figure 48:
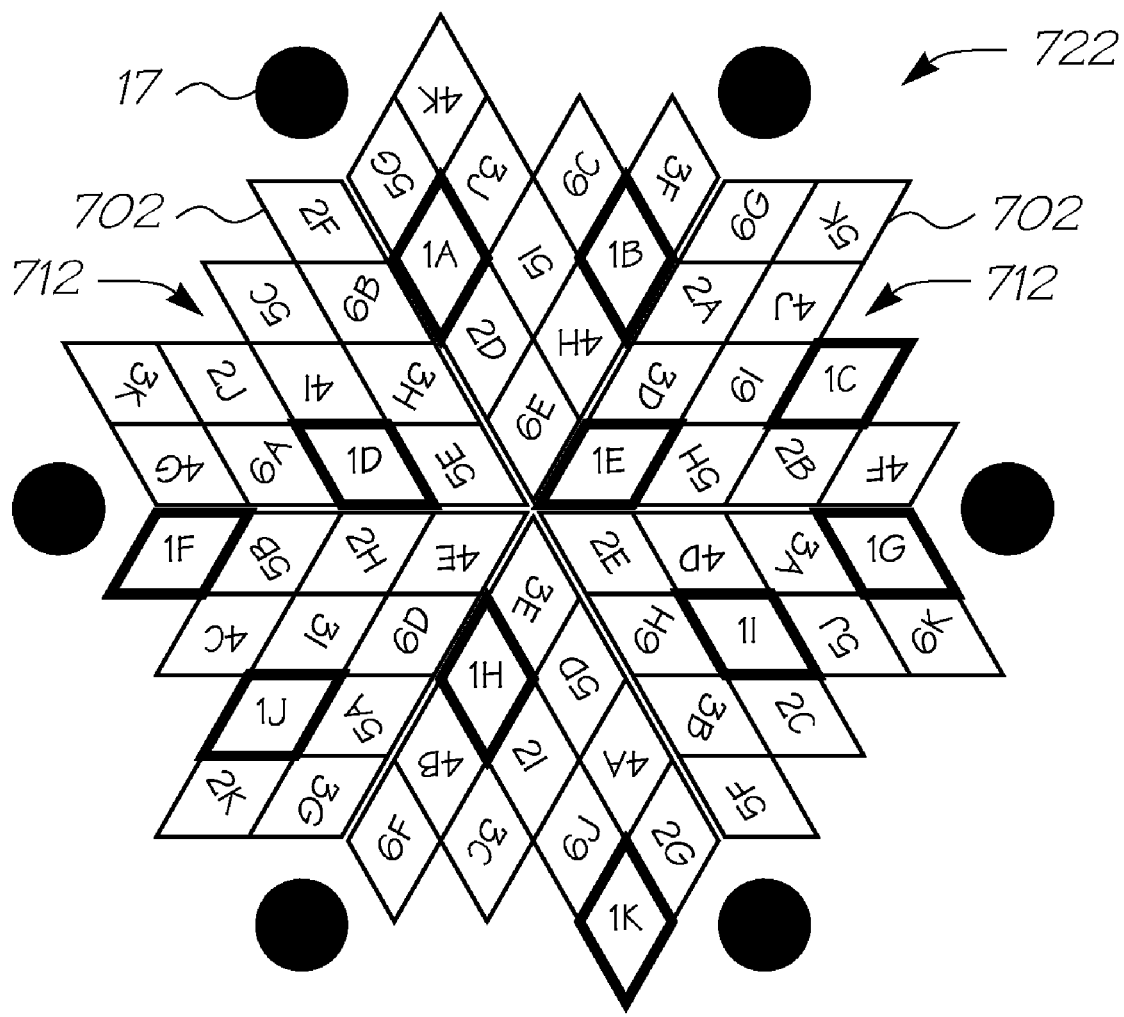
FIG. 48 shows a logical layout of a hexagonal tag using the tag segment of FIG. 47, with six interleaved $2^4$-ary (11, k) codewords.
Figure 49:
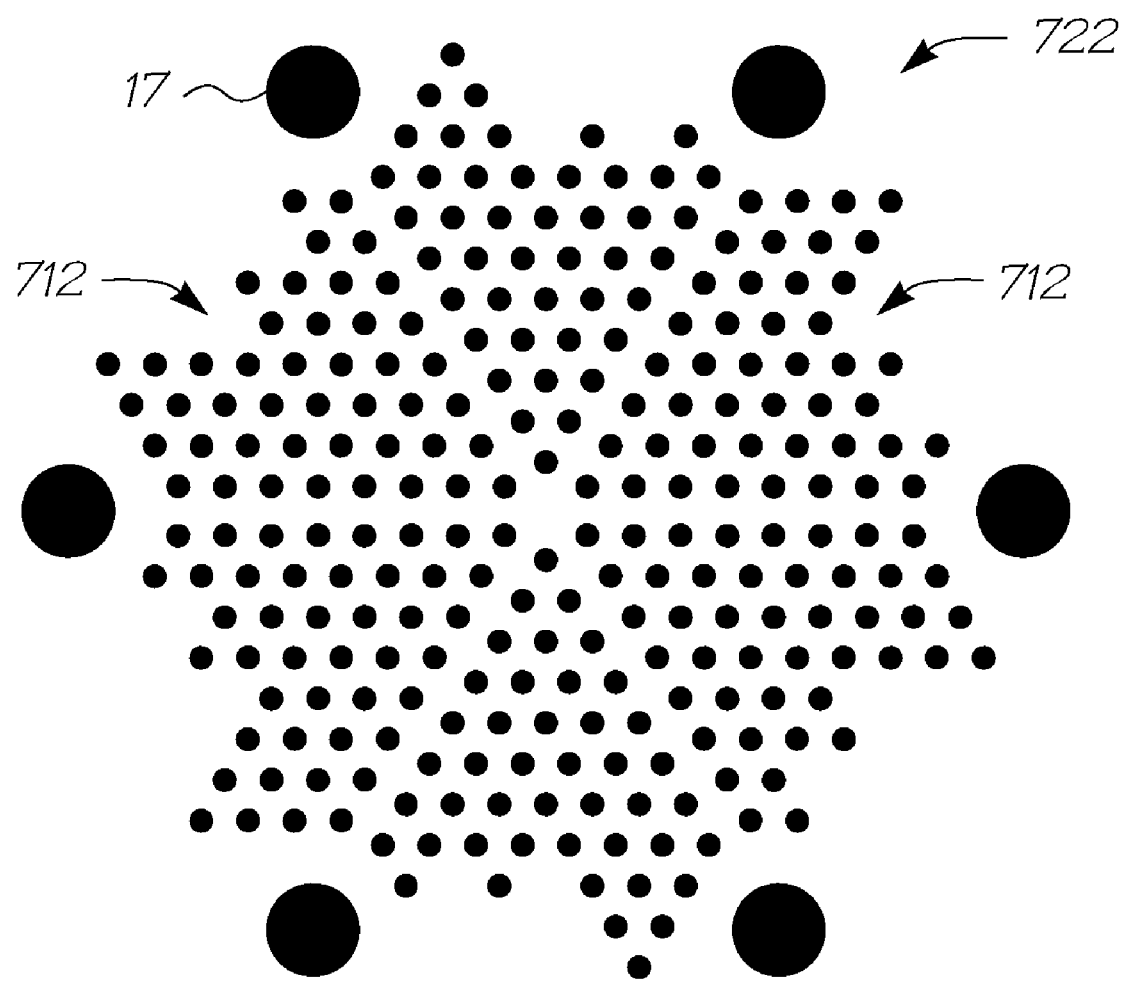
FIG. 49 shows the macrodot layout of the hexagonal tag of FIG. 48.
Figure 50:
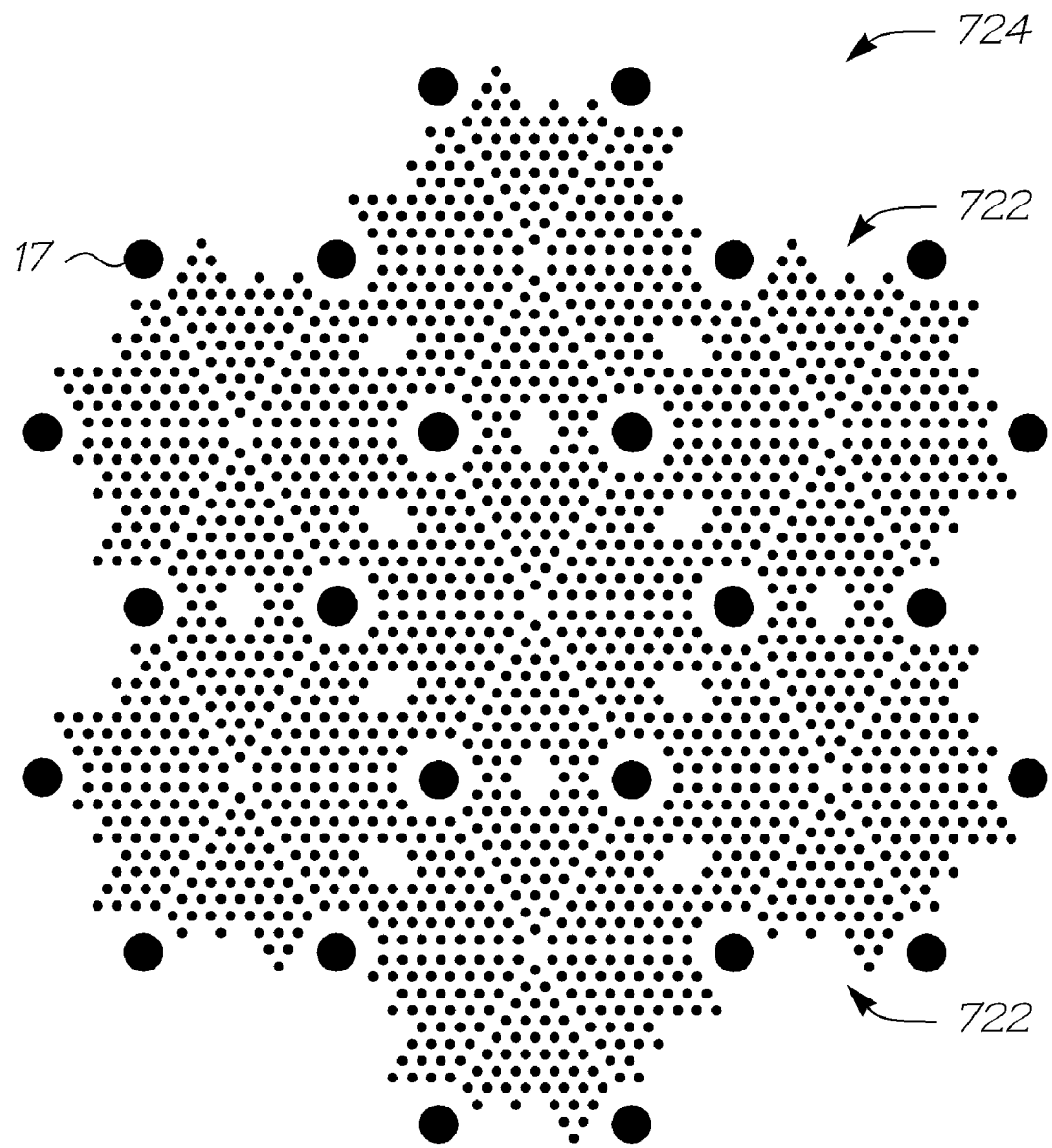
FIG. 50 shows an arrangement of seven abutting tags of the design of FIGS. 48 and 49, with shared targets.
Figure 53:
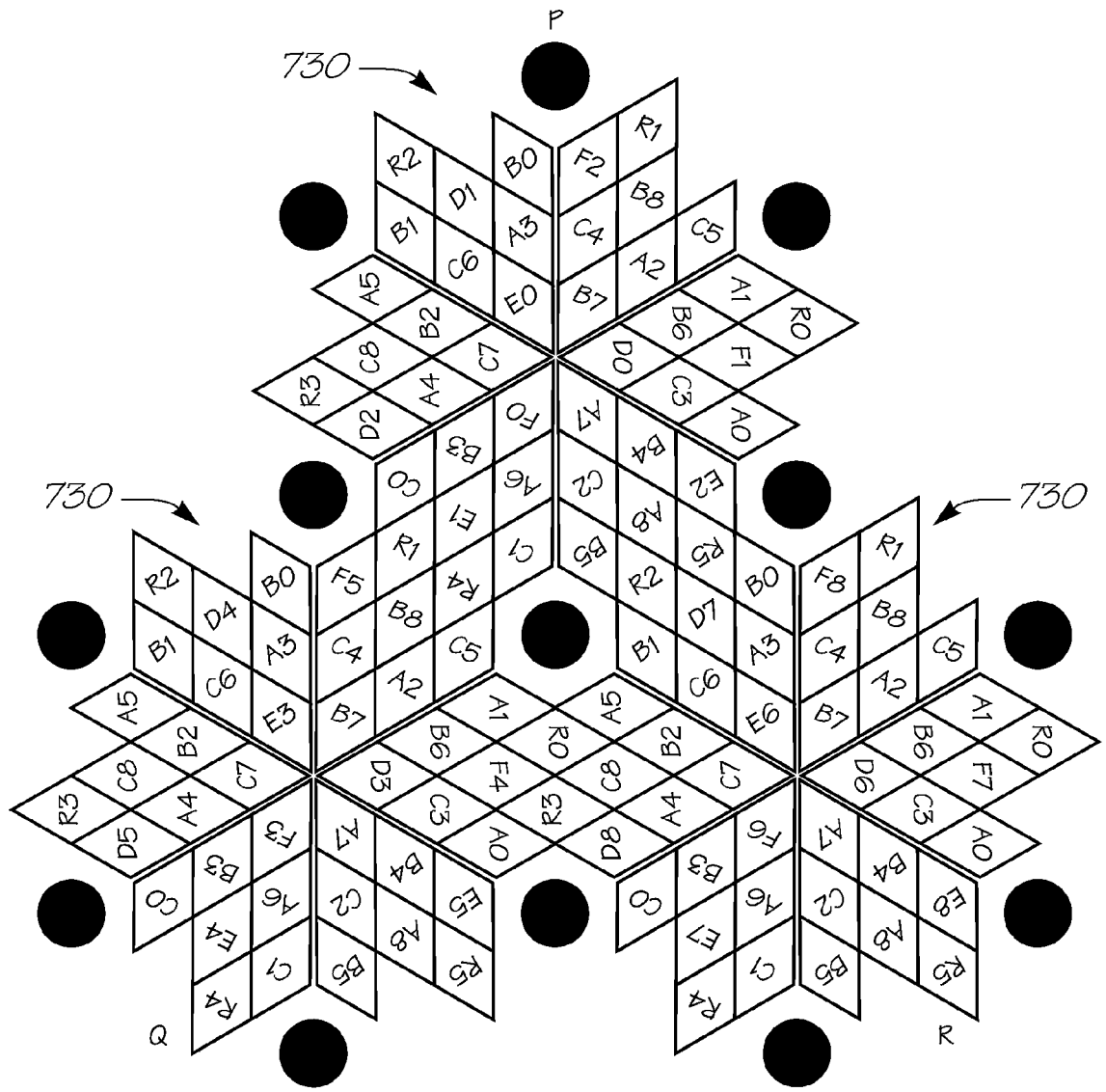
FIG. 53 shows three adjacent tags of type P, Q and R, each with the layout of the tag of FIG. 51, containing a complete set of distributed codewords.

FIG. 48 shows a logical layout of a hexagonal tag 722 using the tag segment 712 of FIG. 46, with six interleaved $2^4$-ary (11,k) codewords. FIG. 49 shows the macrodot layout of the hexagonal tag 722 of FIG. 51. FIG. 53 shows an arrangement 724 of seven abutting tags 722 of the design of FIG. 48, with shared targets 17. The arrangement 724 shows that the hexagonal tag 722 can be used to tesselate a plane of arbitrary size.

1.2.4.4 Alternative Hexagonal Tag Design 1

Figure 51:
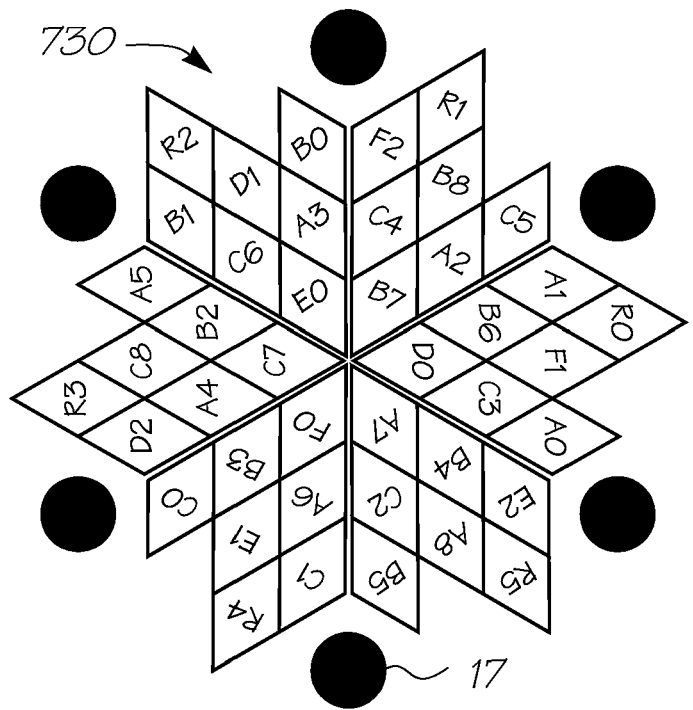
FIG. 51 shows a logical layout of an alternative hexagonal tag using the tag segment of FIG. 47, with three interleaved $2^4$-ary (9, k) codewords and three interleaved three-symbol fragments of three distributed $2^4$-ary (9, k) codewords.

FIG. 51 shows the logical layout of an alternative hexagonal tag. This tag design is described in detail in the present applicants' co-pending U.S. application U.S. Ser. No. 10/409,864 entitled "Orientation-Indicating Cyclic Position Codes".

Figure 52:
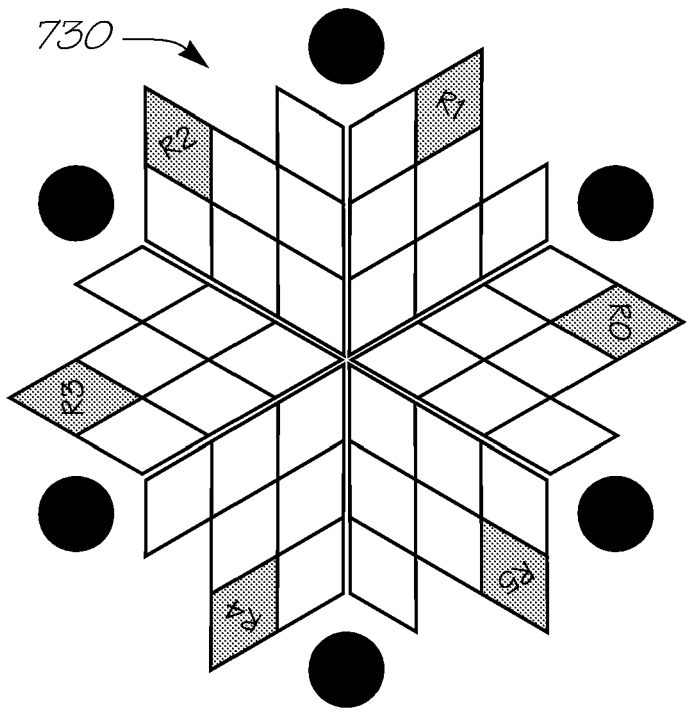
FIG. 52 shows the logical layout of an orientation-indicating cyclic position codeword of the hexagonal tag of FIG. 51.

The tag contains a $2^4$-ary (6,1) cyclic position codeword $(0,5,6,9,A_{16},F_{16})$ which can be decoded at any of the six possible orientations of the tag to determine the actual orientation of the tag. Symbols which are part of the cyclic position codeword have a prefix of "R" and are numbered 0 to 5 in order of increasing significance, and are shown shaded in FIG. 52.

The tag locally contains three complete codewords which are used to encode information unique to the tag. Each codeword is of a punctured $2^4$-ary (9,5) Reed-Solomon code. The tag therefore encodes up to 60 bits of information unique to the tag. The tag also contains fragments of three codewords which are distributed across three adjacent tags and which are used to encode information common to a set of contiguous tags. Each codeword is of a punctured $2^4$-ary (9,5) Reed-Solomon code. Any three adjacent tags therefore together encode up to 60 bits of information common to a set of contiguous tags.

The layout of the three complete codewords, distributed across three adjacent tags, is shown in FIG. 53. In relation to these distributed codewords there are three types of tag. These are referred to as P, Q and R in order of increasing significance.

The P, Q and R tags are repeated in a continuous tiling of tags which guarantees the any set of three adjacent tags contains one tag of each type, and therefore contains a complete set of distributed codewords. The tag type, used to determine the registration of the distributed codewords with respect to a particular set of adjacent tags, is encoded in one of the local codewords of each tag.

1.2.4.4 Alternative Hexagonal Tag Design 2

Figure 54:
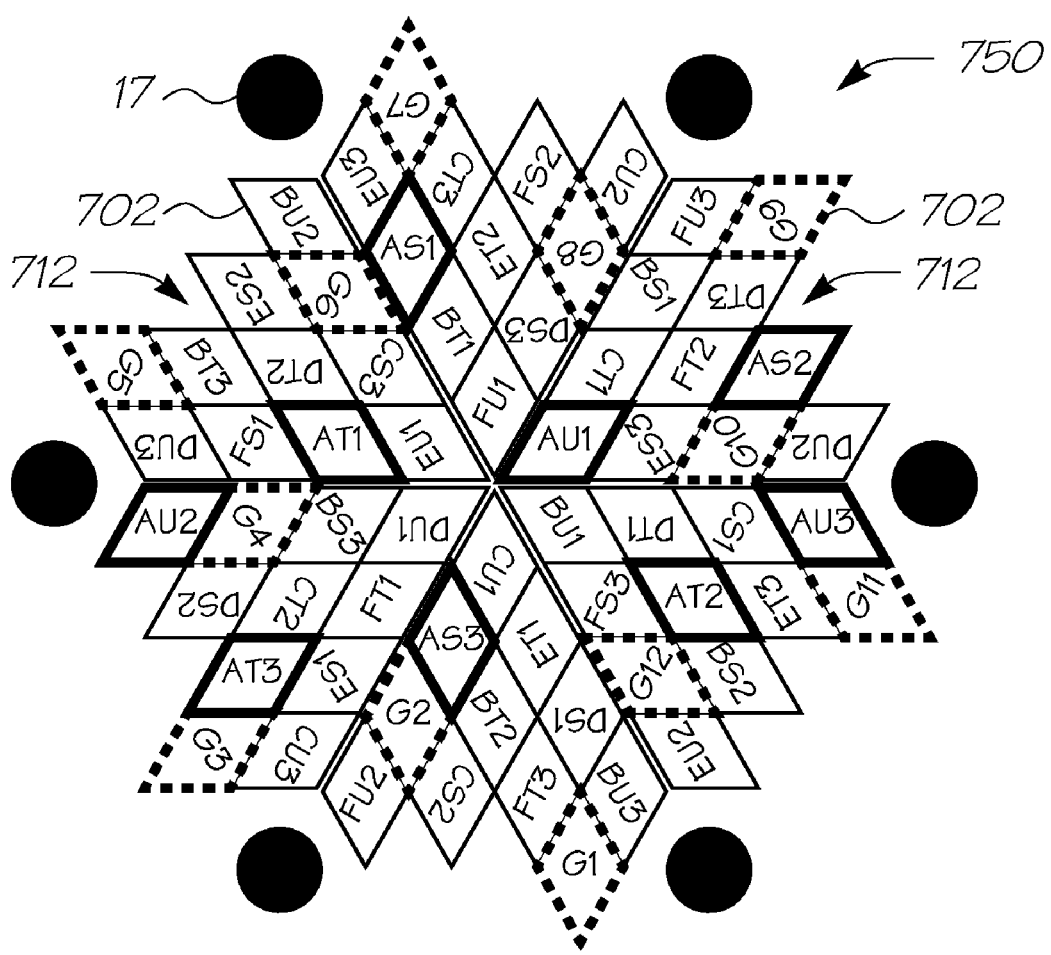
FIG. 54 shows the logical layout of yet another alternative hexagonal tag using the tag segment of FIG. 47, with one local $2^4$-ary (12, k) codeword, interleaved with eighteen 3-symbol fragments of eighteen distributed $2^4$-ary (9, k) codewords.

FIG. 54 shows the logical layout of another alternative hexagonal tag. This tag design is described in detail in the present applicants' co-pending U.S. application U.S. Ser. No. 10/786,631 entitled "Symmetric Tags".

FIG. 54 shows a logical layout of a hexagonal tag 750 using the tag segment of FIG. 46, with one local $2^4$-ary (12,k) codeword interleaved with eighteen 3-symbol fragments of eighteen distributed $2^4$-ary (9,k) codewords.

In the layout of FIG. 54, the twelve 4-bit symbols of the local codeword are labelled G1 through G12, and are shown with a dashed outline. Each symbol of the eighteen fragments of the eighteen distributed codewords is labelled with an initial prefix of A through F, indicating which of six nominal codewords the symbol belongs to, a subsequent prefix of S through U, indicating which 3-symbol part of the codeword the symbol belongs to, and a suffix of 1 through 3, indicating which of the three possible symbols the symbol is.

Tag 750 is structured so that the minimal field of view allows the recovery of the local codeword G of at least one tag, and the entire set of distributed codewords AP through FR via fragments of tags of type P, Q and R included in the field of view. Furthermore, the continuous tiling of tag 750 ensures that there is a codeword available with a known layout for each possible rotational and translational combination (of which there are eighteen). Each distributed codeword includes data which identifies the rotation of the codeword in relation to the tiling, thus allowing the rotation of the tiling with respect to the field of view to be determined from decoded data rather than from other structures, and the local codeword to be decoded at the correct orientation.

Figure 55:
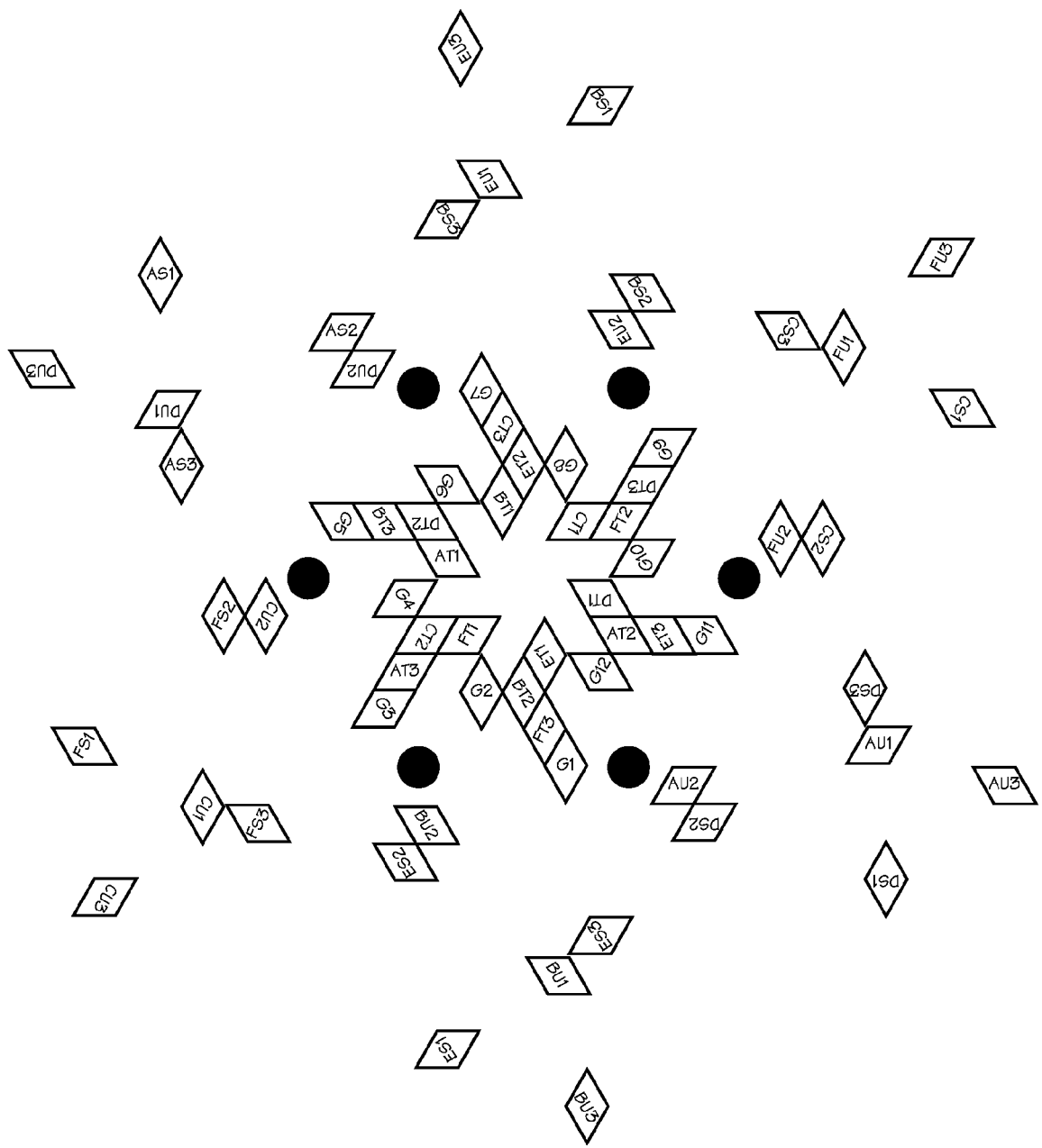
FIG. 55 shows the logical layout of the hexagonal tag of FIG. 54, re-arranged to show the distributed 3-symbol fragments which contribute to the same codewords.

FIG. 55 shows the logical layout of the hexagonal tag 750 of FIG. 54, re-arranged to show the distributed 3-symbol fragments which contribute to the same codewords. For example, if the central tag shown in FIG. 54 were a P-type tag, then the six distributed codewords shown in the figure would be the AP, BP, CP, DP, EP and FP codewords. FIG. 55 also shows the local G codeword of the tag. Clearly, given the distributed and repeating nature of the distributed codewords, different fragments from the ones shown in the figure can be used to build the corresponding codewords.

1.2.4 Tag Image Processing and Decoding

Figure 7:
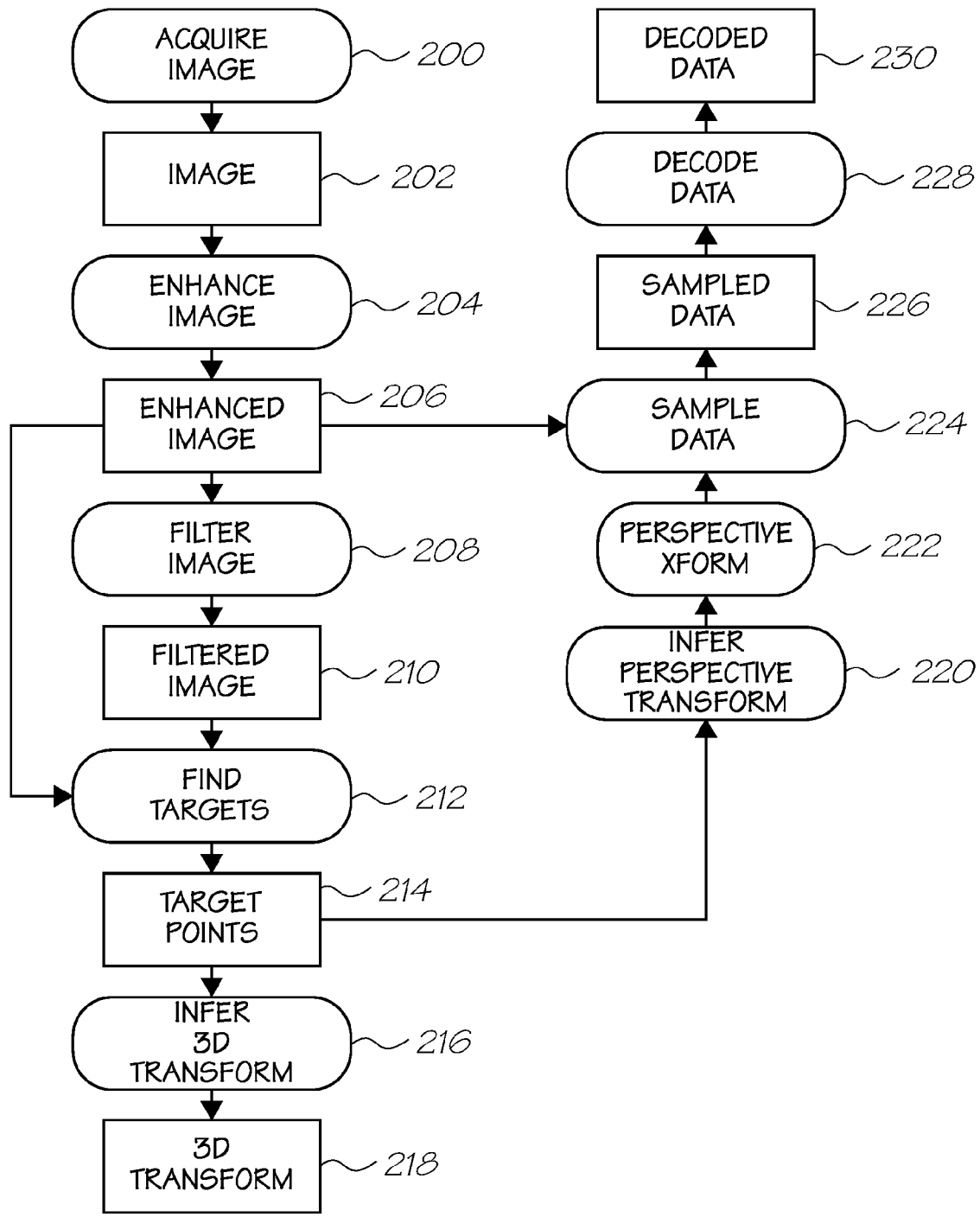
FIG. 7 is a flowchart of a tag image processing and decoding algorithm.

FIG. 7 shows a tag image processing and decoding process flow. A raw image 202 of the tag pattern is acquired (at 200), for example via an image sensor such as a CCD image sensor, CMOS image sensor, or a scanning laser and photodiode image sensor. The raw image is then typically enhanced (at 204) to produce an enhanced image 206 with improved contrast and more uniform pixel intensities. Image enhancement may include global or local range expansion, equalisation, and the like. The enhanced image 206 is then typically filtered (at 208) to produce a filtered image 210. Image filtering may consist of low-pass filtering, with the low-pass filter kernel size tuned to obscure macrodots but to preserve targets. The filtering step 208 may include additional filtering (such as edge detection) to enhance target features. The filtered image 210 is then processed to locate target features (at 212), yielding a set of target points. This may consist of a search for target features whose spatial inter-relationship is consistent with the known geometry of a tag. Candidate targets may be identified directly from maxima in the filtered image 210, or may be the subject of further characterisation and matching, such as via their (binary or grayscale) shape moments (typically computed from pixels in the enhanced image 206 based on local maxima in the filtered image 210), as described in U.S. patent application Ser. No. 09/575,154. The search typically starts from the center of the field of view. The target points 214 found by the search step 212 indirectly identify the location of the tag in the three-dimensional space occupied by the image sensor and its associated optics. Since the target points 214 are derived from the (binary or grayscale) centroids of the targets, they are typically defined to sub-pixel precision.

It may be useful to determine the actual 3D transform of the tag (at 216), and, by extension, the 3D transform (or pose) 218 of the sensing device relative to the tag. This may be done analytically, as described in U.S. patent application Ser. No. 09/575,154, or using a maximum likelihood estimator (such as least squares adjustment) to fit parameter values to the 3D transform given the observed perspective-distorted target points (as described in P. R. Wolf and B. A. Dewitt, Elements of Photogrammetry with Applications in GIS, 3rd Edition, McGraw Hill, February 2000, the contents of which are herein incorporated by reference thereto). The 3D transform includes the 3D translation of the tag, the 3D orientation (rotation) of the tag, and the focal length and viewport scale of the sensing device, thus giving eight parameters to be fitted, or six parameters if the focal length and viewport scale are known (e.g. by design or from a calibration step). Each target point yields a pair of observation equations, relating an observed coordinate to a known coordinate. If eight parameters are being fitted, then five or more target points are needed to provide sufficient redundancy to allow maximum likelihood estimation. If six parameters are being fitted, then four or more target points are needed. If the tag design contains more targets than are minimally required to allow maximum likelihood estimation, then the tag can be recognised and decoded even if up to that many of its targets are damaged beyond recognition.

To allow macrodot values to be sampled accurately, the perspective transform of the tag must be inferred. Four of the target points are taken to be the perspective-distorted corners of a rectangle of known size in tag space, and the eight-degree-of-freedom perspective transform 222 is inferred (at 220), based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by reference thereto). The perspective transform may alternatively be derived from the 3D transform 218, if available.

The inferred tag-space to image-space perspective transform 222 is used to project (at 224) each known data bit position in tag space into image space where the real-valued position is used to bi-linearly (or higher-order) interpolate (at 224) the four (or more) relevant adjacent pixels in the enhanced input image 206. The resultant macrodot value is compared with a suitable threshold to determine whether it represents a zero bit or a one bit.

One the bits of one or more complete codeword have been sampled, the codewords are decoded (at 228) to obtain the desired data 230 encoded in the tag. Redundancy in the codeword may be used to detect errors in the sampled data, or to correct errors in the sampled data.

As discussed in U.S. patent application Ser. No. 09/575,154, the obtained tag data 230 may directly or indirectly identify the surface region containing the tag and the position of the tag within the region. An accurate position of the sensing device relative to the surface region can therefore be derived from the tag data 230 and the 3D transform 218 of the sensing device relative to the tag.

1.2.6 Tag Map

Figure 22:
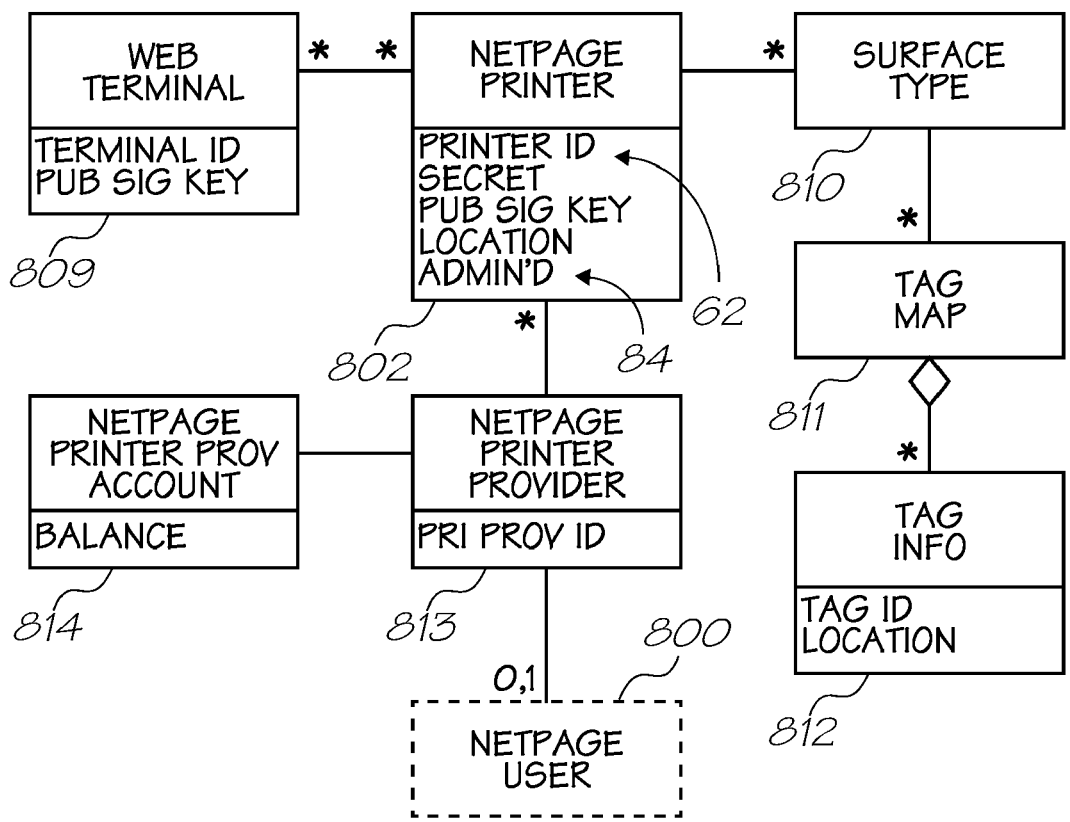
FIG. 22 is a schematic view of a printer class diagram.

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encode cartesian coordinates or polar coordinates, depending on the surface type on which it appears. The tag ID structure is dictated by and known to the tag map, and tag IDs associated with different tag maps may therefore have different structures. For example, the tag ID may simply encode a pair of x and y coordinates of the tag, in which case the tag map may simply consist of record of the coordinate precision. If the coordinate precision is fixed, then the tag map can be implicit.

1.2.7 Tagging Schemes

Two distinct surface coding schemes are of interest, both of which use the tag structure described earlier in this section. The preferred coding scheme uses "location-indicating" tags as already discussed. An alternative coding scheme uses object-indicating tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating tag contains a tag ID which directly identifies a user interface element in the page description associated with the region. All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

In many circumstances, where it is not required to determine the absolute pen path, either object-indicating tags or position-indicating tags can be used. For the purposes of simplicity, the remainder of the description will focus on the use of position-indicating tags, but it will be appreciated that this should be taken to include the use of object-indicating tags within its scope. In this instance, a reference to digital ink should be taken to include object-indicating "digital ink", even though digital ink is nominally position-indicating.

1.3 Document and Page Descriptions

Figure 25:
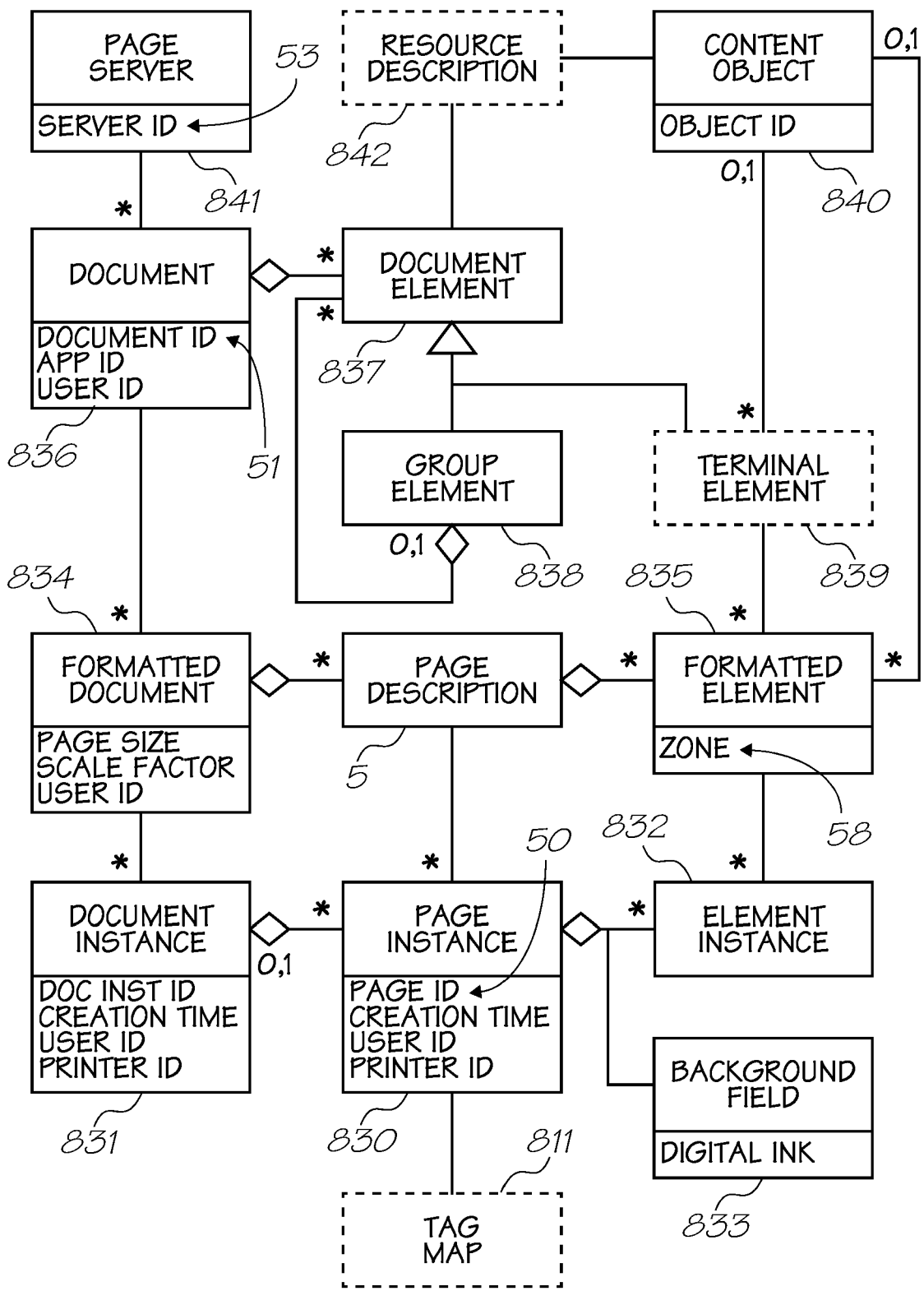
FIG. 25 is a schematic view of a document and page description class diagram.
Figure 26:
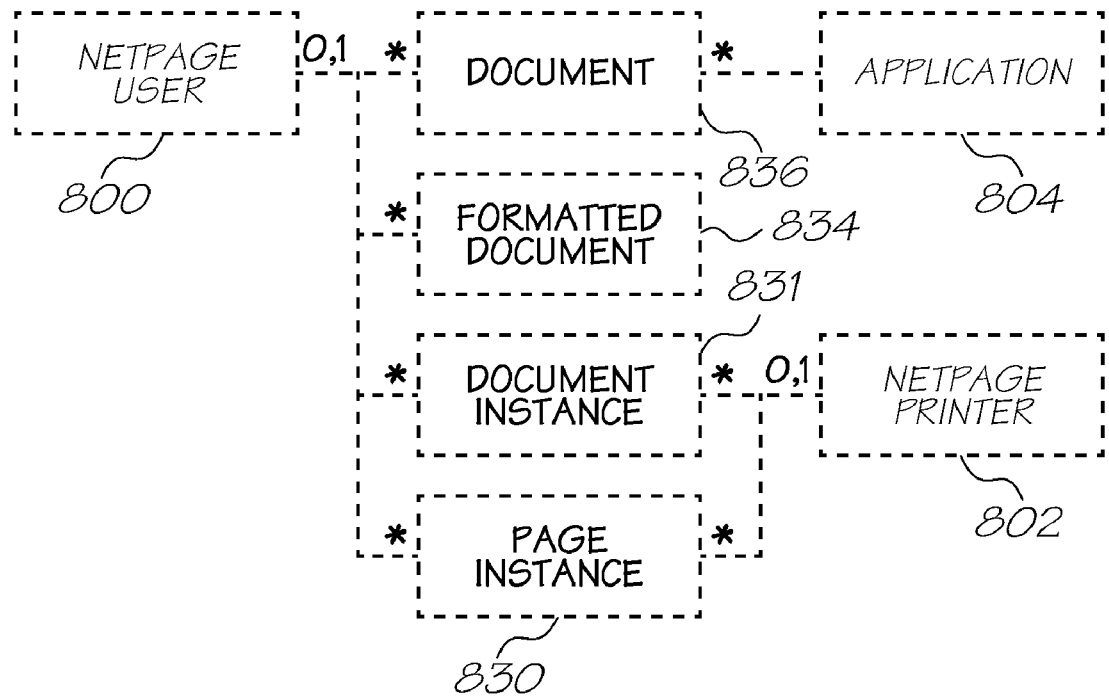
FIG. 26 is a schematic view of a document and page ownership class diagram.

A preferred embodiment of a document and page description class diagram is shown in FIGS. 25 and 26.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size and according to a particular user's scale factor preference, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a user to request a copy of a document without being forced to accept the source document's specific format. The user may be requesting a copy through a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 27:
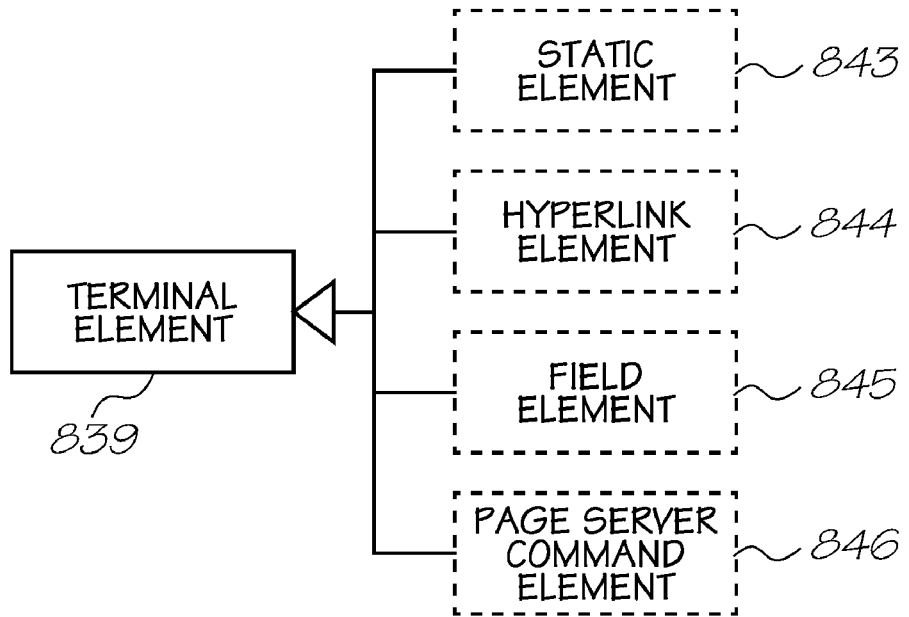
FIG. 27 is a schematic view of a terminal element specialization class diagram.
Figure 28:
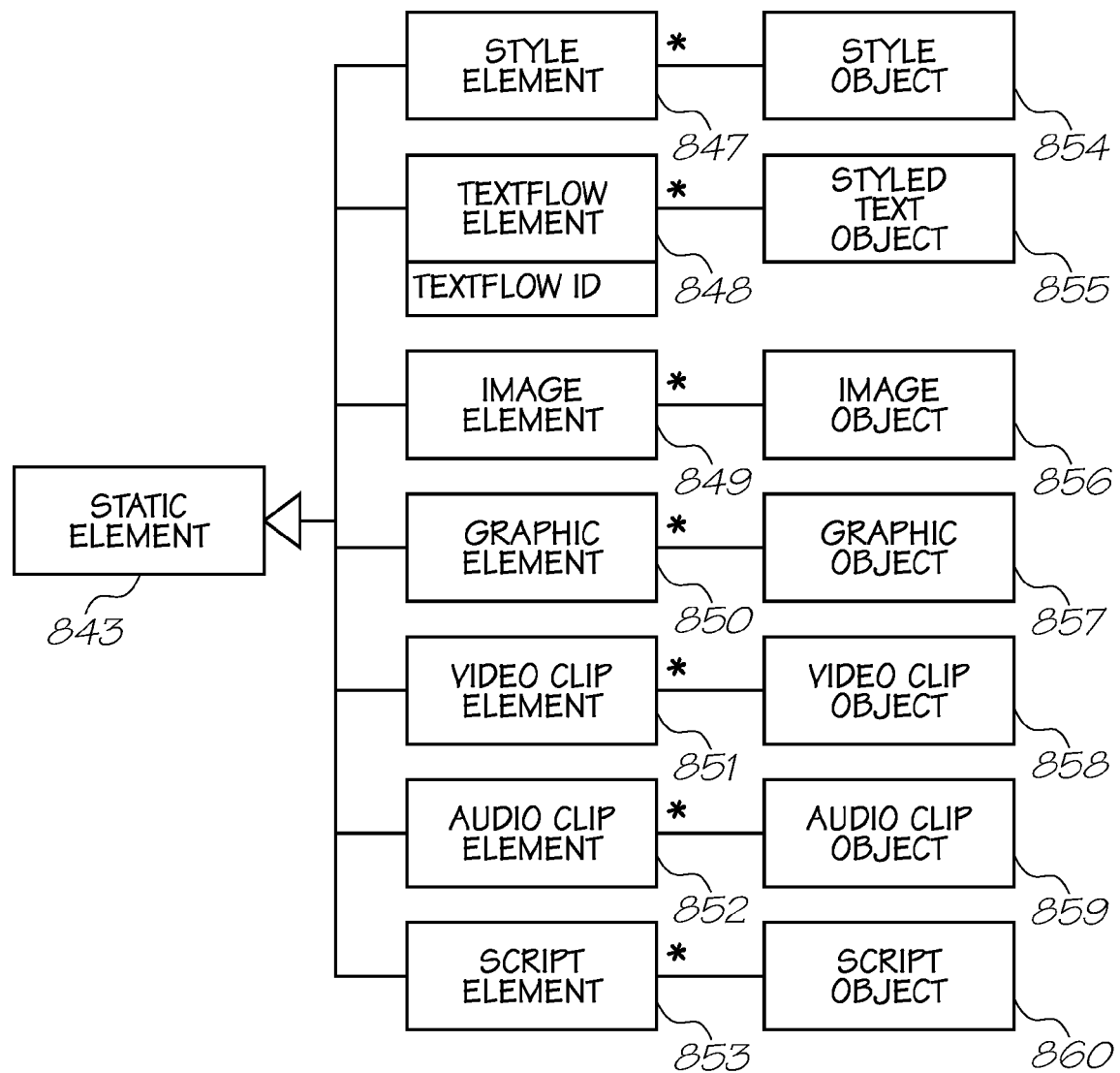
FIG. 28 is a schematic view of a static element specialization class diagram.

A terminal element can be a static element 843, a hyperlink element 844, a field element 845 or a page server command element 846, as shown in FIG. 27. A static element 843 can be a style element 847 with an associated style object 854, a textflow element 848 with an associated styled text object 855, an image element 849 with an associated image element 856, a graphic element 850 with an associated graphic object 857, a video clip element 851 with an associated video clip object 858, an audio clip element 852 with an associated audio clip object 859, or a script element 853 with an associated script object 860, as shown in FIG. 28.

A page instance has a background field 833 which is used to record any digital ink captured on the page which does not apply to a specific input element.

In the preferred form of the invention, a tag map 811 is associated with each page instance to allow tags on the page to be translated into locations on the page.

1.4 The Netpage Network

Figure 3:
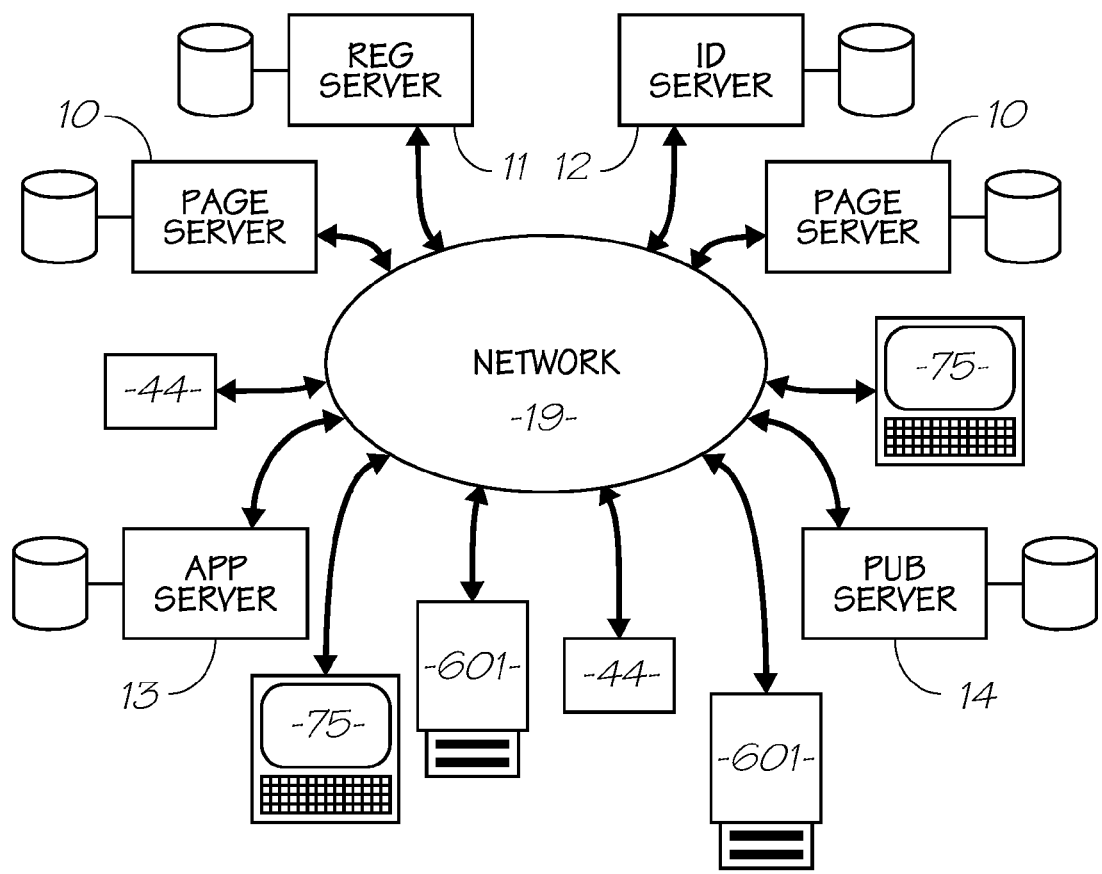
FIG. 3 illustrates a collection of netpage servers, Web terminals, printers and relays interconnected via a network.

In a preferred embodiment, a netpage network consists of a distributed set of netpage page servers 10, netpage registration servers 11, netpage ID servers 12, netpage application servers 13, netpage publication servers 14, Web terminals 75, netpage printers 601, and relay devices 44 connected via a network 19 such as the Internet, as shown in FIG. 3.

The netpage registration server 11 is a server which records relationships between users, pens, printers, applications and publications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage printers send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage printer uses the Internet Distributed Name System (DNS), or similar, to resolve a netpage page ID 50 into the network address of the netpage page server handling the corresponding page instance.

A netpage application server 13 is a server which hosts interactive netpage applications. A netpage publication server 14 is an application server which publishes netpage documents to netpage printers. They are described in detail in Section 2.

netpage servers can be hosted on a variety of network server platforms from manufacturers such as IBM, Hewlett-Packard, and Sun. Multiple netpage servers can run concurrently on a single host, and a single server can be distributed over a number of hosts. Some or all of the functionality provided by netpage servers, and in particular the functionality provided by the ID server and the page server, can also be provided directly in a netpage appliance such as a netpage printer, in a computer workstation, or on a local network.

1.5 The Netpage Printer

The netpage printer 601 is an appliance which is registered with the netpage system and prints netpage documents on demand and via subscription. Each printer has a unique printer ID 62, and is connected to the netpage network via a network such as the Internet, ideally via a broadband connection.

Apart from identity and security settings in non-volatile memory, the netpage printer contains no persistent storage. As far as a user is concerned, "the network is the computer". netpages function interactively across space and time with the help of the distributed netpage page servers 10, independently of particular netpage printers.

The netpage printer receives subscribed netpage documents from netpage publication servers 14. Each document is distributed in two parts: the page layouts, and the actual text and image objects which populate the pages. Because of personalization, page layouts are typically specific to a particular subscriber and so are pointcast to the subscriber's printer via the appropriate page server. Text and image objects, on the other hand, are typically shared with other subscribers, and so are multicast to all subscribers' printers and the appropriate page servers.

The netpage publication server optimizes the segmentation of document content into pointcasts and multicasts. After receiving the pointcast of a document's page layouts, the printer knows which multicasts, if any, to listen to.

Once the printer has received the complete page layouts and objects that define the document to be printed, it can print the document.

The printer rasterizes and prints odd and even pages simultaneously on both sides of the sheet. It contains duplexed print engine controllers 760 and print engines utilizing Memjet™ printheads 350 for this purpose.

The printing process consists of two decoupled stages: rasterization of page descriptions, and expansion and printing of page images. The raster image processor (RIP) consists of one or more standard DSPs 757 running in parallel. The duplexed print engine controllers consist of custom processors which expand, dither and print page images in real time, synchronized with the operation of the printheads in the print engines.

Printers not enabled for IR printing have the option to print tags using IR-absorptive black ink, although this restricts tags to otherwise empty areas of the page. Although such pages have more limited functionality than IR-printed pages, they are still classed as netpages.

A normal netpage printer prints netpages on sheets of paper. More specialised netpage printers may print onto more specialised surfaces, such as globes. Each printer supports at least one surface type, and supports at least one tag tiling scheme, and hence tag map, for each surface type. The tag map 811 which describes the tag tiling scheme actually used to print a document becomes associated with that document so that the document's tags can be correctly interpreted.

FIG. 2 shows the netpage printer class diagram, reflecting printer-related information maintained by a registration server 11 on the netpage network.

A preferred embodiment of the netpage printer is described in greater detail in Section 6 below, with reference to FIGS. 11 to 16.

1.5.1 Memjet™ Printheads

The netpage system can operate using printers made with a wide range of digital printing technologies, including thermal inkjet, piezoelectric inkjet, laser electrophotographic, and others. However, for wide consumer acceptance, it is desirable that a netpage printer have the following characteristics:

- photographic quality color printing
- high quality text printing
- high reliability
- low printer cost
- low ink cost
- low paper cost
- simple operation
- nearly silent printing
- high printing speed
- simultaneous double sided printing
- compact form factor
- low power consumption No commercially available printing technology has all of these characteristics.

Figure 17:
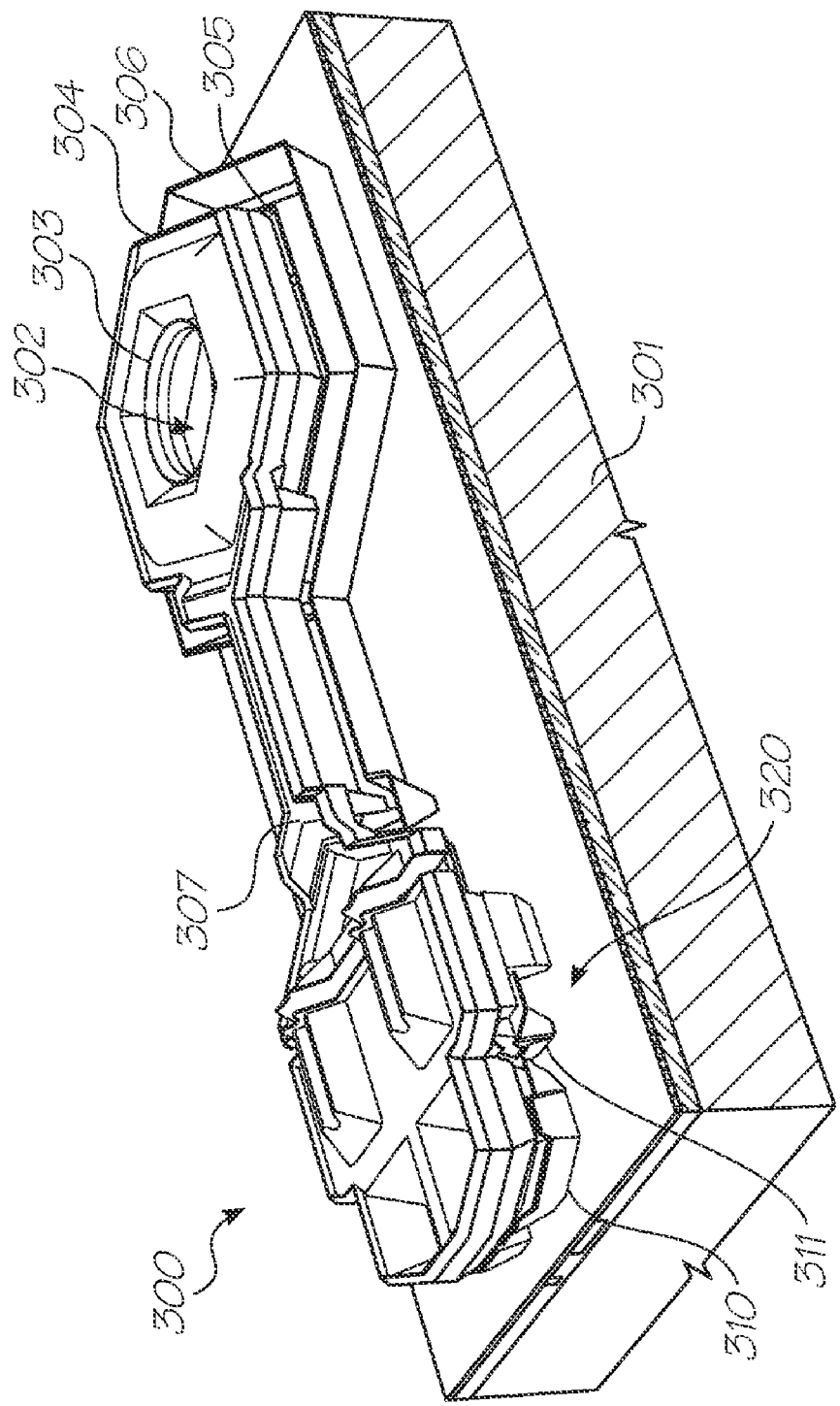
FIG. 17 is a perspective view of a single Memjet™ printing element, as used in, for example, the netpage printer of FIGS. 10 to 12.

To enable to production of printers with these characteristics, the present applicant has invented a new print technology, referred to as Memjet™ technology. Memjet™ is a drop-on-demand inkjet technology that incorporates pagewidth printheads fabricated using microelectromechanical systems (MEMS) technology. FIG. 17 shows a single printing element 300 of a Memjet™ printhead. The netpage wallprinter incorporates 168960 printing elements 300 to form a 1600 dpi pagewidth duplex printer. This printer simultaneously prints cyan, magenta, yellow, black, and infrared inks as well as paper conditioner and ink fixative.

The printing element 300 is approximately 110 microns long by 32 microns wide. Arrays of these printing elements are formed on a silicon substrate 301 that incorporates CMOS logic, data transfer, timing, and drive circuits (not shown).

Major elements of the printing element 300 are the nozzle 302, the nozzle rim 303, the nozzle chamber 304, the fluidic seal 305, the ink channel rim 306, the lever arm 307, the active actuator beam pair 308, the passive actuator beam pair 309, the active actuator anchor 310, the passive actuator anchor 311, and the ink inlet 312.

The active actuator beam pair 308 is mechanically joined to the passive actuator beam pair 309 at the join 319. Both beams pairs are anchored at their respective anchor points 310 and 311. The combination of elements 308, 309, 310, 311, and 319 form a cantilevered electrothermal bend actuator 320.

While printing, the printhead CMOS circuitry distributes data from the print engine controller to the correct printing element, latches the data, and buffers the data to drive the electrodes 318 of the active actuator beam pair 308. This causes an electrical current to pass through the beam pair 308 for about one microsecond, resulting in Joule heating. The temperature increase resulting from Joule heating causes the beam pair 308 to expand. As the passive actuator beam pair 309 is not heated, it does not expand, resulting in a stress difference between the two beam pairs. This stress difference is partially resolved by the cantilevered end of the electrothermal bend actuator 320 bending towards the substrate 301. The lever arm 307 transmits this movement to the nozzle chamber 304. The nozzle chamber 304 moves about two microns to the position shown in FIG. 19(*b*). This increases the ink pressure, forcing ink 321 out of the nozzle 302, and causing the ink meniscus 316 to bulge. The nozzle rim 303 prevents the ink meniscus 316 from spreading across the surface of the nozzle chamber 304.

As the temperature of the beam pairs 308 and 309 equalizes, the actuator 320 returns to its original position. This aids in the break-off of the ink droplet 317 from the ink 321 in the nozzle chamber. The nozzle chamber is refilled by the action of the surface tension at the meniscus 316.

In a netpage printer, the length of the printhead is the full width of the paper (typically 210 mm). When printing, the paper is moved past the fixed printhead. The printhead has 6 rows of interdigitated printing elements 300, printing the six colors or types of ink supplied by the ink inlets.

To protect the fragile surface of the printhead during operation, a nozzle guard wafer is attached to the printhead substrate. For each nozzle there is a corresponding nozzle guard hole through which the ink droplets are fired. To prevent the nozzle guard holes from becoming blocked by paper fibers or other debris, filtered air is pumped through the air inlets and out of the nozzle guard holes during printing. To prevent ink from drying, the nozzle guard is sealed while the printer is idle.

1.6 The Netpage Pen

The active sensing device of the netpage system is typically a pen 101, which, using its embedded controller 134, is able to capture and decode IR position tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen is encrypted and wirelessly transmitted to the printer (or base station), the printer or base station interpreting the data with respect to the (known) page structure.

Figure 23:
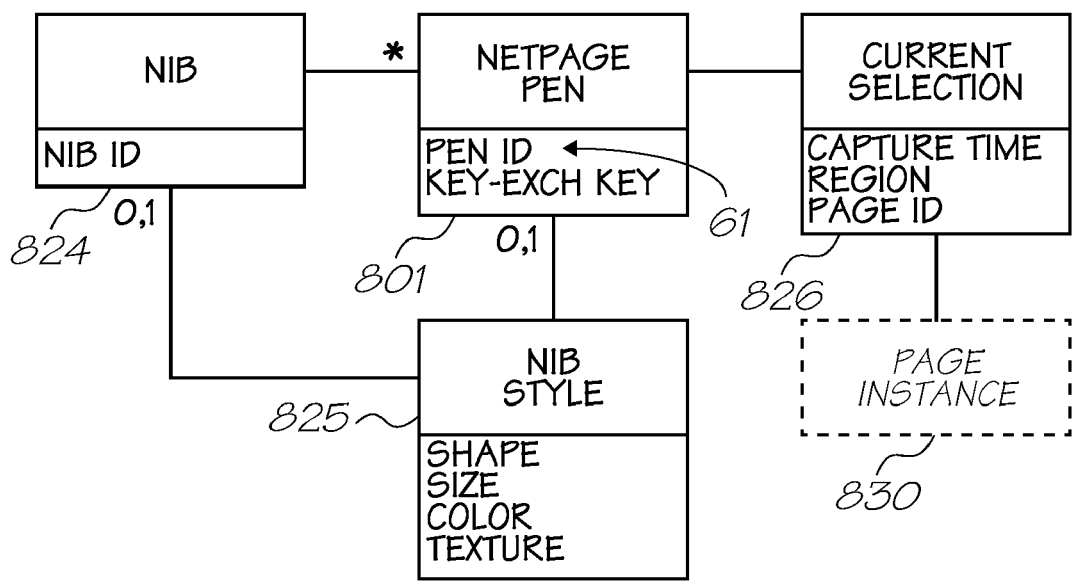
FIG. 23 is a schematic view of a pen class diagram.

The preferred embodiment of the netpage pen operates both as a normal marking ink pen and as a non-marking stylus. The marking aspect, however, is not necessary for using the netpage system as a browsing system, such as when it is used as an Internet interface. Each netpage pen is registered with the netpage system and has a unique pen ID 61. FIG. 23 shows the netpage pen class diagram, reflecting pen-related information maintained by a registration server 11 on the netpage network.

When either nib is in contact with a netpage, the pen determines its position and orientation relative to the page. The nib is attached to a force sensor, and the force on the nib is interpreted relative to a threshold to indicate whether the pen is "up" or "down". This allows a interactive element on the page to be 'clicked' by pressing with the pen nib, in order to request, say, information from a network. Furthermore, the force is captured as a continuous value to allow, say, the full dynamics of a signature to be verified.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

Whenever the pen is within range of a printer with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is wireless and transmits digital ink to the netpage printer via a short-range radio link. The transmitted digital ink is encrypted for privacy and security and packetized for efficient transmission, but is always flushed on a pen-up event to ensure timely handling in the printer.

When the pen is out-of-range of a printer it buffers digital ink in internal memory, which has a capacity of over ten minutes of continuous handwriting. When the pen is once again within range of a printer, it transfers any buffered digital ink.

A pen can be registered with any number of printers, but because all state data resides in netpages both on paper and on the network, it is largely immaterial which printer a pen is communicating with at any particular time.

Figure 10:
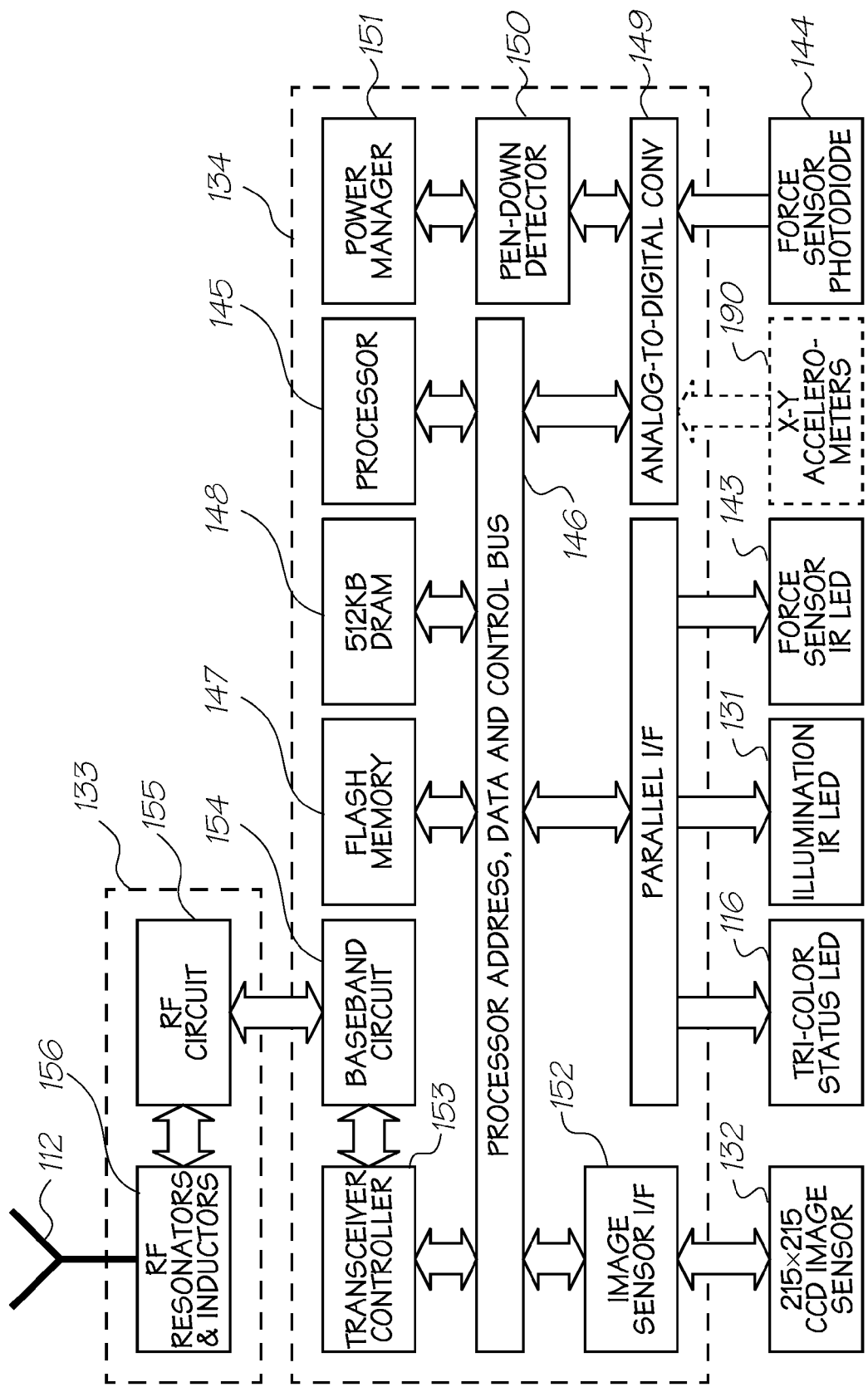
FIG. 10 is a schematic block diagram of a pen controller for the netpage pen shown in FIGS. 8 and 9.

A preferred embodiment of the pen is described in greater detail in Section 6 below, with reference to FIGS. 8 to 10.

1.7 Netpage Interaction

The netpage printer 601 receives data relating to a stroke from the pen 101 when the pen is used to interact with a netpage 1. The coded data 3 of the tags 4 is read by the pen when it is used to execute a movement, such as a stroke. The data allows the identity of the particular page and associated interactive element to be determined and an indication of the relative positioning of the pen relative to the page to be obtained. The indicating data is transmitted to the printer, where it resolves, via the DNS, the page ID 50 of the stroke into the network address of the netpage page server 10 which maintains the corresponding page instance 830. It then transmits the stroke to the page server. If the page was recently identified in an earlier stroke, then the printer may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register is indicated by the lack of response from the pen's "ok" LED.

There are two kinds of input elements in a netpage page description: hyperlinks and form fields. Input through a form field can also trigger the activation of an associated hyperlink.

1.7.1 Hyperlinks

A hyperlink is a means of sending a message to a remote application, and typically elicits a printed response in the netpage system.

Figure 29:
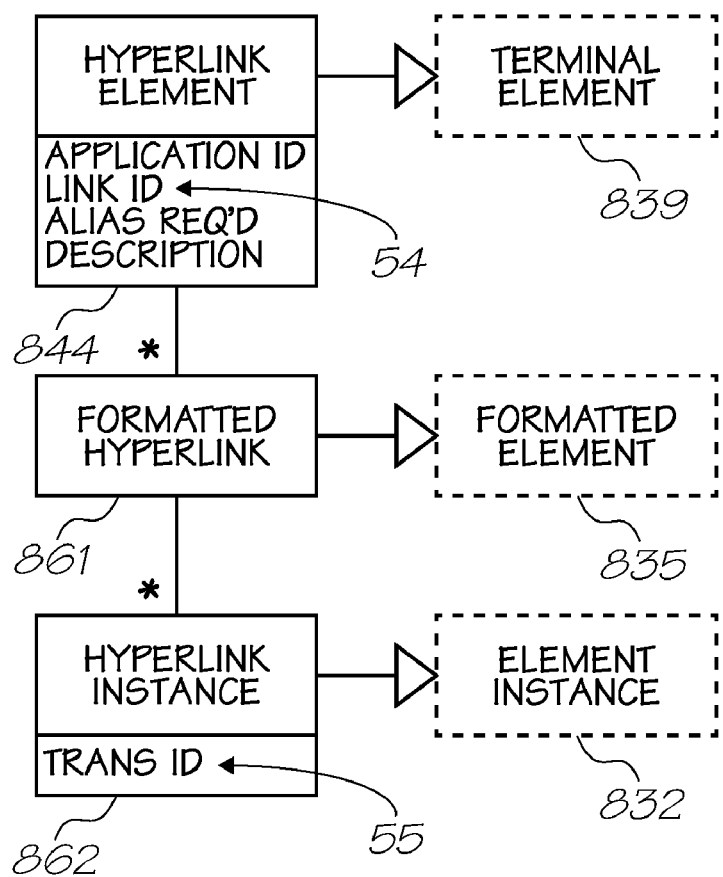
FIG. 29 is a schematic view of a hyperlink element class diagram.

A hyperlink element 844 identifies the application 71 which handles activation of the hyperlink, a link ID 54 which identifies the hyperlink to the application, an "alias required" flag which asks the system to include the user's application alias ID 65 in the hyperlink activation, and a description which is used when the hyperlink is recorded as a favorite or appears in the user's history. The hyperlink element class diagram is shown in FIG. 29.

Figure 30:
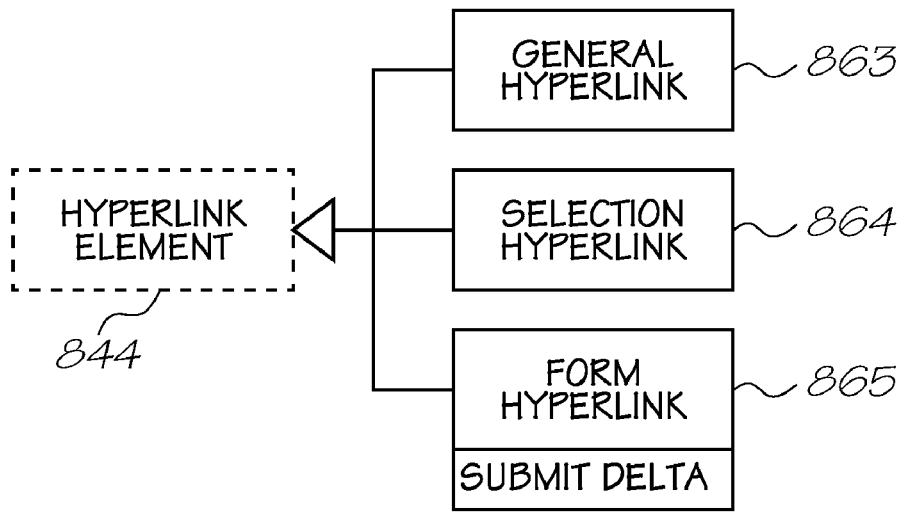
FIG. 30 is a schematic view of a hyperlink element specialization class diagram.

When a hyperlink is activated, the page server sends a request to an application somewhere on the network. The application is identified by an application ID 64, and the application ID is resolved in the normal way via the DNS. There are three types of hyperlinks: general hyperlinks 863, form hyperlinks 865, and selection hyperlinks 864, as shown in FIG. 30. A general hyperlink can implement a request for a linked document, or may simply signal a preference to a server. A form hyperlink submits the corresponding form to the application. A selection hyperlink submits the current selection to the application. If the current selection contains a single-word piece of text, for example, the application may return a single-page document giving the word's meaning within the context in which it appears, or a translation into a different language. Each hyperlink type is characterized by what information is submitted to the application.

The corresponding hyperlink instance 862 records a transaction ID 55 which can be specific to the page instance on which the hyperlink instance appears. The transaction ID can identify user-specific data to the application, for example a "shopping cart" of pending purchases maintained by a purchasing application on behalf of the user.

The system includes the pen's current selection 826 in a selection hyperlink activation. The system includes the content of the associated form instance 868 in a form hyperlink activation, although if the hyperlink has its "submit delta" attribute set, only input since the last form submission is included. The system includes an effective return path in all hyperlink activations.

Figure 31:
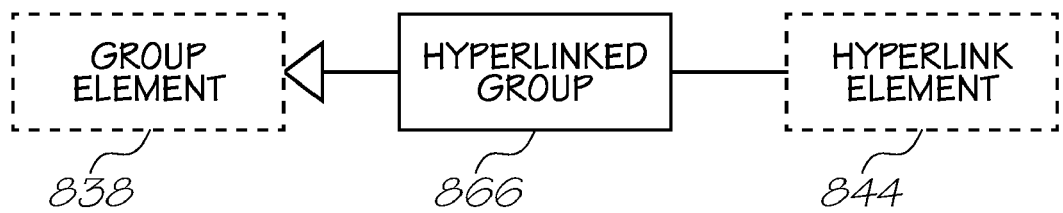
FIG. 31 is a schematic view of a hyperlinked group class diagram.

A hyperlinked group 866 is a group element 838 which has an associated hyperlink, as shown in FIG. 31. When input occurs through any field element in the group, the hyperlink 844 associated with the group is activated. A hyperlinked group can be used to associate hyperlink behavior with a field such as a checkbox. It can also be used, in conjunction with the "submit delta" attribute of a form hyperlink, to provide continuous input to an application. It can therefore be used to support a "blackboard" interaction model, i.e. where input is captured and therefore shared as soon as it occurs.

1.7.2 Forms

A form defines a collection of related input fields used to capture a related set of inputs through a printed netpage. A form allows a user to submit one or more parameters to an application software program running on a server.

Figure 32:
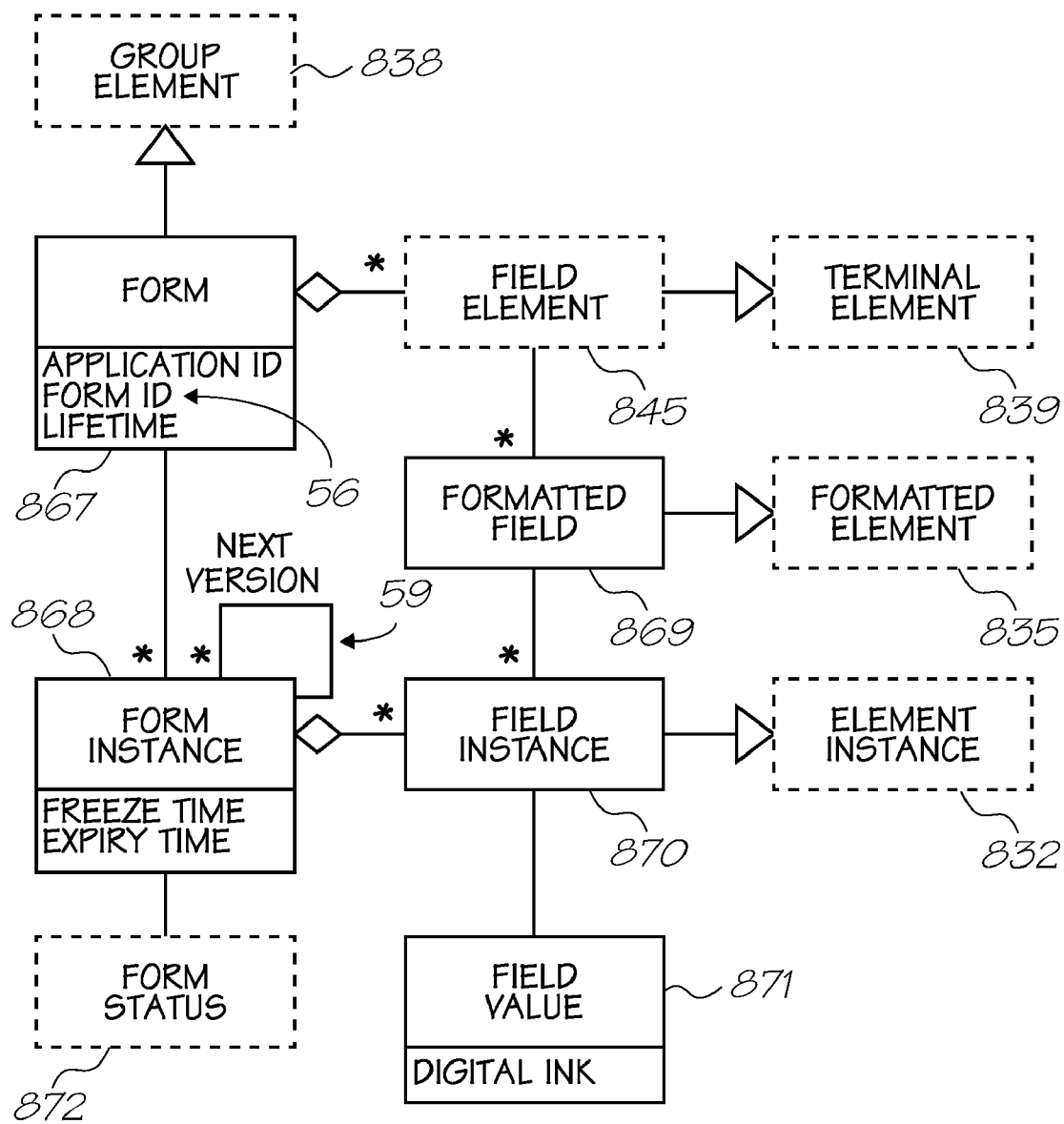
FIG. 32 is a schematic view of a form class diagram.

A form 867 is a group element 838 in the document hierarchy. It ultimately contains a set of terminal field elements 839. A form instance 868 represents a printed instance of a form. It consists of a set of field instances 870 which correspond to the field elements 845 of the form. Each field instance has an associated value 871, whose type depends on the type of the corresponding field element. Each field value records input through a particular printed form instance, i.e. through one or more printed netpages. The form class diagram is shown in FIG. 32.

Each form instance has a status 872 which indicates whether the form is active, frozen, submitted, void or expired. A form is active when first printed. A form becomes frozen once it is signed or once its freeze time is reached. A form becomes submitted once one of its submission hyperlinks has been activated, unless the hyperlink has its "submit delta" attribute set. A form becomes void when the user invokes a void form, reset form or duplicate form page command. A form expires when its specified expiry time is reached, i.e. when the time the form has been active exceeds the form's specified lifetime. While the form is active, form input is allowed. Input through a form which is not active is instead captured in the background field 833 of the relevant page instance. When the form is active or frozen, form submission is allowed. Any attempt to submit a form when the form is not active or frozen is rejected, and instead elicits an form status report.

Each form instance is associated (at 59) with any form instances derived from it, thus providing a version history. This allows all but the latest version of a form in a particular time period to be excluded from a search.

Figure 33:
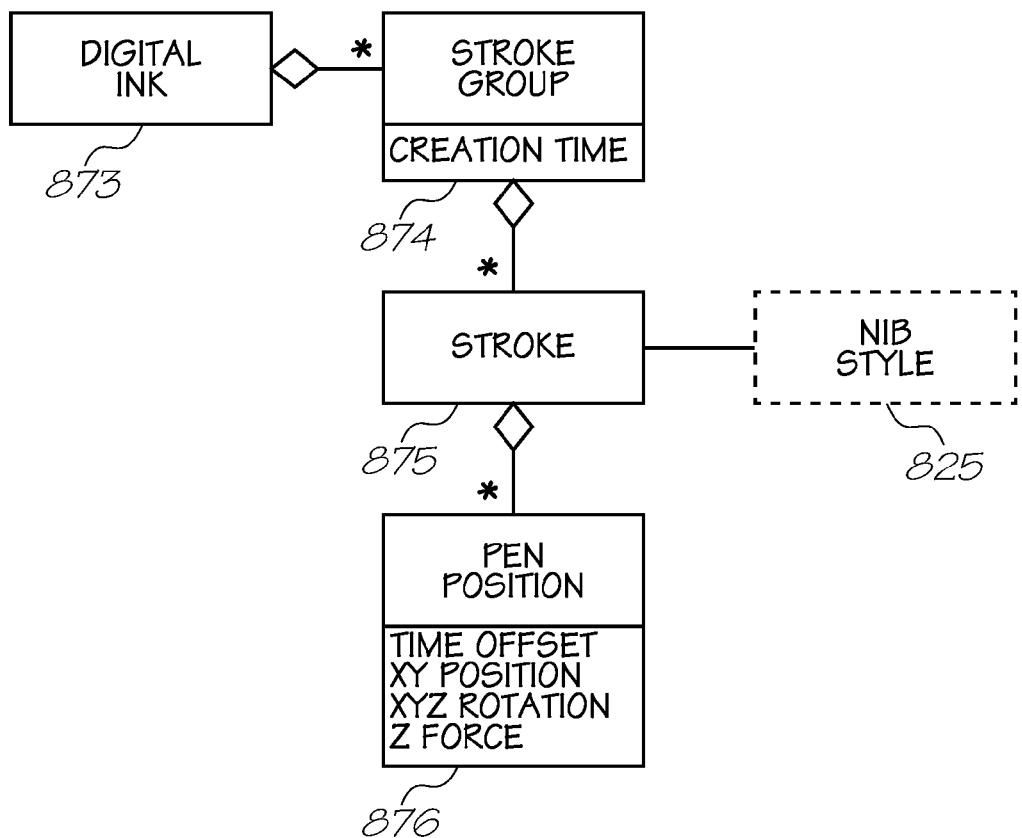
FIG. 33 is a schematic view of a digital ink class diagram.

All input is captured as digital ink. Digital ink 873 consists of a set of timestamped stroke groups 874, each of which consists of a set of styled strokes 875. Each stroke consists of a set of timestamped pen positions 876, each of which also includes pen orientation and nib force. The digital ink class diagram is shown in FIG. 33.

Figure 34:
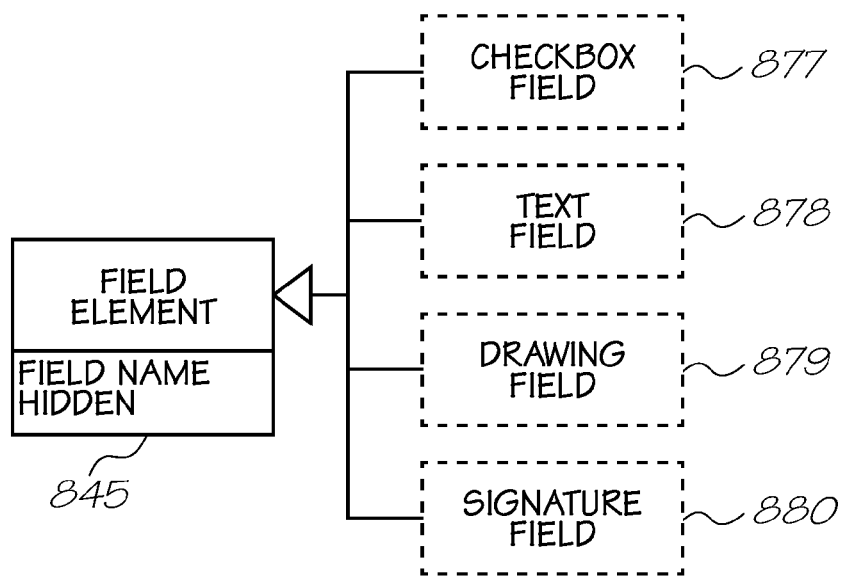
FIG. 34 is a schematic view of a field element specialization class diagram.

A field element 845 can be a checkbox field 877, a text field 878, a drawing field 879, or a signature field 880. The field element class diagram is shown in FIG. 34. Any digital ink captured in a field's zone 58 is assigned to the field.

Figure 35:
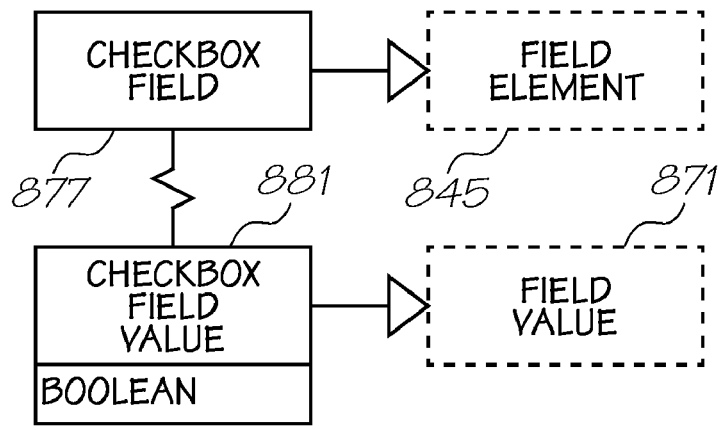
FIG. 35 is a schematic view of a checkbox field class diagram.

A checkbox field has an associated boolean value 881, as shown in FIG. 35. Any mark (a tick, a cross, a stroke, a fill zigzag, etc.) captured in a checkbox field's zone causes a true value to be assigned to the field's value.

Figure 36:
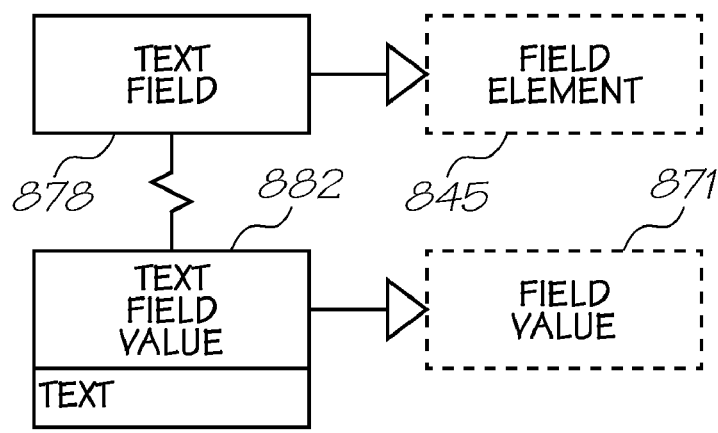
FIG. 36 is a schematic view of a text field class diagram.

A text field has an associated text value 882, as shown in FIG. 36. Any digital ink captured in a text field's zone is automatically converted to text via online handwriting recognition, and the text is assigned to the field's value. Online handwriting recognition is well-understood (see, for example, Tappert, C., C. Y. Suen and T. Wakahara, "The State of the Art in On-Line Handwriting Recognition", IEEE Transactions on Pattern Analysis and Machine Intelligence, Vol. 12, No. 8, August 1990, the contents of which are herein incorporated by cross-reference).

Figure 37:
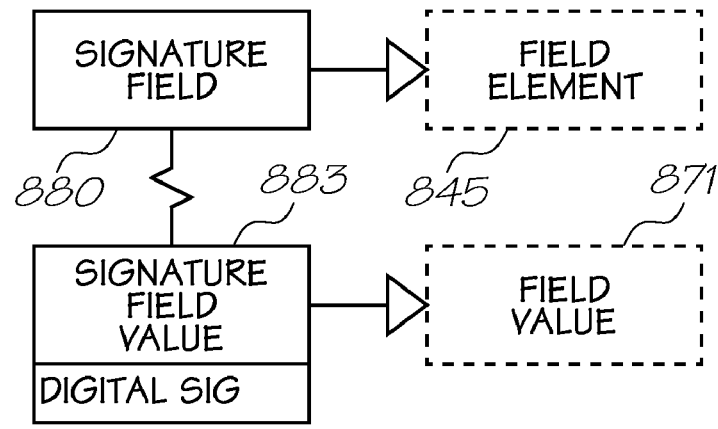
FIG. 37 is a schematic view of a signature field class diagram.

A signature field has an associated digital signature value 883, as shown in FIG. 37. Any digital ink captured in a signature field's zone is automatically verified with respect to the identity of the owner of the pen, and a digital signature of the content of the form of which the field is part is generated and assigned to the field's value. The digital signature is generated using the pen user's private signature key specific to the application which owns the form. Online signature verification is well-understood (see, for example, Plamondon, R. and G. Lorette, "Automatic Signature Verification and Writer Identification—State of the Art", Pattern Recognition, Vol. 22, No. 2, 1989, the contents of which are herein incorporated by cross-reference).

A field element is hidden if its "hidden" attribute is set. A hidden field element does not have an input zone on a page and does not accept input. It can have an associated field value which is included in the form data when the form containing the field is submitted.

"Editing" commands, such as strike-throughs indicating deletion, can also be recognized in form fields.

Because the handwriting recognition algorithm works "online" (i.e. with access to the dynamics of the pen movement), rather than "offline" (i.e. with access only to a bitmap of pen markings), it can recognize run-on discretely-written characters with relatively high accuracy, without a writer-dependent training phase. A writer-dependent model of handwriting is automatically generated over time, however, and can be generated up-front if necessary, Digital ink, as already stated, consists of a sequence of strokes. Any stroke which starts in a particular element's zone is appended to that element's digital ink stream, ready for interpretation. Any stroke not appended to an object's digital ink stream is appended to the background field's digital ink stream.

Digital ink captured in the background field is interpreted as a selection gesture. Circumscription of one or more objects is generally interpreted as a selection of the circumscribed objects, although the actual interpretation is application-specific.

Table 3 summarises these various pen interactions with a netpage.

The system maintains a current selection for each pen. The selection consists simply of the most recent stroke captured in the background field. The selection is cleared after an inactivity timeout to ensure predictable behavior.

The raw digital ink captured in every field is retained on the netpage page server and is optionally transmitted with the form data when the form is submitted to the application. This allows the application to interrogate the raw digital ink should it suspect the original conversion, such as the conversion of handwritten text. This can, for example, involve human intervention at the application level for forms which fail certain application-specific consistency checks. As an extension to this, the entire background area of a form can be designated as a drawing field. The application can then decide, on the basis of the presence of digital ink outside the explicit fields of the form, to route the form to a human operator, on the assumption that the user may have indicated amendments to the filled-in fields outside of those fields.

TABLE 3

Summary of pen interactions with a netpage

| Object | Type | Pen input | Action |
|---|---|---|---|
| Hyperlink | General | Click | Submit action to application |
| | Form | Click | Submit form to application |
| | Selection | Click | Submit selection to application |
| Form field | Checkbox | Any mark | Assign true to field |
| | Text | Handwriting | Convert digital ink to text; assign text to field |
| | Drawing | Digital ink | Assign digital ink to field |
| | Signature | Signature | Verify digital ink signature; generate digital signature of form; assign digital signature to field |
| None | — | Circumscription | Assign digital ink to current selection |

Figure 38:
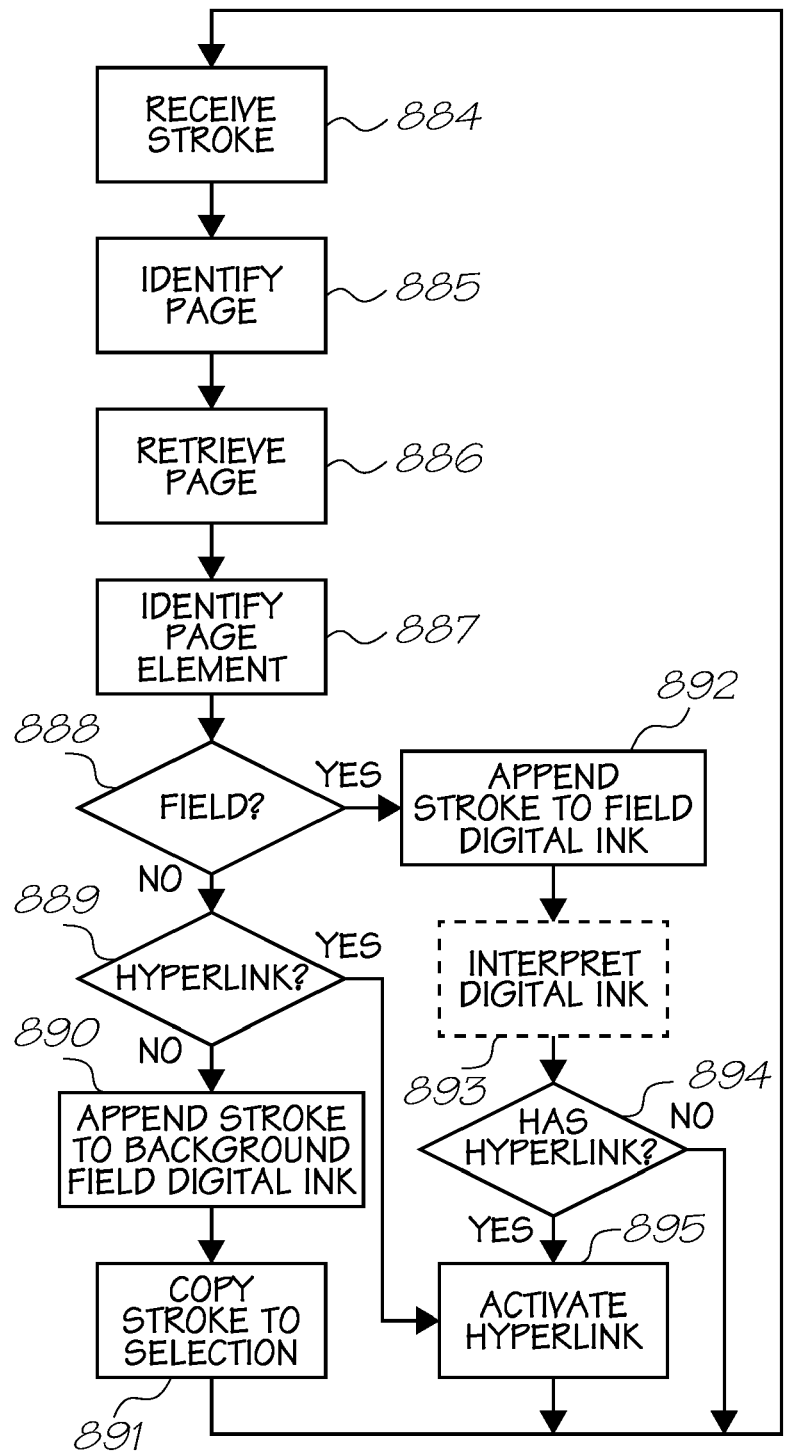
FIG. 38 is a flowchart of an input processing algorithm.

FIG. 38 shows a flowchart of the process of handling pen input relative to a netpage. The process consists of receiving (at 884) a stroke from the pen; identifying (at 885) the page instance 830 to which the page ID 50 in the stroke refers; retrieving (at 886) the page description 5; identifying (at 887) a formatted element 839 whose zone 58 the stroke intersects; determining (at 888) whether the formatted element corresponds to a field element, and if so appending (at 892) the received stroke to the digital ink of the field value 871, interpreting (at 893) the accumulated digital ink of the field, and determining (at 894) whether the field is part of a hyperlinked group 866 and if so activating (at 895) the associated hyperlink; alternatively determining (at 889) whether the formatted element corresponds to a hyperlink element and if so activating (at 895) the corresponding hyperlink; alternatively, in the absence of an input field or hyperlink, appending (at 890) the received stroke to the digital ink of the background field 833; and copying (at 891) the received stroke to the current selection 826 of the current pen, as maintained by the registration server.

Figure 38A:
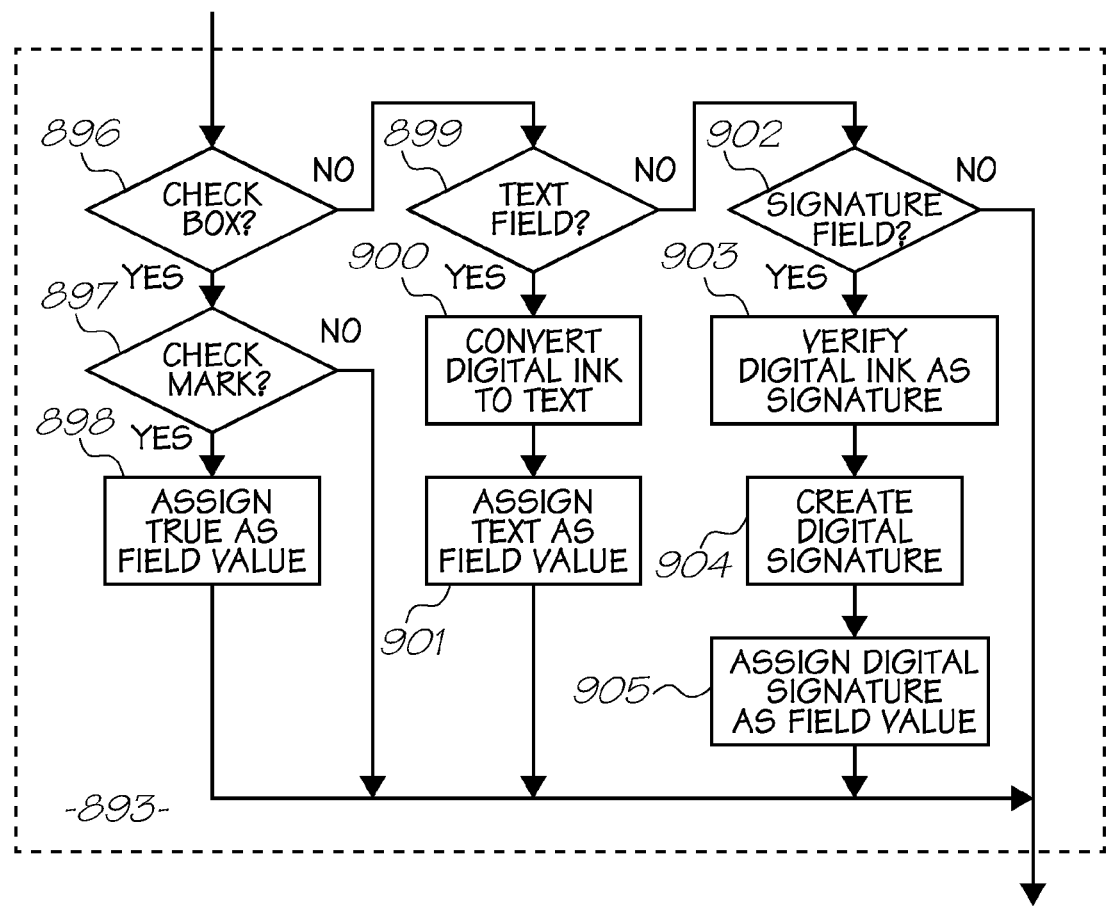
FIG. 38A is a detailed flowchart of one step of the flowchart of FIG. 38.

FIG. 38a shows a detailed flowchart of step 893 in the process shown in FIG. 38, where the accumulated digital ink of a field is interpreted according to the type of the field. The process consists of determining (at 896) whether the field is a checkbox and (at 897) whether the digital ink represents a checkmark, and if so assigning (at 898) a true value to the field value; alternatively determining (at 899) whether the field is a text field and if so converting (at 900) the digital ink to computer text, with the help of the appropriate registration server, and assigning (at 901) the converted computer text to the field value; alternatively determining (at 902) whether the field is a signature field and if so verifying (at 903) the digital ink as the signature of the pen's owner, with the help of the appropriate registration server, creating (at 904) a digital signature of the contents of the corresponding form, also with the help of the registration server and using the pen owner's private signature key relating to the corresponding application, and assigning (at 905) the digital signature to the field value.

1.7.3 Page Server Commands

A page server command is a command which is handled locally by the page server. It operates directly on form, page and document instances.

Figure 39:
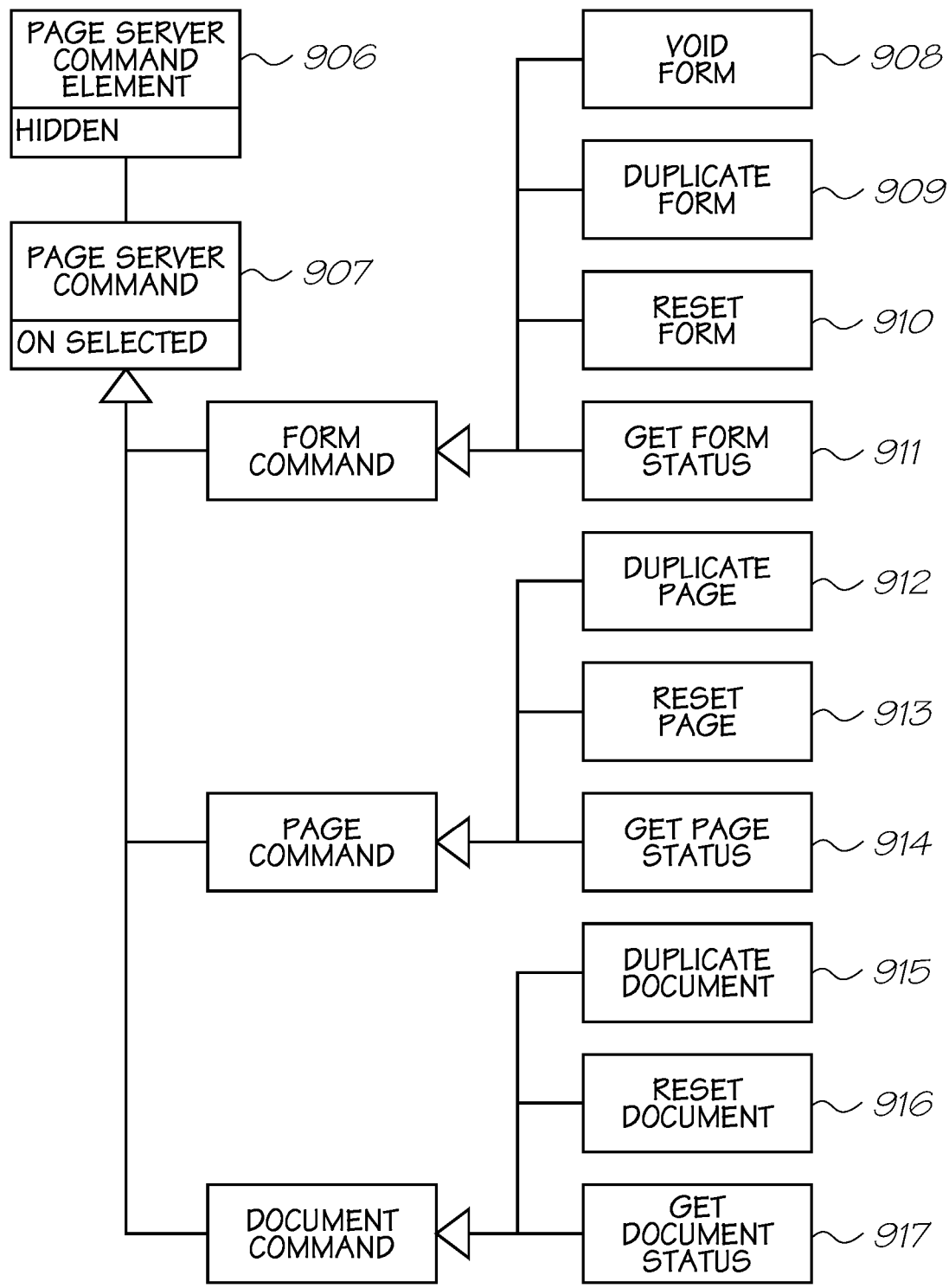
FIG. 39 is a schematic view of a page server command element class diagram.

A page server command 907 can be a void form command 908, a duplicate form command 909, a reset form command 910, a get form status command 911, a duplicate page command 912, a reset page command 913, a get page status command 914, a duplicate document command 915, a reset document command 916, or a get document status command 917, as shown in FIG. 39.

A void form command voids the corresponding form instance. A duplicate form command voids the corresponding form instance and then produces an active printed copy of the current form instance with field values preserved. The copy contains the same hyperlink transaction IDs as the original, and so is indistinguishable from the original to an application. A reset form command voids the corresponding form instance and then produces an active printed copy of the form instance with field values discarded. A get form status command produces a printed report on the status of the corresponding form instance, including who published it, when it was printed, for whom it was printed, and the form status of the form instance.

Since a form hyperlink instance contains a transaction ID, the application has to be involved in producing a new form instance. A button requesting a new form instance is therefore typically implemented as a hyperlink.

A duplicate page command produces a printed copy of the corresponding page instance with the background field value preserved. If the page contains a form or is part of a form, then the duplicate page command is interpreted as a duplicate form command. A reset page command produces a printed copy of the corresponding page instance with the background field value discarded. If the page contains a form or is part of a form, then the reset page command is interpreted as a reset form command. A get page status command produces a printed report on the status of the corresponding page instance, including who published it, when it was printed, for whom it was printed, and the status of any forms it contains or is part of.

The netpage logo which appears on every netpage is usually associated with a duplicate page element.

When a page instance is duplicated with field values preserved, field values are printed in their native form, i.e. a checkmark appears as a standard checkmark graphic, and text appears as typeset text. Only drawings and signatures appear in their original form, with a signature accompanied by a standard graphic indicating successful signature verification.

A duplicate document command produces a printed copy of the corresponding document instance with background field values preserved. If the document contains any forms, then the duplicate document command duplicates the forms in the same way a duplicate form command does. A reset document command produces a printed copy of the corresponding document instance with background field values discarded. If the document contains any forms, then the reset document command resets the forms in the same way a reset form command does. A get document status command produces a printed report on the status of the corresponding document instance, including who published it, when it was printed, for whom it was printed, and the status of any forms it contains.

If the page server command's "on selected" attribute is set, then the command operates on the page identified by the pen's current selection rather than on the page containing the command. This allows a menu of page server commands to be printed. If the target page doesn't contain a page server command element for the designated page server command, then the command is ignored.

An application can provide application-specific handling by embedding the relevant page server command element in a hyperlinked group. The page server activates the hyperlink associated with the hyperlinked group rather than executing the page server command.

A page server command element is hidden if its "hidden" attribute is set. A hidden command element does not have an input zone on a page and so cannot be activated directly by a user. It can, however, be activated via a page server command embedded in a different page, if that page server command has its "on selected" attribute set.

1.8 Standard Features of Netpages

In the preferred form, each netpage is printed with the netpage logo at the bottom to indicate that it is a netpage and therefore has interactive properties. The logo also acts as a copy button. In most cases pressing the logo produces a copy of the page. In the case of a form, the button produces a copy of the entire form. And in the case of a secure document, such as a ticket or coupon, the button elicits an explanatory note or advertising page.

The default single-page copy function is handled directly by the relevant netpage page server. Special copy functions are handled by linking the logo button to an application.

1.9 User Help System

In a preferred embodiment, the netpage printer has a single button labelled "Help". When pressed it elicits a single help page 46 of information, including:
- status of printer connection
- status of printer consumables
- top-level help menu
- document function menu
- top-level netpage network directory The help menu provides a hierarchical manual on how to use the netpage system.

The document function menu includes the following functions:
- print a copy of a document
- print a clean copy of a form
- print the status of a document A document function is initiated by selecting the document and then pressing the button. The status of a document indicates who published it and when, to whom it was delivered, and to whom and when it was subsequently submitted as a form.

The help page is obviously unavailable if the printer is unable to print. In this case the "error" light is lit and the user can request remote diagnosis over the network.

2 Personalized Publication Model

In the following description, news is used as a canonical publication example to illustrate personalization mechanisms in the netpage system. Although news is often used in the limited sense of newspaper and newsmagazine news, the intended scope in the present context is wider.

In the netpage system, the editorial content and the advertising content of a news publication are personalized using different mechanisms. The editorial content is personalized according to the reader's explicitly stated and implicitly captured interest profile. The advertising content is personalized according to the reader's locality and demographic.

2.1 Editorial Personalization

A subscriber can draw on two kinds of news sources: those that deliver news publications, and those that deliver news streams. While news publications are aggregated and edited by the publisher, news streams are aggregated either by a news publisher or by a specialized news aggregator. News publications typically correspond to traditional newspapers and newsmagazines, while news streams can be many and varied: a "raw" news feed from a news service, a cartoon strip, a freelance writer's column, a friend's bulletin board, or the reader's own e-mail.

The netpage publication server supports the publication of edited news publications as well as the aggregation of multiple news streams. By handling the aggregation and hence the formatting of news streams selected directly by the reader, the server is able to place advertising on pages over which it otherwise has no editorial control.

The subscriber builds a daily newspaper by selecting one or more contributing news publications, and creating a personalized version of each. The resulting daily editions are printed and bound together into a single newspaper. The various members of a household typically express their different interests and tastes by selecting different daily publications and then customizing them.

For each publication, the reader optionally selects specific sections. Some sections appear daily, while others appear weekly. The daily sections available from The New York Times online, for example, include "Page One Plus", "National", "International", "Opinion", "Business", "Arts/Living", "Technology", and "Sports". The set of available sections is specific to a publication, as is the default subset.

The reader can extend the daily newspaper by creating custom sections, each one drawing on any number of news streams. Custom sections might be created for e-mail and friends' announcements ("Personal"), or for monitoring news feeds for specific topics ("Alerts" or "Clippings").

For each section, the reader optionally specifies its size, either qualitatively (e.g. short, medium, or long), or numerically (i.e. as a limit on its number of pages), and the desired proportion of advertising, either qualitatively (e.g. high, normal, low, none), or numerically (i.e. as a percentage).

The reader also optionally expresses a preference for a large number of shorter articles or a small number of longer articles. Each article is ideally written (or edited) in both short and long forms to support this preference.

An article may also be written (or edited) in different versions to match the expected sophistication of the reader, for example to provide children's and adults' versions. The appropriate version is selected according to the reader's age. The reader can specify a "reading age" which takes precedence over their biological age.

The articles which make up each section are selected and prioritized by the editors, and each is assigned a useful lifetime. By default they are delivered to all relevant subscribers, in priority order, subject to space constraints in the subscribers' editions.

In sections where it is appropriate, the reader may optionally enable collaborative filtering. This is then applied to articles which have a sufficiently long lifetime. Each article which qualifies for collaborative filtering is printed with rating buttons at the end of the article. The buttons can provide an easy choice (e.g. "liked" and "disliked"), making it more likely that readers will bother to rate the article.

Articles with high priorities and short lifetimes are therefore effectively considered essential reading by the editors and are delivered to most relevant subscribers.

The reader optionally specifies a serendipity factor, either qualitatively (e.g. do or don't surprise me), or numerically. A high serendipity factor lowers the threshold used for matching during collaborative filtering. A high factor makes it more likely that the corresponding section will be filled to the reader's specified capacity. A different serendipity factor can be specified for different days of the week.

The reader also optionally specifies topics of particular interest within a section, and this modifies the priorities assigned by the editors.

The speed of the reader's Internet connection affects the quality at which images can be delivered. The reader optionally specifies a preference for fewer images or smaller images or both. If the number or size of images is not reduced, then images may be delivered at lower quality (i.e. at lower resolution or with greater compression).

At a global level, the reader specifies how quantities, dates, times and monetary values are localized. This involves specifying whether units are imperial or metric, a local timezone and time format, and a local currency, and whether the localization consist of in situ translation or annotation. These preferences are derived from the reader's locality by default.

To reduce reading difficulties caused by poor eyesight, the reader optionally specifies a global preference for a larger presentation. Both text and images are scaled accordingly, and less information is accommodated on each page.

The language in which a news publication is published, and its corresponding text encoding, is a property of the publication and not a preference expressed by the user. However, the netpage system can be configured to provide automatic translation services in various guises.

2.2 Advertising Localization and Targeting

The personalization of the editorial content directly affects the advertising content, because advertising is typically placed to exploit the editorial context. Travel ads, for example, are more likely to appear in a travel section than elsewhere. The value of the editorial content to an advertiser (and therefore to the publisher) lies in its ability to attract large numbers of readers with the right demographics.

Effective advertising is placed on the basis of locality and demographics. Locality determines proximity to particular services, retailers etc., and particular interests and concerns associated with the local community and environment. Demographics determine general interests and preoccupations as well as likely spending patterns.

A news publisher's most profitable product is advertising "space", a multi-dimensional entity determined by the publication's geographic coverage, the size of its readership, its readership demographics, and the page area available for advertising.

In the netpage system, the netpage publication server computes the approximate multi-dimensional size of a publication's saleable advertising space on a per-section basis, taking into account the publication's geographic coverage, the section's readership, the size of each reader's section edition, each reader's advertising proportion, and each reader's demographic.

In comparison with other media, the netpage system allows the advertising space to be defined in greater detail, and allows smaller pieces of it to be sold separately. It therefore allows it to be sold at closer to its true value.

For example, the same advertising "slot" can be sold in varying proportions to several advertisers, with individual readers' pages randomly receiving the advertisement of one advertiser or another, overall preserving the proportion of space sold to each advertiser.

The netpage system allows advertising to be linked directly to detailed product information and online purchasing. It therefore raises the intrinsic value of the advertising space.

Because personalization and localization are handled automatically by netpage publication servers, an advertising aggregator can provide arbitrarily broad coverage of both geography and demographics. The subsequent disaggregation is efficient because it is automatic. This makes it more cost-effective for publishers to deal with advertising aggregators than to directly capture advertising. Even though the advertising aggregator is taking a proportion of advertising revenue, publishers may find the change profit-neutral because of the greater efficiency of aggregation. The advertising aggregator acts as an intermediary between advertisers and publishers, and may place the same advertisement in multiple publications.

It is worth noting that ad placement in a netpage publication can be more complex than ad placement in the publication's traditional counterpart, because the publication's advertising space is more complex. While ignoring the full complexities of negotiations between advertisers, advertising aggregators and publishers, the preferred form of the netpage system provides some automated support for these negotiations, including support for automated auctions of advertising space. Automation is particularly desirable for the placement of advertisements which generate small amounts of income, such as small or highly localized advertisements.

Once placement has been negotiated, the aggregator captures and edits the advertisement and records it on a netpage ad server. Correspondingly, the publisher records the ad placement on the relevant netpage publication server. When the netpage publication server lays out each user's personalized publication, it picks the relevant advertisements from the netpage ad server.

2.3 User Profiles 2.3.1 Information Filtering

The personalization of news and other publications relies on an assortment of user-specific profile information, including:

publication customizations
collaborative filtering vectors
contact details
presentation preferences The customization of a publication is typically publication-specific, and so the customization information is maintained by the relevant netpage publication server.

A collaborative filtering vector consists of the user's ratings of a number of news items. It is used to correlate different users' interests for the purposes of making recommendations. Although there are benefits to maintaining a single collaborative filtering vector independently of any particular publication, there are two reasons why it is more practical to maintain a separate vector for each publication: there is likely to be more overlap between the vectors of subscribers to the same publication than between those of subscribers to different publications; and a publication is likely to want to present its users' collaborative filtering vectors as part of the value of its brand, not to be found elsewhere. Collaborative filtering vectors are therefore also maintained by the relevant netpage publication server.

Contact details, including name, street address, ZIP Code, state, country, telephone numbers, are global by nature, and are maintained by a netpage registration server.

Presentation preferences, including those for quantities, dates and times, are likewise global and maintained in the same way.

The localization of advertising relies on the locality indicated in the user's contact details, while the targeting of advertising relies on personal information such as date of birth, gender, marital status, income, profession, education, or qualitative derivatives such as age range and income range.

For those users who choose to reveal personal information for advertising purposes, the information is maintained by the relevant netpage registration server. In the absence of such information, advertising can be targeted on the basis of the demographic associated with the user's ZIP or ZIP+4 Code.

Each user, pen, printer, application provider and application is assigned its own unique identifier, and the netpage registration server maintains the relationships between them, as shown in FIGS. 21, 22, 23 and 24. For registration purposes, a publisher is a special kind of application provider, and a publication is a special kind of application.

Each user 800 may be authorized to use any number of printers 802, and each printer may allow any number of users to use it. Each user has a single default printer (at 66), to which periodical publications are delivered by default, whilst pages printed on demand are delivered to the printer through which the user is interacting. The server keeps track of which publishers a user has authorized to print to the user's default printer. A publisher does not record the ID of any particular printer, but instead resolves the ID when it is required. The user may also be designated as having administrative privileges 69 on the printer, allowing the user to authorize other users to use the printer. This only has meaning if the printer requires administrative privileges 84 for such operations.

When a user subscribes 808 to a publication 807, the publisher 806 (i.e. application provider 803) is authorized to print to a specified printer or the user's default printer. This authorization can be revoked at any time by the user. Each user may have several pens 801, but a pen is specific to a single user. If a user is authorized to use a particular printer, then that printer recognizes any of the user's pens.

The pen ID is used to locate the corresponding user profile maintained by a particular netpage registration server, via the DNS in the usual way.

A Web terminal 809 can be authorized to print on a particular netpage printer, allowing Web pages and netpage documents encountered during Web browsing to be conveniently printed on the nearest netpage printer.

The netpage system can collect, on behalf of a printer provider, fees and commissions on income earned through publications printed on the provider's printers. Such income can include advertising fees, click-through fees, e-commerce commissions, and transaction fees. If the printer is owned by the user, then the user is the printer provider.

Each user also has a netpage account 820 which is used to accumulate micro-debits and credits (such as those described in the preceding paragraph); contact details 815, including name, address and telephone numbers; global preferences 816, including privacy, delivery and localization settings; any number of biometric records 817, containing the user's encoded signature 818, fingerprint 819 etc; a handwriting model 819 automatically maintained by the system; and SET payment card accounts 821, with which e-commerce payments can be made.

In addition to the user-specific netpage account, each user also has a netpage account 936 specific to each printer the user is authorized to use. Each printer-specific account is used to accumulate micro-debits and credits related to the user's activities on that printer. The user is billed on a regular basis for any outstanding debit balances.

A user optionally appears in the netpage user directory 823, allowing other users to locate and direct e-mail (etc.) to the user.

2.4 Intelligent Page Layout

The netpage publication server automatically lays out the pages of each user's personalized publication on a section-by-section basis. Since most advertisements are in the form of pre-formatted rectangles, they are placed on the page before the editorial content.

The advertising ratio for a section can be achieved with wildly varying advertising ratios on individual pages within the section, and the ad layout algorithm exploits this. The algorithm is configured to attempt to co-locate closely tied editorial and advertising content, such as placing ads for roofing material specifically within the publication because of a special feature on do-it-yourself roofing repairs.

The editorial content selected for the user, including text and associated images and graphics, is then laid out according to various aesthetic rules.

The entire process, including the selection of ads and the selection of editorial content, must be iterated once the layout has converged, to attempt to more closely achieve the user's stated section size preference. The section size preference can, however, be matched on average over time, allowing significant day-to-day variations.

2.5 Document Format

Once the document is laid out, it is encoded for efficient distribution and persistent storage on the netpage network.

The primary efficiency mechanism is the separation of information specific to a single user's edition and information shared between multiple users' editions. The specific information consists of the page layout. The shared information consists of the objects to which the page layout refers, including images, graphics, and pieces of text.

A text object contains fully-formatted text represented in the Extensible Markup Language (XML) using the Extensible Stylesheet Language (XSL). XSL provides precise control over text formatting independently of the region into which the text is being set, which in this case is being provided by the layout. The text object contains embedded language codes to enable automatic translation, and embedded hyphenation hints to aid with paragraph formatting.

An image object encodes an image in the JPEG 2000 wavelet-based compressed image format. A graphic object encodes a 2D graphic in Scalable Vector Graphics (SVG) format.

The layout itself consists of a series of placed image and graphic objects, linked textflow objects through which text objects flow, hyperlinks and input fields as described above, and watermark regions. These layout objects are summarized in Table 4. The layout uses a compact format suitable for efficient distribution and storage.

TABLE 4 netpage layout objects

| Layout object | Attribute | Format of linked object |
|---|---|---|
| Image | Position | — |
|  | Image object ID | JPEG 2000 |
| Graphic | Position | — |
|  | Graphic object ID | SVG |
| Textflow | Textflow ID | — |
|  | Zone | — |
|  | Optional text object ID | XML/XSL |
| Hyperlink | Type | — |
|  | Zone | — |
|  | Application ID, etc. | — |
| Field | Type | — |
|  | Meaning | — |
|  | Zone | — |
| Watermark | Zone | — |

2.6 Document Distribution

As described above, for purposes of efficient distribution and persistent storage on the netpage network, a user-specific page layout is separated from the shared objects to which it refers.

When a subscribed publication is ready to be distributed, the netpage publication server allocates, with the help of the netpage ID server 12, a unique ID for each page, page instance, document, and document instance.

The server computes a set of optimized subsets of the shared content and creates a multicast channel for each subset, and then tags each user-specific layout with the names of the multicast channels which will carry the shared content used by that layout. The server then pointcasts each user's layouts to that user's printer via the appropriate page server, and when the pointcasting is complete, multicasts the shared content on the specified channels. After receiving its pointcast, each page server and printer subscribes to the multicast channels specified in the page layouts. During the multicasts, each page server and printer extracts from the multicast streams those objects referred to by its page layouts. The page servers persistently archive the received page layouts and shared content.

Once a printer has received all the objects to which its page layouts refer, the printer re-creates the fully-populated layout and then rasterizes and prints it.

Under normal circumstances, the printer prints pages faster than they can be delivered. Assuming a quarter of each page is covered with images, the average page has a size of less than 400 KB. The printer can therefore hold in excess of 100 such pages in its internal 64 MB memory, allowing for temporary buffers etc. The printer prints at a rate of one page per second. This is equivalent to 400 KB or about 3 Mbit of page data per second, which is similar to the highest expected rate of page data delivery over a broadband network.

Even under abnormal circumstances, such as when the printer runs out of paper, it is likely that the user will be able to replenish the paper supply before the printer's 100-page internal storage capacity is exhausted.

However, if the printer's internal memory does fill up, then the printer will be unable to make use of a multicast when it first occurs. The netpage publication server therefore allows printers to submit requests for re-multicasts. When a critical number of requests is received or a timeout occurs, the server re-multicasts the corresponding shared objects.

Once a document is printed, a printer can produce an exact duplicate at any time by retrieving its page layouts and contents from the relevant page server.

2.7 On-Demand Documents

When a netpage document is requested on demand, it can be personalized and delivered in much the same way as a periodical. However, since there is no shared content, delivery is made directly to the requesting printer without the use of multicast.

When a non-netpage document is requested on demand, it is not personalized, and it is delivered via a designated netpage formatting server which reformats it as a netpage document. A netpage formatting server is a special instance of a netpage publication server. The netpage formatting server has knowledge of various Internet document formats, including Adobe's Portable Document Format (PDF), and Hypertext Markup Language (HTML). In the case of HTML, it can make use of the higher resolution of the printed page to present Web pages in a multi-column format, with a table of contents. It can automatically include all Web pages directly linked to the requested page. The user can tune this behavior via a preference.

The netpage formatting server makes standard netpage behavior, including interactivity and persistence, available on any Internet document, no matter what its origin and format. It hides knowledge of different document formats from both the netpage printer and the netpage page server, and hides knowledge of the netpage system from Web servers.

2.8 ID Allocation

Unstructured netpage IDs such as the document ID 51, page ID (region ID) 50, etc., may be assigned on demand through a multi-level assignment hierarchy with a single root node. Lower-level assignors obtain blocks of IDs from higher-level assignors on demand. Unlike with structured ID assignment, these blocks correspond to arbitrary ranges (or even sets) of IDs, rather than to IDs with fixed prefixes. Each assignor in the assignment hierarchy ensures that blocks of IDs and individual IDs are assigned uniquely.

Both registration servers 11 and ID servers 12 act as ID assignors.

3 Security

3.1 Cryptography

Cryptography is used to protect sensitive information, both in storage and in transit, and to authenticate parties to a transaction. There are two classes of cryptography in widespread use: secret-key cryptography and public-key cryptography. The netpage network uses both classes of cryptography.

Secret-key cryptography, also referred to as symmetric cryptography, uses the same key to encrypt and decrypt a message. Two parties wishing to exchange messages must first arrange to securely exchange the secret key.

Public-key cryptography, also referred to as asymmetric cryptography, uses two encryption keys. The two keys are mathematically related in such a way that any message encrypted using one key can only be decrypted using the other key. One of these keys is then published, while the other is kept private. The public key is used to encrypt any message intended for the holder of the private key. Once encrypted using the public key, a message can only be decrypted using the private key. Thus two parties can securely exchange messages without first having to exchange a secret key. To ensure that the private key is secure, it is normal for the holder of the private key to generate the key pair.

Public-key cryptography can be used to create a digital signature. The holder of the private key can create a known hash of a message and then encrypt the hash using the private key. Anyone can then verify that the encrypted hash constitutes the "signature" of the holder of the private key with respect to that particular message by decrypting the encrypted hash using the public key and verifying the hash against the message. If the signature is appended to the message, then the recipient of the message can verify both that the message is genuine and that it has not been altered in transit.

To make public-key cryptography work, there has to be a way to distribute public keys which prevents impersonation. This is normally done using certificates and certificate authorities. A certificate authority is a trusted third party which authenticates the connection between a public key and someone's identity. The certificate authority verifies the person's identity by examining identity documents, and then creates and signs a digital certificate containing the person's identity details and public key. Anyone who trusts the certificate authority can use the public key in the certificate with a high degree of certainty that it is genuine. They just have to verify that the certificate has indeed been signed by the certificate authority, whose public key is well-known.

In most transaction environments, public-key cryptography is only used to create digital signatures and to securely exchange secret session keys. Secret-key cryptography is used for all other purposes.

In the following discussion, when reference is made to the secure transmission of information between a netpage printer and a server, what actually happens is that the printer obtains the server's certificate, authenticates it with reference to the certificate authority, uses the public key-exchange key in the certificate to exchange a secret session key with the server, and then uses the secret session key to encrypt the message data. A session key, by definition, can have an arbitrarily short lifetime.

3.2 Netpage Printer Security

Each netpage printer is assigned a pair of unique identifiers at time of manufacture which are stored in read-only memory in the printer and in the netpage registration server database. The first ID 62 is public and uniquely identifies the printer on the netpage network. The second ID is secret and is used when the printer is first registered on the network.

When the printer connects to the netpage network for the first time after installation, it creates a signature public/private key pair. It transmits the secret ID and the public key securely to the netpage registration server. The server compares the secret ID against the printer's secret ID recorded in its database, and accepts the registration if the IDs match. It then creates and signs a certificate containing the printer's public ID and public signature key, and stores the certificate in the registration database.

The netpage registration server acts as a certificate authority for netpage printers, since it has access to secret information allowing it to verify printer identity.

When a user subscribes to a publication, a record is created in the netpage registration server database authorizing the publisher to print the publication to the user's default printer or a specified printer. Every document sent to a printer via a page server is addressed to a particular user and is signed by the publisher using the publisher's private signature key. The page server verifies, via the registration database, that the publisher is authorized to deliver the publication to the specified user. The page server verifies the signature using the publisher's public key, obtained from the publisher's certificate stored in the registration database.

The netpage registration server accepts requests to add printing authorizations to the database, so long as those requests are initiated via a pen registered to the printer.

3.3 Netpage Pen Security

Each netpage pen is assigned a unique identifier at time of manufacture which is stored in read-only memory in the pen and in the netpage registration server database. The pen ID 61 uniquely identifies the pen on the netpage network.

A netpage pen can "know" a number of netpage printers, and a printer can "know" a number of pens. A pen communicates with a printer via a radio frequency signal whenever it is within range of the printer. Once a pen and printer are registered, they regularly exchange session keys. Whenever the pen transmits digital ink to the printer, the digital ink is always encrypted using the appropriate session key. Digital ink is never transmitted in the clear.

A pen stores a session key for every printer it knows, indexed by printer ID, and a printer stores a session key for every pen it knows, indexed by pen ID. Both have a large but finite storage capacity for session keys, and will forget a session key on a least-recently-used basis if necessary.

When a pen comes within range of a printer, the pen and printer discover whether they know each other. If they don't know each other, then the printer determines whether it is supposed to know the pen. This might be, for example, because the pen belongs to a user who is registered to use the printer. If the printer is meant to know the pen but doesn't, then it initiates the automatic pen registration procedure. If the printer isn't meant to know the pen, then it agrees with the pen to ignore it until the pen is placed in a charging cup, at which time it initiates the registration procedure.

In addition to its public ID, the pen contains a secret key-exchange key. The key-exchange key is also recorded in the netpage registration server database at time of manufacture. During registration, the pen transmits its pen ID to the printer, and the printer transmits the pen ID to the netpage registration server. The server generates a session key for the printer and pen to use, and securely transmits the session key to the printer. It also transmits a copy of the session key encrypted with the pen's key-exchange key. The printer stores the session key internally, indexed by the pen ID, and transmits the encrypted session key to the pen. The pen stores the session key internally, indexed by the printer ID.

Although a fake pen can impersonate a pen in the pen registration protocol, only a real pen can decrypt the session key transmitted by the printer.

When a previously unregistered pen is first registered, it is of limited use until it is linked to a user. A registered but "un-owned" pen is only allowed to be used to request and fill in netpage user and pen registration forms, to register a new user to which the new pen is automatically linked, or to add a new pen to an existing user.

The pen uses secret-key rather than public-key encryption because of hardware performance constraints in the pen.

3.4 Secure Documents

The netpage system supports the delivery of secure documents such as tickets and coupons. The netpage printer includes a facility to print watermarks, but will only do so on request from publishers who are suitably authorized. The publisher indicates its authority to print watermarks in its certificate, which the printer is able to authenticate.

The "watermark" printing process uses an alternative dither matrix in specified "watermark" regions of the page. Back-to-back pages contain mirror-image watermark regions which coincide when printed. The dither matrices used in odd and even pages' watermark regions are designed to produce an interference effect when the regions are viewed together, achieved by looking through the printed sheet.

The effect is similar to a watermark in that it is not visible when looking at only one side of the page, and is lost when the page is copied by normal means.

Pages of secure documents cannot be copied using the built-in netpage copy mechanism described in Section 1.9 above. This extends to copying netpages on netpage-aware photocopiers.

Secure documents are typically generated as part of e-commerce transactions. They can therefore include the user's photograph which was captured when the user registered biometric information with the netpage registration server, as described in Section 2.

When presented with a secure netpage document, the recipient can verify its authenticity by requesting its status in the usual way. The unique ID of a secure document is only valid for the lifetime of the document, and secure document IDs are allocated non-contiguously to prevent their prediction by opportunistic forgers. A secure document verification pen can be developed with built-in feedback on verification failure, to support easy point-of-presentation document verification.

Clearly neither the watermark nor the user's photograph are secure in a cryptographic sense. They simply provide a significant obstacle to casual forgery. Online document verification, particularly using a verification pen, provides an added level of security where it is needed, but is still not entirely immune to forgeries.

3.5 Non-Repudiation

In the netpage system, forms submitted by users are delivered reliably to forms handlers and are persistently archived on netpage page servers. It is therefore impossible for recipients to repudiate delivery.

E-commerce payments made through the system, as described in Section 4, are also impossible for the payee to repudiate.

4 Electronic Commerce Model

4.1 Secure Electronic Transaction (SET)

The netpage system uses the Secure Electronic Transaction (SET) system as one of its payment systems. SET, having been developed by MasterCard and Visa, is organized around payment cards, and this is reflected in the terminology. However, much of the system is independent of the type of accounts being used.

In SET, cardholders and merchants register with a certificate authority and are issued with certificates containing their public signature keys. The certificate authority verifies a cardholder's registration details with the card issuer as appropriate, and verifies a merchant's registration details with the acquirer as appropriate. Cardholders and merchants store their respective private signature keys securely on their computers. During the payment process, these certificates are used to mutually authenticate a merchant and cardholder, and to authenticate them both to the payment gateway.

SET has not yet been adopted widely, partly because cardholder maintenance of keys and certificates is considered burdensome. Interim solutions which maintain cardholder keys and certificates on a server and give the cardholder access via a password have met with some success.

4.2 Set Payments

In the netpage system the netpage registration server acts as a proxy for the netpage user (i.e. the cardholder) in SET payment transactions.

The netpage system uses biometrics to authenticate the user and authorize SET payments. Because the system is pen-based, the biometric used is the user's on-line signature, consisting of time-varying pen position and pressure. A fingerprint biometric can also be used by designing a fingerprint sensor into the pen, although at a higher cost. The type of biometric used only affects the capture of the biometric, not the authorization aspects of the system.

The first step to being able to make SET payments is to register the user's biometric with the netpage registration server. This is done in a controlled environment, for example a bank, where the biometric can be captured at the same time as the user's identity is verified. The biometric is captured and stored in the registration database, linked to the user's record. The user's photograph is also optionally captured and linked to the record. The SET cardholder registration process is completed, and the resulting private signature key and certificate are stored in the database. The user's payment card information is also stored, giving the netpage registration server enough information to act as the user's proxy in any SET payment transaction.

When the user eventually supplies the biometric to complete a payment, for example by signing a netpage order form, the printer securely transmits the order information, the pen ID and the biometric data to the netpage registration server. The server verifies the biometric with respect to the user identified by the pen ID, and from then on acts as the user's proxy in completing the SET payment transaction.

4.3 Micro-Payments

The netpage system includes a mechanism for micro-payments, to allow the user to be conveniently charged for printing low-cost documents on demand and for copying copyright documents, and possibly also to allow the user to be reimbursed for expenses incurred in printing advertising material. The latter depends on the level of subsidy already provided to the user.

When the user registers for e-commerce, a network account is established which aggregates micro-payments. The user receives a statement on a regular basis, and can settle any outstanding debit balance using the standard payment mechanism.

The network account can be extended to aggregate subscription fees for periodicals, which would also otherwise be presented to the user in the form of individual statements.

4.4 Transactions

When a user requests a netpage in a particular application context, the application is able to embed a user-specific transaction ID 55 in the page. Subsequent input through the page is tagged with the transaction ID, and the application is thereby able to establish an appropriate context for the user's input.

When input occurs through a page which is not user-specific, however, the application must use the user's unique identity to establish a context. A typical example involves adding items from a pre-printed catalog page to the user's virtual "shopping cart". To protect the user's privacy, however, the unique user ID 60 known to the netpage system is not divulged to applications. This is to prevent different application providers from easily correlating independently accumulated behavioral data.

Figure 24:
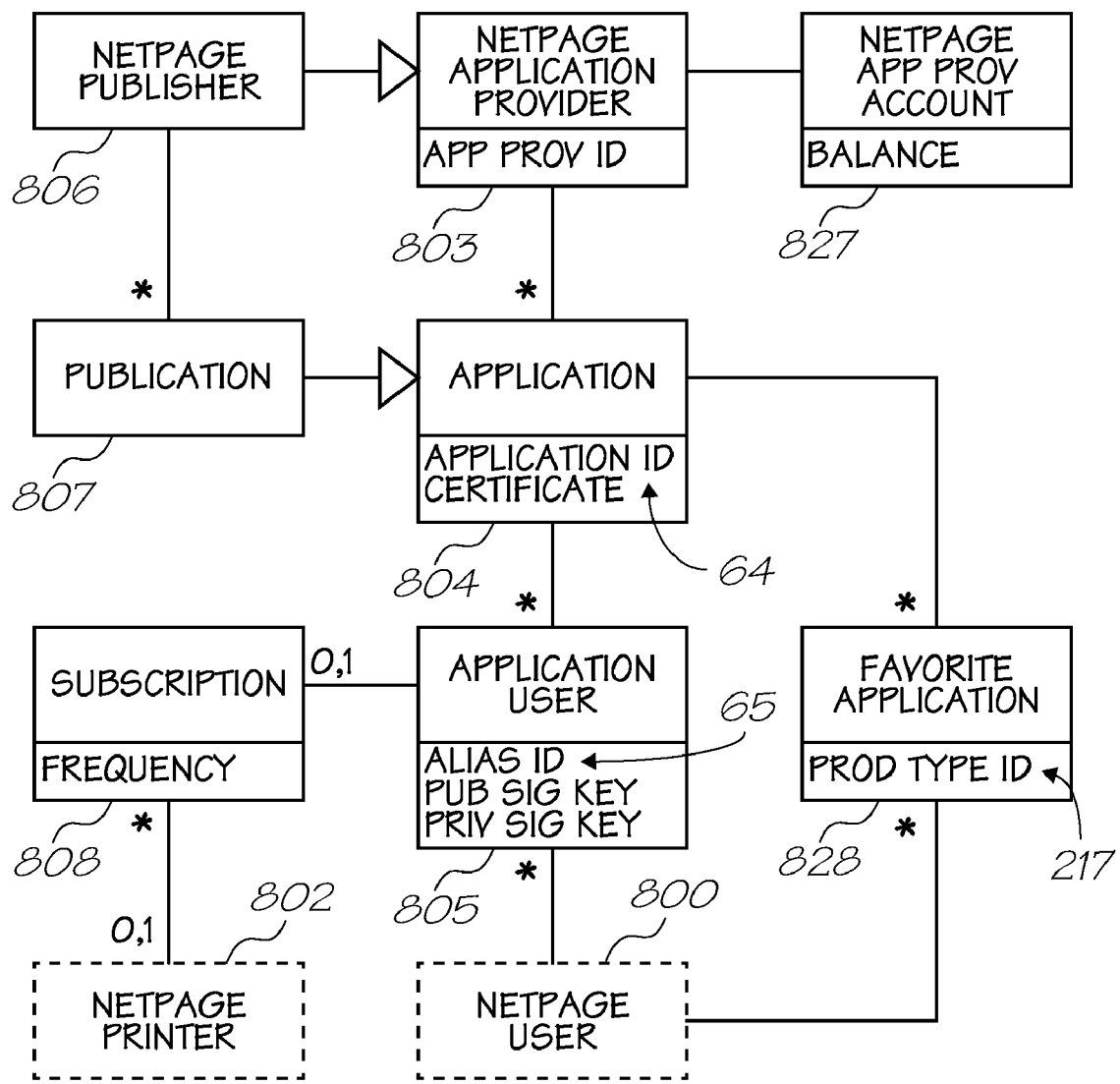
FIG. 24 is a schematic view of an application class diagram.

The netpage registration server instead maintains an anonymous relationship between a user and an application via a unique alias ID 65, as shown in FIG. 24. Whenever the user activates a hyperlink tagged with the "registered" attribute, the netpage page server asks the netpage registration server to translate the associated application ID 64, together with the pen ID 61, into an alias ID 65. The alias ID is then submitted to the hyperlink's application.

The application maintains state information indexed by alias ID, and is able to retrieve user-specific state information without knowledge of the global identity of the user.

The system also maintains an independent certificate and private signature key for each of a user's applications, to allow it to sign application transactions on behalf of the user using only application-specific information.

To assist the system in routing product bar code (e.g. UPC) and similar product-item-related "hyperlink" activations, the system records a favorite application on behalf of the user for any number of product types. For example, a user may nominate Amazon as their favorite bookseller, while a different user may nominate Barnes and Noble. When the first user requests book-related information, e.g. via a printed book review or via an actual book, they are provided with the information by Amazon.

Each application is associated with an application provider, and the system maintains an account on behalf of each application provider, to allow it to credit and debit the provider for click-through fees etc.

An application provider can be a publisher of periodical subscribed content. The system records the user's willingness to receive the subscribed publication, as well as the expected frequency of publication.

5 Communications Protocols

A communications protocol defines an ordered exchange of messages between entities. In the netpage system, entities such as pens, printers and servers utilise a set of defined protocols to cooperatively handle user interaction with the netpage system.

Each protocol is illustrated by way of a sequence diagram in which the horizontal dimension is used to represent message flow and the vertical dimension is used to represent time. Each entity is represented by a rectangle containing the name of the entity and a vertical column representing the lifeline of the entity. During the time an entity exists, the lifeline is shown as a dashed line. During the time an entity is active, the lifeline is shown as a double line. Because the protocols considered here do not create or destroy entities, lifelines are generally cut short as soon as an entity ceases to participate in a protocol.

5.1 Subscription Delivery Protocol

Figure 40:
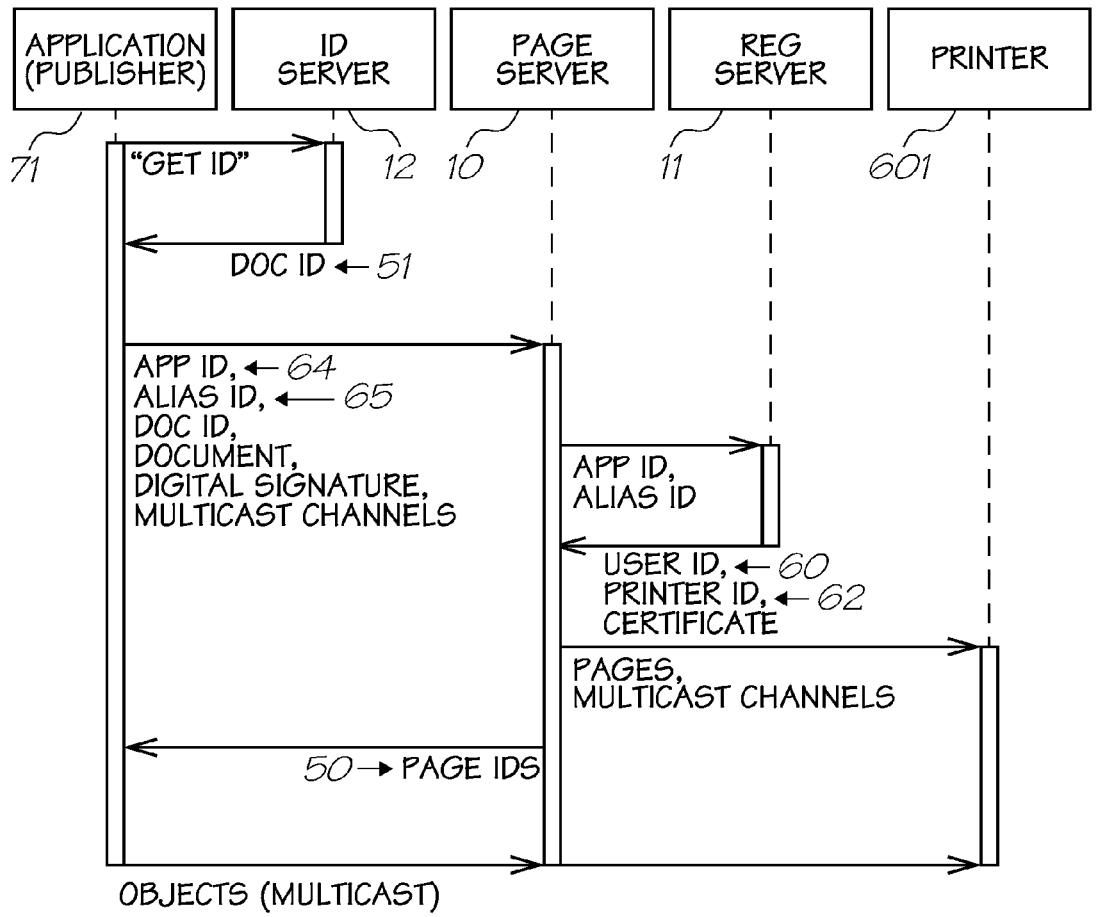
FIG. 40 is a schematic view of a subscription delivery protocol.

A preferred embodiment of a subscription delivery protocol is shown in FIG. 40.

A large number of users may subscribe to a periodical publication. Each user's edition may be laid out differently, but many users' editions will share common content such as text objects and image objects. The subscription delivery protocol therefore delivers document structures to individual printers via pointcast, but delivers shared content objects via multicast.

The application (i.e. publisher) first obtains a document ID 51 for each document from an ID server 12. It then sends each document structure, including its document ID and page descriptions, to the page server 10 responsible for the document's newly allocated ID. It includes its own application ID 64, the subscriber's alias ID 65, and the relevant set of multicast channel names. It signs the message using its private signature key.

The page server uses the application ID and alias ID to obtain from the registration server the corresponding user ID 60, the user's selected printer ID 62 (which may be explicitly selected for the application, or may be the user's default printer), and the application's certificate.

The application's certificate allows the page server to verify the message signature. The page server's request to the registration server fails if the application ID and alias ID don't together identify a subscription 808.

The page server then allocates document and page instance IDs and forwards the page descriptions, including page IDs 50, to the printer. It includes the relevant set of multicast channel names for the printer to listen to.

It then returns the newly allocated page IDs to the application for future reference.

Once the application has distributed all of the document structures to the subscribers' selected printers via the relevant page servers, it multicasts the various subsets of the shared objects on the previously selected multicast channels. Both page servers and printers monitor the appropriate multicast channels and receive their required content objects. They are then able to populate the previously pointcast document structures. This allows the page servers to add complete documents to their databases, and it allows the printers to print the documents.

5.2 Hyperlink Activation Protocol

Figure 42:
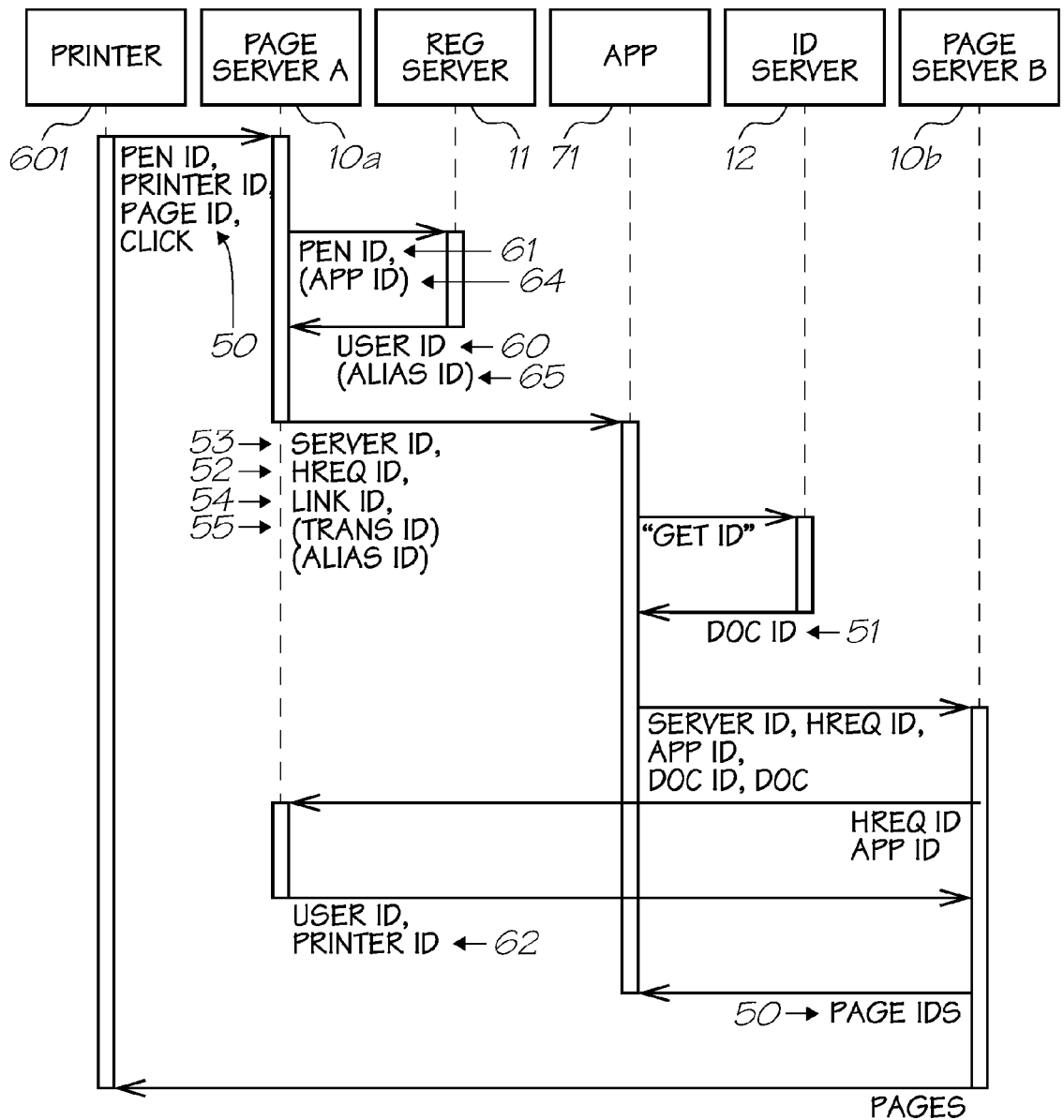
FIG. 42 is a schematic view of a hyperlink activation protocol.

A preferred embodiment of a hyperlink activation protocol is shown in FIG. 42.

When a user clicks on a netpage with a netpage pen, the pen communicates the click to the nearest netpage printer 601. The click identifies the page and a location on the page. The printer already knows the ID 61 of the pen from the pen connection protocol.

The printer determines, via the DNS, the network address of the page server 10a handling the particular page ID 50. The address may already be in its cache if the user has recently interacted with the same page. The printer then forwards the pen ID, its own printer ID 62, the page ID and click location to the page server.

The page server loads the page description 5 identified by the page ID and determines which input element's zone 58, if any, the click lies in. Assuming the relevant input element is a hyperlink element 844, the page server then obtains the associated application ID 64 and link ID 54, and determines, via the DNS, the network address of the application server hosting the application 71.

Figure 41:
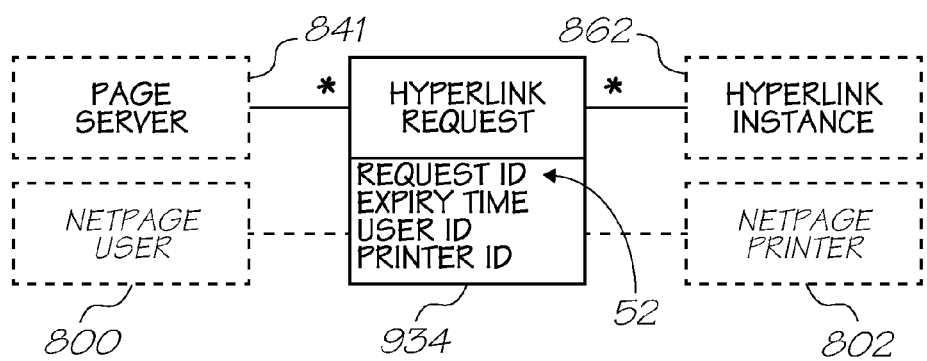
FIG. 41 is a schematic view of a hyperlink request class diagram.

The page server uses the pen ID 61 to obtain the corresponding user ID 60 from the registration server 11, and then allocates a globally unique hyperlink request ID 52 and builds a hyperlink request 934. The hyperlink request class diagram is shown in FIG. 41. The hyperlink request records the IDs of the requesting user and printer, and identifies the clicked hyperlink instance 862. The page server then sends its own server ID 53, the hyperlink request ID, and the link ID to the application.

The application produces a response document according to application-specific logic, and obtains a document ID 51 from an ID server 12. It then sends the document to the page server 10b responsible for the document's newly allocated ID, together with the requesting page server's ID and the hyperlink request ID.

The second page server sends the hyperlink request ID and application ID to the first page server to obtain the corresponding user ID and printer ID 62. The first page server rejects the request if the hyperlink request has expired or is for a different application.

The second page server allocates document instance and page IDs 50, returns the newly allocated page IDs to the application, adds the complete document to its own database, and finally sends the page descriptions to the requesting printer.

The hyperlink instance may include a meaningful transaction ID 55, in which case the first page server includes the transaction ID in the message sent to the application. This allows the application to establish a transaction-specific context for the hyperlink activation.

If the hyperlink requires a user alias, i.e. its "alias required" attribute is set, then the first page server sends both the pen ID 61 and the hyperlink's application ID 64 to the registration server 11 to obtain not just the user ID corresponding to the pen ID but also the alias ID 65 corresponding to the application ID and the user ID. It includes the alias ID in the message sent to the application, allowing the application to establish a user-specific context for the hyperlink activation.

5.3 Handwriting Recognition Protocol

When a user draws a stroke on a netpage with a netpage pen, the pen communicates the stroke to the nearest netpage printer. The stroke identifies the page and a path on the page.

The printer forwards the pen ID 61, its own printer ID 62, the page ID 50 and stroke path to the page server 10 in the usual way.

The page server loads the page description 5 identified by the page ID and determines which input element's zone 58, if any, the stroke intersects. Assuming the relevant input element is a text field 878, the page server appends the stroke to the text field's digital ink.

After a period of inactivity in the zone of the text field, the page server sends the pen ID and the pending strokes to the registration server 11 for interpretation. The registration server identifies the user corresponding to the pen, and uses the user's accumulated handwriting model 822 to interpret the strokes as handwritten text. Once it has converted the strokes to text, the registration server returns the text to the requesting page server. The page server appends the text to the text value of the text field.

5.4 Signature Verification Protocol

Assuming the input element whose zone the stroke intersects is a signature field 880, the page server 10 appends the stroke to the signature field's digital ink.

After a period of inactivity in the zone of the signature field, the page server sends the pen ID 61 and the pending strokes to the registration server 11 for verification. It also sends the application ID 64 associated with the form of which the signature field is part, as well as the form ID 56 and the current data content of the form. The registration server identifies the user corresponding to the pen, and uses the user's dynamic signature biometric 818 to verify the strokes as the user's signature. Once it has verified the signature, the registration server uses the application ID 64 and user ID 60 to identify the user's application-specific private signature key. It then uses the key to generate a digital signature of the form data, and returns the digital signature to the requesting page server. The page server assigns the digital signature to the signature field and sets the associated form's status to frozen.

The digital signature includes the alias ID 65 of the corresponding user. This allows a single form to capture multiple users' signatures.

5.5 Form Submission Protocol

Figure 43:
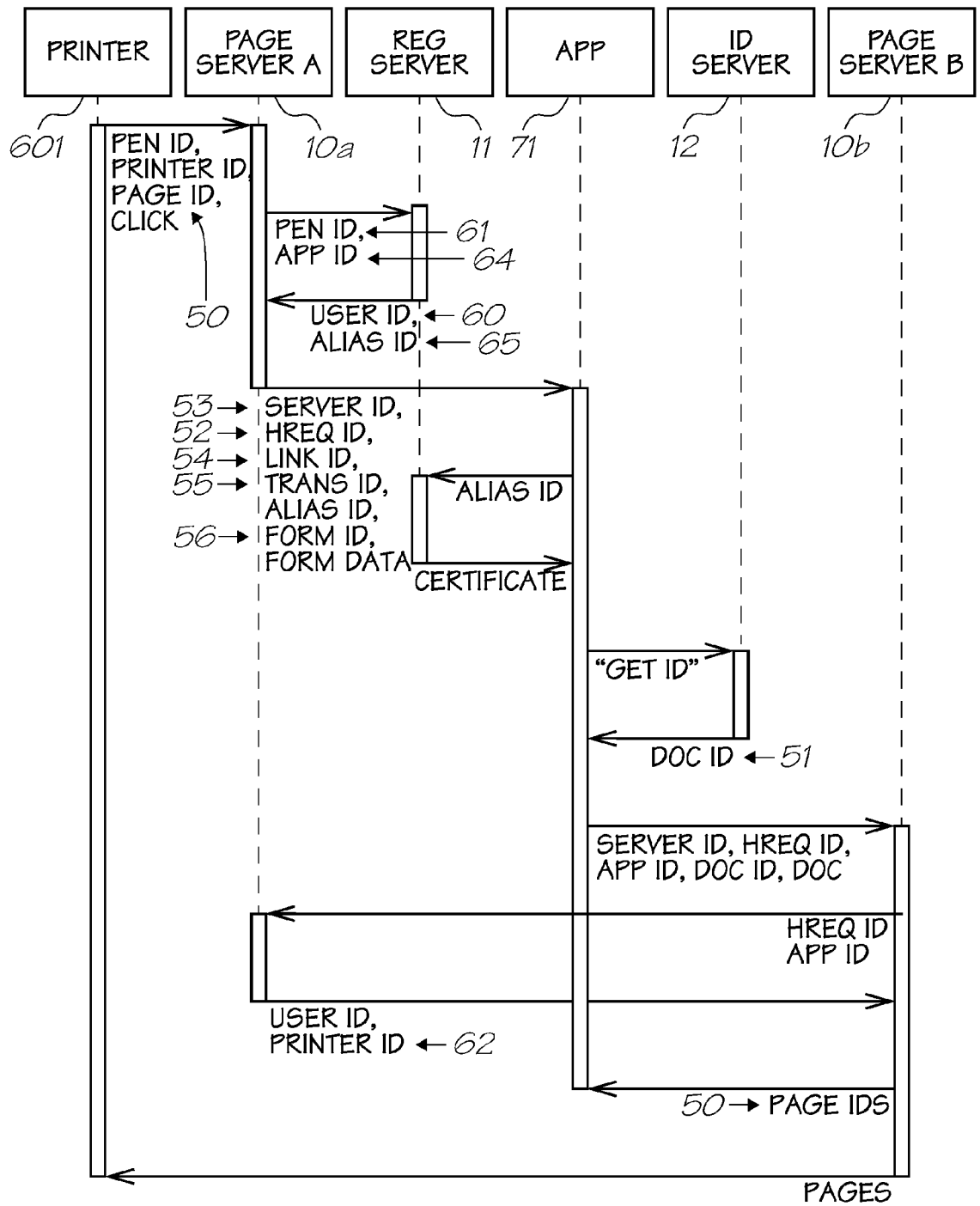
FIG. 43 is a schematic view of a form submission protocol.

A preferred embodiment of a form submission protocol is shown in FIG. 43.

Form submission occurs via a form hyperlink activation. It thus follows the protocol defined in Section 5.2, with some form-specific additions.

In the case of a form hyperlink, the hyperlink activation message sent by the page server 10 to the application 71 also contains the form ID 56 and the current data content of the form. If the form contains any signature fields, then the application verifies each one by extracting the alias ID 65 associated with the corresponding digital signature and obtaining the corresponding certificate from the registration server 11.

6 Netpage Pen Description

6.1 Pen Mechanics

Referring to FIGS. 8 and 9, the pen, generally designated by reference numeral 101, includes a housing 102 in the form of a plastics moulding having walls 103 defining an interior space 104 for mounting the pen components. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

stylus 120 nib 121 out ink cartridge 118 nib 119 out, and neither ink cartridge 118 nib 119 out nor stylus 120 nib 121 out A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

6.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation of the pen and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a receiver, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a CCD or CMOS image sensor. Depending on tagging scheme, it has a size ranging from about 100×100 pixels to 200×200 pixels. Many miniature CMOS image sensors are commercially available, including the National Semiconductor LM9630.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

In a further embodiment, the pen 101 includes a pair of orthogonal accelerometers mounted in the normal plane of the pen 101 axis. The accelerometers 190 are shown in FIGS. 9 and 10 in ghost outline.

The provision of the accelerometers enables this embodiment of the pen 101 to sense motion without reference to surface location tags, allowing the location tags to be sampled at a lower rate. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate, is short.

7 Netpage Printer Description

7.1 Printer Mechanics

The vertically-mounted netpage wallprinter 601 is shown fully assembled in FIG. 11.

Figure 12A:
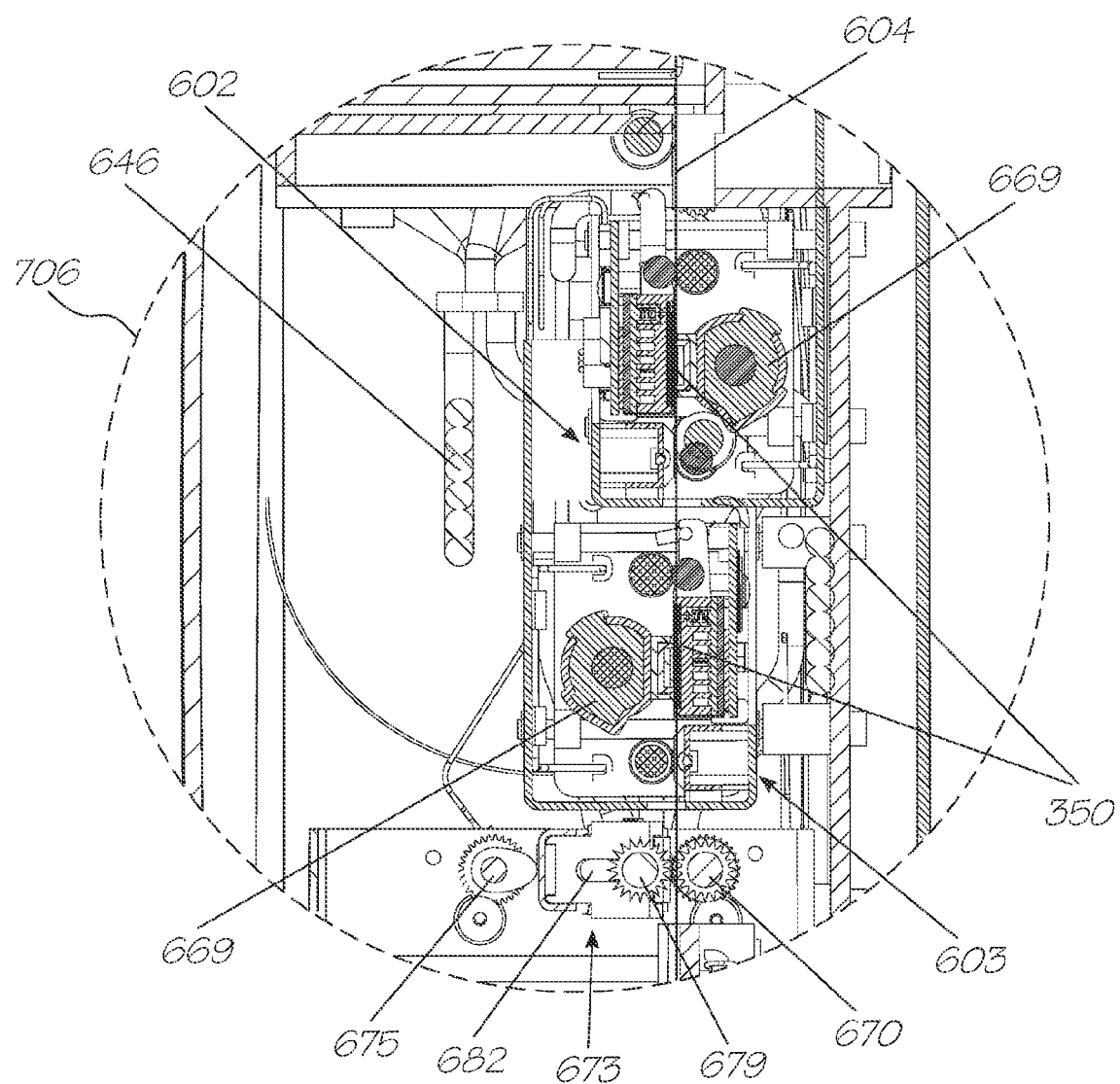
FIG. 12A is an enlarged portion of FIG. 12 showing a section of the duplexed print engines and glue wheel assembly.

It prints netpages on Letter/A4 sized media using duplexed 8½" Memjet™ print engines 602 and 603, as shown in FIGS. 12 and 12a. It uses a straight paper path with the paper 604 passing through the duplexed print engines 602 and 603 which print both sides of a sheet simultaneously, in full color and with full bleed.

An integral binding assembly 605 applies a strip of glue along one edge of each printed sheet, allowing it to adhere to the previous sheet when pressed against it. This creates a final bound document 618 which can range in thickness from one sheet to several hundred sheets.

The replaceable ink cartridge 627, shown in FIG. 13 coupled with the duplexed print engines, has bladders or chambers for storing fixative, adhesive, and cyan, magenta, yellow, black and infrared inks. The cartridge also contains a micro air filter in a base molding. The micro air filter interfaces with an air pump 638 inside the printer via a hose 639. This provides filtered air to the printheads to prevent ingress of micro particles into the Memjet™ printheads 350 which might otherwise clog the printhead nozzles. By incorporating the air filter within the cartridge, the operational life of the filter is effectively linked to the life of the cartridge. The ink cartridge is a fully recyclable product with a capacity for printing and gluing 3000 pages (1500 sheets).

Referring to FIG. 12, the motorized media pick-up roller assembly 626 pushes the top sheet directly from the media tray past a paper sensor on the first print engine 602 into the duplexed Memjet™ printhead assembly. The two Memjet™ print engines 602 and 603 are mounted in an opposing in-line sequential configuration along the straight paper path. The paper 604 is drawn into the first print engine 602 by integral, powered pick-up rollers 626. The position and size of the paper 604 is sensed and full bleed printing commences. Fixative is printed simultaneously to aid drying in the shortest possible time.

The paper exits the first Memjet™ print engine 602 through a set of powered exit spike wheels (aligned along the straight paper path), which act against a rubberized roller.

These spike wheels contact the 'wet' printed surface and continue to feed the sheet 604 into the second Memjet™ print engine 603.

Referring to FIGS. 12 and 12a, the paper 604 passes from the duplexed print engines 602 and 603 into the binder assembly 605. The printed page passes between a powered spike wheel axle 670 with a fibrous support roller and another movable axle with spike wheels and a momentary action glue wheel. The movable axle/glue assembly 673 is mounted to a metal support bracket and it is transported forward to interface with the powered axle 670 via gears by action of a camshaft. A separate motor powers this camshaft.

The glue wheel assembly 673 consists of a partially hollow axle 679 with a rotating coupling for the glue supply hose 641 from the ink cartridge 627. This axle 679 connects to a glue wheel, which absorbs adhesive by capillary action through radial holes. A molded housing 682 surrounds the glue wheel, with an opening at the front. Pivoting side moldings and sprung outer doors are attached to the metal bracket and hinge out sideways when the rest of the assembly 673 is thrust forward. This action exposes the glue wheel through the front of the molded housing 682. Tension springs close the assembly and effectively cap the glue wheel during periods of inactivity.

As the sheet 604 passes into the glue wheel assembly 673, adhesive is applied to one vertical edge on the front side (apart from the first sheet of a document) as it is transported down into the binding assembly 605.

7.2 Printer Controller Architecture

Figure 14:
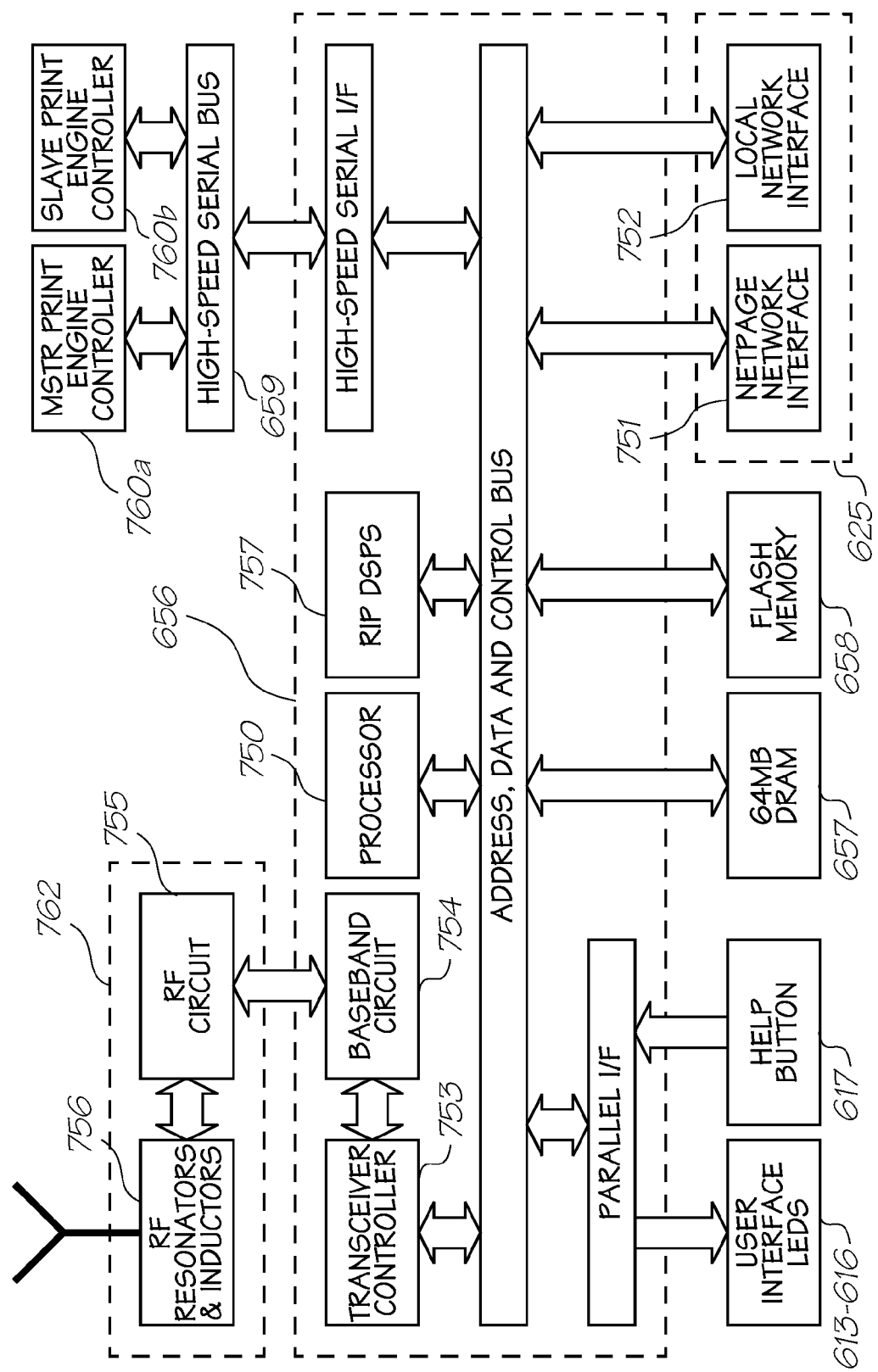
FIG. 14 is a schematic block diagram of a printer controller for the netpage printer shown in FIGS. 11 and 12.
Figure 15:
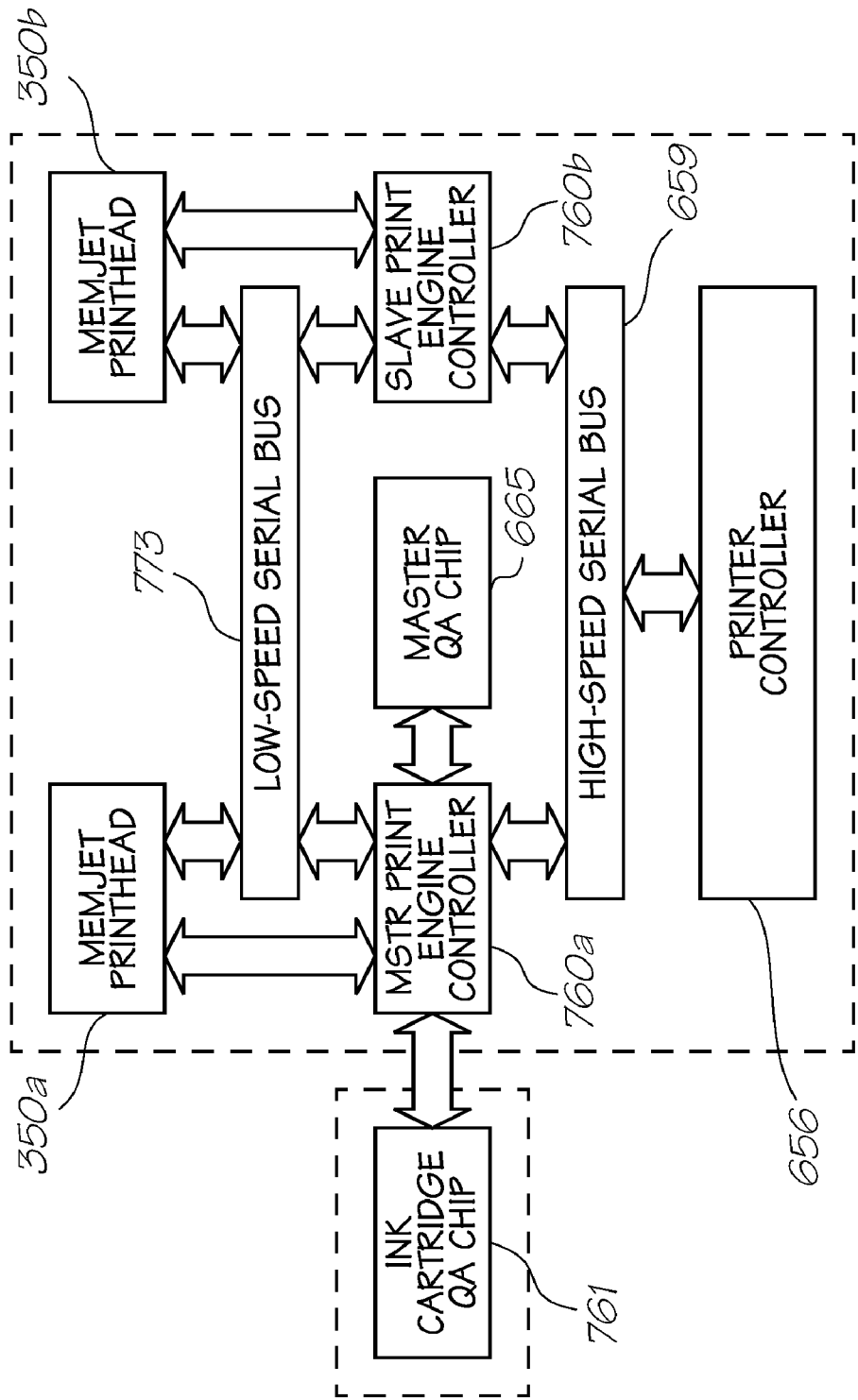
FIG. 15 is a schematic block diagram of duplexed print engine controllers and Memjet™ printheads associated with the printer controller shown in FIG. 14.
Figure 16:
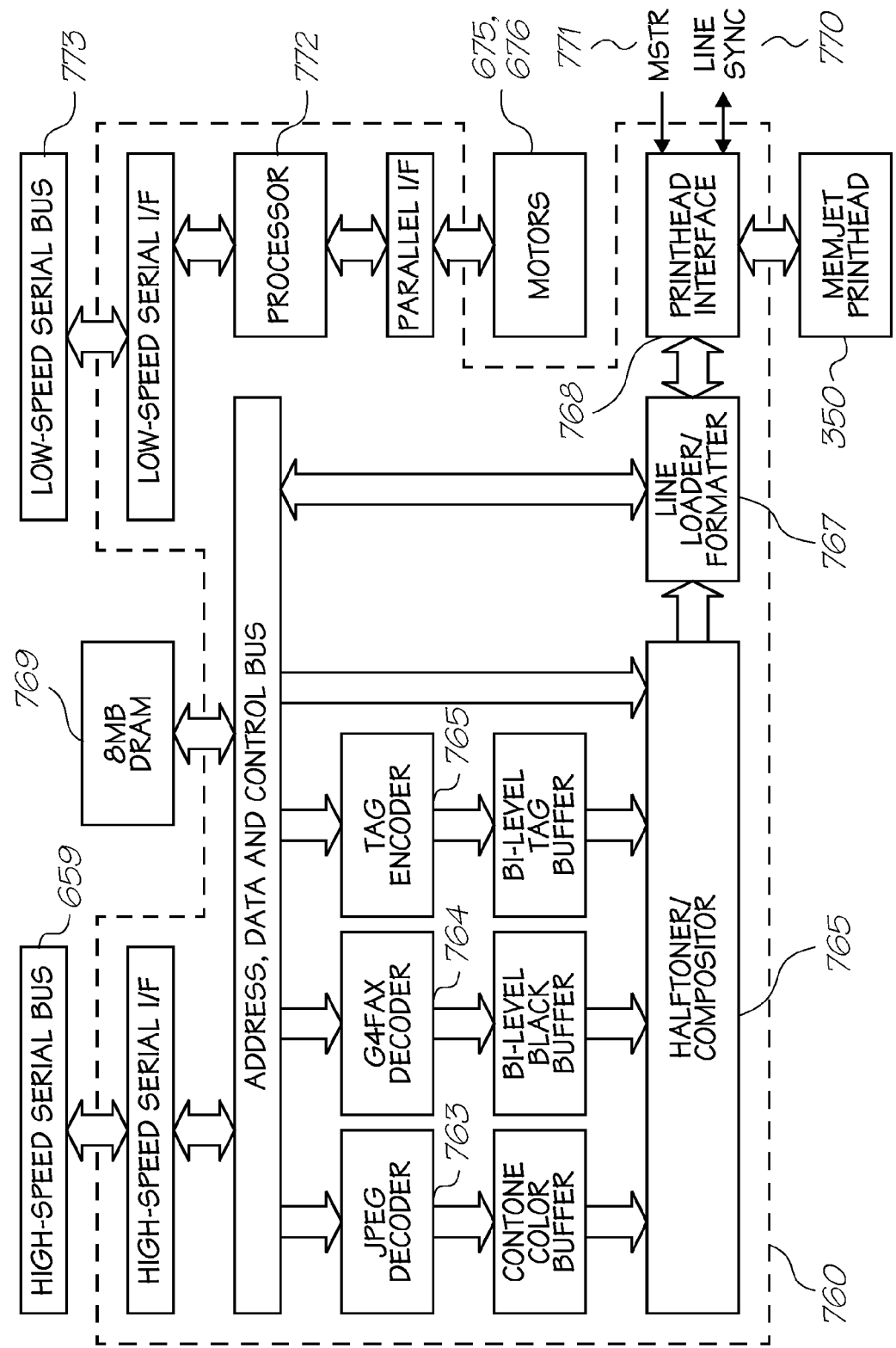
FIG. 16 is a schematic block diagram of the print engine controller shown in FIGS. 14 and 15.

The netpage printer controller consists of a controlling processor 750, a factory-installed or field-installed network interface module 625, a radio transceiver (transceiver controller 753, baseband circuit 754, RF circuit 755, and RF resonators and inductors 756), dual raster image processor (RIP) DSPs 757, duplexed print engine controllers 760a and 760b, flash memory 658, and 64 MB of DRAM 657, as illustrated in FIG. 14.

The controlling processor handles communication with the network 19 and with local wireless netpage pens 101, senses the help button 617, controls the user interface LEDs 613-616, and feeds and synchronizes the RIP DSPs 757 and print engine controllers 760. It consists of a medium-performance general-purpose microprocessor. The controlling processor 750 communicates with the print engine controllers 760 via a high-speed serial bus 659.

The RIP DSPs rasterize and compress page descriptions to the netpage printer's compressed page format. Each print engine controller expands, dithers and prints page images to its associated Memjet™ printhead 350 in real time (i.e. at over 30 pages per minute). The duplexed print engine controllers print both sides of a sheet simultaneously.

The master print engine controller 760a controls the paper transport and monitors ink usage in conjunction with the master QA chip 665 and the ink cartridge QA chip 761.

The printer controller's flash memory 658 holds the software for both the processor 750 and the DSPs 757, as well as configuration data. This is copied to main memory 657 at boot time.

The processor 750, DSPs 757, and digital transceiver components (transceiver controller 753 and baseband circuit 754) are integrated in a single controller ASIC 656. Analog RF components (RF circuit 755 and RF resonators and inductors 756) are provided in a separate RF chip 762. The network interface module 625 is separate, since netpage printers allow the network connection to be factory-selected or field-selected. Flash memory 658 and the 2×256 Mbit (64 MB) DRAM 657 is also off-chip. The print engine controllers 760 are provided in separate ASICs.

A variety of network interface modules 625 are provided, each providing a netpage network interface 751 and optionally a local computer or network interface 752. netpage network Internet interfaces include POTS modems, Hybrid Fiber-Coax (HFC) cable modems, ISDN modems, DSL modems, satellite transceivers, current and next-generation cellular telephone transceivers, and wireless local loop (WLL) transceivers. Local interfaces include IEEE 1284 (parallel port), 10Base-T and 100Base-T Ethernet, USB and USB 2.0, IEEE 1394 (Firewire), and various emerging home networking interfaces. If an Internet connection is available on the local network, then the local network interface can be used as the netpage network interface.

The radio transceiver 753 communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

The printer controller optionally incorporates an Infrared Data Association (IrDA) interface for receiving data "squirted" from devices such as netpage cameras. In an alternative embodiment, the printer uses the IrDA interface for short-range communication with suitably configured netpage pens.

7.2.1 Rasterization and Printing

Once the main processor 750 has received and verified the document's page layouts and page objects, it runs the appropriate RIP software on the DSPs 757.

The DSPs 757 rasterize each page description and compress the rasterized page image. The main processor stores each compressed page image in memory. The simplest way to load-balance multiple DSPs is to let each DSP rasterize a separate page. The DSPs can always be kept busy since an arbitrary number of rasterized pages can, in general, be stored in memory. This strategy only leads to potentially poor DSP utilization when rasterizing short documents.

Watermark regions in the page description are rasterized to a contone-resolution bi-level bitmap which is losslessly compressed to negligible size and which forms part of the compressed page image.

The infrared (IR) layer of the printed page contains coded netpage tags at a density of about six per inch. Each tag encodes the page ID, tag ID, and control bits, and the data content of each tag is generated during rasterization and stored in the compressed page image.

The main processor 750 passes back-to-back page images to the duplexed print engine controllers 760. Each print engine controller 760 stores the compressed page image in its local memory, and starts the page expansion and printing pipeline. Page expansion and printing is pipelined because it is impractical to store an entire 114 MB bi-level CMYK+IR page image in memory.

7.2.2 Print Engine Controller

The page expansion and printing pipeline of the print engine controller 760 consists of a high speed IEEE 1394 serial interface 659, a standard JPEG decoder 763, a standard Group 4 Fax decoder 764, a custom halftoner/compositor unit 765, a custom tag encoder 766, a line loader/formatter unit 767, and a custom interface 768 to the Memjet™ printhead 350.

The print engine controller 360 operates in a double buffered manner. While one page is loaded into DRAM 769 via the high speed serial interface 659, the previously loaded page is read from DRAM 769 and passed through the print engine controller pipeline. Once the page has finished printing, the page just loaded is printed while another page is loaded.

The first stage of the pipeline expands (at 763) the JPEG-compressed contone CMYK layer, expands (at 764) the Group 4 Fax-compressed bi-level black layer, and renders (at 766) the bi-level netpage tag layer according to the tag format defined in section 1.2, all in parallel. The second stage dithers (at 765) the contone CMYK layer and composites (at 765) the bi-level black layer over the resulting bi-level CMYK layer. The resultant bi-level CMYK+IR dot data is buffered and formatted (at 767) for printing on the Memjet™ printhead 350 via a set of line buffers. Most of these line buffers are stored in the off-chip DRAM. The final stage prints the six channels of bi-level dot data (including fixative) to the Memjet™ printhead 350 via the printhead interface 768.

When several print engine controllers 760 are used in unison, such as in a duplexed configuration, they are synchronized via a shared line sync signal 770. Only one print engine 760, selected via the external master/slave pin 771, generates the line sync signal 770 onto the shared line.

The print engine controller 760 contains a low-speed processor 772 for synchronizing the page expansion and rendering pipeline, configuring the printhead 350 via a low-speed serial bus 773, and controlling the stepper motors 675, 676.

In the 8½" versions of the netpage printer, the two print engines each prints 30 Letter pages per minute along the long dimension of the page (11"), giving a line rate of 8.8 kHz at 1600 dpi. In the 12" versions of the netpage printer, the two print engines each prints 45 Letter pages per minute along the short dimension of the page (8½"), giving a line rate of 10.2 kHz. These line rates are well within the operating frequency of the Memjet™ printhead, which in the current design exceeds 30 kHz.

8 Product Tagging

Automatic identification refers to the use of technologies such as bar codes, magnetic stripe cards, smartcards, and RF transponders, to (semi-)automatically identify objects to data processing systems without manual keying. Existing systems typically utilise RFID tags or two-dimensional bar codes as discussed above.

However, significant problems exist with such systems and it is therefore proposed to provide tags utilising the netpage tagging system, herein after referred to as Hyperlabel™ tagging.

8.1 Hyperlabel™ Tagging in the Supply Chain

Using an invisible (e.g. infrared) tagging scheme such as the netpage tagging scheme described above to uniquely identify a product item has the significant advantage that it allows the entire surface of a product to be tagged, or a significant portion thereof, without impinging on the graphic design of the product's packaging or labelling. If the entire product surface is tagged, then the orientation of the product doesn't affect its ability to be scanned, i.e. a significant part of the line-of-sight disadvantage of a visible bar code is eliminated. Furthermore, since the tags are small and massively replicated, label damage no longer prevents scanning Hyperlabel™ tagging, then, consists of covering a large proportion of the surface of a product item with optically-readable invisible tags. When the tags utilise reflection or absorption in the infrared spectrum they are also referred to as infrared identification (IRID) tags. Each Hyperlabel™ tag uniquely identifies the product item on which it appears. The Hyperlabel™ tag may directly encode the product code (e.g. EPC) of the item, or may encode a surrogate ID which in turn identifies the product code via a database lookup. Each Hyperlabel™ tag also optionally identifies its own position on the surface of the product item, to provide the downstream consumer benefits of netpage interactivity described earlier.

Hyperlabel™ tags are applied during product manufacture and/or packaging using digital printers. These may be add-on infrared printers which print the Hyperlabel™ tags after the text and graphics have been printed by other means, or integrated color and infrared printers which print the Hyperlabel™ tags, text and graphics simultaneously. Digitally-printed text and graphics may include everything on the label or packaging, or may consist only of the variable portions, with other portions still printed by other means.

The economic case for IRID Hyperlabel™ tagging is discussed in more detail below.

8.2 Hyperlabel™ Tagging

Figure 18:
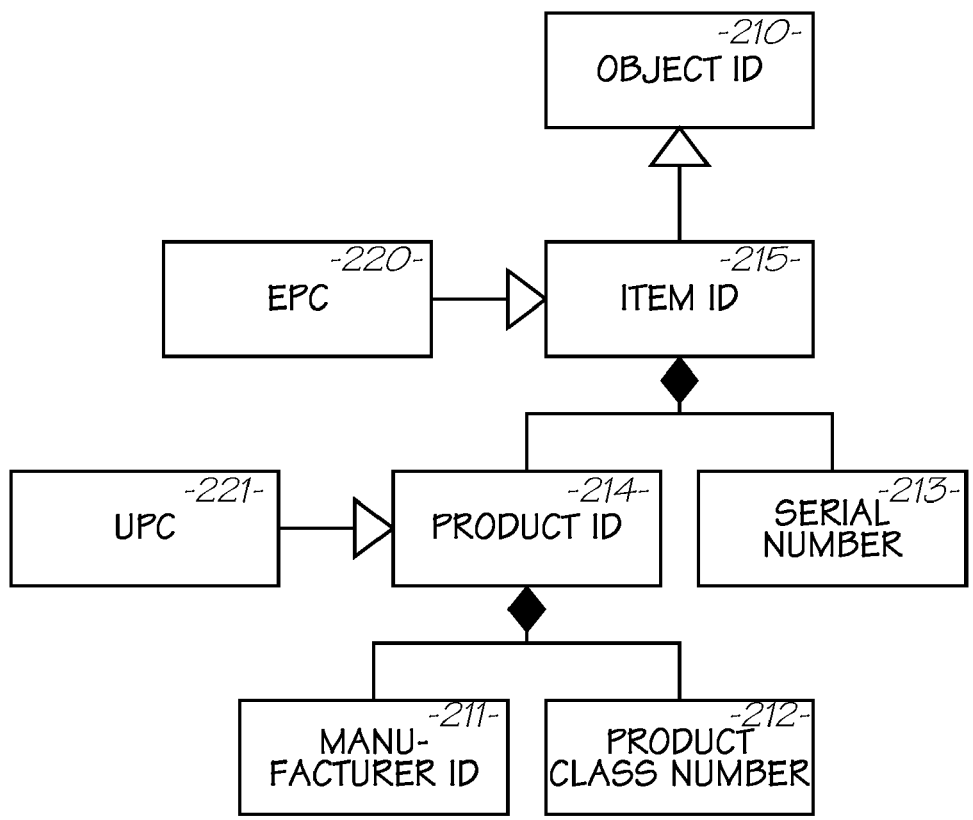
FIG. 18 is a schematic view of the structure of an item ID.

As shown in FIG. 18, a product's unique item ID 215 may be seen as a special kind of unique object ID 210. The Electronic Product Code (EPC) 220 is one emerging standard for an item ID. An item ID typically consists of a product ID 214 and a serial number 213. The product ID identifies a class of product, while the serial number identifies a particular instance of that class, i.e. an individual product item. The product ID in turn typically consists of a manufacturer number 211 and a product class number 212. The best-known product ID is the EAN.UCC Universal Product Code (UPC) 221 and its variants.

Figure 19:
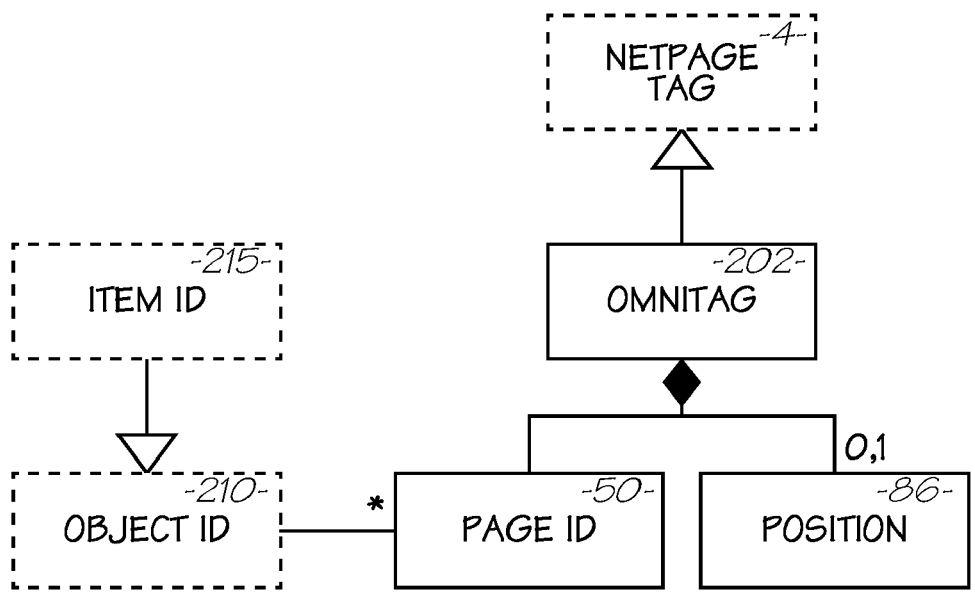
FIG. 19 is a schematic view of the structure of a Hyperlabel™ tag.

As shown in FIG. 19, a Hyperlabel™ tag 202 encodes a page ID (or region ID) 50 and a two-dimensional (2D) position 86. The region ID identifies the surface region containing the tag, and the position identifies the tag's position within the two-dimensional region. Since the surface in question is the surface of a physical product item 201, it is useful to define a one-to-one mapping between the region ID and the unique object ID 210, and more specifically the item ID 215, of the product item. Note, however, that the mapping can be many-to-one without compromising the utility of the Hyperlabel™ tag. For example, each panel of a product item's packaging could have a different region ID 50. Conversely, the Hyperlabel™ tag may directly encode the item ID, in which case the region ID contains the item ID, suitably prefixed to decouple item ID allocation from general netpage region ID allocation. Note that the region ID uniquely distinguishes the corresponding surface region from all other surface regions identified within the global netpage system. Directly encoding the item ID 215 in the region ID 50 is preferred, since it allows the item ID to be obtained directly from the Hyperlabel™ tag without additional lookup, thus facilitating more seamless integration with inventory systems and the like.

The item ID 215 is preferably the EPC 220 proposed by the Auto-ID Center, since this provides direct compatibility between Hyperlabel™ tags and EPC-carrying RFID tags.

In FIG. 19 the position 86 is shown as optional. This is to indicate that much of the utility of the Hyperlabel™ tag in the supply chain derives from the region ID 50, and the position may be omitted if not desired for a particular product.

For interoperability with the netpage system, a Hyperlabel™ tag 202 is a netpage tag 4, i.e. it has the logical structure, physical layout and semantics of a netpage tag.

In one example, when a netpage sensing device such as the netpage pen 101 images and decodes a Hyperlabel™ tag, it uses the position and orientation of the tag in its field of view to compute its own position relative to the tag, and it combines this with the position encoded in the tag, to compute its own position relative to the region containing the tag. As the sensing device is moved relative to a Hyperlabel™ tagged surface region, it is thereby able to track its own motion relative to the region and generate a set of timestamped position samples representative of its time-varying path. When the sensing device is a pen, then the path consists of a sequence of strokes, with each stroke starting when the pen makes contact with the surface, and ending when the pen breaks contact with the surface.

When a stroke is forwarded to the page server 10 responsible for the region ID, the server retrieves a description of the region keyed by region ID, and interprets the stroke in relation to the description. For example, if the description includes a hyperlink and the stroke intersects the zone of the hyperlink, then the server may interpret the stroke as a designation of the hyperlink and activate the hyperlink.

8.2.1 Item ID Management

As previously described, a structured item ID 215 typically has a three-level encoding, consisting of a manufacturer number 211, a product class number 212, and a serial number 213. In the EPC the manufacturer number corresponds to the manager ID. Manufacturer numbers are assigned to particular manufacturers 235 by a governing body such as EAN, EPCglobal (UCC). Within the scope of each manufacturer number the manufacturer 235 assigns product class numbers to particular product classes 236, and within the scope of each product class number the manufacturer assigns serial numbers to individual product items 237. Each assignor in the assignment hierarchy ensures that each component of the item ID is assigned uniquely, with the end result that an item ID uniquely identifies a single product item. Each assigned item ID component is robustly recorded to ensure unique assignment, and subsequently becomes a database key to details about the corresponding manufacturer, product or item. At the product level this information may include the product's description, dimensions, weight and price, while at the item level it may include the item's expiry date and place of manufacture.

Figure 20:
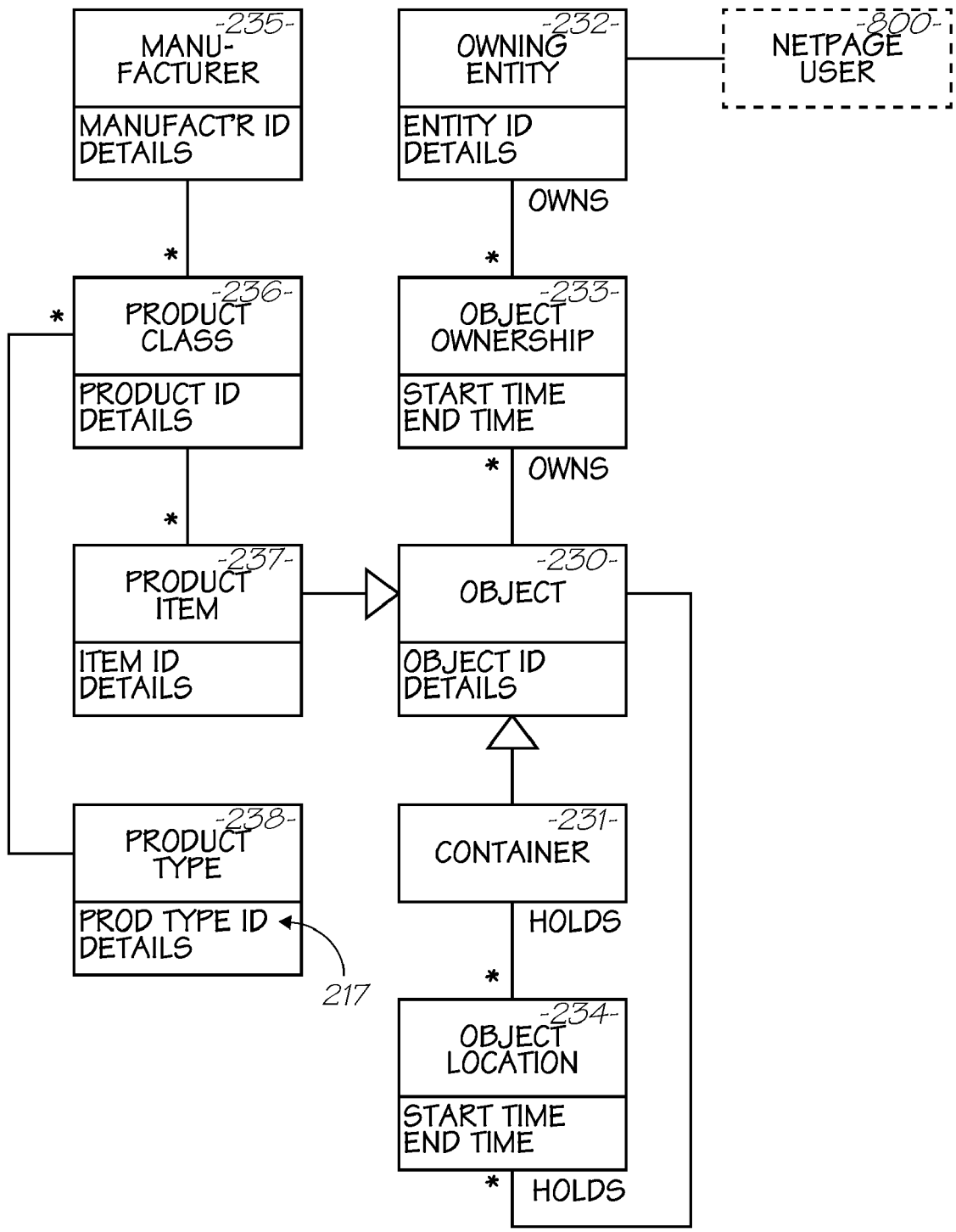
FIG. 20 is a schematic view of a product item and object ownership and packaging hierarchy class diagram.
Figure 21:
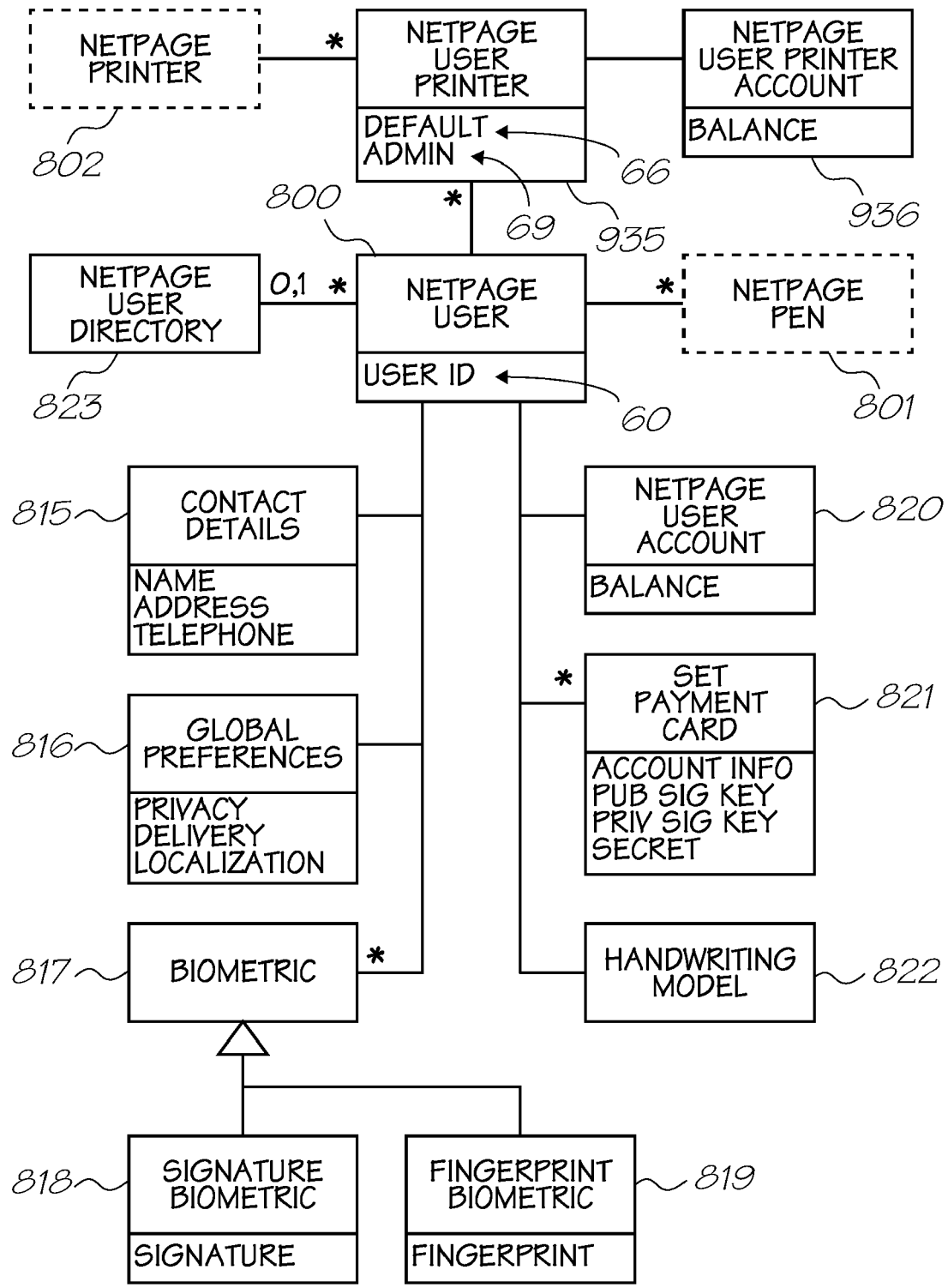
FIG. 21 is a schematic view of a user class diagram.

As shown in FIG. 20, a collection of related product classes may be recorded as a single product type 238, identified by a unique product type ID 217. This provides the basis for mapping a scanned or otherwise obtained product ID 214 (or the product ID portion of a scanned or otherwise obtained item ID 215) to a product type 238. This in turn allows a favorite application 828 for that product type to be identified for a particular netpage user 800, as shown in FIG. 24.

As a product item moves through the supply chain, status information is ideally maintained in a globally accessible database, keyed by the item ID. This information may include the item's dynamic position in the packaging, shipping and transportation hierarchy, its location on a store shelf, and ultimately the date and time of its sale and the recipient of that sale. In a packaging, shipping and transportation hierarchy, higher level units such as cases, pallets, shipping containers and trucks all have their own item IDs, and this provides the basis for recording the dynamic hierarchy in which the end product item participates. Note that the concept of an item also extends to a sub-component of an assembly or a component or element of a saleable product.

FIG. 20 shows the product description hierarchy corresponding to the structure of the item ID; the product item's dynamic participation in a dynamic packaging, shipping and transportation hierarchy; and the product item's dynamic ownership. As the figure shows, a container 231 (e.g. case, pallet, shipping container, or truck) is a special case of an uniquely identified object 230. The fact that the container is holding, or has held, a particular object for the duration of some time interval is represented by the time-stamped object location 234, wherein the end time remains unspecified until the container ceases to hold the item. The object-container relationship is recursive, allowing it to represent an arbitrary dynamic hierarchy. Clearly this representation can be expanded to record the time-varying relative or absolute geographic location of an object.

The fact that an entity 232 owns, or has owned, a particular object for the duration of some time interval is represented by the time-stamped object ownership 233, wherein the end time remains unspecified until the entity ceases to own the item. The owning entity 232 may represent a netpage user 800, e.g. when a netpage user purchases a product item and the sale is recorded, or some other supply chain participant such as a manufacturer, distributor or retailer.

Figure 56:
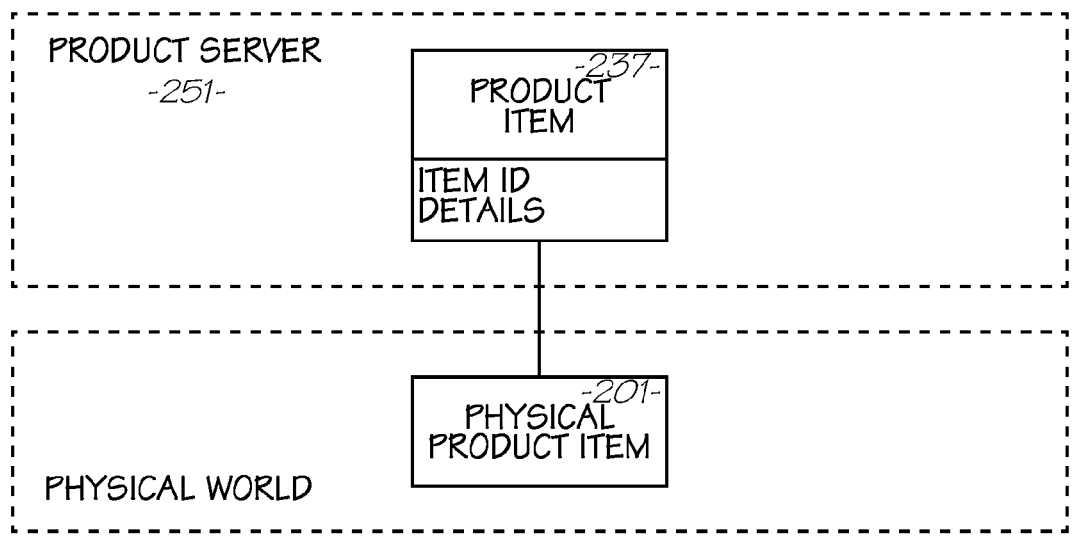
FIG. 56 is a schematic view of a physical product item and its online description.

As shown in FIG. 56, a physical product item 201 is recorded as a product item 237 by a product server 251. A product item may be recorded in multiple product servers, managed by different participants in the supply chain such as manufacturers, distributors and retailers. However, benefits accrue from providing a unified view of a product item, even if the unified view is provided virtually.

To foster interoperability between different supply chain participants and between disparate systems which may want to query and update both static and dynamic item information, such information interchanges are ideally performed using a standard representation. The MIT Auto-ID Center's Physical Markup Language (PML) is an example of a standard representation designed for this purpose. For a detailed description of PML, refer to Brock, D. L. et al., *The Physical Markup Language*, MIT Auto-ID Center (June 2001), the contents of which are herein incorporated by cross-reference.

The Auto-ID Centre has proposed a distributed architecture wherein relevant supply chain participants are notified of product movements in an event-driven manner.

In general there is a single public source of information about an item identified by an item ID, and there is a mechanism which resolves an item ID into the network address of a corresponding server. In the case of an EPC, the ONS resolver rewrites the EPC into the domain name of the product server, and then uses the Domain Name System (DNS) to resolve the domain name into the address of the product server. The DNS allows a domain name to resolve to a list of addresses, providing a basis for both load balancing and fault tolerance. DNS lookups are made efficient by caching of results.

8.2.2 EPC-Driven Supply Chain Example

In a supply chain driven by EPC scan data, legacy database systems will typically be enhanced to support the description and tracking of EPC-tagged containers and product items. Some scan events result in message flow between systems, while other scan events result in purely local database updates.

The EPC administrator (EPCglobal) allocates an EPC manager number to the manufacturer for the exclusive use of a manufacturer. The manufacturer in turn allocates an object class number to each of its products. When the manufacturer produces a batch of a particular product, it allocates each product item a unique serial number within the corresponding object class, and encodes the entire EPC in the Hyperlabel™ tags printed on the product item's label or packaging. As the manufacturer aggregates individual product items into cases and higher-level containers, its manufacturing and shipping systems record the container hierarchy. This allows the contents of a container to be tracked by simply tracking the container.

When a retailer receives a case, it is scanned into inventory at the receiving dock. The scan event triggers the retailer's inventory system to retrieve a description of the case content from the manufacturer. The inventory system uses the case EPC to first identify, via the ONS, the server responsible for serving information about that EPC. It then contacts that server to identify the contents of the case, and iterates the entire process for the case content, down to the item level. In order to satisfy the inventory system's queries, the manufacturer's server extracts information from the manufacturer's private databases and translates this information into standard PML.

When an item is sold, the point-of-sale EPC scan event triggers the inventory system to record the item as sold, and may also trigger the system to notify the item's manufacturer of the circumstances of the sale. This can provide the manufacturer with timely information about the effect of a promotional campaign, particularly when the campaign is lot-specific and involves campaign-specific product graphics. Again the EPC lookup uses the ONS, but this time the inventory system transmits the sale event information to the manufacturer's server as PML.

The EPC-driven architecture of the integrated supply chain is independent of whether EPC scan data originates from Hyperlabel™ scanners, RFID readers, or a mixture of both.

8.2.3 Region Id Management

An unstructured identifier such as the region ID (page ID) may be assigned on demand through a multi-level assignment hierarchy with a single root node. Lower-level assignors obtain blocks of IDs from higher-level assignors on demand. Unlike with structured ID assignment, these blocks correspond to arbitrary ranges (or even sets) of IDs, rather than to IDs with fixed prefixes. Again, each assignor in the assignment hierarchy ensures that blocks of IDs and individual IDs are assigned uniquely. The region ID subsequently becomes a database key to information about the region. In the netpage system, this information includes a full description of the graphical and interactive elements which appear in the region. Graphical elements include such things as text flows, text and images. Interactive elements include such things as buttons, hyperlinks, checkboxes, drawing fields, text fields and signature fields.

8.2.4 Product Interface Document Management

In the netpage system, the graphic and interactive elements of a netpage are described by a document 836, as illustrated in FIG. 25. A product manufacturer therefore defines the graphic and interactive elements of a Hyperlabel™ tagged product item by publishing a corresponding interface document to the netpage system in much the usual way (i.e. as described earlier). The manufacturing application (i.e. publisher) first obtains a document ID 51 for the interface document from an ID server 12. It then sends the document structure, including its document ID and page descriptions, to the page server 10 responsible for the document's newly allocated ID.

Even if the graphic elements of a product label are printed by traditional non-digital means (e.g. offset or flexographic), it is still beneficial to include the graphic elements in the netpage document 836, since this facilitates logical operations on otherwise passive label content, such as copy and paste, and searching on a combination of label content and annotations.

As described earlier, the preferred form of the region ID 50 of a Hyperlabel™ tag 202 contains the corresponding item ID 215. When the manufacturer allocates an item ID to a product item at time of manufacture, the item ID is registered as a page ID with the page server responsible for the corresponding document 836. The page server records the page ID as part of a page instance 830. The item ID is also registered as a page ID with a netpage ID server to facilitate subsequent lookup of the corresponding page server.

The document 836 typically describes the label or packaging of a class 236 of product items. Publication of the document, down to the level of the formatted document 834, may therefore be decoupled from the printing of individual product item labels. However, since the item ID 215 is structured, the ID server and page server may also record a partial page ID based on an item ID 215 with a unspecified serial number 213 (i.e. a product ID 214). When a netpage user interacts with an individual product item, the relay function identifies the corresponding page server via the ID server based purely on the product item's product ID. If no page instance 830 exists which corresponds to the full item ID (i.e. page ID) then the page server creates a page instance against which to record the interaction.

To address the situation where the label or packaging of a product class 236 changes over time, the ID server may record a range of item IDs against a document ID (e.g. in the form of a product ID and a range of serial numbers). The manufacturer may leave the end of the range unspecified until a label or packaging change actually occurs.

An individual item ID is already recorded by the product server 237 which manages the product item. Therefore, as an alternative to using the netpage ID server to record and support the lookup of the netpage page server associated with an item ID, the page server can instead be registered with the product server in much the same way.

Figure 98:
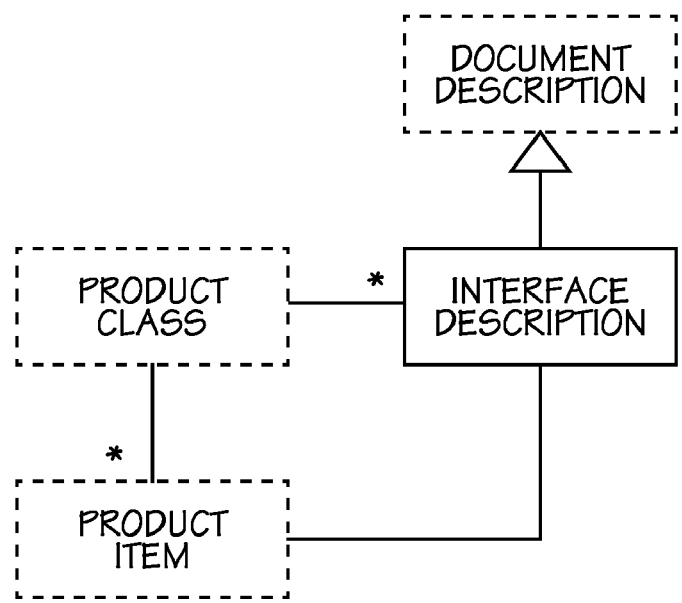
FIG. 98 is a schematic diagram of an interface description class used for recording relationships between ranges of item IDs and particular interface descriptions.

Rather than publish an interface document to a netpage page server, the product server may instead allow the page server to retrieve the interface document from the product server on demand. The product server is then responsible for recording relationships between ranges of item IDs and particular interface descriptions, as shown in FIG. 98. As described earlier, the page server may use a standard name service lookup mechanism to resolve an item ID into a network address of a corresponding product server.

Figure 99:
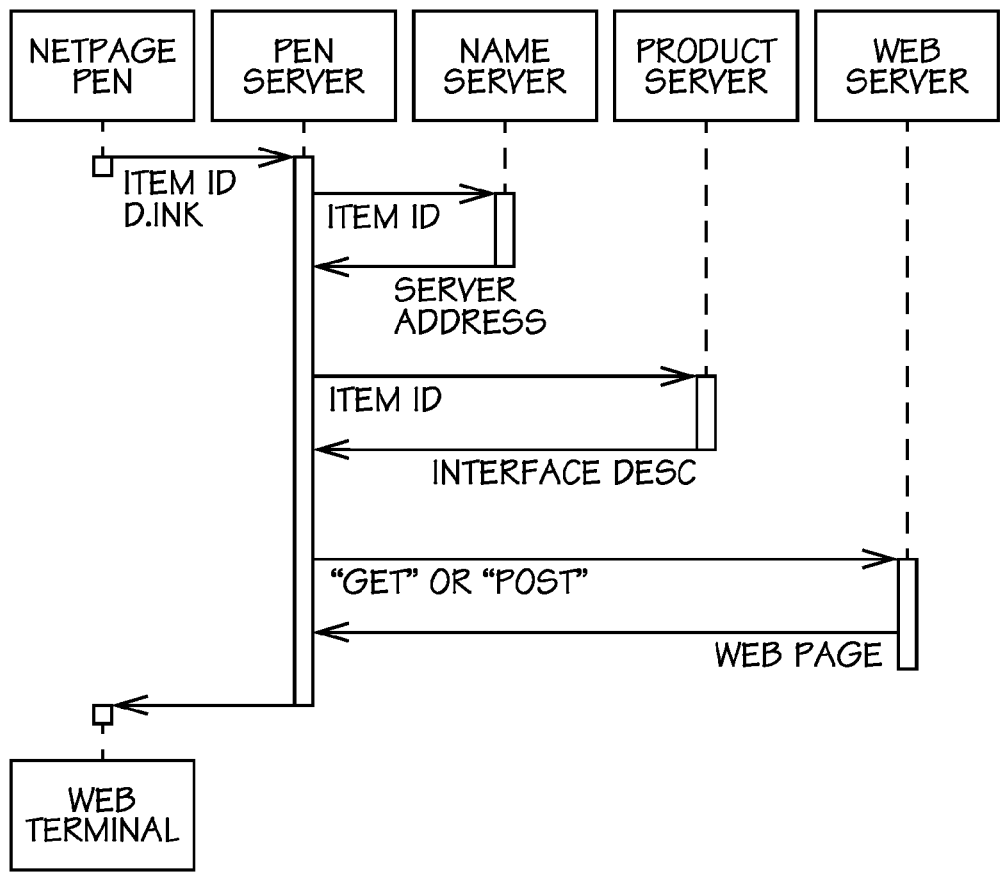
FIG. 99 is a schematic diagram of an example of interaction between a netpage pen and a Web server.
Figure 100:
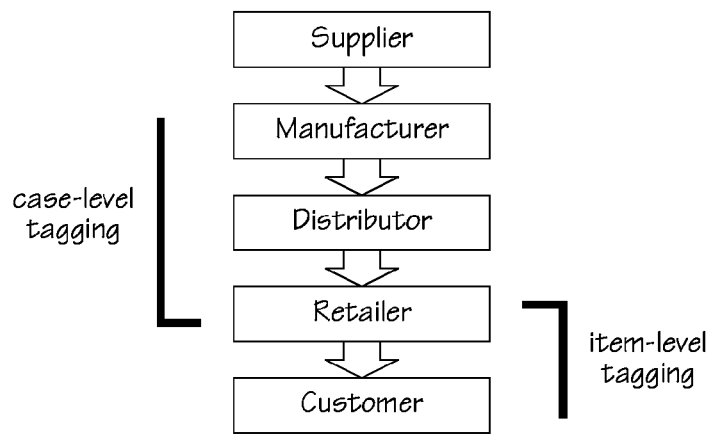
FIG. 100 is a block diagram of tagging levels in the supply chain.

FIG. 99 shows a typical interaction between a netpage pen 101 and a Web server in this scenario. The pen 101 captures an item ID and digital ink via a product surface. It forwards this to the netpage pen server associated with the pen. The pen server uses the item ID to look up the address of the item ID's product server via a name server (or hierarchy of name servers). The pen server then retrieves the product's interface description from the identified product server, and uses the interface description to interpret the user's digital ink input in the usual way. This may ultimately result in the submission of a form to, and/or the retrieval of a Web page from a Web server identified by a URI associated with a form or hyperlink in the interface description. Again this involves the resolution of a server address for the Web server using a name server, which is not shown in the figure. The pen server may then display the Web page on a Web terminal associated with the netpage pen. For example, the relay device (e.g. PC, mobile phone or PDA) through which the pen is communicating with the pen server may act as a Web terminal by running a Web browser. The user may continue to interact with the Web page directly through the Web browser.

Note that in this scenario the page server has been replaced by a pen server. Where the page server provides persistent storage of digital ink associated with particular pages, the pen server provides persistent storage of digital ink associated with particular users' pens. In both cases the persistence is provided at least until the form to which the digital ink applies is submitted. Note that the pen server may be a shared network server which serves many users, or may be a private server which executes on the pen user's relay device (e.g. PC, mobile telephone or PDA). In the limit case it may execute in the pen itself.

In the example described above, when the pen server uses the item ID to look up the address of the item ID's product server, this can be achieved by resolving the item ID to a product server address on the basis of any or all of the manufacturer number 211, the product class number 212, and the serial number 213.

It will also be appreciated that the Web server scenario described above is only one example of the general interaction between a pen, a pen server, a name server, a product server and an application, which in this case is a Web server.

It will also be appreciated that the interaction between a pen and application shown in FIG. 42, between the pen 101 (via the printer or other relay shown in the figure), a page server 10a, and an application 71, if the manufacturer lodges interface descriptions with a page server, rather than providing interface descriptions directly on demand to a pen server.

8.3 Hyperlabel™ Tag Printing

A Hyperlabel™ printer is a digital printer which prints Hyperlabel™ tags onto the label, packaging or actual surface of a product before, during or after product manufacture and/or assembly. It is a special case of a netpage printer 601. It is capable of printing a continuous pattern of Hyperlabel™ tags onto a surface, typically using a near-infrared-absorptive ink. In high-speed environments, the printer includes hardware which accelerates tag rendering. This typically includes real-time Reed-Solomon encoding of variable tag data such as tag position, and real-time template-based rendering of the actual tag pattern at the dot resolution of the printhead.

The printer may be an add-on infrared printer which prints the Hyperlabel™ tags after text and graphics have been printed by other means, or an integrated color and infrared printer which prints the Hyperlabel™ tags, text and graphics simultaneously. Digitally-printed text and graphics may include everything on the label or packaging, or may consist only of the variable portions, with other portions still printed by other means. Thus a Hyperlabel™ tag printer with an infrared and black printing capability can displace an existing digital printer used for variable data printing, such as a conventional thermal transfer or inkjet printer.

For the purposes of the following discussion, any reference to printing onto an item label is intended to include printing onto the item packaging in general, or directly onto the item surface. Furthermore, any reference to an item ID 215 is intended to include a region ID 50 (or collection of per-panel region IDs), or a component thereof.

The printer is typically controlled by a host computer, which supplies the printer with fixed and/or variable text and graphics as well as item IDs for inclusion in the Hyperlabel™ tags. The host may provide real-time control over the printer, whereby it provides the printer with data in real time as printing proceeds. As an optimisation, the host may provide the printer with fixed data before printing begins, and only provide variable data in real time. The printer may also be capable of generating per-item variable data based on parameters provided by the host. For example, the host may provide the printer with a base item ID prior to printing, and the printer may simply increment the base item ID to generate successive item IDs. Alternatively, memory in the ink cartridge or other storage medium inserted into the printer may provide a source of unique item IDs, in which case the printer reports the assignment of items IDs to the host computer for recording by the host.

Alternatively still, the printer may be capable of reading a pre-existing item ID from the label onto which the Hyperlabel™ tags are being printed, assuming the unique ID has been applied in some form to the label during a previous manufacturing step. For example, the item ID may already be present in the form of a visible 2D bar code, or encoded in an RFID tag. In the former case the printer can include an optical bar code scanner, examples of which are described in U.S. Pat. Nos. 5,340,973, or 5,126,544. In the latter case it can include an RFID reader, such as the reader described in U.S. Pat. No. 5,280,159, or such as a Commander 320 13.56 MHz RFID reader, manufactured by Texas Instruments of Dallas, Tex.

The printer may also be capable of rendering the item ID in other forms. For example, it may be capable of printing the item ID in the form of a 2D bar code, or of printing the product ID component of the item ID in the form of a 1D bar code, or of writing the item ID to a writable or write-once RFID tag, for example by using the Commander 320 13.56 MHz RFID reader, manufactured by Texas Instruments of Dallas, Tex., as described above.

Figure 110:
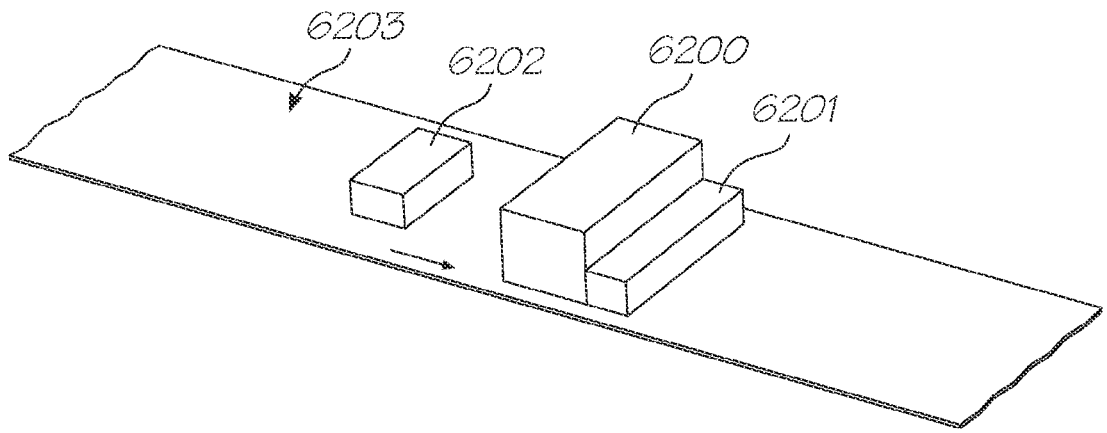
FIG. 110 is a schematic perspective view of a printing system for printing coded data on product items.

An example of this is shown in FIG. 110. In this example, a tag or label printer 6200 is shown with an add-on Hyperlabel™ tag printer shown at 6201. In use, an object 6202 to be printed, such as a product item, packaging, or the like, is transferred through a printing region on a conveyor 6203. In use, the printer 6200 will operate in the normal way to provide visible markings on the packaging, labelling or the like. The visible markings may correspond to product information, the name of the product, or the like, as well as identifiers such as bar codes.

The printer 6201 either before or after the visible markings are provided, operates to print coded data as described above. The coded data tags may be printed over an entire label or packaging, in which case the article is typically provided as a flat pack box or alternatively may be printed on one or more faces depending on the respective implementation.

In any event, in use the Hyperlabel™ tag printer 6201 generates the coded data such that it is indicative of a unique product item identifier such as an EPC. This can be achieved in a number of ways depending the respective implementation as shown for example in FIGS. 111, 112, 113.

Figure 111:
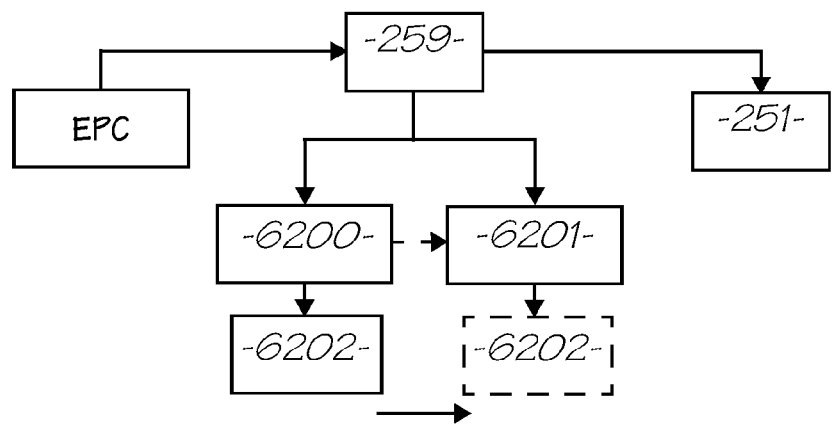
FIGS. 111 to 113 are examples of procedures for printing coded data on product items; and, FIG. 114 is schematic representation of an example of a scanning system for sensing bar codes and coded data.

In particular, in a first example shown in FIG. 111, the EPC is generated by an authority such as EPC Global (as described in 8.2.1). The EPC is provided to the manufacturing server 259, typically as part of a batch, and then allocated to the printer 6200 and the printer 6201 as required. Thus, for example, the printer 6200 can generate a 2D bar code representative of the EPC, which is printed in visible ink, with the Hyperlabel™ tag printer 6201 printing coded data which encodes the EPC. The bar code would typically be generated in accordance with a standard symbology, as described above.

At some time during this process, the link between the EPC and its corresponding interface surface may be recorded at a product server 251 as shown.

Figure 112:
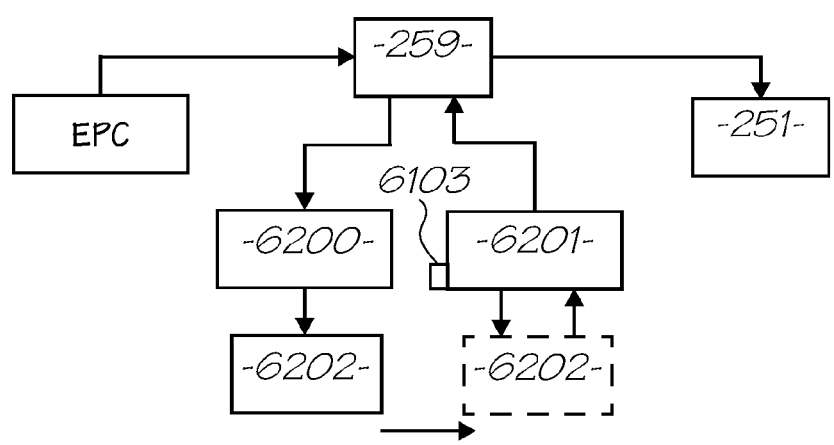
Figure 113:
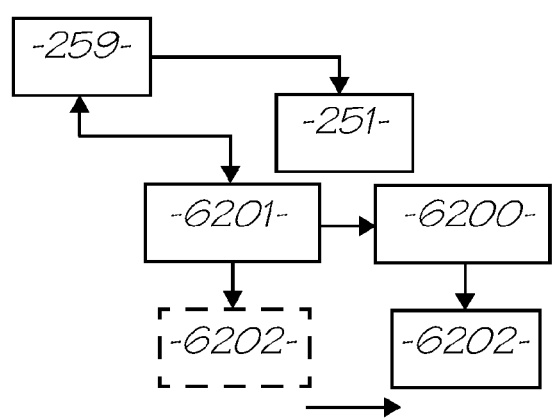
Figure 114:
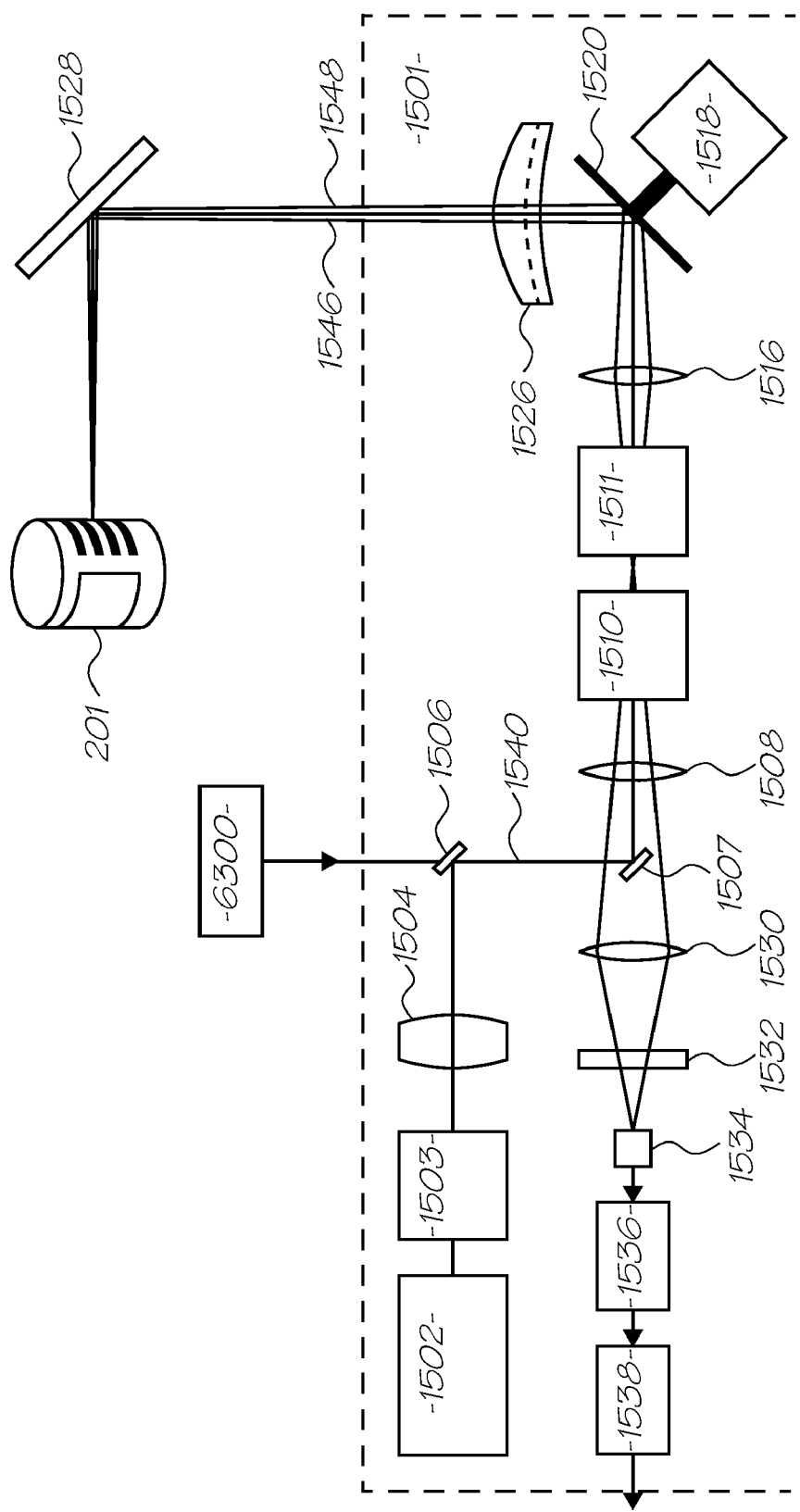

In a second example as shown in FIG. 112, the EPC is only transferred to the printer 6200, which prints the 2D bar code on the product item 6202. In this case, the netpage printer 6201 also includes a bar code reader 6203 which operates to read the two-dimensional 2D bar code and determine the EPC therefrom. The EPC is then used to generate the coded data which is applied to the product item 6202, in the normal way. (Again an indication of the page interface description is provided to the product server 251.) It should also be noted that the netpage printer 6201 and the product item 6202 may be separated in space and time.

As a further alternative, the netpage printer 6201 can be adapted to generate an EPC based for example on a predetermined manufacturer number, assigned to the manufacturer, a product class number, and a serial number. In this case, having printed the Hyperlabel™ tags, an indication of the EPC is also transferred to the printer 6200 which prints a 2D bar code on the box.

It will be appreciated that equivalent functionality can be provided in conjunction with an RFID tag instead of a 2D bar code. Thus for example, an RFID tag writing device, such as the Commander 320 13.56 MHz RFID reader/writer, manufactured by Texas Instruments of Dallas, Tex., may be used to encode the EPC in an RFID tag which is then subsequently read by the printing device to determine the EPC.

As a further alternative, it is possible to provide a printing device in the form of a printer 6201 which is also enabled to encode one or more of RFID tags and 2D bar codes. It will be appreciated that in the case of encoding 2D bar codes, the printer 6201 will also be adapted to print visible markings as well as infrared markings and in particular 2D bar codes. Similarly, the device may alternatively or additionally be provided with a RFID tag writing device for encoding RF-ID tags.

8.4 Hyperlabel™ Scanning

Item information typically flows to the product server in response to situated scan events, e.g. when an item is scanned into inventory on delivery; when the item is placed on a retail shelf; and when the item is scanned at point of sale. Both fixed and hand-held scanners may be used to sca Hyperlabel™ tagged product items, using both laser-based 2D scanning and 2D image-sensor-based scanning, using similar or the same techniques as employed in the netpage pen.

Figure 57:
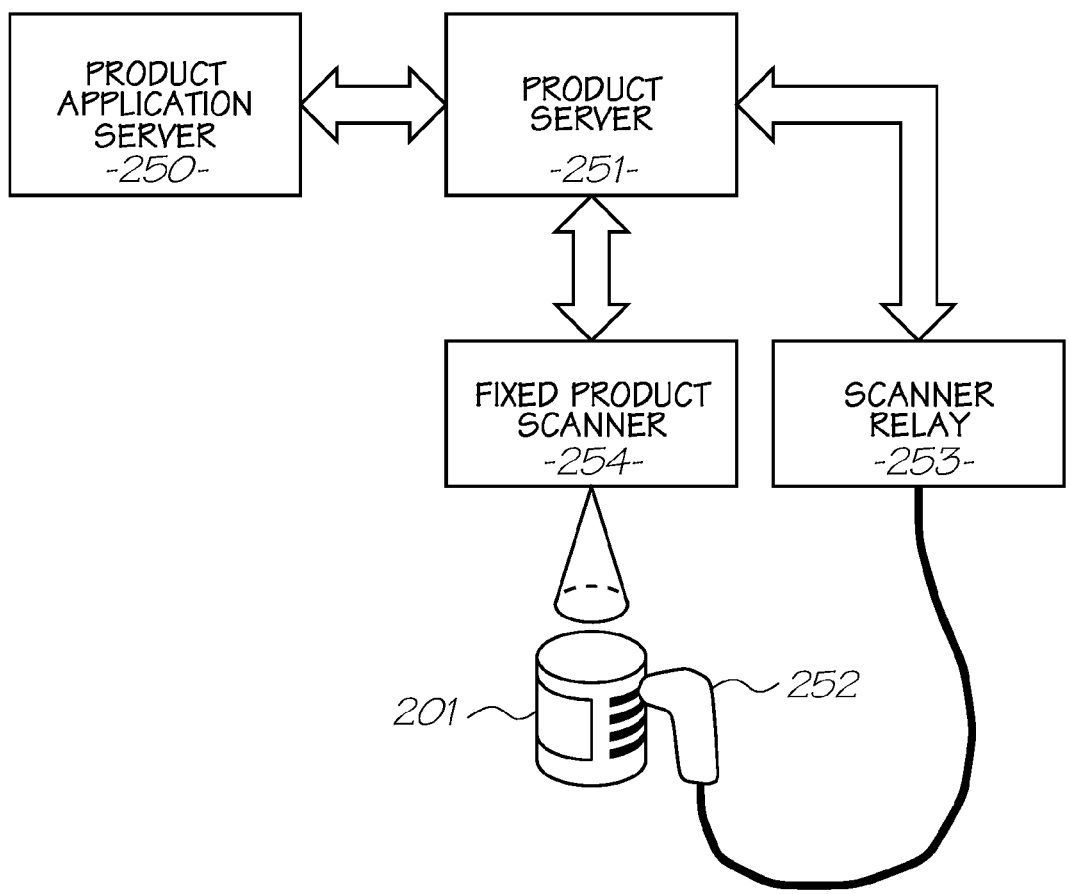
FIG. 57 is a schematic view of the interaction between a product item, a fixed product scanner, a hand-held product scanner, a scanner relay, a product server, and a product application server.
Figure 58:
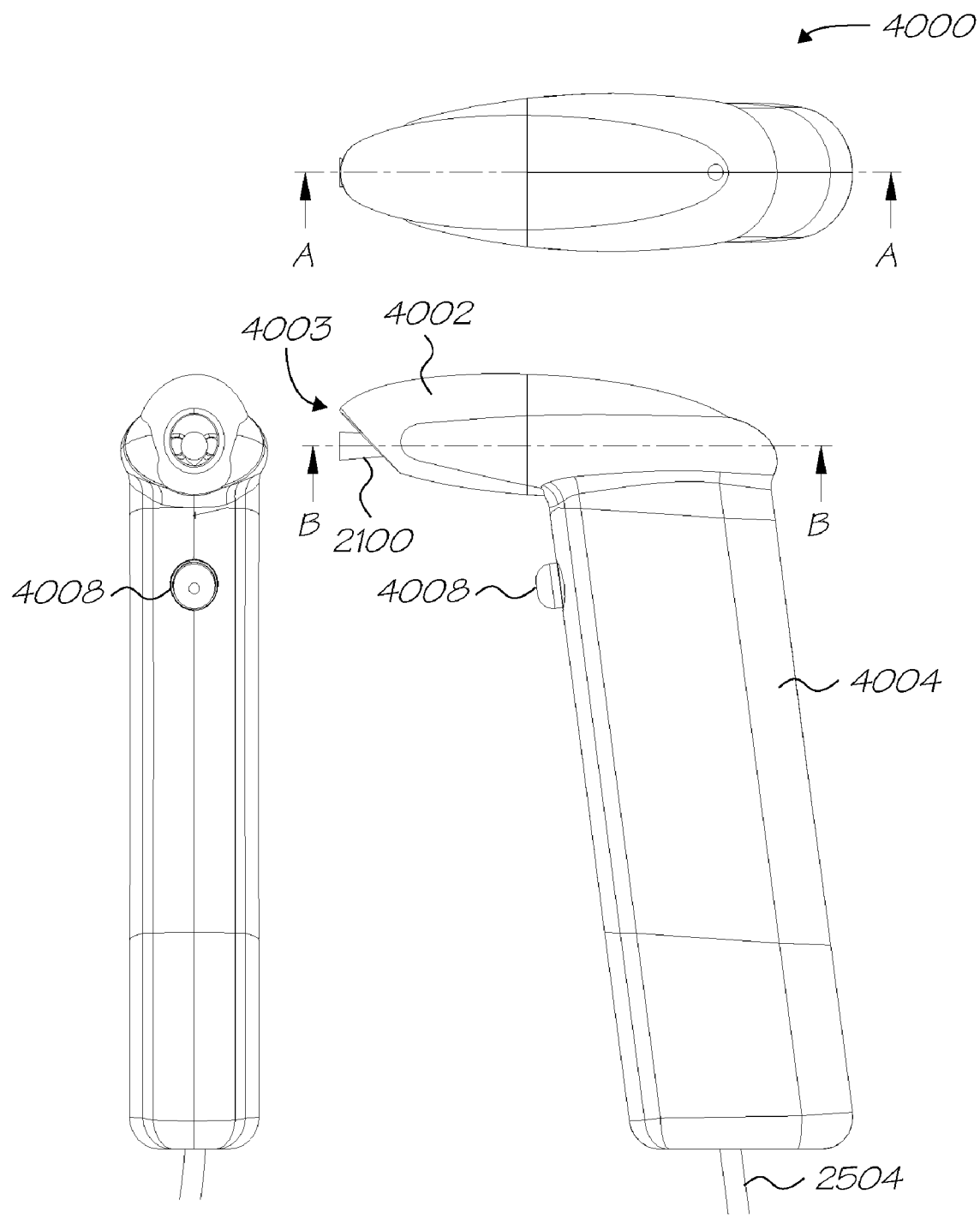
FIG. 58 shows a plan and elevation view of a hand-held Hyperlabel™ scanner 4000 according to a preferred embodiment of the present invention.

As shown in FIG. 57, both a fixed scanner 254 and a hand-held scanner 252 can communicate scan data to the product server 251. The product server may in turn communicate product item event data to a peer product server (not shown), or to a product application server 250, which may implement sharing of data with related product servers. For example, stock movements within a retail store may be recorded locally on the retail store's product server, but the manufacturer's product server may be notified once a product item is sold.

8.4.1 Hand Based Scanners

A number of designs of a hand based scanners Hyperlabel™ scanner 252 will now be described Hyperlabel™ scanner.

8.4.1.1 Hand-Held Hyperlabel™ Optical Reader

FIG. 58, FIG. 59, FIG. 60 and FIG. 61 show a first embodiment of a Hyperlabel™ scanner 4000. The scanner is designed to image and decode Hyperlabel™ tags when its tip 4003 is brought into close proximity or contact with a Hyperlabel™ tagged surface. The scanner can be operated in free mode, in which it continuously and automatically scans tags within its field of view; or in triggered mode, in which it only scans tags when its trigger 4008 is held depressed. Although the scanner is designed with a limited depth of field, thus reducing the likelihood of unintentional scans in free mode, triggered mode can be used to avoid unintentional scans. The trigger may also be configured to be manually operated (as shown), or configured to be automatically activated when the scanner makes contact with the surface. Because an individual product item is tagged with a unique item ID, there is no possibility of duplicate scans.

During normal operation the scanner returns the item ID encoded in a Hyperlabel™ tag, but ignores the position 86. The scanner distinguishes between Hyperlabel™ tags, which encode item IDs, and general netpage tags, which do not.

The scanner is a general-purpose Hyperlabel™ scanner suitable for shelf-stock scanning, point-of-sale scanning, and returns processing. Although not shown in the figures, the Hyperlabel™ scanner may usefully incorporate a conventional laser-based bar code scanner for backwards compatibility with linear bar codes. Alternatively or additionally, the scanner may be programmed to support scanning of extant linear and/or two-dimensional symbologies via its two-dimensional image sensor.

The scanner as shown is designed for tethered operation, wherein it obtains DC power from an external supply via a cable 2504, and transmits decoded scan data to an external processor via the same cable 2504. The scanner may be connected to a relay 253 which simply relays the scan data to a point-of-sale system or other processing system via wired or wireless communications, or the scanner may be directly connected to the processing system.

Alternative versions of the scanner incorporate a replaceable or rechargeable battery to allow untethered operation; a wireless communication capability such as IrDA, Bluetooth, IEEE 802.15 (e.g. ZigBee) or IEEE 802.11 to allow untethered data transmission; and/or external contacts designed to mate with a tethered pod to allow in-pod battery charging and/or data transmission.

During a single period of proximity or contact with a tagged surface, the scanner may successfully perform tens or even hundreds of scans. Although even a single scan may be performed reliably based on built-in error correction in the Hyperlabel™ tag, multiple scans can be used to further ensure reliability.

The scanner can indicate a correct (and possibly unique) scan by flashing its status LED 2426 and/or by producing an audible "beep". The beep may be generated by the control unit to which the scanner is attached or by the scanner itself. It is useful if the status LED is flashed on a successful scan but the beep is only produced on a unique scan (as identified by the control unit).

As shown in FIG. 58 through FIG. 62, the scanner consists of a nose molding 4002 and two grip moldings 4004 and 4006. The grip moldings mate together to hold the nose molding in place and to form the grip. Although shown with screw fasteners, the grip moldings may alternatively incorporate snap fasteners. The nose molding incorporates an aperture, directly below the tip 4003, to accommodate the imaging field-of-view cone 2100 and illumination field cones 2102. Further apertures in the grip accommodate the status LED window 4010, the trigger 4008, and the cable 2504.

Figure 59:
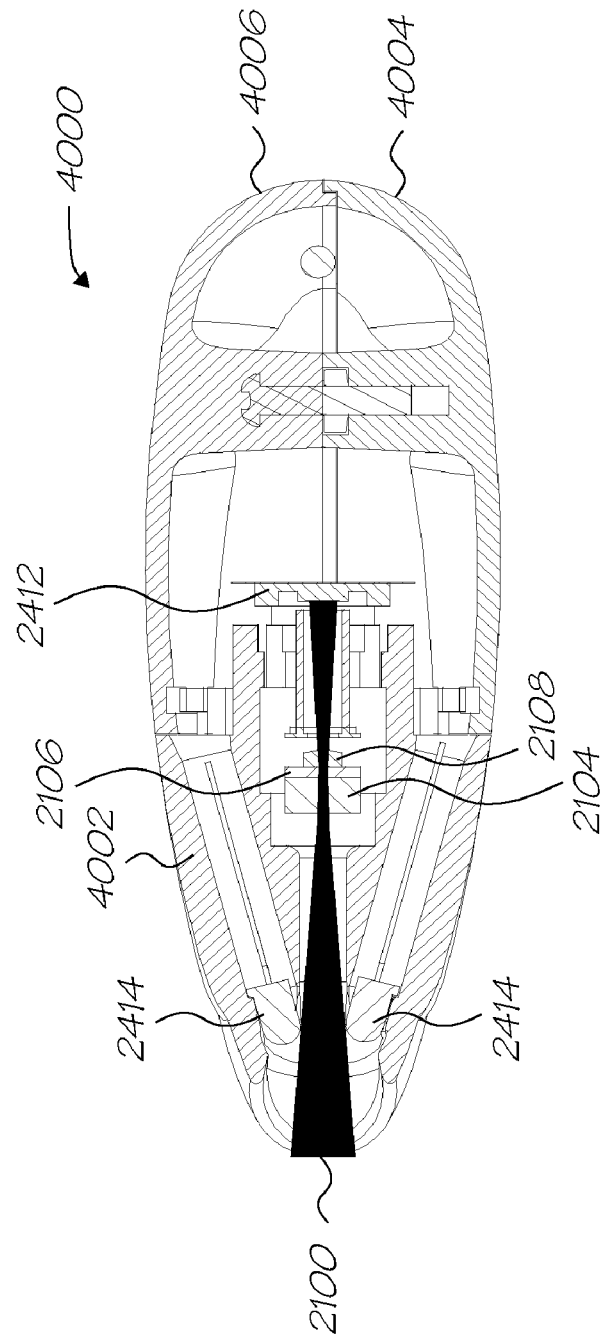
FIG. 59 shows a cross-sectional view A of the scanner of FIG. 58.
Figure 60:
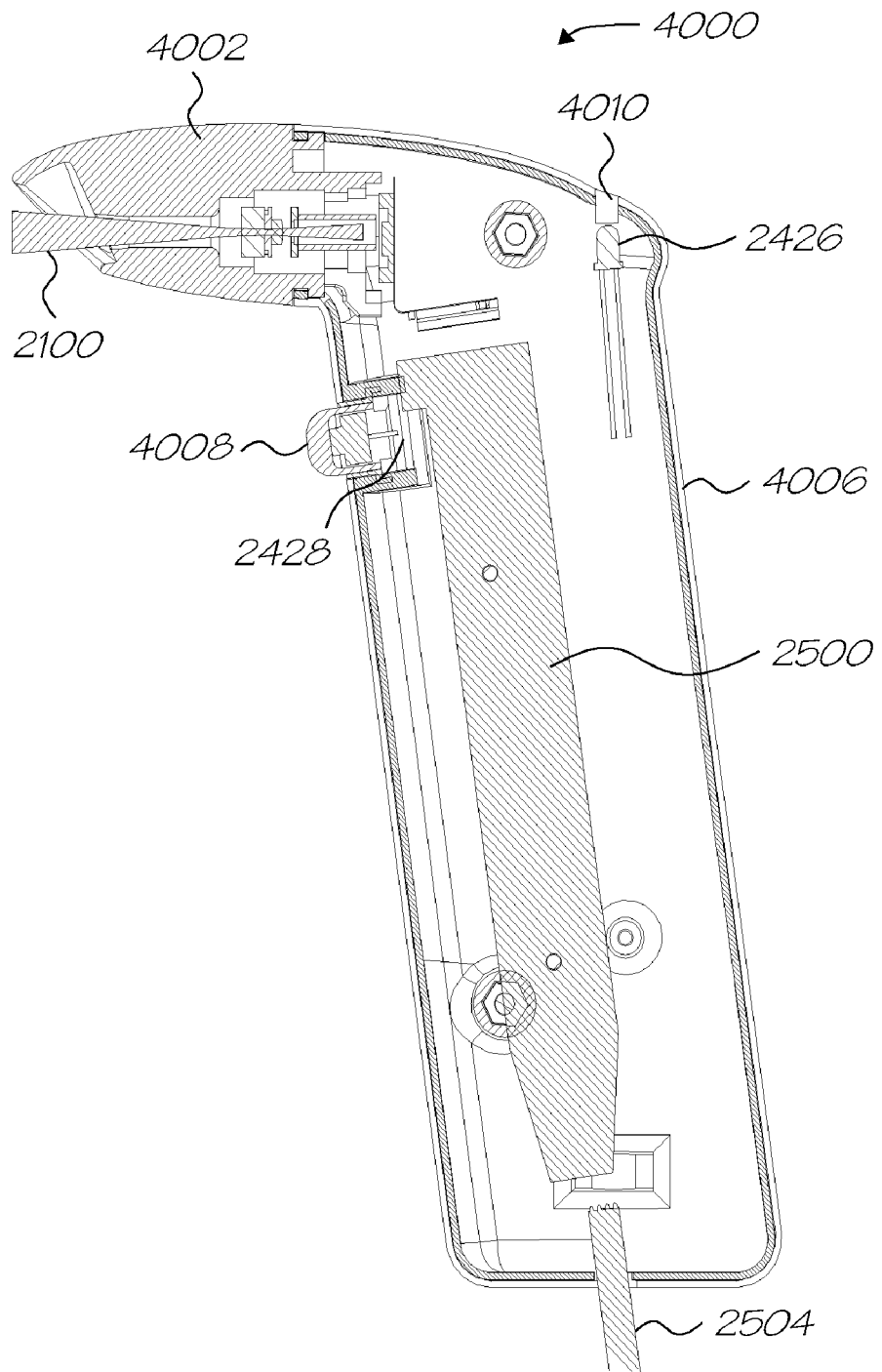
FIG. 60 shows a cross-sectional view B of the scanner of FIG. 58.
Figure 61:
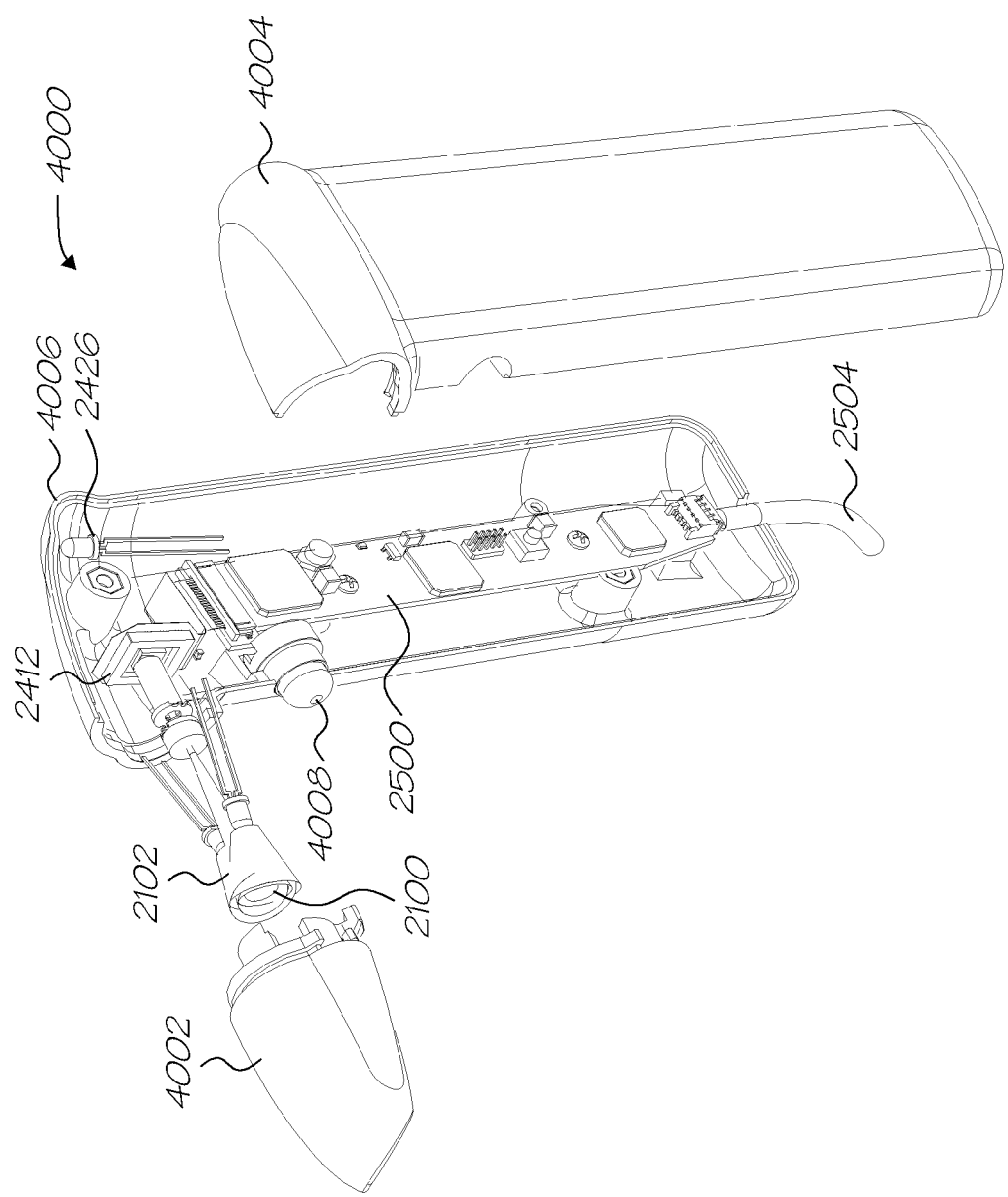
FIG. 61 shows an exploded view of the hand-held scanner.
Figure 62:
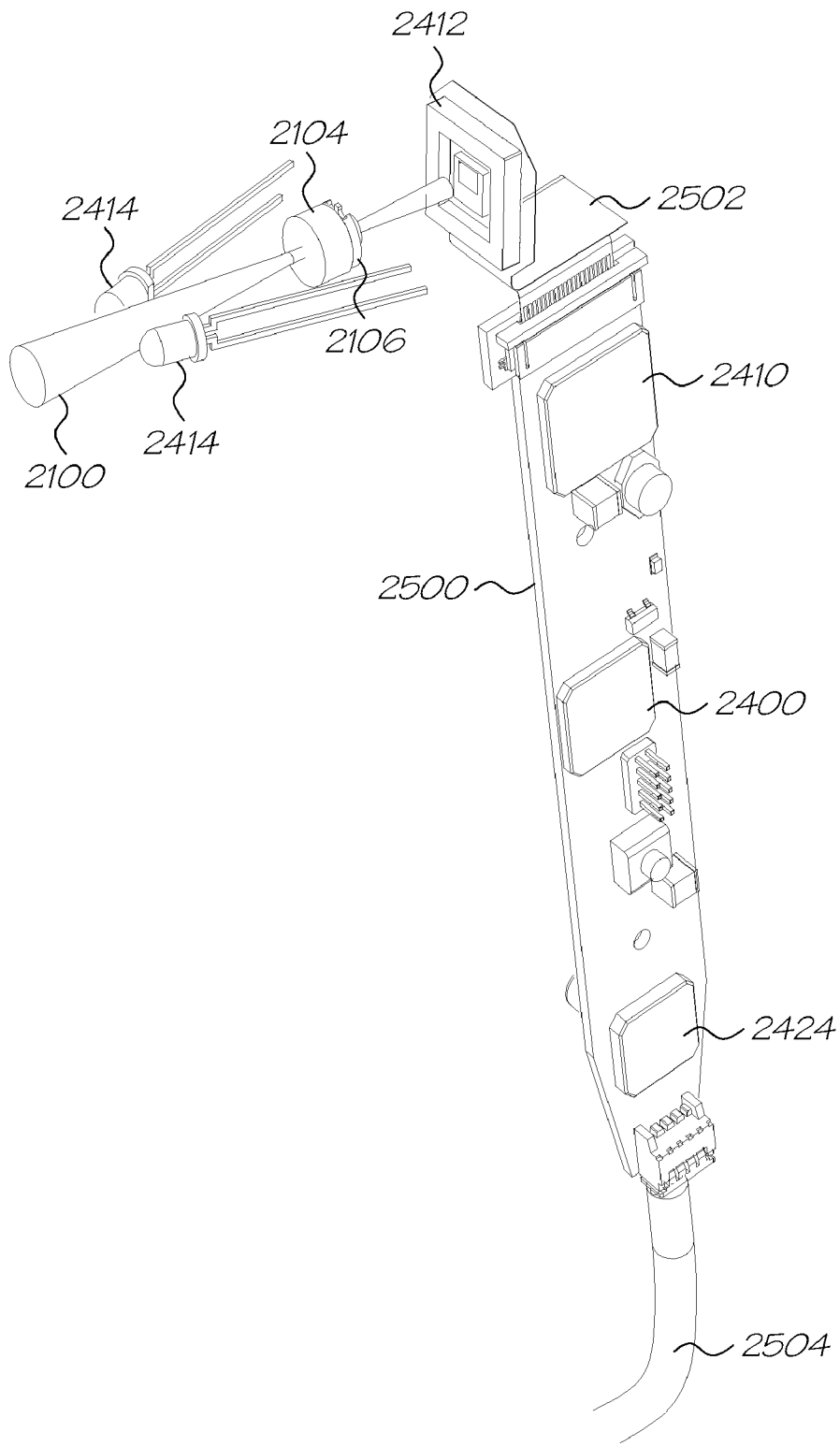
FIG. 62 shows a view of the optical and electronic sub-assemblies of the hand-held scanner.

As shown in FIGS. 59 and 62, the two near-infrared illumination LEDs 2414 are disposed symmetrically about the imaging field-of-view cone 2100 to provide a uniform illumination field across a range of tilt angles.

The optical assembly consists of a near-infrared filter 2104, an aperture disc 2106 incorporating a pin-hole aperture of between 0.5 mm and 1 mm in diameter, a focussing lens 2108, and a CMOS image sensor 2412. To ensure accurate Hyperlabel™ tag acquisition across a range of tilt angles and relative scanner-to-Hyperlabel™ tag registrations, the image sensor has a pixel array size of at least 128 by 128. The small aperture and the large ratio of viewing distance to nominal field-of-view diameter (i.e. in excess of 5:1) yields adequate depth-of-field for reliable operation across a tilt range (i.e. combination of pitch and roll) of plus 45 degrees to minus 45 degrees, as well as contact-less tag acquisition. The optical magnification is dictated by the image sensor's pixel size and the required sampling rate of between 2:1 and 3:1 with respect to the worst-case (i.e. tilt-induced) pitch of the macrodots in the tag. The focussing lens is chosen to provide the required magnification while minimising overall space requirements. The near-infrared filter 2104 may be of longpass type or narrow bandpass type, depending on the required performance of the scanner with respect to ambient light levels, and the characteristics of the ink used to print the tags. If the scanner is required to perform in direct sunlight, then a narrow bandpass filter is preferred. If the ink is narrowband, then a matching narrowband filter is also preferred.

Figure 63:
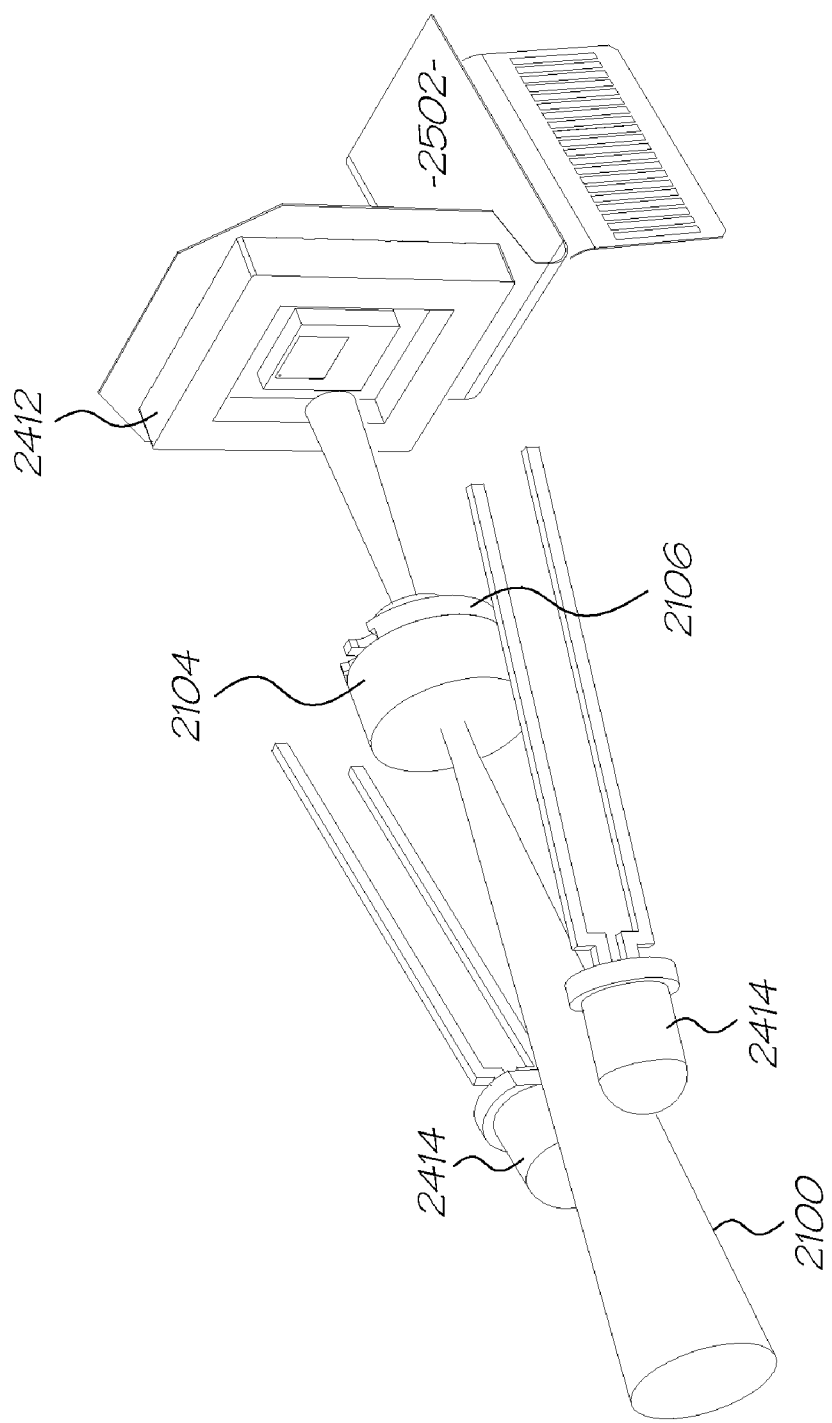
FIG. 63 shows a close-up view of the optical sub-assembly.
Figure 64:
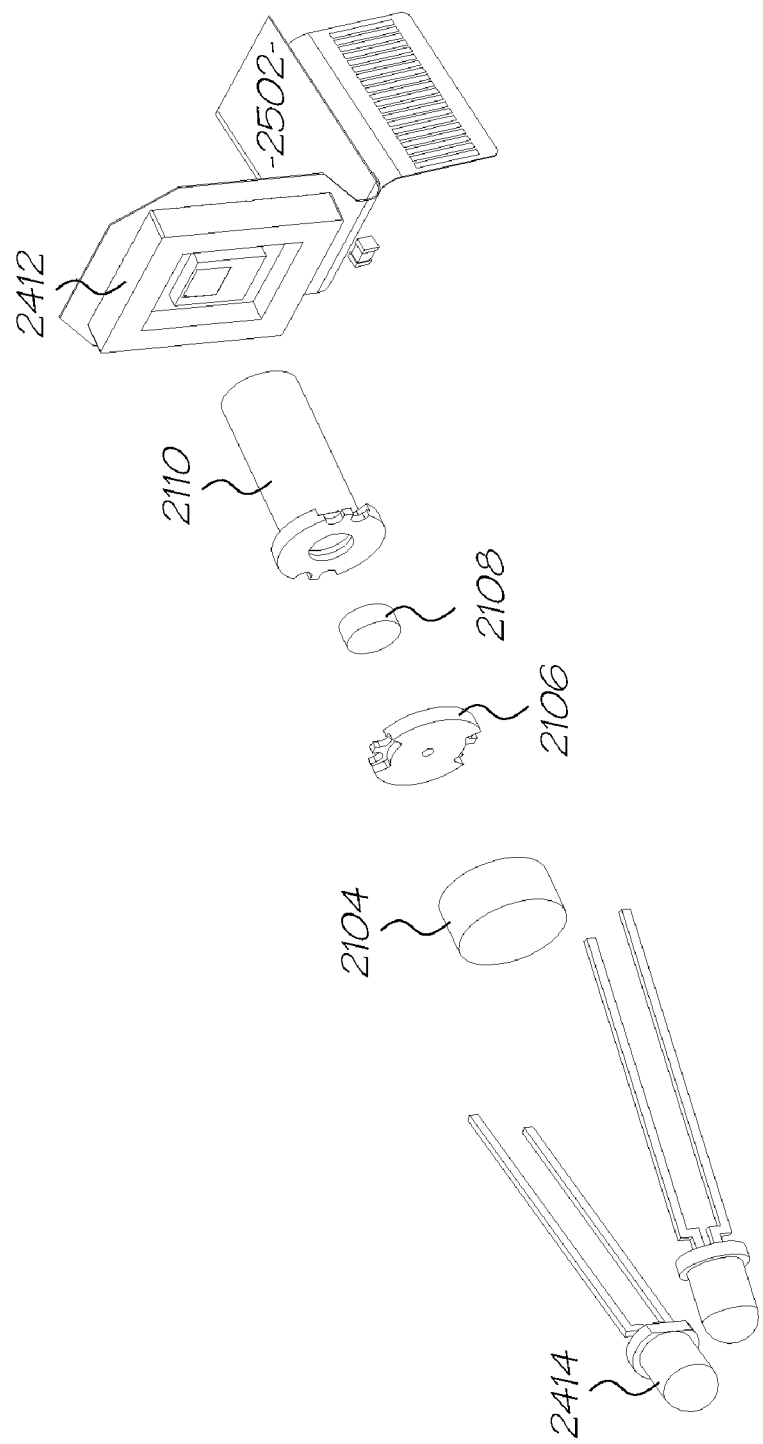
FIG. 64 shows an exploded view of the optical sub-assembly.

FIG. 63 and FIG. 64 show close-up and exploded views of the optics respectively.

The image sensor is usefully of freeze-frame type rather than rolling-shutter type to avoid skew between successive scan lines. Suitable freeze-frame image sensors are available commercially from Micron, Texas Instruments and National Semiconductor.

FIG. 62 shows the image sensor 2412 attached via a flexible PCB 2502 to the main PCB 2500. The main PCB as shown holds an image processor 2410, controller 2400 and communications interface 2424. FIG. 12 a corresponding block diagram of the electronics.

The image processor 2410 is closely coupled with the image sensor 2412. As described in the co-pending application, the image sensor and image processor are designed to implemented together in the same chip, to minimise requirements for high-speed external interfacing. The image processor supports rapid readout of images from the image sensor into the image processor's internal memory, followed by relatively slower readout from the image processor's internal memory to the external controller. The image processor also provides low-level image processing functions to assist the controller with image processing and further reduce the data rate to the controller. The image processor also controls the timing of the image sensor and the synchronisation of image acquisition with the strobing of the illumination LEDs 2414.

In a typical configuration, image acquisition occurs at a rate of between 50 and 150 frames per second. The exposure time of the image sensor may be as low as 200 microseconds to allow accurate scanning even during significant relative motion between the scanner and the tagged surface.

The image readout time of the image sensor is typically a couple of milliseconds, which is only a fifth of the frame period at 100 frames per second. Thus the controller has ample time to process the acquired image in the image processor's internal memory. The image processor's memory may be double-buffered to allow the controller to utilise the full frame period for image processing.

Figure 69:
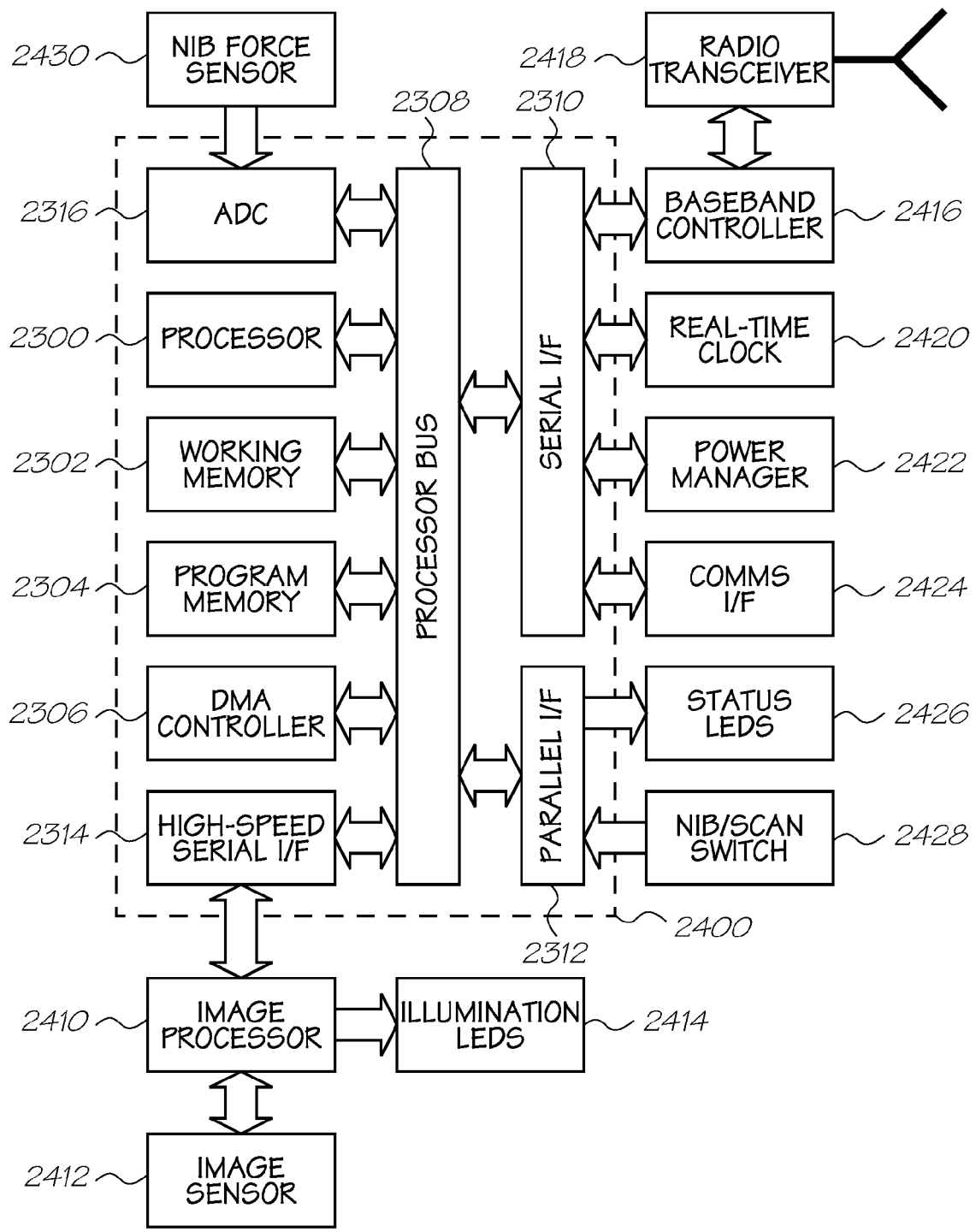
FIG. 69 shows a block diagram of salient aspects of the electronics of the scanner and pen.

As shown in FIG. 69, the image processor is designed to interface with the controller via a high-speed serial interface 2312. One example of such an interface is the high-speed synchronous serial interface provided on Atmel controllers.

The controller 2400 includes a processor 2300 which runs software to perform a number of tasks. These tasks include overall control of the scanner; real-time decoding of images of Hyperlabel™ tags acquired and pre-processed by the image sensor 2412 and image processor 2410; and encoding and transmission of scan data to the external control unit via the communications interface 2424 (or alternatively via the baseband controller 2416 and radio transceiver 2418).

The controller incorporates a high-speed working memory 2302 (such as a static RAM) for program data and for program code which is executing. It also incorporates a non-volatile program memory 2304 which stores the program code, and which may be used to persistently (and hence securely) store scan data awaiting transmission. The controller may incorporate a DMA controller 2306 for optimising the transfer of data between working memory and the high-speed serial interface. The controller's components are interconnected via a shared control, address and data bus 2308.

The processor senses depression of the scan switch 2428 via a general-purpose parallel input on the parallel interface 2312. It controls the status LED(s) 2426 via outputs on the same parallel interface. The controller 2400 may optionally include a programmable pulse width modulator (PWM) for driving the status LEDs.

When configured for wireless operation, the real-time clock 2420 provides the basis for timestamping scan data when operating off-line. The power manager 2422 manages power utilisation and controls battery charging. Both are controlled via the serial interface 2310.

The Hyperlabel™ scanner can be further augmented with a monochrome or color display to allow the operator to obtain product information based on scan data. This may include product-specific information such as descriptive information, and item-specific information such as manufacturing and use-by dates.

When the user of the scanner is a customer operating in self-checkout mode, the display can assist the customer in adding items to and removing items from their shopping cart. This may work in conjunction with a mode switch incorporated in the scanner which allows the customer to switch the scanner between the "add" mode and the "remove" mode prior to scanning an individual item. The mode can also be signalled more economically via one or more mode-indicating LEDs.

When operating in self-checkout mode, the customer may provide an identity token, such as a magnetic stripe or smart-card-based payment card or RFID token, which allows the customer to be associated with the scanner for the duration of the shopping excursion. The reader for the identity token may usefully be incorporated in the scanner. If the identity token is a payment card, then payment can also be completed through the scanner.

8.4.1.2 Handheld Hyperlabel™ Laser Scanner

Figure 72:
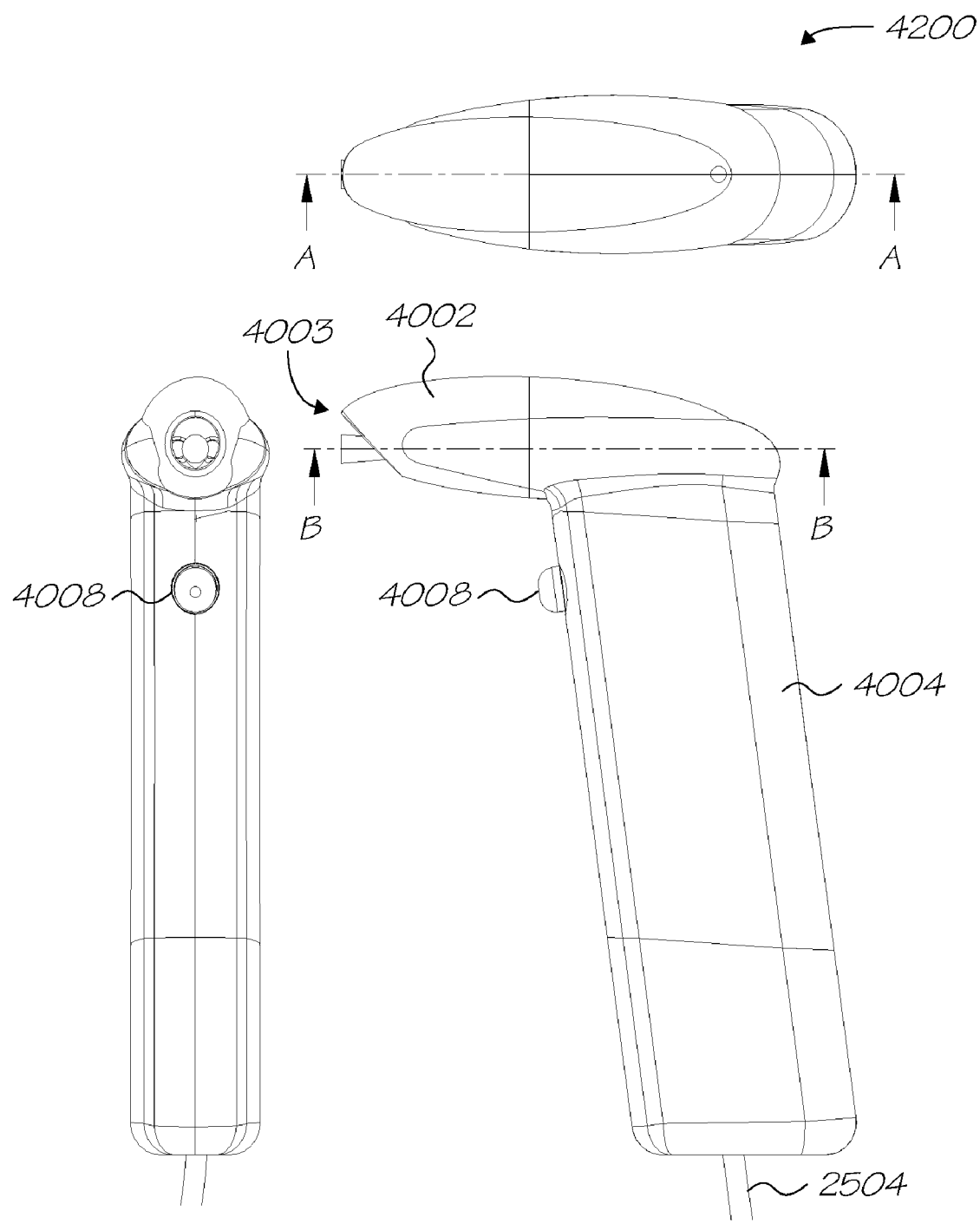
FIG. 72 shows a plan and elevation view of a hand-held Hyperlabel™ scanner 4200 according to a preferred embodiment of the present invention.
Figure 73:
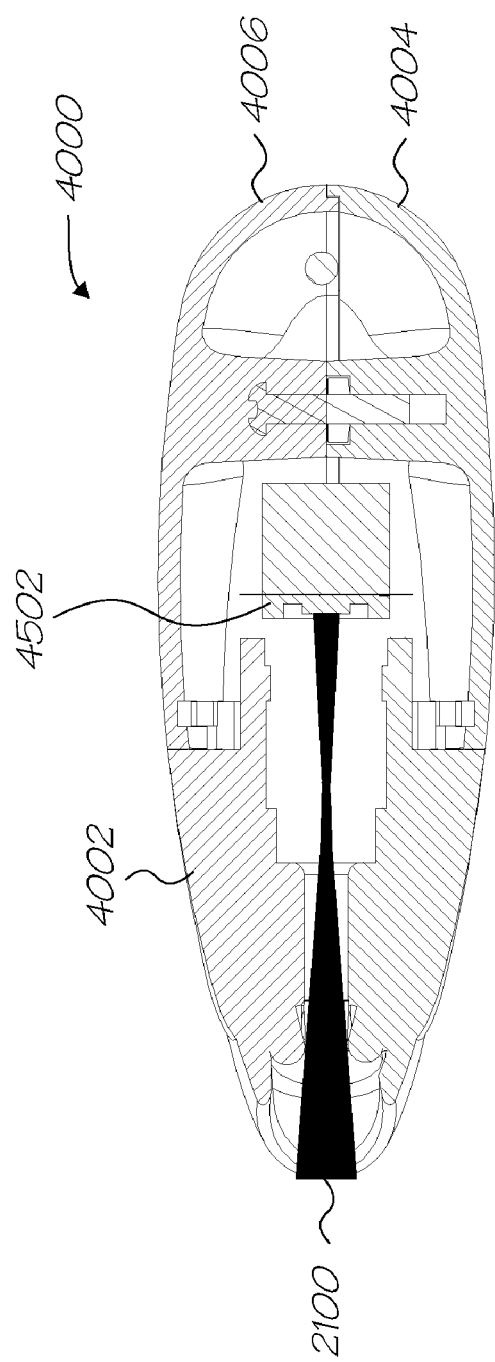
FIG. 73 shows a cross-sectional view A of the scanner of FIG. 72.
Figure 74:
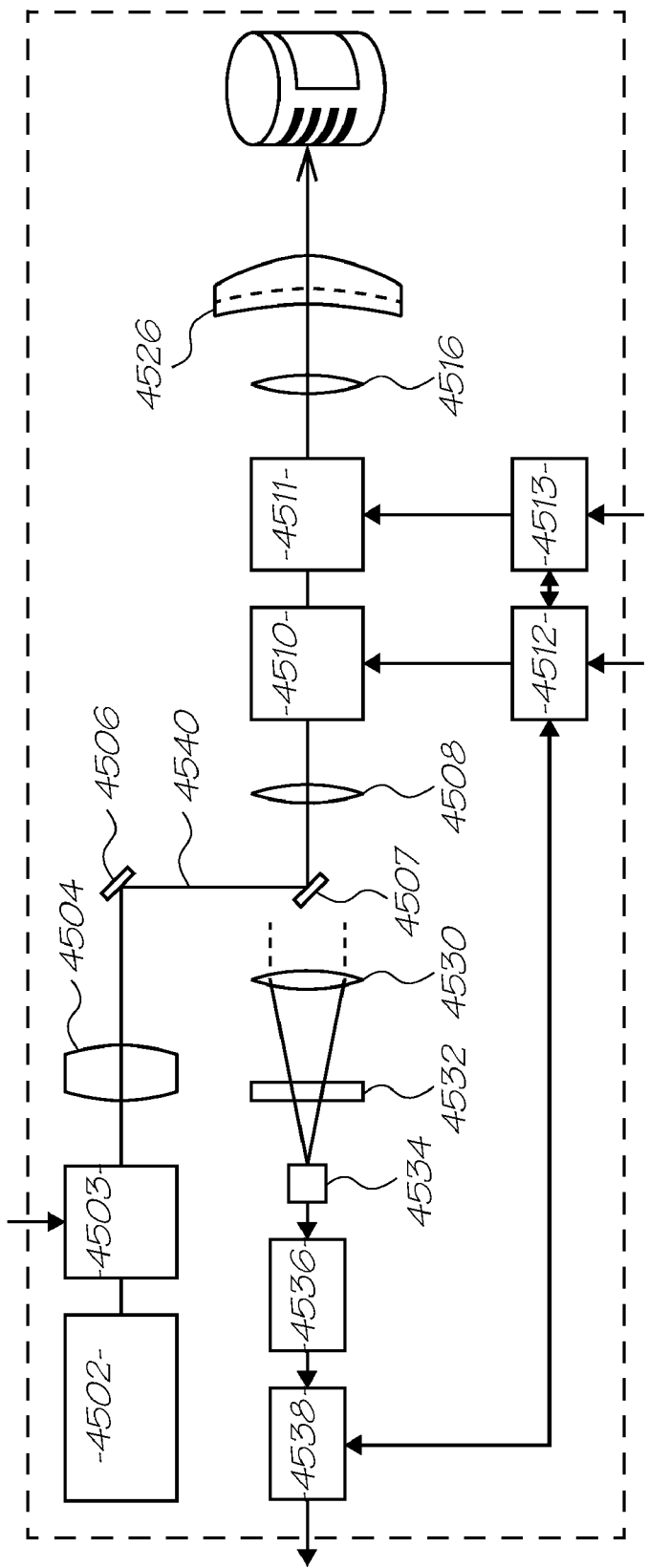
FIG. 74 shows a block diagram of salient aspects of the electronics of the scanner and pen.

FIGS. 72, 73 and 74 show a second embodiment of a Hyperlabel™ scanner 4000. FIGS. 72 and 73 use similar reference numerals to FIGS. 58 and 59 to denote similar elements. In this example, the optical assembly shown in FIG. 59 is replaced with a laser based scanning system, an example of which is shown in FIG. 74.

As shown in FIG. 74, a scan beam 4540 is produced by a laser 4502. The laser produces a narrowband near-infrared beam matched to the peak wavelength of the near-infrared ink used to print the Hyperlabel™ tags. An optional amplitude modulator 4503 allows the amplitude of the beam to be modulated, e.g. for ambient light suppression or ranging purposes as discussed below. An optional beam expander 4504 allows the beam to be reduced to produce the desired spot size. The laser is typically a solid-state laser.

A pair of mirrors 4506 and 4507 injects the scan beam into line with the retroreflective collection system, as described further below.

An optional focussing lens 4508 focusses the beam prior to steering. A first deflector 4510 provides horizontal deflection of the beam within a scan line of the patch. A second deflector 4511 provides vertical deflection of the beam between scan lines of the patch.

The maximum pixel sampling rate of the patch is usefully derived from the maximum operating frequency of commercially-available horizontal deflectors. There are a number of available alternatives, including acousto-optic deflectors and resonant scanners. A practical upper limit on the operating frequency of these devices is about 500 KHz, and this is taken as the scan line rate for the purposes of the following description.

Given a patch width of 150 pixels, the pixel rate of the scanner is therefore 75 MHz and the pixel time is 13 nanoseconds. The scan line time is 2 microseconds, but to achieve line separation the actual scan line rate is 250 KHz rather than 500 KHz. The minimum patch time is therefore 600 microseconds and the maximum patch rate is 1.6 KHz.

The vertical deflector 4511 is only required to operate at the maximum patch rate of 1.6 KHz. Again there are a number of available alternatives, including acousto-optic deflectors, resonant scanners, rotating polygon mirrors, galvanometers and piezoelectrically-actuated platforms.

The two deflectors 4510 and 4511 are driven by synchronised drivers 4512 and 4513 respectively, each incorporating scan generation, amplification etc.

The angle of the output beam of the horizontal and vertical deflectors 4510 and 4511 is transformed into a spatial offset within the patch by an angle-to-displacement transform lens 4516. This has the benefit that the bundle of (time-displaced) scan beams which make up the patch beam is collimated, thus the sampling frequency of the patch is unaffected by distance to the tagged surface.

The patch beam is focussed and its focal plane is flattened by a focussing and field-flattening lens 4526.

During the "exposure" time of a single pixel the scan beam spot effectively rests at a single point on the product item 201.

Figure 75:
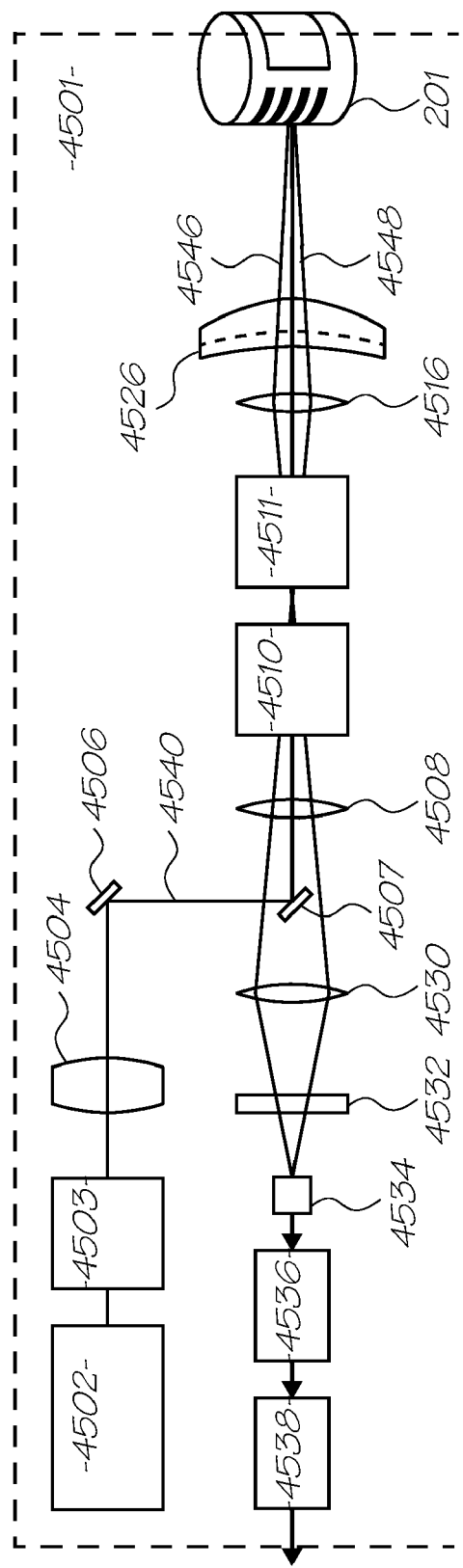
FIG. 75 shows the return light detection path of the scanner of FIG. 72.

As shown in FIG. 75, the scanner's light collection system is retroreflective, significantly increasing the scanner's signal-to-noise ratio. As shown in the figure, divergent rays 4546 and 4548, diffusely reflected where the scan beam strikes the surface of the tagged product item, converge through the transform lens 4516, follow the reverse path of the scan beam through the deflectors 4511 and 4510 to emerge centered on the scan beam, are largely unaffected by the focussing lens 4508, largely bypass the mirror 4507, and are finally focussed by a collecting lens 4530 onto a photodetector 4536. An optional near-infrared filter 4532 further helps reject of ambient light. The photodetector is of any suitable type, such as a solid-state photodiode or a photomultiplier tube.

The signal from the photodetector 4536 is amplified by amplifier 4536 and is converted to a digital value by analog-to-digital converter (ADC) 4538. The ADC operates at the scanner's pixel rate, i.e. 100 MHz. The ADC is synchronised with the horizontal deflector driver 4512.

In use, the photodetector circuit can be modulated in accordance with the modulation of the laser, as achieved by the amplitude modulator 4503, to thereby assist with the suppression of ambient light.

In particular, during an integration (or "exposure") period, the photodetector 4536 produces a photocurrent which is proportional to the intensity of light incident upon the photodetector. When the controlled light source, in this case, the scanning beam 4540 is off, the light incident upon the photodetector will primarily be ambient light. When the scanning beam is on, the light incident upon the photodetector 4536 will be formed from light reflected from the product item, and the ambient light.

Accordingly, the photodectector system can be adapted to operate in two phases in accordance with the modulation of the scanning beam 4540. During a first phase, when the scanning beam 4540 is off, the photodetector circuit is adapted to detect the incident light and from this determine and effectively memorise the ambient light level.

In the second phase when the scanning beam is activated, the photocurrent in the photodetector 4536 increases in proportion to the light incident thereon, based on the reflected radiation and the ambient light. This "total light signal" is corrected by effectively subtracting the memorised ambient light level signal, to generate a "difference signal", which is indicative of the reflected scanning beam only. This allows the effects of ambient light to be reduced.

This process and a photodetector circuit suitable for performing such operation are described in the co-pending PCT Publication No. WO 03/044814 entitled "Active Pixel Sensor" filed 22 Nov. 2002, the contents of which are incorporated herein by cross-reference.

The electronics of the scanner will be similar to those of FIG. 69.

8.4.1.3 Hyperlabel™ Pen

Figure 65:
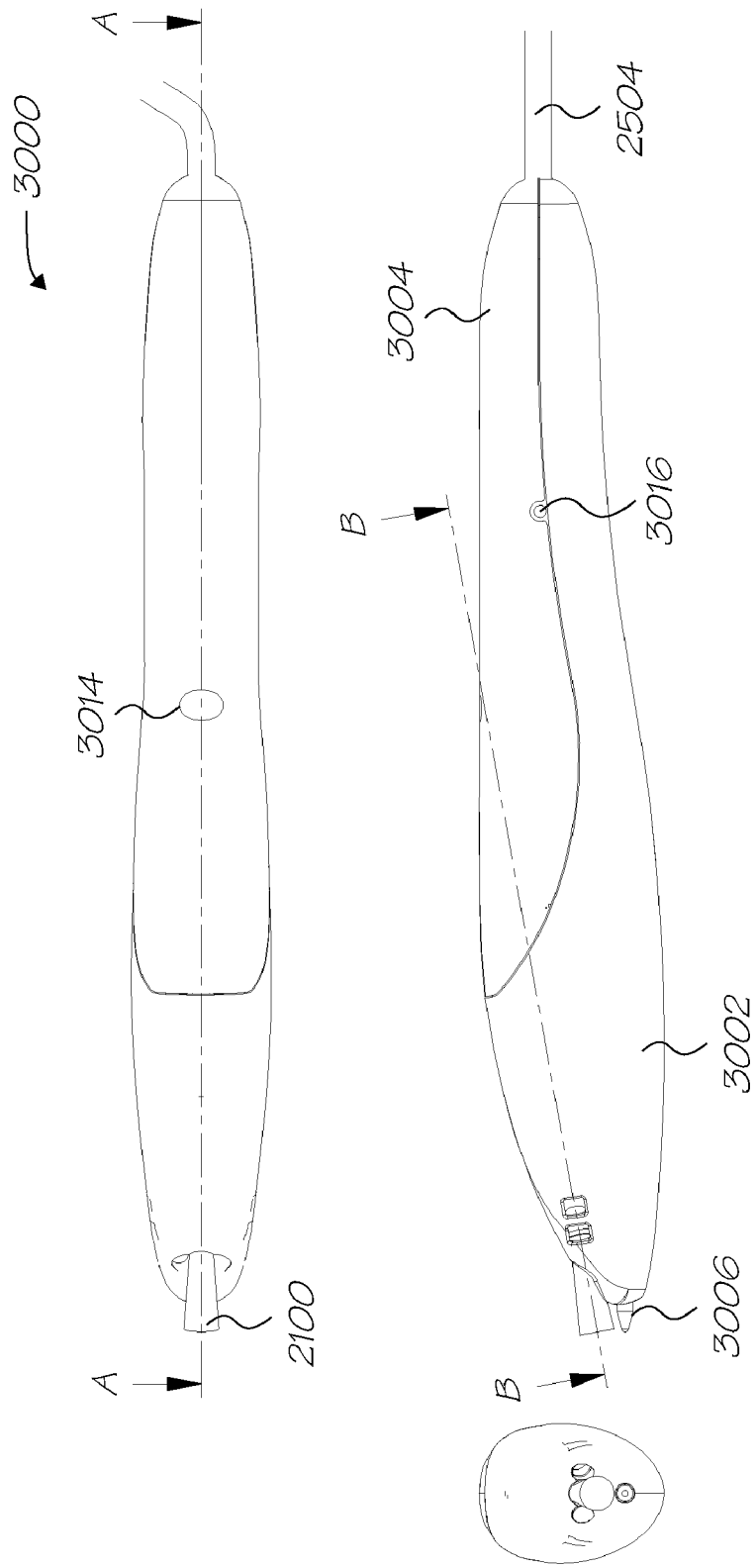
FIG. 65 shows a plan and elevation view of a netpage pen 3000 according to a preferred embodiment of the present invention.
Figure 66:
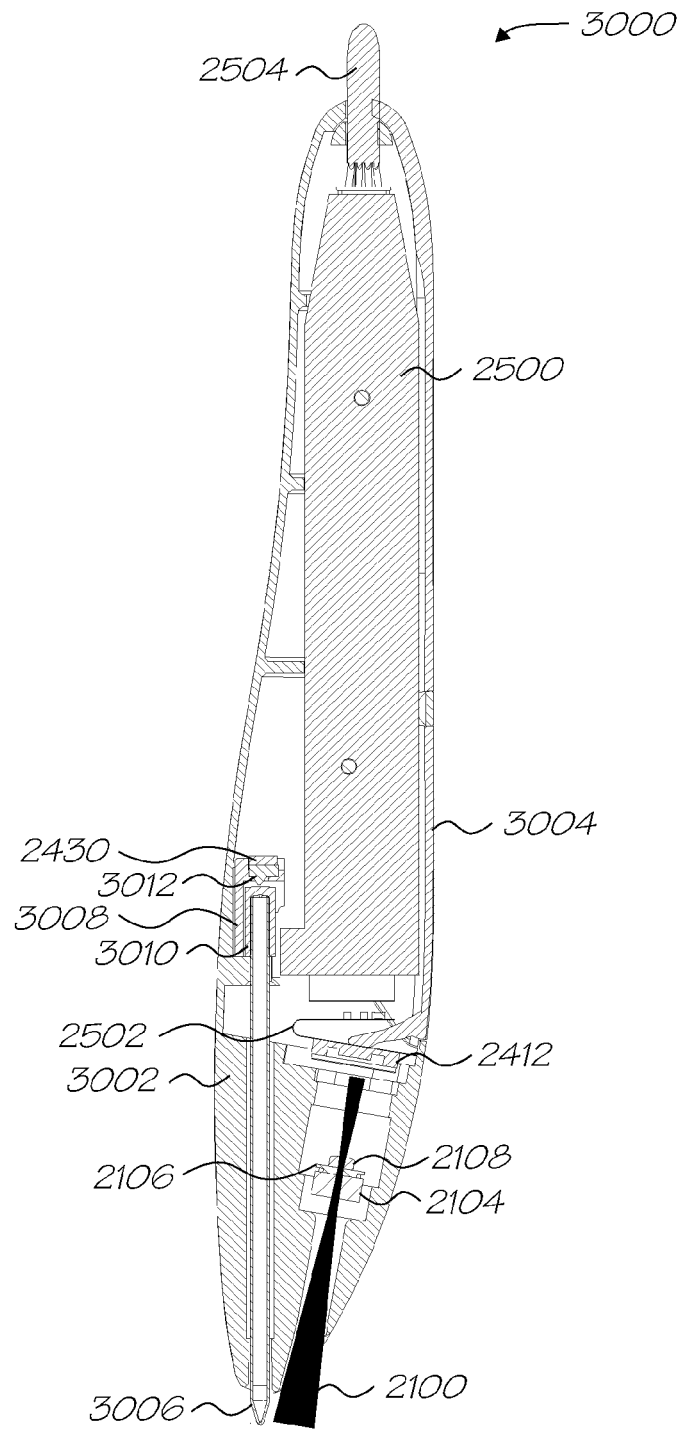
FIG. 66 shows a cross-sectional view A of the pen of FIG. 65.

FIG. 65, FIG. 66 and FIG. 69 show a preferred embodiment of a Hyperlabel™ pen 3000. The pen is designed to image and decode Hyperlabel™ tags when its nib 3006 is brought into close proximity or contact with a Hyperlabel™ tagged surface. The pen can be operated in "hover" mode, in which it continuously and automatically scans tags within its field of view; or in contact mode, in which it only scans tags after a "pen down" event, i.e. when its nib switch 2428 is engaged and/or its nib force sensor 2430 registers a threshold force. Hover mode is useful when the pen is used to drive a cursor on a display screen. It is less useful when interaction is exclusively paper-based.

During normal operation the pen decodes a succession of tag positions 86, refines these positions according to the position and orientation of each tag within the field of view, and thereby generates a succession of nib positions representative of the pen's motion with respect to the tagged surface. As shown in FIG. 33 the pen thus generates a succession of strokes referred to collectively as digital ink, each stroke delimited by a pen down and a pen up event. Each stroke identifies the IDs of the one or more pages or regions within which the stroke was captured.

The pen incorporates a marking nib and ink cartridge 3006, allowing the user to write on a tagged page while simultaneously generating digital ink. The cartridge is replaceable, and a non-marking "stylus" cartridge may be substituted for non-marking operation.

The pen as shown is designed for tethered operation, wherein it obtains DC power from an external supply via a cable 2504, and transmits digital ink to an external processor via the same cable 2504. The pen may be connected to a relay device 44 which simply relays the digital ink to a remote processing system (e.g. page server) via wired or wireless communications, or the pen may be directly connected to the processing system.

Alternative versions of the pen incorporate a replaceable or rechargeable battery to allow untethered operation; a wireless communication capability such as IrDA, Bluetooth, IEEE 802.15 (e.g. ZigBee) or IEEE 802.11 to allow untethered data transmission; and/or external contacts designed to mate with a tethered pod to allow in-pod battery charging and/or data transmission.

Figure 67:
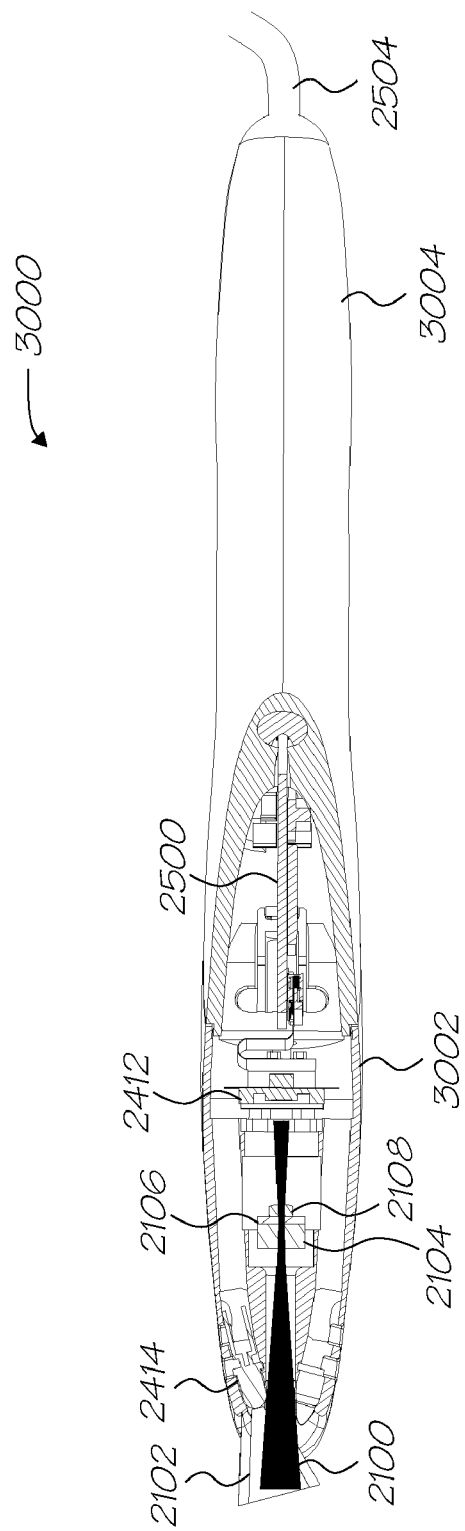
FIG. 67 shows a cross-sectional view B of the pen of FIG. 65.

As shown in FIG. 65 through FIG. 67, the pen consists of a base molding 3002 and a cover molding 3004. The moldings mate together to form the pen body. Although shown with screw fasteners, the moldings may alternatively incorporate snap fasteners. The base molding incorporates an aperture, directly above the nib 3006, to accommodate the imaging field-of-view cone 2100 and illumination field cones 2102. Further apertures in the body accommodate the status LED window 3014, reset switch 3016, and the cable 2504.

The Hyperlabel™ pen 3000 and the hand-held Hyperlabel™ scanner 4000 are designed to share the same optics and electronics. The following description therefore focusses on those areas where the pen differs from the scanner.

As shown in FIG. 66, the pen incorporates a force sensor 2430 coupled to the ink cartridge 3006. A housing 3008 contains a pliable sleeve 3010 designed to grip the removable cartridge 3006 and push against an element 3012 which couples it with the force sensor 2430. The force sensor may usefully be of resistive, piezo-resistive, or piezo-capacitive type.

Figure 5B:
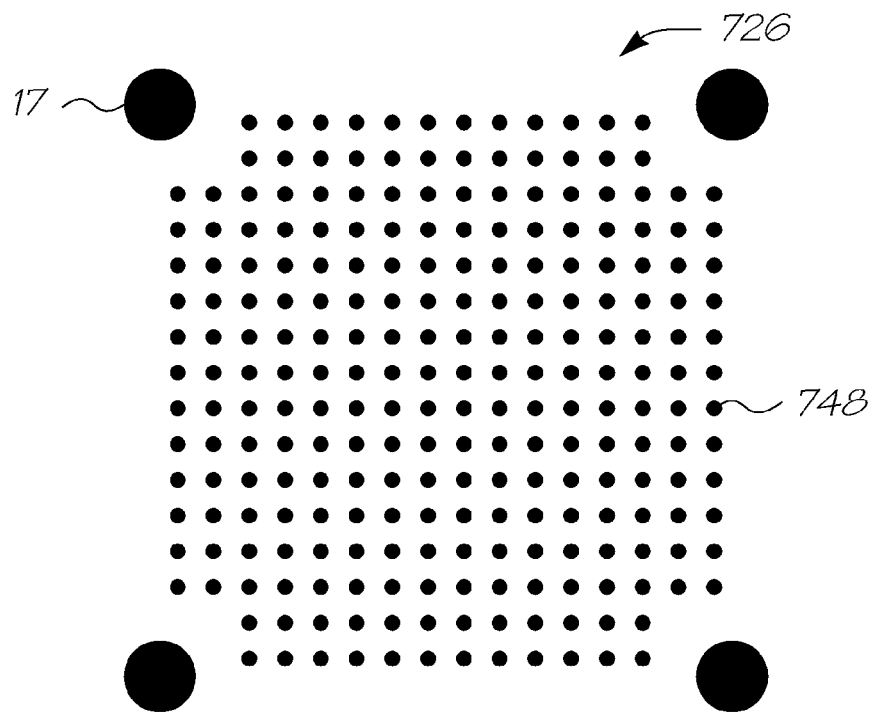
FIG. 5B is a plan view showing a macrodot layout for the tag shown in FIG. 5A.
Figure 68:
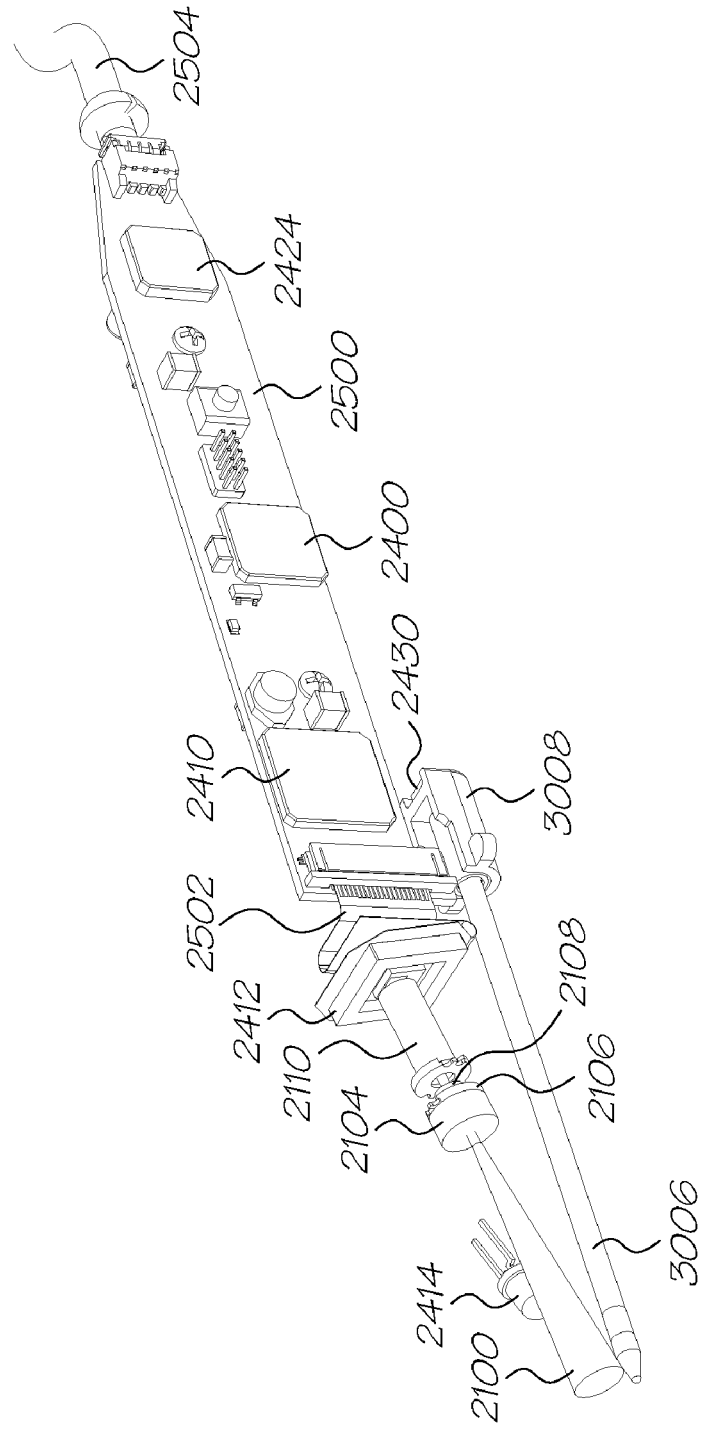
FIG. 68 shows a view of the optical and electronic sub-assemblies of the pen.

FIG. 68 shows the optics and PCB in a linear arrangement suited to the pen, in contrast with the folded arrangement suited to the scanner, as shown in FIG. 5.

As shown in the block diagram of the electronics illustrated in FIG. 12, the controller's ADC 2314 converts the analog signal from the pen's nib-coupled force sensor 2430. The pen optionally incorporates a nib switch 2428, placed in line with the force sensor 2430 to provide a power-efficient and reliable pen-down signal, as well as a basis for force sensor offset calibration. The force signal is included in the digital ink generated by the pen. It may be used in various application-specific ways, including to modulate the thickness of strokes rendered to match the physical strokes produced by the marking nib.

It will be appreciated that the pen 3000 described above is an alternative embodiment of the netpage pen 101. The pen 3000 and netpage pen 101 may be used interchangably, and will therefore be referred to generally as netpage pens.

8.4.1.4 Glove Scanner

Figure 70:
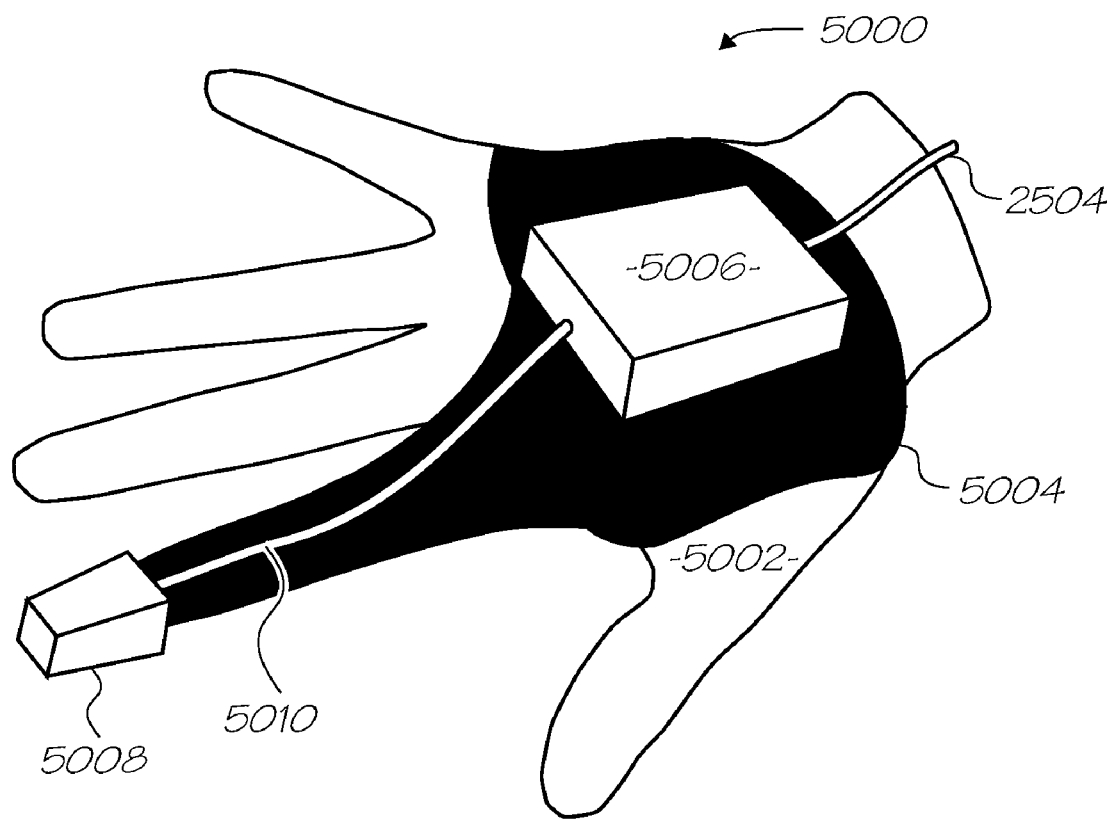
FIG. 70 shows a view of a glove Hyperlabel™ scanner 5000 according to a preferred embodiment of the present invention.
Figure 71:
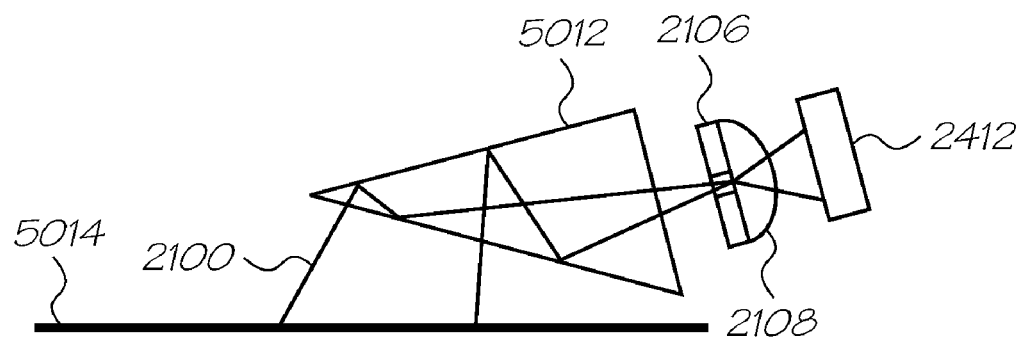
FIG. 71 is a schematic diagram of the optics of the glove scanner of FIG. 70.

FIG. 70 shows a preferred embodiment of a "glove" Hyperlabel™ scanner 5000. The glove scanner is designed to image and decode Hyperlabel™ tags when its "thimble" imaging unit 5008 is brought into close proximity or contact with a Hyperlabel™ tagged surface. The scanner can be operated in free mode, in which it continuously and automatically scans tags within its field of view; or in triggered mode, in which it only scans tags when its trigger is held depressed. Although the scanner is designed with a very limited depth of field, thus reducing the likelihood of unintentional scans in free mode, triggered mode can be used to avoid unintentional scans. Because an individual product item is tagged with a unique item ID, there is no possibility of duplicate scans.

The glove scanner is a general-purpose Hyperlabel™ scanner particularly suited to automatic scanning of stock during handling, such as during shelf replenishment. Unlike other glove-mounted bar code scanners which image in a direction parallel to the outstretched finger, the Hyperlabel™ glove scanner images in a direction normal to the underside of the grasping finger. This mode of operation is made possible by the smallness of the field of view required to acquire a Hyperlabel™ tag, i.e. of the order of 5 mm.

In the glove scanner 5000, the viewing distance is shortened relative to the viewing distance in the hand-held scanner 4000 and netpage pen 3000. This allows the imaging unit 5008 to be compact, but reduces the depth of field. This is not a problem, however, since the imaging unit is designed to be used when close to and parallel to a tagged surface.

The imaging unit 5008 contains the same optical components as the hand-held scanner, including the near-infrared illumination LEDs 2414. In addition, it incorporates a 30-60-90 prism 5012 which folds the imaging cone (to line it up with the image sensor mounted almost normally to the surface 5014) and increases the viewing distance. Since the thimble is less susceptible to ambient light than the hand-held scanner, the near-infrared filter 2104 is optional.

The imaging unit also incorporates the trigger switch (not shown) which registers contact with a tagged surface. Alternatively or additionally, the trigger switch may be placed between thumb and forefinger for manual activation.

The imaging unit incorporates both the image sensor 2412 and the image processor 2410, which are usefully combined into a single compact chip as described in the co-pending U.S. application Ser. No. 10/778,056 entitled "Image Sensor with Digital Framestore" filed 17 Feb. 2004.

The imaging unit 5008 is connected to the processing unit 5006 via a power and high-speed data cable 5010. The remainder of the scanner electronics are incorporated in the processing unit, including the processor 2400 and communications interface 2424. The processing unit is connected to an external control unit via a power and data cable 2504 in the usual way.

Both the imaging unit 5008 and the processing unit 5006 are attached to a harness 5004, constructed from elastic material, which is worn like a glove.

8.4.2.1 Fixed Hyperlabel™ Laser Scanner

A first example of a design of a fixed Hyperlabel™ laser scanner 254 will now be described.

Figure 76:
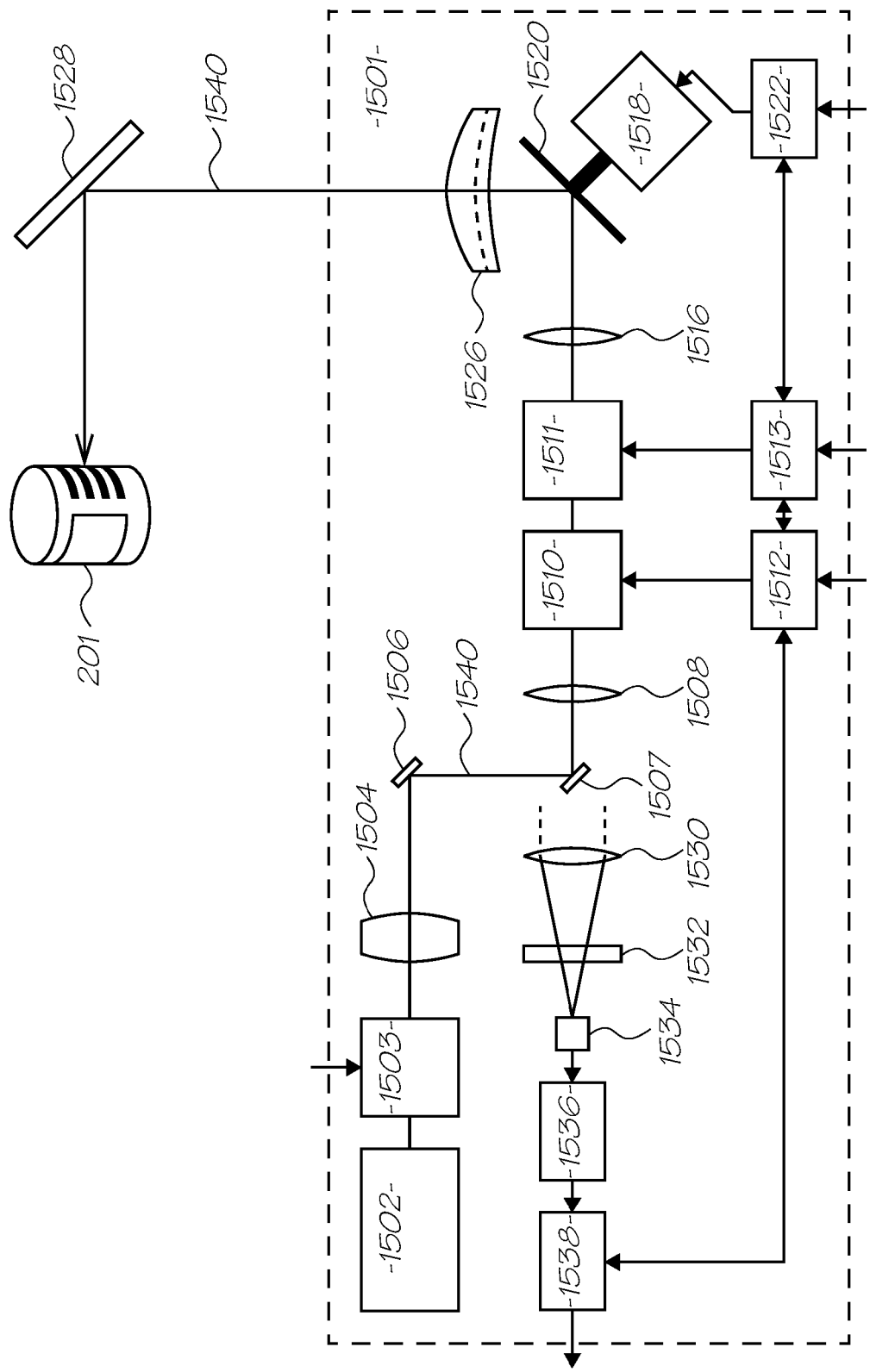
FIG. 76 shows a schematic of a first example of a fixed Hyperlabel™ laser scanner 1500 according to a preferred embodiment of the present invention.

FIG. 76 shows the central unit 1501 of a preferred embodiment of a fixed Hyperlabel™ laser scanner 1500 suitable for incorporation in a retail checkout 1000.

To accommodate as large a proportion as possible of the full range of product items which may need to be scanned, the Hyperlabel™ scanner 1500 is designed to accurately scan any item which fits on the 500 mm wide conveyor 1014 of the checkout 1000. It is configured to automatically scan a single item at a time as it passes by on the conveyor at a speed of up to 500 mm/s. It may scan three sides and the tops of items from both sides of the conveyor, up to an item height of 500 mm, thus providing a five-sided scanning function.

The scanner is typically able to scan product items ranging across the full size range, e.g. ranging from packets of corn flakes to packets of chewing gum, as well as partially labelled items such as glass bottles, jars and shrink-wrapped produce.

If the scanner acquires two different item IDs simultaneously then it flags an error to the operator and stops the conveyor, thereby preventing accidental or deliberate (and therefore fraudulent) occlusion of an item by other items. The operator must then move the offending items to the input side of the conveyor and restart the conveyor.

The uniqueness of the item ID prevents any item from being recorded as a sale more than once.

The scanner detects the transit of an object on the conveyor. If it detects the transit of an object which fails to scan, then it flags an error and stops the conveyor. The operator may then move the offending item to the input side of the conveyor and restart the conveyor, or scan the item manually, e.g. using the hand-held Hyperlabel™ scanner 4000.

Hyperlabel™ tagging covers a large proportion of the surface of a product item. The basic Hyperlabel™ scanning strategy therefore consists of sparsely sampling the scan volume. This basic strategy may then be refined to improve scan accuracy and/or scan efficiency.

The acquisition of a two-dimensional Hyperlabel™ tag requires the scanning of a spatially coherent two-dimensional "patch" large enough to be guaranteed to contain at least one entire tag. This contrasts with the acquisition of a one-dimensional bar code, which only requires the scanning of a spatially coherent line. There is therefore a fundamental requirement to provide two levels of beam steering, where the first level provides the two-dimensional scan of the beam within a patch, and the second level provides the two- or three-dimensional scan of the patch within the scan volume. For the purposes of the following discussion the second level of beam steering is taken to apply to a "patch beam".

As described earlier in this specification, a Hyperlabel™ tag has a maximum feature period of about 150 microns. Assuming a sampling rate of two and a minimum inclination between a tagged surface and the scan beam of 45 degrees, a sampling spot period of 50 microns and a sampling spot size of between 50 and 100 microns is required, depending on beam cross-section. At a sampling rate of two, the required circular field of view has an image-space diameter of about 150 pixels. This in turn determines the dimensions of the patch, i.e. 150 by 150 pixels.

As shown in FIG. 76, a scan beam 1540 is produced by a laser 1502. The laser produces a narrowband near-infrared beam matched to the peak wavelength of the near-infrared ink used to print the Hyperlabel™ tags. An optional amplitude modulator 1503 allows the amplitude of the beam to be modulated, e.g. for ranging purposes as discussed below. An optional beam expander 1504 allows the beam to be reduced to produce the desired spot size. The laser may be a solid-state or gas laser such as HeNe laser.

A pair of mirrors 1506 and 1507 injects the scan beam into line with the retroreflective collection system, as described further below.

An optional focussing lens 1508 focusses the beam prior to steering. A first deflector provides horizontal deflection of the beam within a scan line of the patch. A second deflector 1511 provides vertical deflection of the beam between scan lines of the patch.

The maximum pixel sampling rate of the patch is usefully derived from the maximum operating frequency of commercially-available horizontal deflectors. There are a number of available alternatives, including acousto-optic deflectors, resonant scanners and rotating polygon mirrors. A practical upper limit on the operating frequency of these devices is about 500 KHz, and this is taken as the scan line rate for the purposes of the following description.

Given a patch width of 150 pixels, the pixel rate of the scanner is therefore 75 MHz and the pixel time is 13 nanoseconds. The scan line time is 2 microseconds, but to achieve line separation the actual scan line rate is 250 KHz rather than 500 KHz. The minimum patch time is therefore 600 microseconds and the maximum patch rate is 1.6 KHz.

The vertical deflector 1511 is only required to operate at the maximum patch rate of 1.6 KHz. Again there are a number of available alternatives, including acousto-optic deflectors, resonant scanners, rotating polygon mirrors, galvanometers and piezoelectrically-actuated platforms.

The two deflectors 1510 and 1511 are driven by synchronised drivers 1512 and 1513 respectively, each incorporating scan generation, amplification etc.

The angle of the output beam of the horizontal and vertical deflectors 1510 and 1511 is transformed into a spatial offset within the patch by an angle-to-displacement transform lens 1516. This has the benefit that the bundle of (time-displaced) scan beams which make up the patch beam is collimated, thus the sampling frequency of the patch is unaffected by distance to the tagged surface.

Figure 77:
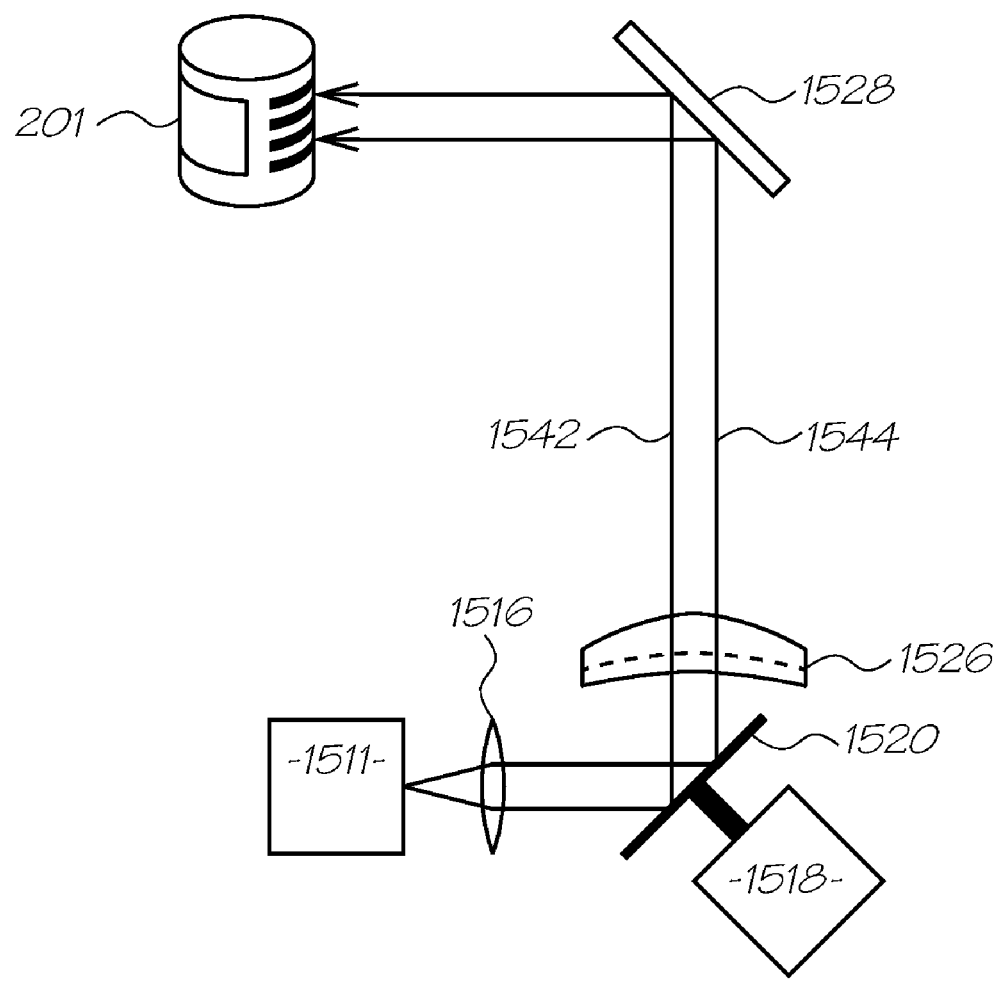
FIG. 77 shows the beam steering mirror of the scanner in a nominal position.
Figure 78:
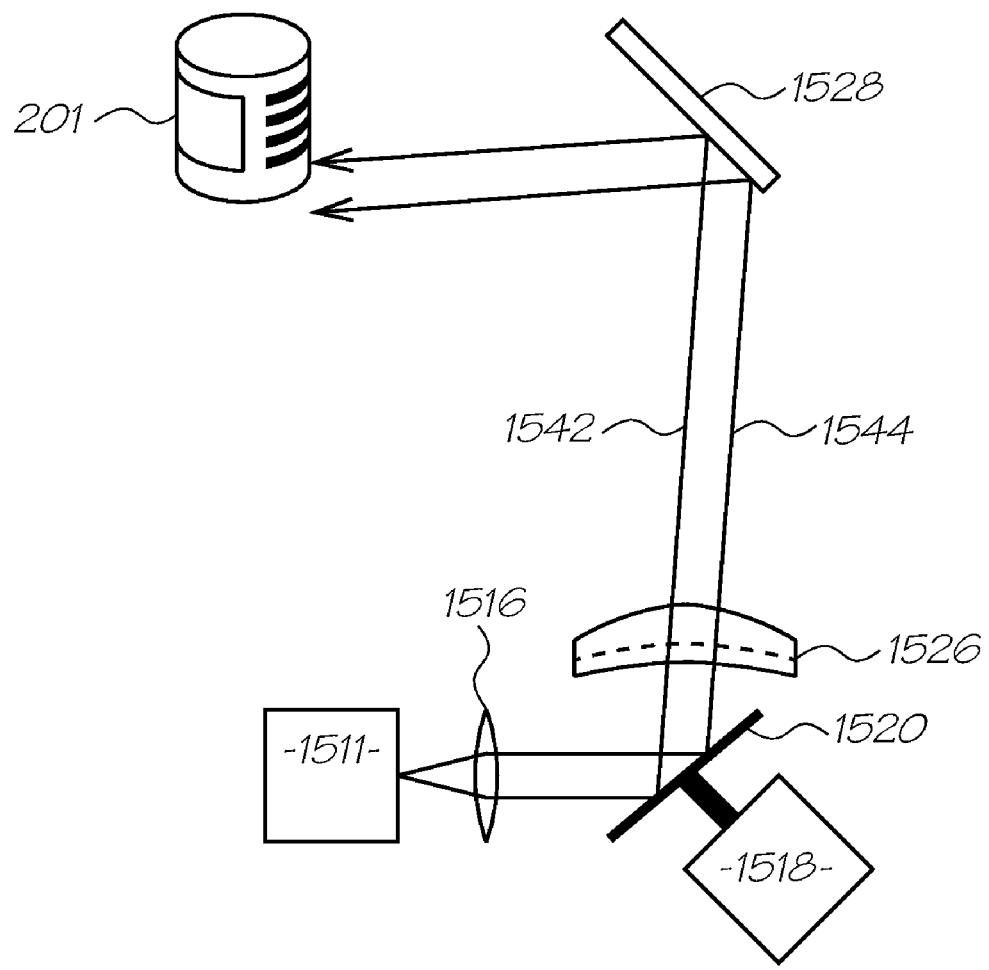
FIG. 78 shows the beam steering mirror of the scanner in a "low" position.
Figure 79:
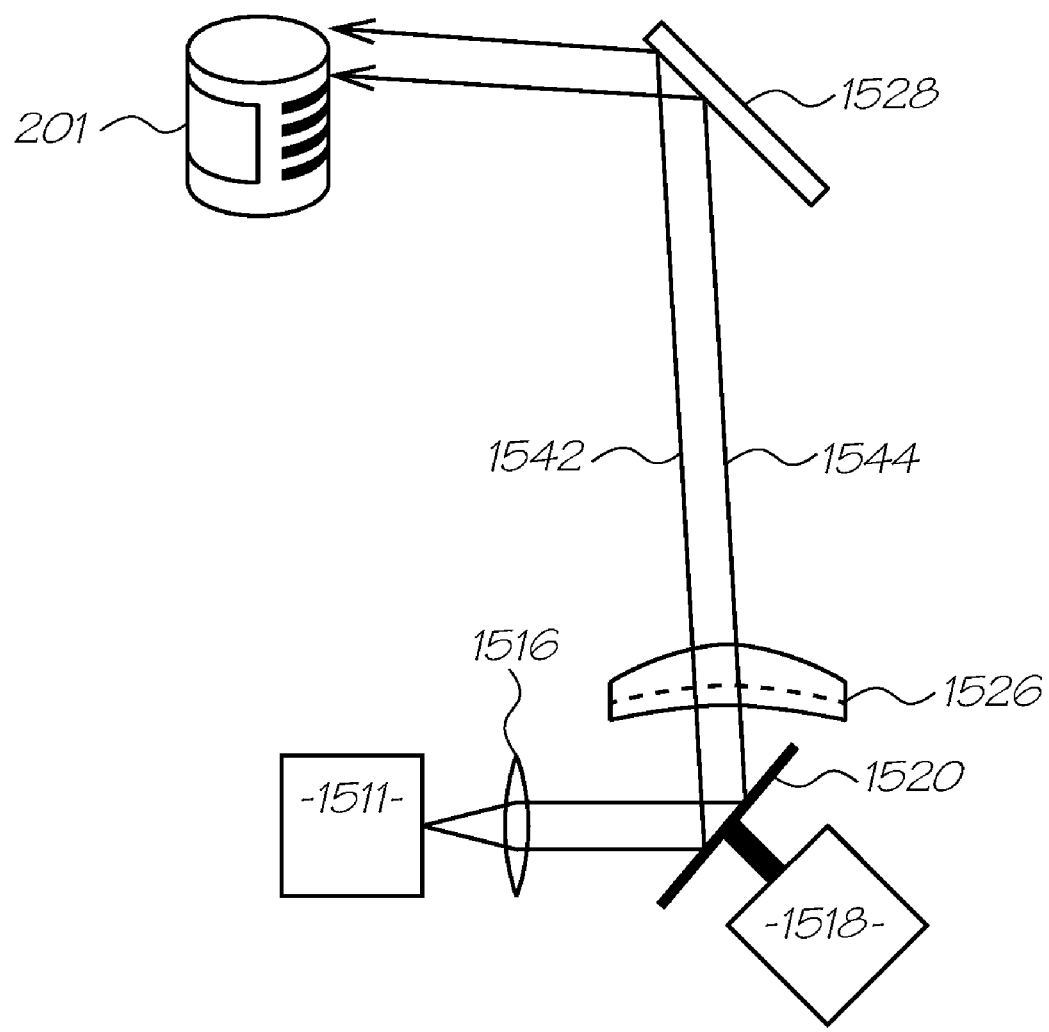
FIG. 79 shows the beam steering mirror of the scanner in a "high" position.
Figure 80:
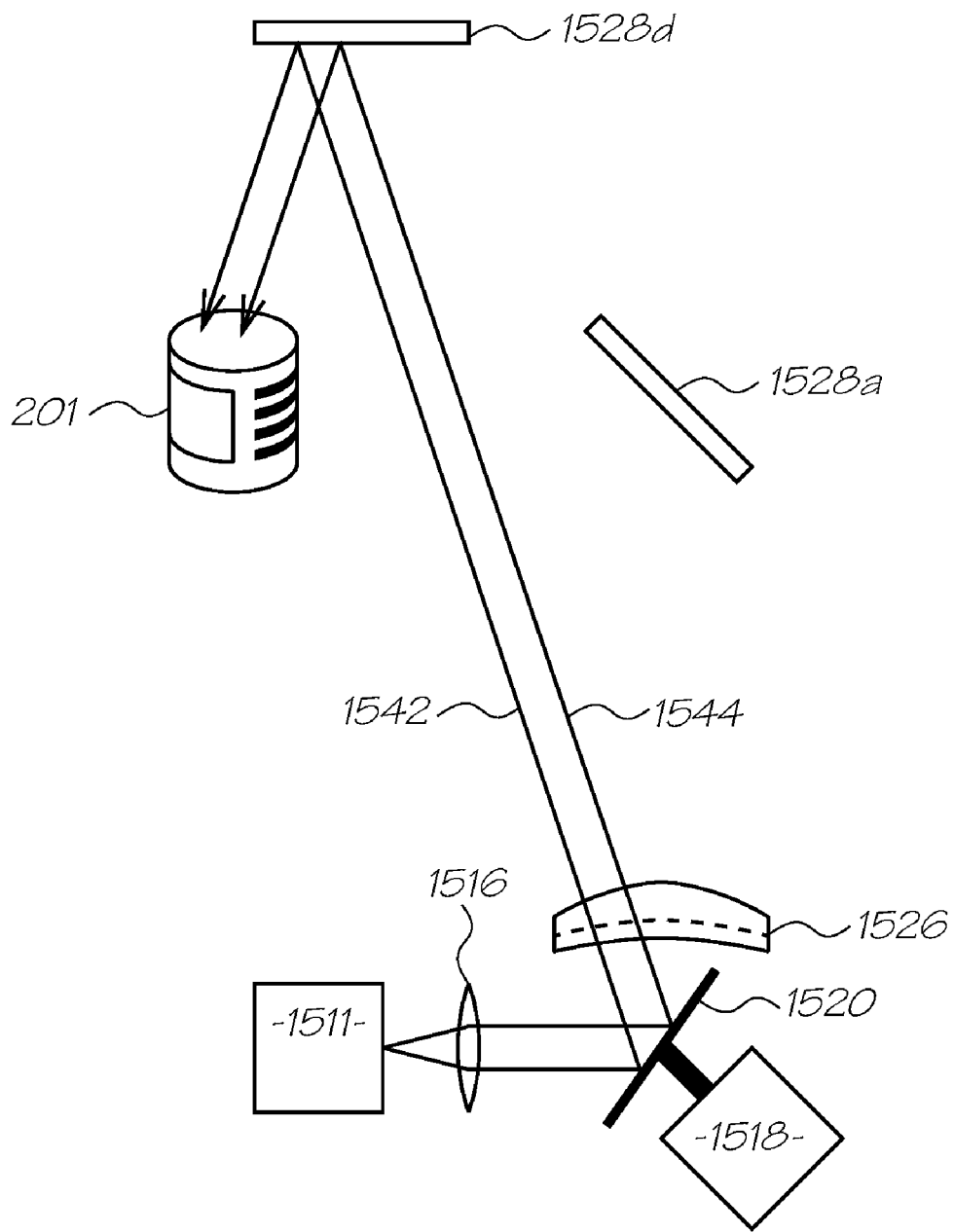
FIG. 80 shows the beam steering mirror of the scanner selecting an alternative deflection mirror.
Figure 82:
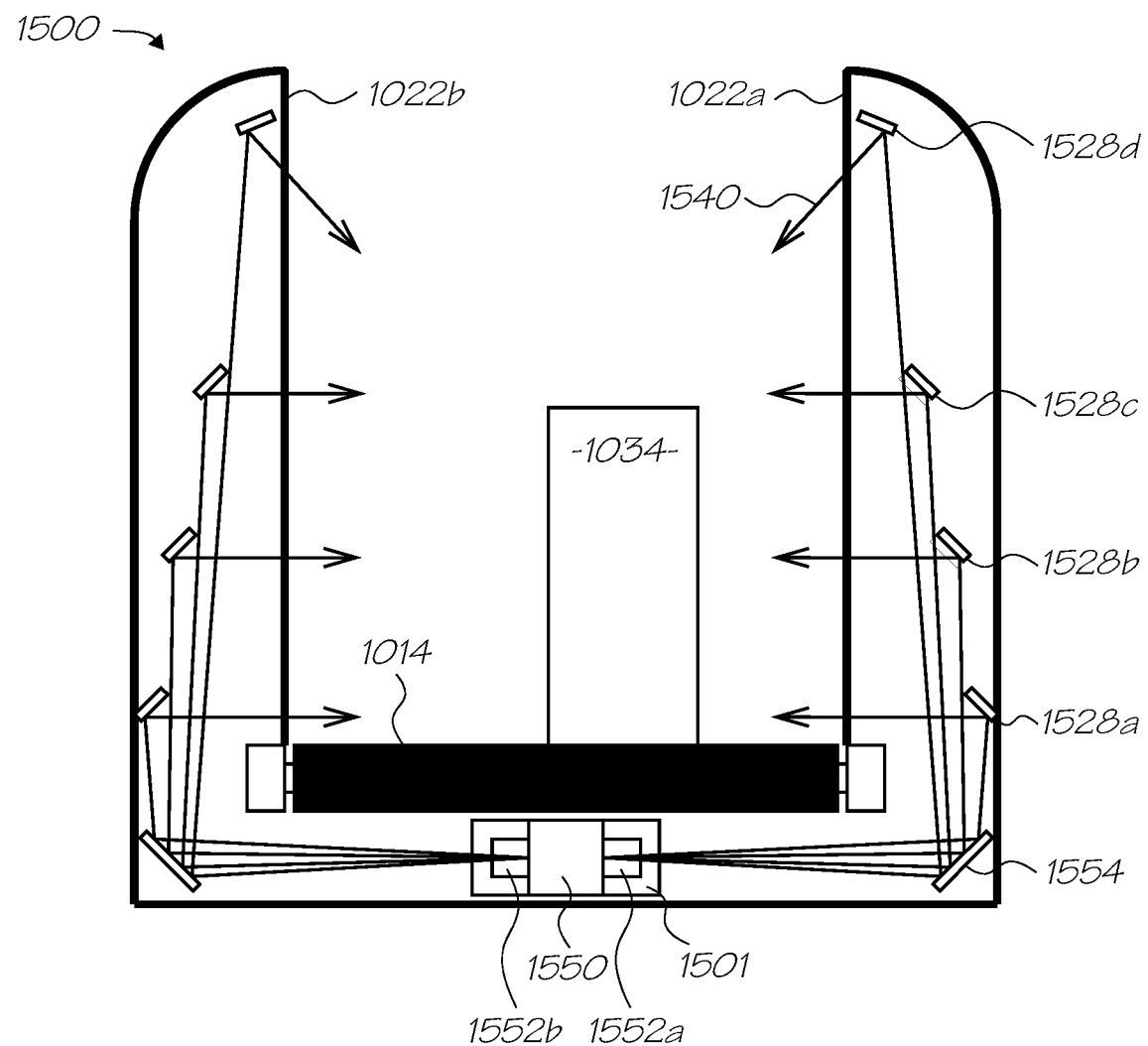
FIG. 82 shows an elevation view of the scanner incorporated in the checkout.
Figure 84:
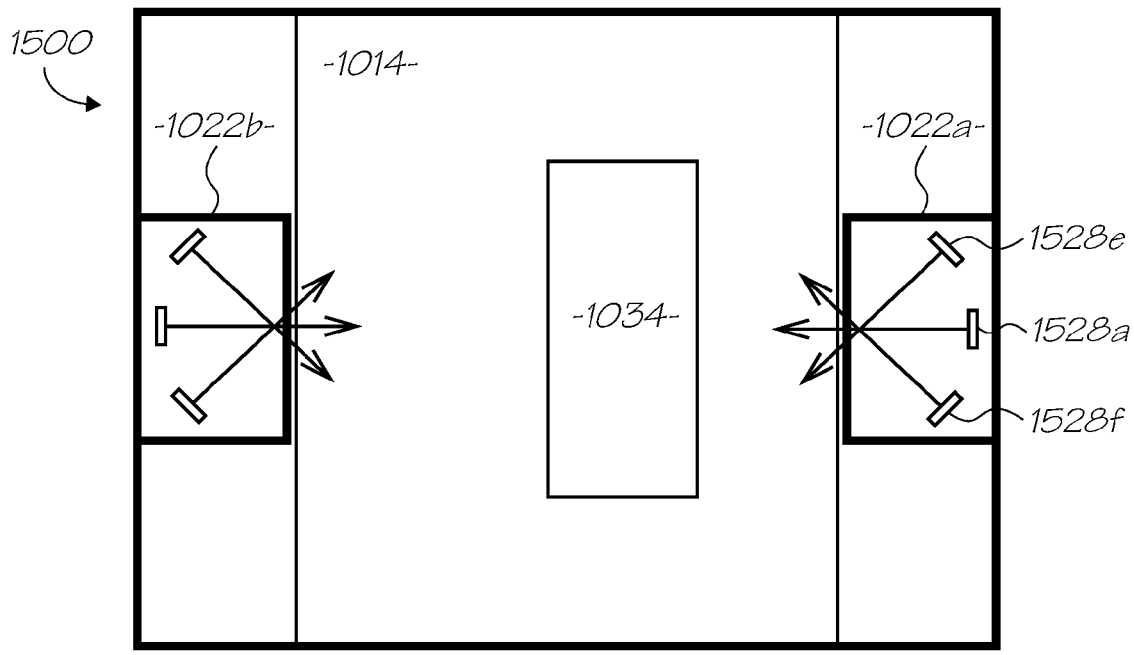
FIG. 84 shows a plan view of the scanner incorporated in the checkout, showing beam paths above the conveyor.

The patch beam is steered by a mirror 1520 attached to a piezoelectric tip-tilt platform 1518. Fine steering control within the scan volume is achieved by steering the patch beam within the confines of a scan mirror 1528, as illustrated in FIG. 77, FIG. 78 and FIG. 79. Gross steering control within the scan volume is achieved by steering the patch beam between different scan mirrors 1528a, 1528b etc., as illustrated in FIG. 80, FIG. 82 and FIG. 84. Although FIG. 82 shows four scan mirrors 1528a, 1528b etc. arranged vertically, and FIG. 84 shows three scan mirrors 1528a, 1528e and 1528f arranged horizontally, there are in practice any number of scan mirrors distributed both vertically and horizontally within the scan posts to effect omnidirectional scanning.

A typical tip-tilt platform has a resonant frequency of about 1 KHz, i.e. an access time of about 1 millisecond. This results in an effective patch rate of about 600 Hz. Faster beam-steering solutions, such as acousto-optic deflectors, may be used to achieve patch beam steering at the maximum patch rate.

As shown in FIG. 84, scan mirrors 1528e and 1528f, located at the sides of the scan posts 1022 and facing diagonally across the scan volume between the scan posts, provide support for scanning the leading and trailing side of a product item, i.e. just after the item enters the scan volume and just before the item leaves the scan volume respectively.

The focus of the beam can be dynamically adjusted for the path length associated with the selected scan mirror. The focus of the beam can be altered by translating a lens element, e.g. within the beam expander 1504, using a precision piezoelectric translation stage.

Depending on the characteristics of the beam produced by the laser 1502, and on the required spot size, the depth of field of the scan beam can be increased by dividing the scan volume into two or more depth zones and individually scanning patches in all zones with zone-specific beam focus.

The deflector drivers 1512 and 1513 may modulate the pixel and line scan rate to accommodate patch distortion caused by the state of the tip-tilt platform 1518.

The patch beam is focussed and its focal plane is flattened by a focussing and field-flattening lens 1526.

During the "exposure" time of a single pixel the scan beam spot effectively rests at a single point on the product item 201. The speed of the conveyor induces a negligible skew. Even during the 300-microsecond scan time of the entire patch, the object moves only about 150 microns, i.e. about 3% of the patch size.

Although conveyor motion with respect to patch size is nominally minimal, the motion may be irregular due to the imprecise nature of the coupling between the motor and the conveyor. The scanner may therefore include a motion sensor 1556 which senses the actual motion of the conveyor, and may use the resultant known motion of the conveyor to correct any motion-induced distortions in the sampled patch, such as inter-line skew.

Figure 81:
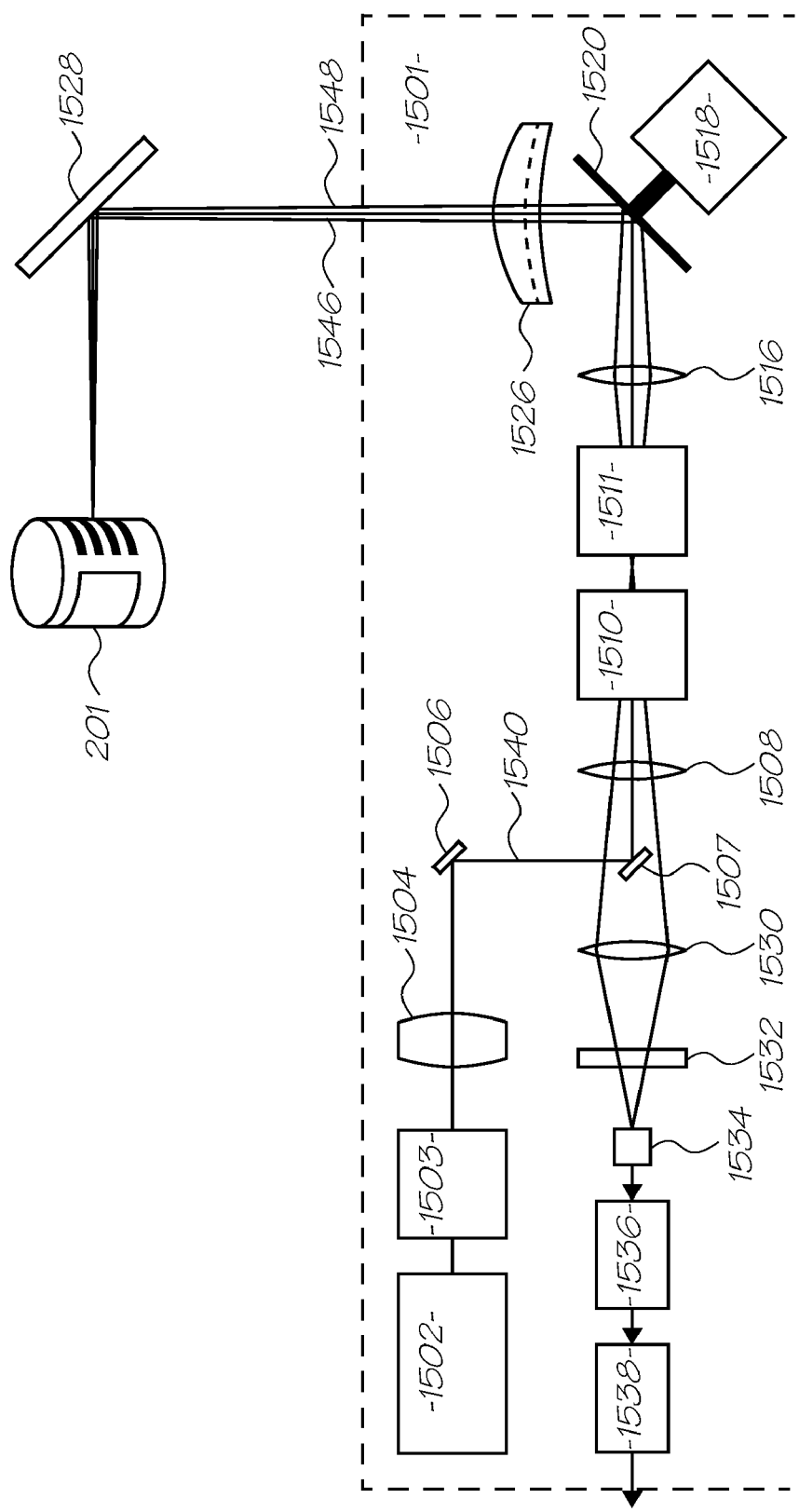
FIG. 81 shows the return light detection path of the scanner.

As shown in FIG. 81, the scanner's light collection system is retroreflective, significantly increasing the scanner's signal-to-noise ratio. As shown in the figure, divergent rays 1546 and 1548, diffusely reflected where the scan beam strikes the surface of the tagged product item, converge through the transform lens 1516, follow the reverse path of the scan beam through the deflectors 1511 and 1510 to emerge centered on the scan beam, are largely unaffected by the focussing lens 1508, largely bypass the mirror 1507, and are finally focussed by a collecting lens 1530 onto a photodetector 1536. An optional near-infrared filter 1532 further helps reject of ambient light. The photodetector is of any suitable type, such as a solid-state photodiode or a photomultiplier tube.

The signal from the photodetector is amplified by amplifier 1536 and is converted to a digital value by analog-to-digital converter (ADC) 1538. The ADC operates at the scanner's pixel rate, i.e. 100 MHz. The ADC is synchronised with the horizontal deflector driver 1512.

Figure 85:
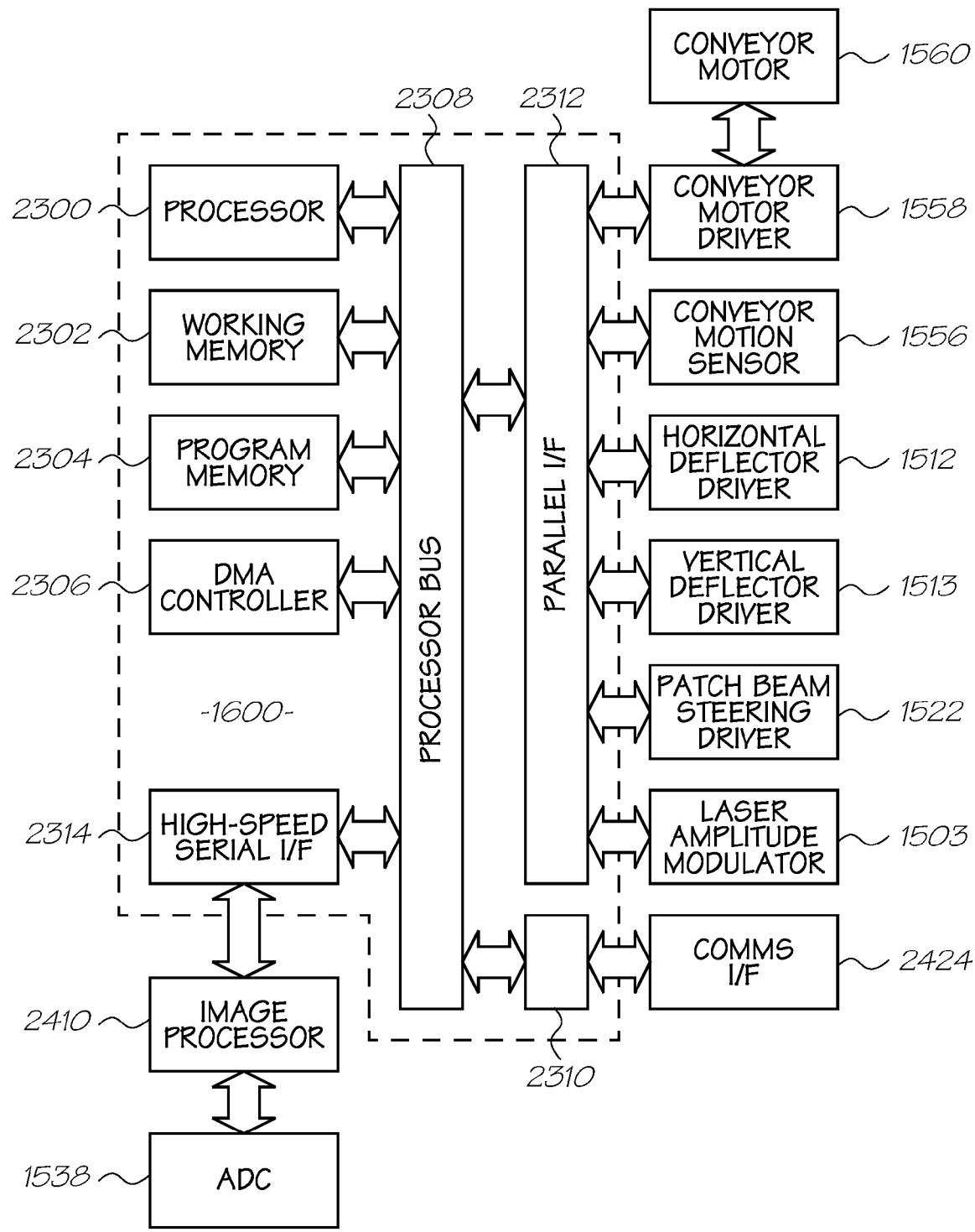
FIG. 85 shows a block diagram of salient aspects of the electronics of the scanner FIG. 76; and, FIG. 86 shows a schematic of a second example of a fixed Hyperlabel™ laser scanner 1500 according to a preferred embodiment of the present invention.

FIG. 85 shows a block diagram of the electronics of the scanner, including an integrated scanner controller 1600.

Where reference numbers in FIG. 85 match those described in FIG. 69, they refer to the same or similar components and functions.

The fixed Hyperlabel™ scanner 1500 utilises the same image processor 2410 as the hand-held Hyperlabel™ scanner, and netpage pens described in FIGS. 8, 9, 65 and 58, here configured to directly capture the digital output of the ADC 1538. The controller 1600 is a higher-performance but otherwise similar controller to the controller described in FIG. 69. It decodes Hyperlabel™ tags in real time and communicates the resultant scan data over the communications interface 2424 to the control unit or retail processing system to which the scanner is attached. It controls the conveyor motor 1560 via the conveyor motor driver 1558. It controls the scanning operation via the horizontal and vertical deflector drivers 1512 and 1513, and the tip-tilt patch beam steering driver 1522. During range finding it controls the amplitude of the laser beam via the amplitude modulator 1503.

As an alternative to the retroreflective collection system, or in addition to it, one or more photodetectors with collection lenses and near-infrared filters may be placed closer to the scan volume, i.e. within the scan posts 1022.

Figure 83:
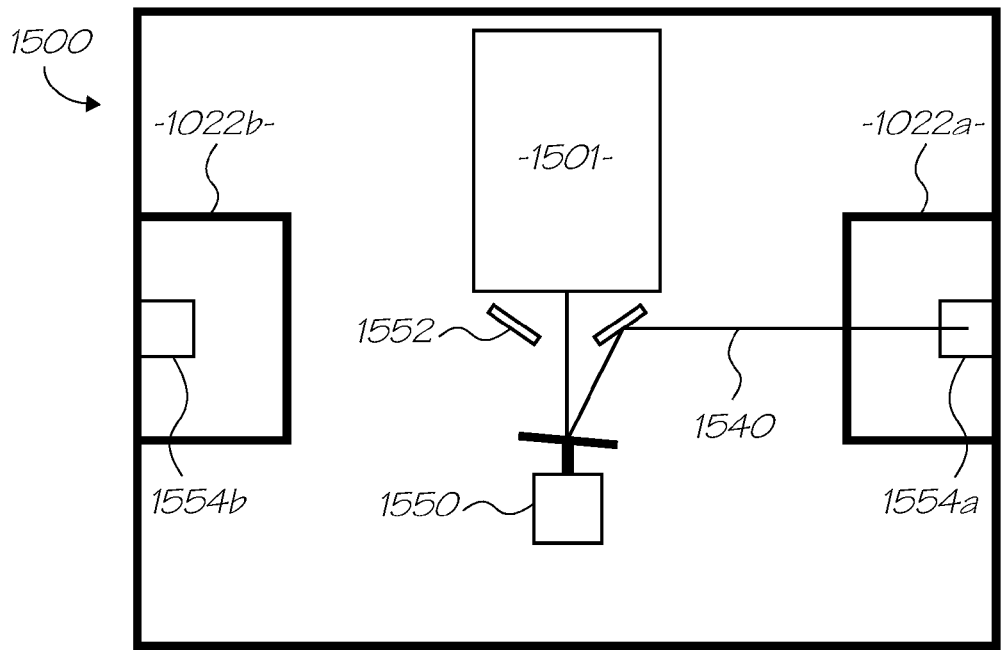
FIG. 83 shows a plan view of the scanner incorporated in the checkout, showing beam paths below the conveyor.

As shown in FIG. 82 and FIG. 83, the scanner's central unit 1501 is designed to be housed below the conveyor 1014, and to be time-multiplexed between the two scan posts 1022. An additional tip-tilt mirror 1550 is used to direct the scan beam to mirror 1552 associated with one or other scan post, and thence to mirror 1554 which directs the beam up the corresponding scan post 1022 to mirrors 1528a etc. to effect the omnidirectional scan.

Rather than time-multiplexing a single scanner unit 1501, it is also possible to use two separate scanner units.

The scanner can be operated as a range finder by modulating a pulse onto the scan beam 1540, using the amplitude modulator 1503, and precisely measuring the nanosecond-scale time-of-flight of the pulse to the photodetector 1534.

Range finding can be used for two distinct purposes. It can be used to detect the presence or absence of an object in the scan volume, and it can be used to determine the distance to the object surface, i.e. the depth of the object surface with respect to the scanner. The known depth of object surface being scanned can be used on a per-patch basis to optimise the focus of the beam and hence the scan spot size.

The scanner may also employ adaptive focus. If it succeeds in acquiring tag targets within a particular patch, but fails to successfully acquire and decode the tag data, then it may rescan the patch with a different beam focus.

The scanner may usefully operate in three modes. In the first "detection" mode the scan volume is nominally empty and the scanner is attempting to detect an object on the input edge of the scan volume, either using range finding or using a separate object detector based on one or more light sources and photodetectors.

In the second "profiling" mode the scan volume contains a detected object and the scanner is determining the two- or three-dimensional profile of the object from the point of view of the scanner, using rapid range finding throughout the scan volume.

In the third "scanning" mode the scan volume contains a profiled object and the scanner is actively scanning the object as described previously. Given a known object profile the scanner can optimise the patch distribution to evenly cover the object and maximise the chances of tag acquisition.

It is also possible to operate the scanner with a fixed patch scan pattern rather than a scan pattern adapted to the profile of the object. In this case the tip-tilt steering mirror 1520 may be replaced by a rotating holographic disc, each of whose segments encodes a different beam direction (and possibly beam focus). In this way the beam can be steered at in an arbitrary pre-determined pattern at the maximum patch rate. A scanner which utilises a holographic disc is described in Dickson, L. D. and G. T. Sincerbox, "Optics and holography in the IBM supermarket scanner", in *Selected Papers on Laser Scanning and Recording*, SPIE Volume 378, referenced below.

The maximum patch rate of the scanner means that it can densely scan the 500 mm height and 500 mm depth of the scan volume at about 8 Hz (or at half this rate if time-multiplexed between the two sides of the conveyor). At a conveyor speed of 500 mm/s, the scanner is able to perform 5 such scans during 300 mm of product item movement. This provides coverage of the three sides and top of the product item required to be scanned by the scanner from one side of the conveyor.

If a fixed scan pattern is used then the scanner has no profiling mode.

Although this description has assumed a pixel rate of 100 MHz, the scanner can be configured to operate at a lower rate. In this case the patch size is widened to accommodate increased skew induced by conveyor motion. Alternatively, the maximum speed of the conveyor may be reduced.

A number of components, systems and techniques related to the present invention are described in Beiser, L. and B. J. Thompson (eds.), *Selected Papers on Laser Scanning and Recording*, SPIE Volume 378 (SPIE 1985), and in Smith, W. J., *Modern Optical Engineering*, 3rd edition (McGraw-Hill 2000), the contents of both of which are herein incorporated by cross-reference.

8.4.2.2 Fixed Hologram Controlled Hyperlabel™ Laser Scanner

Figure 86:
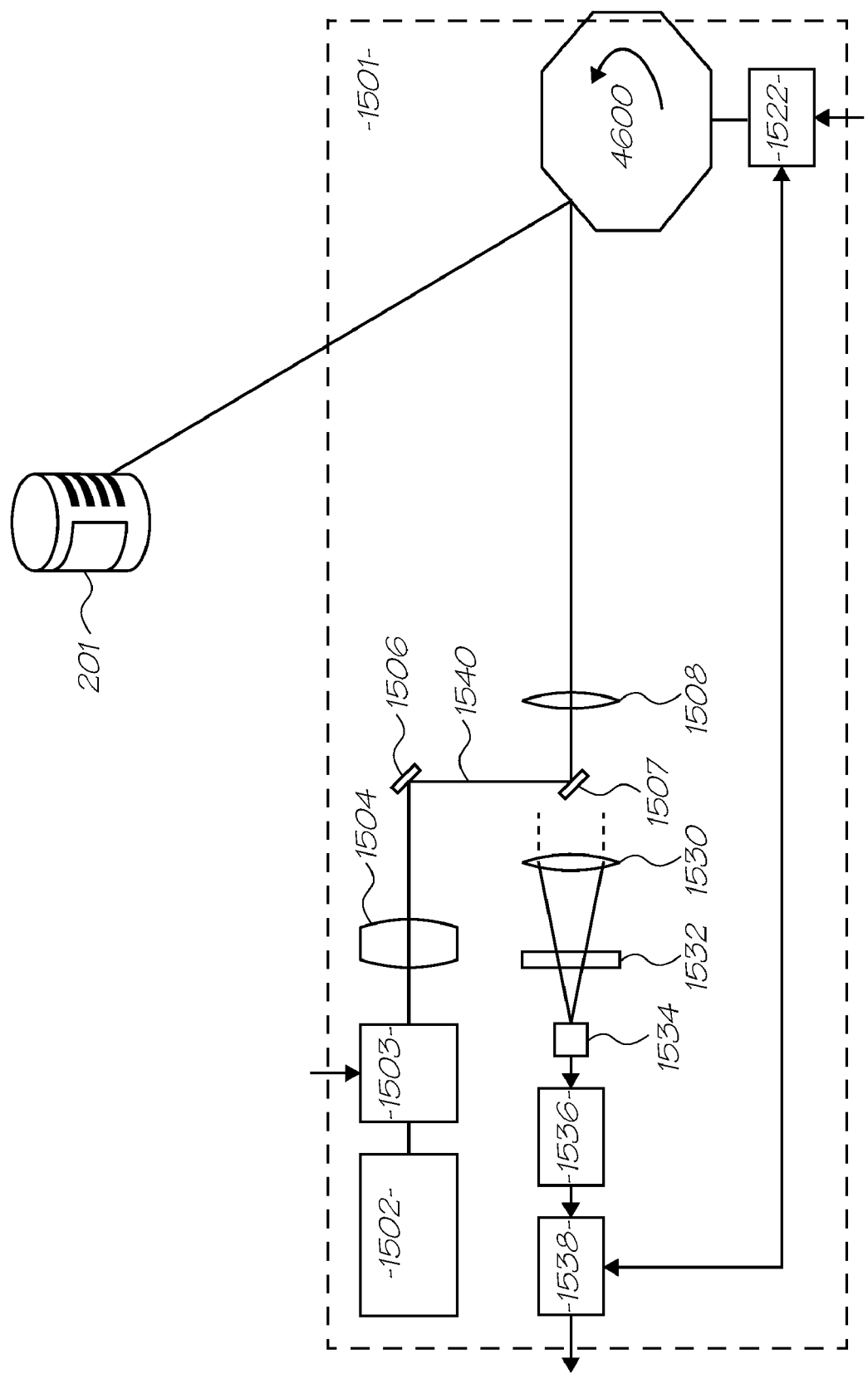

As an alternative to using the mirror based system to control the scanning beam, a holographic optical element may instead be used. An example of this will now be described with reference to FIG. 86.

In this example, a rotating holographic optical element 4600 is designed to both generate a scanning beam which moves over a patch, and to position the patch on the product item 201. This therefore removes the requirement for both the horizontal and vertical deflectors 1510 and 1511, and the mirror based control system 1518, 1528, as shown.

The functioning of the device otherwise is substantially as described above with respect to the mirror based control system and will not therefore be described in any further detail.

Figure 87:
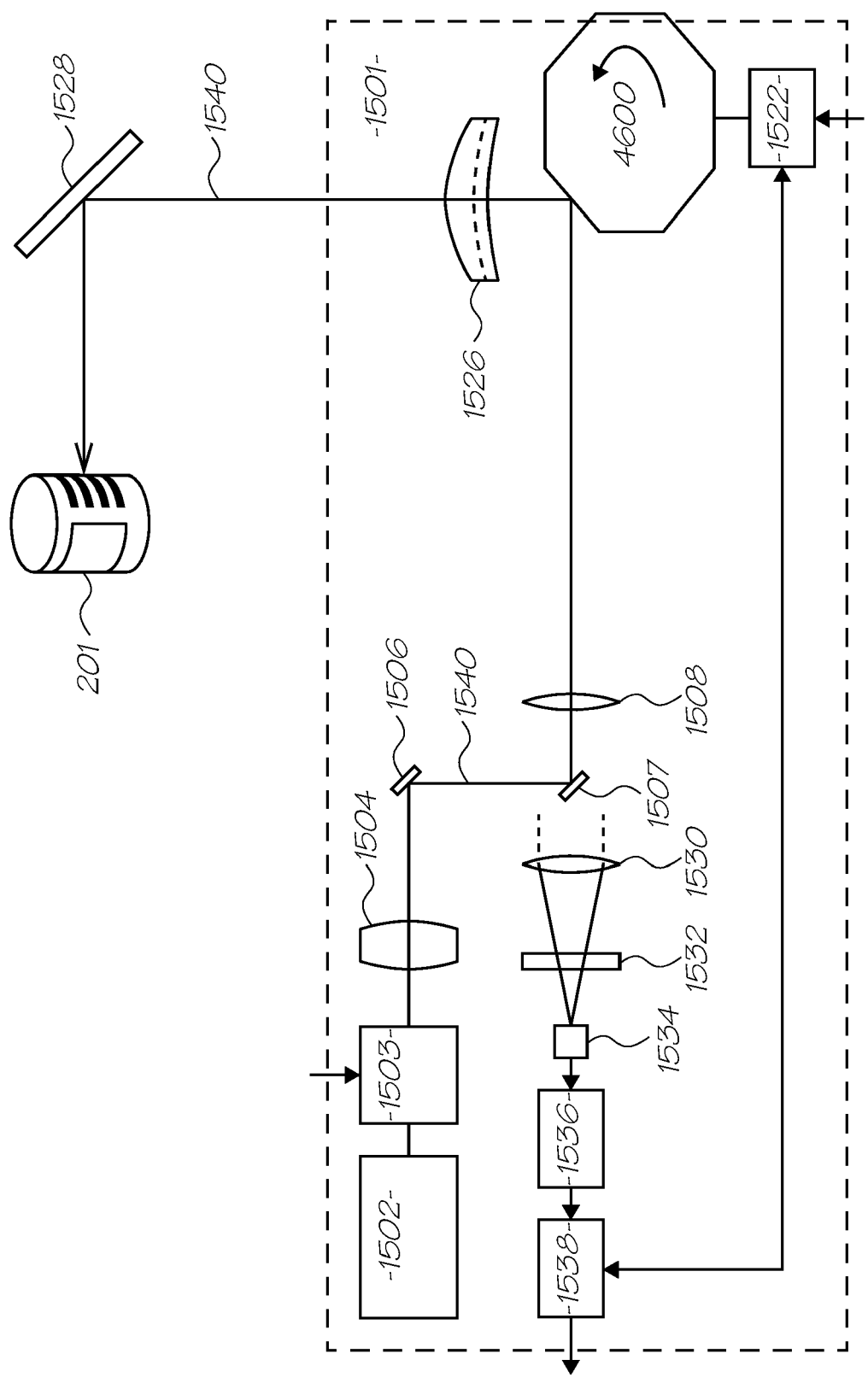
FIG. 87 shows a schematic of a third example of a fixed Hyperlabel™ laser scanner 1500 according to a preferred embodiment of the present invention.
Figure 88:
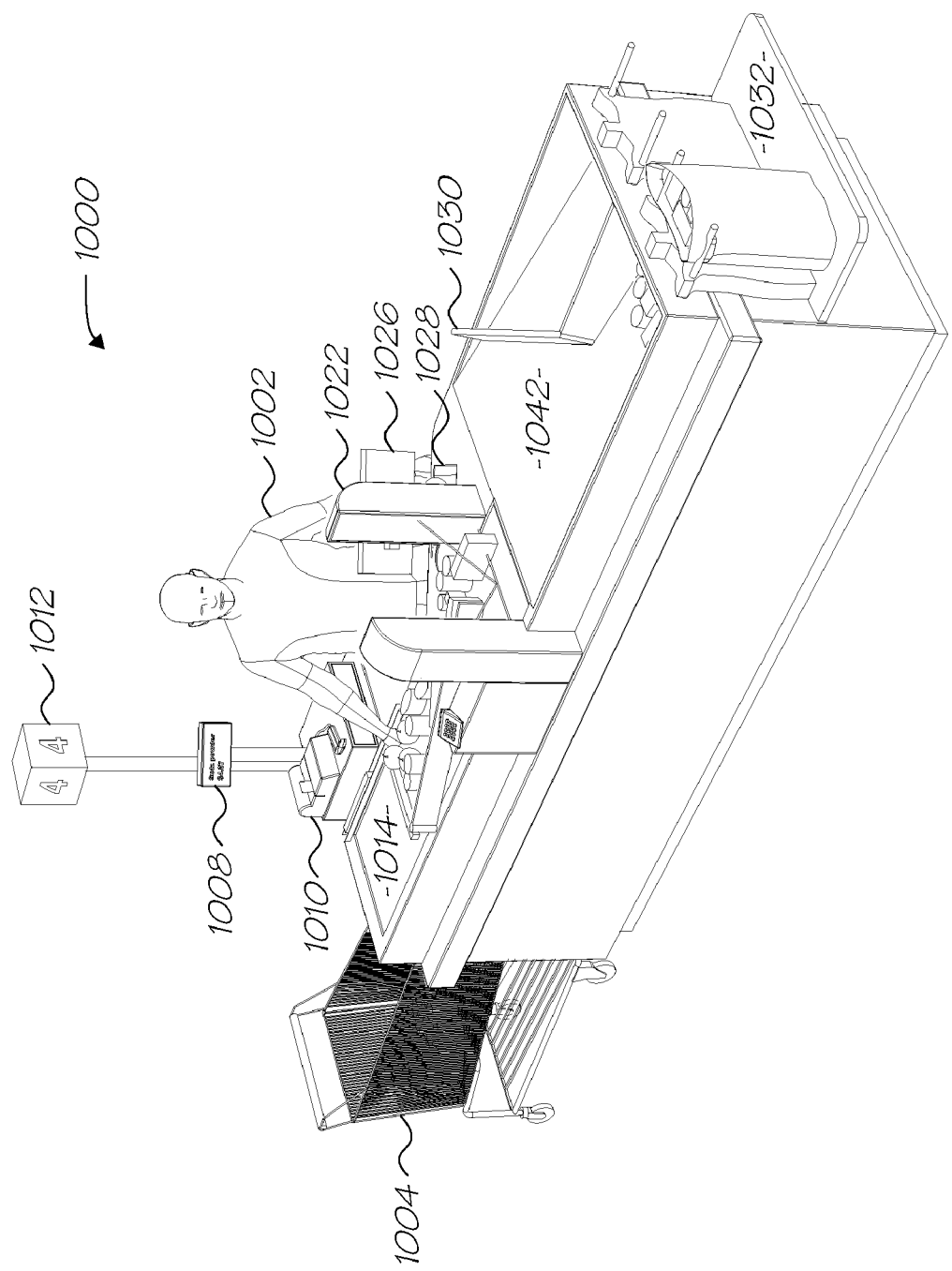
FIG. 88 shows a view of a first example of a checkout 1000 incorporating a fixed Hyperlabel™ laser scanner 1500, both according to preferred embodiments of the present invention.
Figure 89:
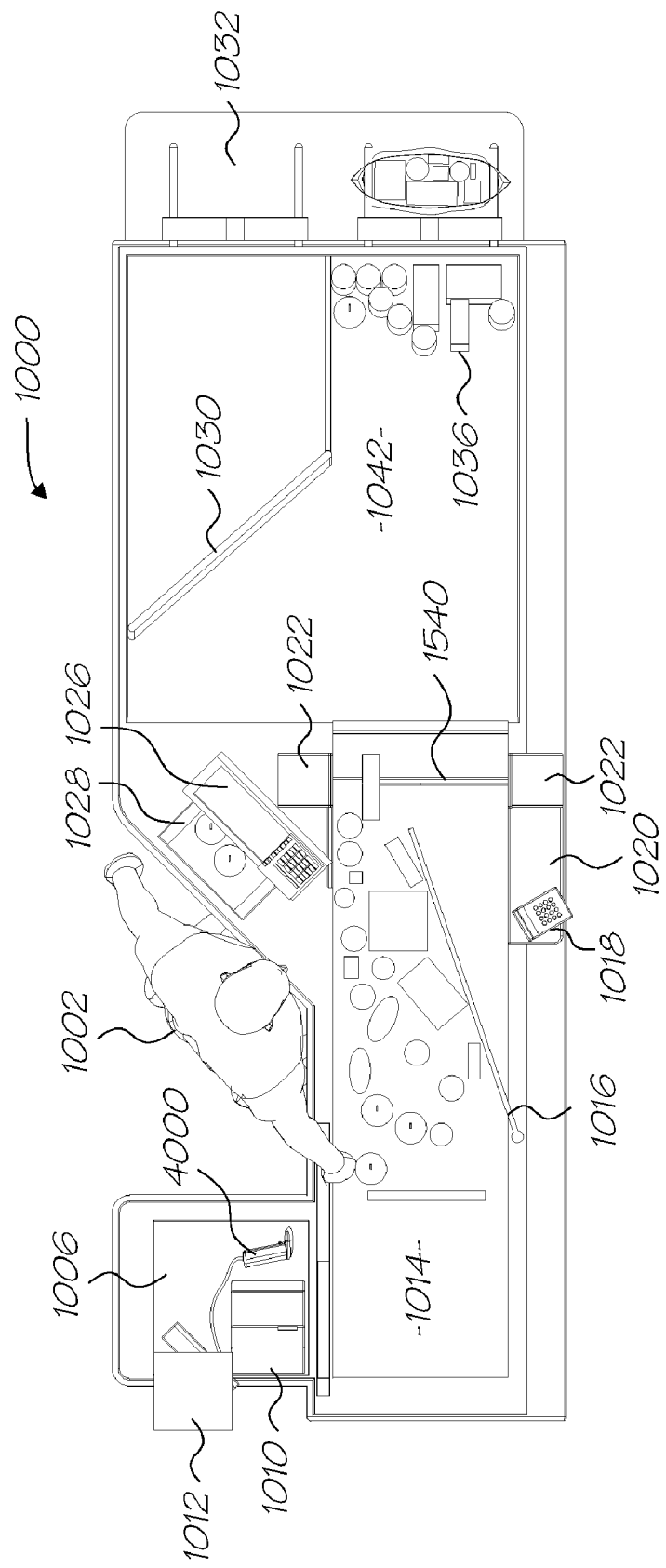
FIG. 89 shows a plan view of the checkout of FIG. 88.
Figure 90:
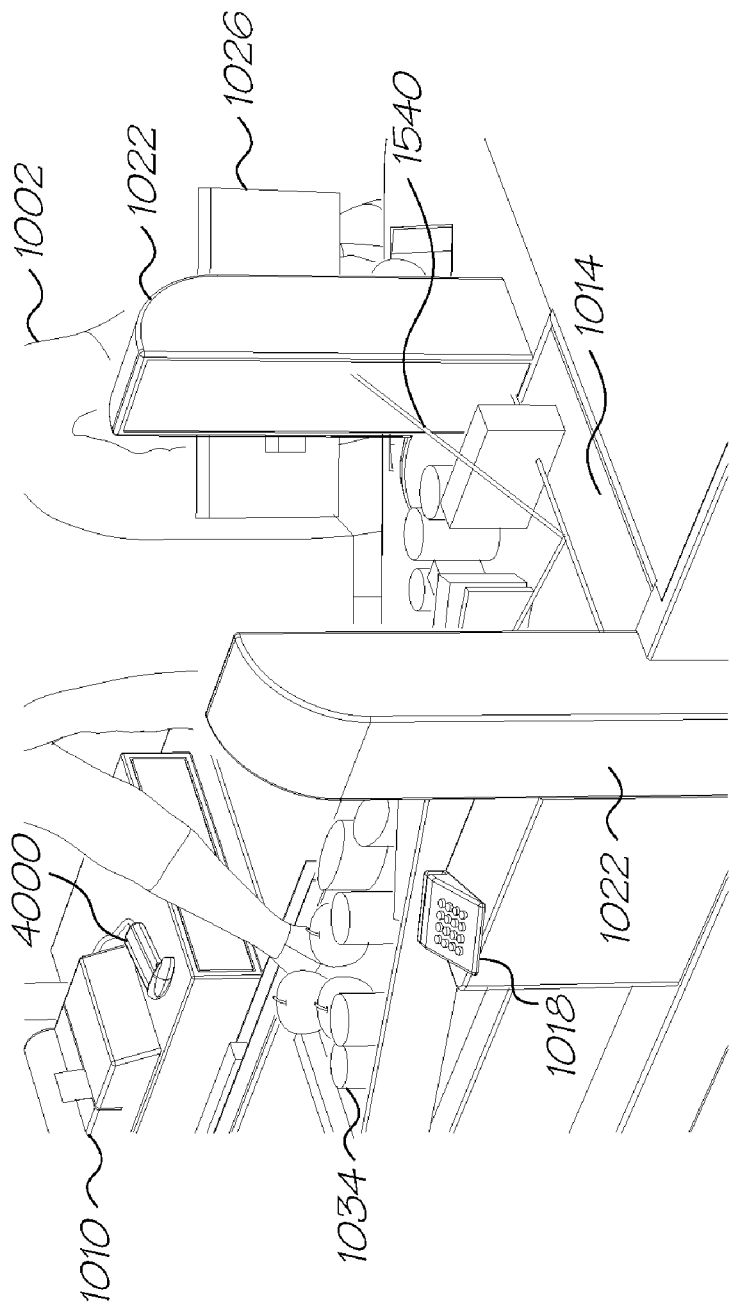
FIG. 90 shows a close-up view of the checkout of FIG. 88.
Figure 91:
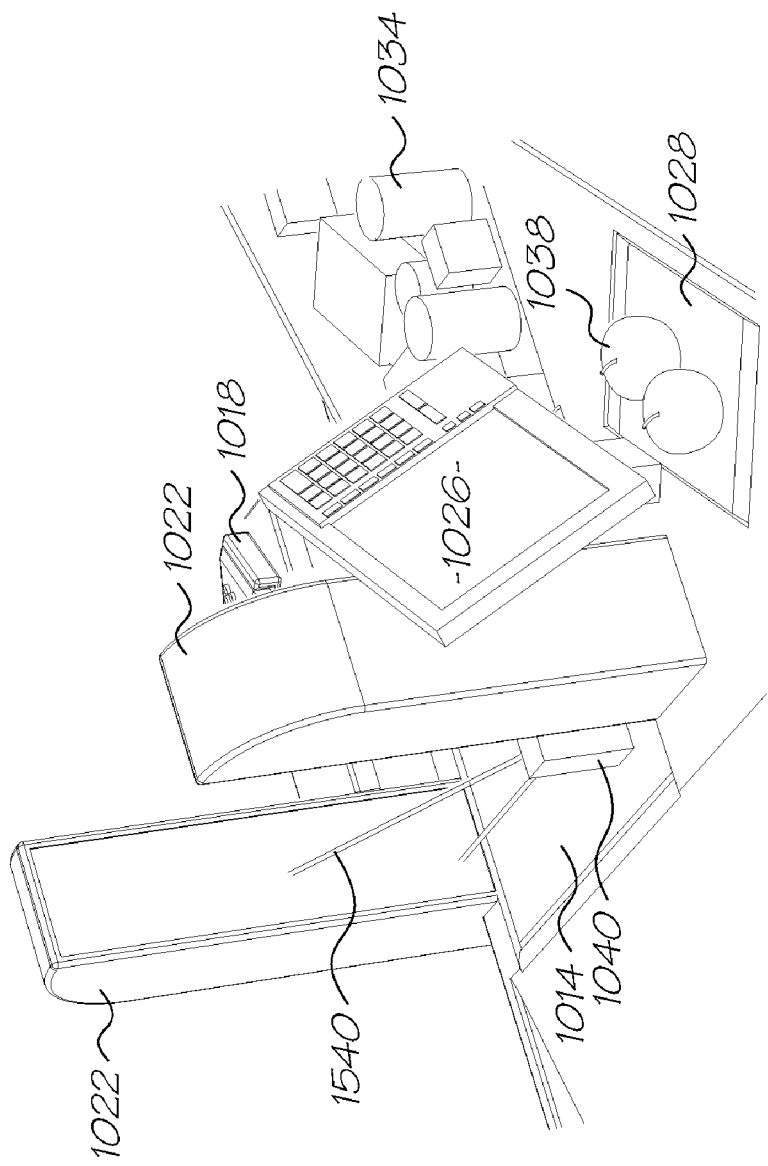
FIG. 91 shows close-up view of the checkout of FIG. 88 from the operator's point of view.

However, it will be appreciated by persons skilled in the art that the holographic element may direct the patch beam onto a number of mirrors equivalent to the mirrors 1528, to allow for appropriate directing of the scanning beam onto the product item 201, as shown in FIG. 87.

Alternatively, the beam may be aimed directly into the sensing region. In this latter case, it will be appreciate that the patch beam will enter the sensing region from substantially one direction. However, this still allows retail checkouts to be achieved as will be described in more detail below.

8.4.3.1 Column Array Based Retail Checkout

FIG. 88, FIG. 89, FIG. 90 and FIG. 91 show a first example of a retail checkout 1000 which incorporates and is adapted to exploit the fixed Hyperlabel™ laser scanner 1500. This may be either the mirror based or hologram based laser scanner systems, as will be appreciated by persons skilled in the art.

The checkout is designed to semi-automatically scan grocery and other items conveyed past the Hyperlabel™ scan posts 1022. The customer transfers items from a shopping cart 1004 to the conveyor 1014. The checkout operator 1002 ensures that tagged product items 1034 proceed through the scanner singly, but otherwise allows scanning to proceed automatically. Unique item IDs make semi-automatic scanning possible, and semi-automatic scanning of unique IDs result in more accurate scanning and prevents fraudulent collusion between the operator and the customer.

The operator diverts untagged items such as fruit and vegetables to a set of scales 1028 for manual entry via the register touchscreen 1026.

Tagged items slide off the conveyor into an output holding area 1042 after being scanned. Manually-processed untagged items are pushed by the operator into the holding area. The holding area includes a moveable boom 1030 which allows the holding area to simultaneously receive items for one customer while holding items for the previous customer. This allows the previous customer to continue bagging items in the bagging area 1036 while the next customer is being serviced, thus optimising checkout throughput.

The checkout includes a register display 1008 visible to the customer. This displays the description and price of the most recently scanned or manually entered item, as well as the running total. An indicator post 1012 incorporated in the checkout advertises the checkout's number, availability and other status information.

A hand-held Hyperlabel™ scanner 4000 allows the operator to manually scan bulky items or items which otherwise fail to scan automatically.

The checkout also includes a cash drawer 1006, EFTPOS terminal 1018, transaction counter 1020, and receipt printer 1010. The receipt printer may be a netpage printer, as described in the main part of this specification, thus providing the customer with the downstream benefits of netpage interactivity, such as the ability to record receipted items in a personal inventory, update a transaction history, and obtain product-level and item-level information about receipted items.

The receipt may also be printed on the reverse side with netpage-interactive advertising, special offers, and redeemable coupons.

To support interoperability with bar coded as well as RFID tagged items, the checkout may incorporate a traditional bar code reading capability as well as an RFID tag reading ability.

Both the fixed Hyperlabel™ laser scanner 1500 and the hand-held Hyperlabel™ scanner 4000 can provide scan data in a standard format and according to standard interfaces and protocols, and can thus be essentially plug-compatible with other item ID (e.g. EPC) scanners such as RFID readers, as described for example in U.S. Pat. No. 5,280,159, or a bar code scanner, examples of which are described in U.S. Pat. Nos. 5,340,973, or 5,126,544.

8.4.3.2 Transparent Conveyor Based Retail Checkout

In an alternative configuration, the laser based scanning system is provided within the checkout to direct the scanning beam into the sensing region through the conveyor.

Figure 92:
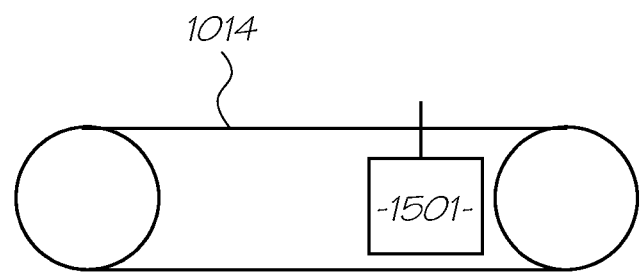
FIG. 92 shows a side view of the conveyor of a second example of the checkout of FIG. 88.

In this example, shown in FIG. 92, the central unit 1501 of the scanning device is positioned below the conveyor to allow the scanning beam to pass through the conveyor into the sensing region. Similar reference numerals to FIGS. 88 and 89 denote similar elements, and will not therefore be described in detail.

In this example, the conveyor belt 1014 is made at least partially invisible to infrared radiation. This is preferably achieved by providing holes in the conveyor belt which are of a sufficient area to allow the scanning beam to illuminate the product item and for the reflected radiation to pass back through the hole and be detected by the central unit 1501, as shown in FIG. 92.

This may be achieved by having the entire conveyor belt, or a portion 1014*a* thereof contructed from a mesh which has sufficient apertures for the laser scanning beam to pass therethrough.

Alternatively, this may be achieved by utilising an infrared-transparent conveyor belt which is infrared-transparent almost over the entire surface or at least a portion thereof. For example, a infrared-transparent strip 1014*a* could be provided along the centre of the conveyor belt as shown.

Operation is then substantially as described above.

It will be appreciated that this could be utilised in addition to the column based checkout system described above to thereby further enhance the chance of product items scanning correctly regardless of their orientation on the conveyor belt.

8.4.4 Other Scanner Configurations

The Hyperlabel™ laser scanner 1500 may usefully be incorporated in other checkout devices.

A variant of the Hyperlabel™ laser scanner may be incorporated in a self-checkout where the customer is responsible for scanning items. Even if the customer is still required to manually present items to the scanner, the unique item ID ensures that duplicate scans do not occur, and Hyperlabel™ tagging ensures that the customer is more easily able to scan items without having to be concerned with correctly presenting a bar code.

A variant of the Hyperlabel™ scanner may also be incorporated in a shopping cart in such a way that items added to the cart are automatically scanned and added to a record of the cart's content, and items removed from the cart are automatically scanned and removed from the record of the cart's content. In the shopping cart the scanner is configured to densely scan two scan volumes, each of which covers the entire opening into the cart. One scan volume lies above the other, and the scanner is configured to distinguish an item addition from an item removal based on the order in which the item's ID is scanned in the two scan volumes. Beam coverage of the scan volumes is assisted by mirrors mounted around the opening into the cart.

It is also possible to provide a scanner which is adapted to scan both Hyperlabel™ tags and 2D bar codes or RFID tags.

In the first instance, the scanning optics for sensing coded data and bar codes may be substantially identical. Accordingly, the scanning device may be similar to those shown in FIG. 81. In many cases, no modification of the scanning device is required. In some instances however it is necessary to provide an alternative light source such as a laser which generates visible light to allow the 2D bar code to be detected.

Similarly, it is also possible for the scanning device to incorporate an RF-ID tag reader. Again, this will be a standard RFID tag reader which is adapted to decode the EPC stored in the RFID tag.

8.5 Hyperlabel™-Based Netpage Interactions

A product item whose labelling, packaging or actual surface has been Hyperlabel™ tagged provides the same level of interactivity as any other netpage.

There is a strong case to be made for netpage-compatible product tagging. netpage turns any printed surface into a finely differentiated graphical user interface akin to a Web page, and there are many applications which map nicely onto the surface of a product. These applications include obtaining product information of various kinds (nutritional information; cooking instructions; recipes; related products; use-by dates; servicing instructions; recall notices); playing games;

entering competitions; managing ownership (registration; query, such as in the case of stolen goods; transfer); providing product feedback; messaging; and indirect device control. If, on the other hand, the product tagging is undifferentiated, such as in the case of an undifferentiated 2D bar code or RFID-carried item ID, then the burden of information navigation is transferred to the information delivery device, which may significantly increase the complexity of the user experience or the required sophistication of the delivery device user interface.

8.5.1 Product Registration

A Hyperlabel™ tagged product can contain a <register> button which, when activated with a netpage pen, registers the netpage user as the owner of the product. The user's contact information, which is already recorded on the netpage system, can be automatically transmitted to the product manufacturer who can record it in their customer database. The registration process can automatically add the manufacturer to the user's e-mail contact list, thus allowing the manufacturer to send the user e-mail relevant to the product, such as related special offers, recall notices, etc. If the manufacturer abuses their e-mail privileges, the user can bar them in the usual way.

An example of the procedure for implementing this will be described with reference to FIG. 101 which shows a system for allowing product registration. In particular, in this example, the user utilises a netpage pen 101, or other suitable sensing device, such as one of the scanning devices described above, to select the <register> button on the product item 201.

The netpage pen 101 captures an item ID and digital ink representing a click, from the product interface surface, and forwards this to the netpage pen server 500 associated with the netpage pen. The pen server 500 uses a name server 501 to resolve the item ID to a product server address, for example by using the manufacturer number, as described above.

The pen server 500 uses the server address to contact the product server 251 and obtain the interface surface description therefrom. As previously described, the interface surface description defines the action associated with respective positions or on the interface surface, and accordingly, the pen server 500 interprets the pen input in relation to the interface description and as a result generates a registration request. The request transferred to a manufacturer server 502, typically in accordance with a manufacturer server address determined from the item ID. The manufacturer server 502 is operated by the manufacturer of the product item, or an entity associated with the manufacturer which operates to provide product registration facilities.

The manufacturer server 502 is responsive to the registration request to register the user of the netpage pen 101 as the owner of the product item 201. This will be achieved by having the manufacturer server 502 update a database which contains information indicative of the current owner of the product item. It will therefore be appreciated that this is generally updated with information such as the user's contact information. In one example, this is achieved by having the pen server provide an indication of user details previously associated with the netpage pen 101, as part of the registration request.

Once registration has been performed, an optional response can be sent by the manufacturer server 502 confirming that registration is complete. This may be provided to the user via a terminal 504, such as the netpage printer, or by any other suitable indicating device.

Accordingly, the selection of an appropriate <register> button, which is typically formed from a respective region on the product item's interface surface, allows the user the register themselves with the manufacturer as the existing owner of the product item.

Figure 102:
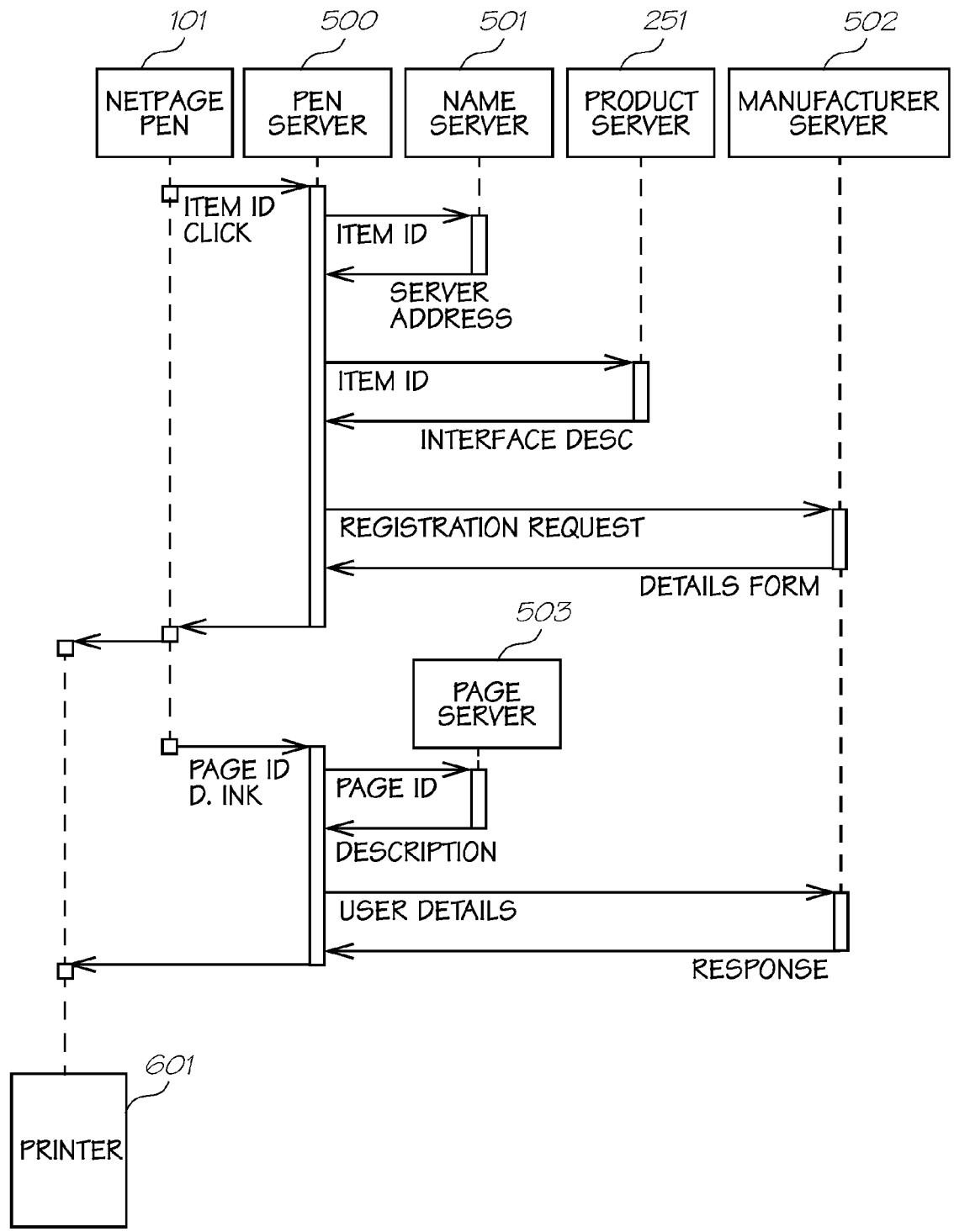
FIG. 102 is a schematic view of a second example of a product item registration protocol.

It will be appreciated that the registration system may include a number of variations. For example, in the above described example, the user details are automatically provided as part of the registration request. However, alternatively the user details may be provided in a subsequent step, as shown in FIG. 102.

In particular, in this example, the manufacturer server 502 responds to the registration request to generate a user details request form, which is transferred to a terminal, which may be any form of terminal that allows completion of the form by the user.

In one example, the terminal is formed from a netpage printer 601, which presents the user with an interactive form which can be completed using the netpage pen 101 in accordance with techniques described above with respect to netpage interaction.

Thus, the form will include a number of fields into which the user can enter information using the netpage pen 101. The netpage pen transmits digital ink representative of the completed form information, to the pen server 500. The pen server 500 (or page server 10) retrieves a form description using the form page ID or region ID using the item ID, digital ink and interface description, and uses this to interpret the digital ink to generate data representing the user details. The user details are then provided to the manufacturer server 502, which operates to register the user, and optionally provide a registration response as described above.

As a further alternative, the user may be identified to the manufacturer through the use of an alias ID, as previously described.

As an alternative to providing a <register> button on the product item interface surface, the sensing device can be adapted to operate in a mode, such as a <register> mode, which allows registration to be triggered by clicking anywhere on the interface surface. In this case, the sensing device need only capture the item ID, with the pen server being responsive to this to generate the registration request.

Selection of an appropriate mode may be achieved using an input provided on the sensing device, or alternatively, by the use of a suitably encoded netpage which has buttons provided thereon.

8.5.2 Product Servicing

A Hyperlabel™ tagged product item can contain a <servicing> button which, when activated using a netpage pen, or other suitable scanning device, signals that the user requires servicing of the product item in question.

Figure 101:
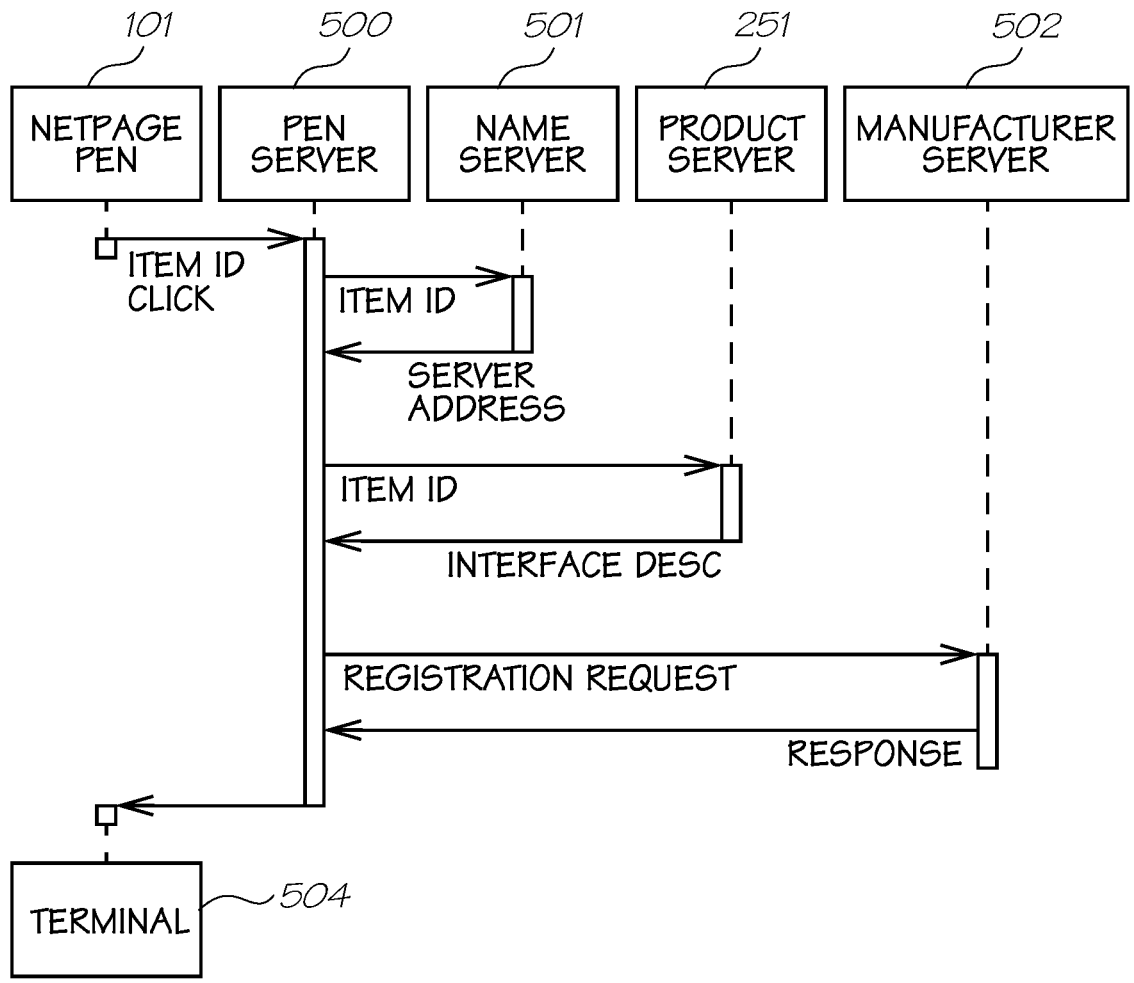
FIG. 101 is a schematic view of a first example of a product item registration protocol.

This may be achieved in a manner substantially similar to that described above with respect to product registration in either FIG. 101 or 102, and the flow of information will not therefore be described in detail.

In this particular instance however, the registration request transferred from the pen server 500 to the manufacturer server 502 is replaced with a service request, which will indicate at least the product ID or the product item ID of the item requiring servicing. In this instance, the manufacturer server 502 responds to the servicing request in such a manner as to provide required servicing of the product.

This can therefore be achieved in a number of ways depending on the respective product item, the nature of the servicing required, and the respective implementation.

For example, the manufacturer server 502 may be adapted to initiate a standard response based on the item ID, and this will therefore be performed in a manner similar to that shown in FIG. 101, with the manufacturer server 502 generating an indication of the action to be taken as a response. This may include for example having an operator contact the user of the netpage pen 101 to determine further details of the servicing required, and/or to schedule appointments.

Alternatively, the response may simply indicate to the user a number to call to contact the manufacturer, or specify an appointed action, such as returning the product item to a specified location.

Alternatively, the product item can include a number of buttons indicative of respective faults. In this instance, the user will select a button indicative of a respective fault using the netpage pen 101, with an indication of this being provided in the servicing request, thereby allowing the manufacturer server to determine an appropriate response action.

Thus, for example, the manufacturer server 502 can be provided with details of respective action to be taken for each kind of fault indicated on the product item. Again, this may include for example returning the product for servicing, arranging for an engineer to service the product, arranging for a portion of the product to be replaced, or the like.

Alternatively, the <servicing> button may simply indicate that servicing is required, with the manufacturer server 502 generating a servicing form which is transferred to a terminal, such as the printer 601 described above. This is used to allow the manufacturer to obtain details of the servicing required, in a manner similar to the provision of the further user details, as described with respect to FIG. 102 above.

In this case, the servicing form may include details of the type of servicing required by the user, such as an indication of the nature of the fault, preferred times and dates for servicing or the like. The user can complete the form using the netpage pen 101 with the pen server 500 operating to forward on the details of the completed form to the manufacturer server 502. The manufacturer server can then arrange for servicing to be performed as required by the manufacturer.

8.5.3 Communications Services

A further operation of Hyperlabel™ tagging is to provide the user with access to services associated with the product item, such as for example free communications. Again, this may be achieved by having the user select a <communications> button provided on an interface surface associated with the product item.

An example of how this may be achieved will now be described with reference to FIG. 102, and for the specific example of the communications being an SMS.

In particular, in this example, the product item 201 is provided with an <SMS> button. In this instance, when the user wishes to send an SMS, they can select the <SMS> button utilising either the netpage pen 101, or a mobile phone which is adapted to incorporate a netpage pen or pointer function and in particular to operate as in a manner equivalent to a netpage pen.

In this instance, the method will be substantially as described above with the pen server 500 obtaining a server address from the name server 501 and utilising this to obtain an interface description from the product server 251. The interface description will be used by the pen server 500 to determine that an <SMS> button has been activated, thereby indicating that user wishes to obtain a free SMS. Thus, the pen server 500 generates an SMS request which is transferred to the manufacturer server 502.

The manner in which the SMS is provided will vary depending on the respective implementation.

In a first embodiment, the manufacturer server 502 will respond to the SMS request to provide the user with an SMS response inclusive of a number to which the SMS should be sent. The user simply generates an SMS in the usual way utilising their own mobile phone, and including an indication of the intended destination phone number. The user then sends the SMS to the number indicated in the SMS response to correspond to a number operated by the manufacturer, or other entity.

The manufacturer or other entity will receive the SMS and then forward this to the destination number indicated in the SMS. Typically, the numbers will be configured so that the user is not charged for this process and in return for this, the manufacturer will typically embed advertising within the sent SMS, such as an indication that the SMS was sent in accordance with a free SMS provided by the respective entity.

In a second example, the user sends the SMS directly to the destination in the normal way. In this case, the manufacturer server 502 receives details of the user's mobile phone number as part of the SMS request, and arranges payment of the SMS on the user's behalf.

Figure 103:
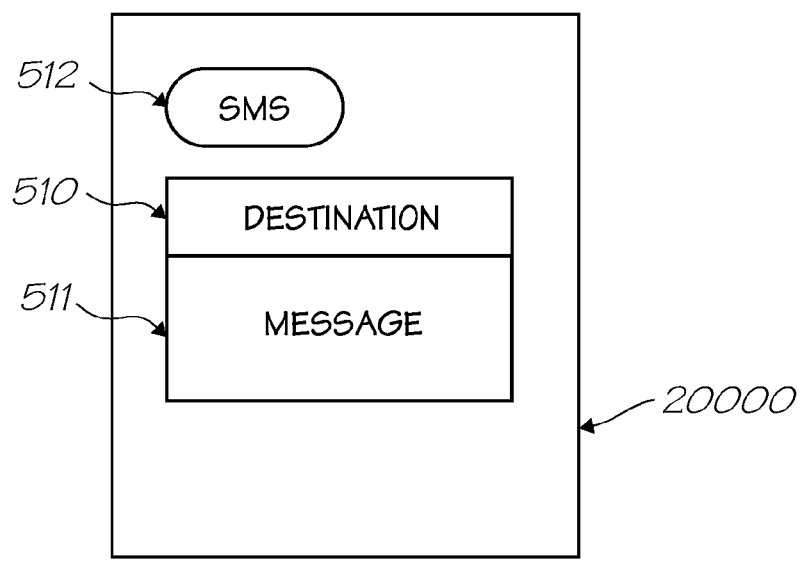
FIG. 103 is a schematic view of an interface for providing SMS functionality.

In a third example, the process operates without requiring direct user interaction with a mobile phone. In this instance, the <SMS> button 512 is associated with a destination region 510 and a message region 511 on the product item interface, as shown in FIG. 103.

In use, the user provides a hand-written indication of the destination mobile phone number in destination region 510, and a hand-written indication of the message text in the message region 511. In this case, once this information has been completed, the user selects the <SMS> button 512 using the netpage pen 101, causing the netpage pen 101 to transfer the item ID and digital ink, indicative of the destination and message, to the pen server 500. In this instance, when the SMS request is transferred to the manufacturer server 502, this will include the destination number and message text which the manufacturer uses to send the SMS accordingly.

In a fourth example, the user selects the <SMS> button, causing the SMS request to be transferred to the manufacturer server 502. The manufacturer server will then generate an SMS form, which is provided to the user in a manner similar to that shown in FIG. 102. The user then provides the destination and message body details via the form, allowing the manufacturer to send the SMS accordingly.

It will be appreciated that these techniques can also apply to other forms of communication, such as e-mail, MMS messages, or the like, as well as to making free phone calls, or the like, in which case both the delivered message and the embedded advertising may include images, graphics, audio, video and Web page content".

8.5.4 Product Information Via Product ID

Some of the benefits of Hyperlabel™ tagging products can be gained by enhancing the netpage pen to decode UPC bar codes. Alternatively a UPC bar code scanner can netpage-enabled. When the netpage system receives a scanned UPC, it forwards a request to a default or favorite application for that product type (as described earlier), and this in turn elicits product information from the application, such as in the form of a printed netpage. The product page can also include the facility to enter the serial number of the product item and register the user's ownership of it via a <register> button. Product manufacturers can thus gain the benefits of netpage linking for their entire installed base of products without making alterations to the products themselves.

8.5.5 Context-Specific Product Help

If the entire surface of a product is Hyperlabel™ tagged, then pressing on any part of the surface with a netpage pen can then elicit product-specific help. The help is either specific to the area pressed, by providing respective <information> buttons, or making respective regions of the product interface surface responsive to provide respective information, or relates to the product as a whole. Thus the user of the product has instant access to helpful information about specific features of a product as well as the product as a whole. Each feature-specific help page can be linked to the entire product manual.

It will be appreciated that this can be achieved in manners similar to those described above with respect to FIGS. 101 and 102, with an indication of the selected region, button, or simply the item ID being transferred to the manufacturer server to allow the information to be provided.

8.5.6 Home Inventory

In a further example the system is adapted to provide home inventory functionality by allowing a user to use a scanning device, such as a hand-held device described above with respect to FIGS. 58 to 75, or a netpage pen 101, to update details of product items within the home.

In one embodiment, when a user has purchases a product, they use the netpage pen 101 to scan the coded data provided on the product item's interface surface, thereby allowing the pen server 500 to determine the item ID. An indication of this can then be stored in a database on a product item list, which lists items currently owned by the user.

When the user uses the item, the product item can again be scanned, with the pen server 500 using the determined item ID to remove the product item from the product item list.

In the simplest embodiment, this therefore uses a single undifferentiated scan process to both add and remove product items from the product item list. However, as this may lead to incorrect adding or removal of items from the list, for example, due to double scanning of an item, in an alternative embodiment, the scanning processes for adding and removing items from the list are differentiated, such that a respective scan operation is used to add and remove the product items.

In one example, this is achieved by providing respective <add> and <remove> buttons on the product item. In this instance, the user selects an appropriate button, with the identity of the button being determined by obtaining an interface surface description from the product server 251, in a manner similar to that described above. The pen server will then add the item to, or remove the item from the product item list as required.

As an alternative to providing respective buttons on the product item interface surface, the sensing device can be adapted to operate in different modes, such as an "add to list" mode and a "remove from list" mode. Selection of an appropriate mode may be achieved using an input provided on the sensing device, or alternatively, by the use of a suitably encoded netpage which has buttons provided thereon. In this case, the pen server interprets the pen input in relation to the interface description and as a result uses this to select a scanning device mode. Again, this will be achieved by having the pen server 500 to obtain a page description from a page server, and use this to determine the operating mode associated with the respective button.

In addition to maintaining a list of current items within the home, the pen server 500 may also be adapted to store minimum stock level indications in the form of predetermined thresholds of certain types of product items. In this case, when the pen server 500 updates the product item list, the pen server will determine the type of the product item added or removed from the product item list, and uses this to update a total of the number of product items of the respective type. This value is then compared to the predetermined threshold associated with the respective product item type. If the number of product items is below the threshold, an appropriate indication is generated that the product item requires replenishment.

This can be achieved by adding an indication of the product item to a shopping list, which is therefore automatically updated with details of product items that need replenishing. Accordingly, this allows the pen server 500 to maintain an inventory of product items currently in the home and obtain a shopping list of items that are of stock below a predetermined level.

In the above examples, the functionality of maintaining the inventory is typically performed by an inventory application operating on a suitable computer system, such as a computer owned by, run by, and/or situated in the user's home. In this case, the pen server (or page server) operates to interpret digital ink and submit this to the application. In use, when the user goes shopping, the shopping list may be printed out in the form of a netpage, with the product item types and number of the product items required being indicated by the coded data provided thereon. This can then be used to ensure that correct items are purchased in the shop by scanning the shopping list, and then scanning selected product items, to allow these to be removed from the list.

Alternatively, the shopping list may be used to place an online order, either automatically, for example on a regular basis, or at the user's direction.

A number of other variations are also possible. For example, the pen server 500 can be adapted to record details of the status of product items within the home, such as defining product items as in use. Furthermore, product items may also be added directly to shopping lists upon use (i.e. instead of maintaining a home inventory), again by selection of an appropriate input mode, through the use of a button on the product item or the like.

8.5.7 Product Ownership Tracking

If the entire surface of a product is Hyperlabel™ tagged, then pressing on any part of the surface with a netpage pen can elicit a description of the product and its current ownership. After the product is purchased, pressing on any part of the surface can automatically register the product in the name of the owner of the netpage pen. Anyone can determine the ownership of a product offered for sale simply by pressing on any part of its surface with a netpage Pen. Ownership may only be registered by a new owner if the current owner has relinquished ownership by signing the "sell" portion of the product's status page. This places the product in an "unowned" state.

Product information and ownership is maintained either by the product manufacturer, as a service to its customers, or by a profit-oriented third party.

The shipping computer system of a product manufacturer can automatically transfer ownership of products from the manufacturer to the distributor or retailer, and so on down through the supply chain. The retail computer system of the retailer can automatically mark each sold item as free, or transfer ownership directly to the holder of the payment card used to pay for the product. The customer can also use a netpage pen at the point of sale to register immediate ownership of the product.

Traditional clearing-houses for stolen goods, such as pawn shops, can be required by law to check the ownership of all products presented to them. Since a Hyperlabel™ tagged product has an invisible encoding on most or all of its surface, it is difficult for a thief to remove it or even tell if it has been successfully removed. Conversely, it is incumbent on a potential buyer of a product to ensure that a clean reading can be obtained from its surface so that its ownership can be indisputably established.

Where a product is leased or otherwise subject to complex or multiple ownership, the product registration database can reflect this and thus alert a potential buyer.

8.5.8 Light Weight Web Interface

As described earlier, Hyperlabel™ tagged products can be used to request linked Web pages for printing or display on a Web terminal, e.g. a screen-based Web browser running on a personal computer (PC), mobile telephone or personal digital assistant (PDA).

In the absence of infrastructure support for product interface descriptions, a single page ID can be used per page, or an individual link ID can be used for each embedded hyperlink, i.e. the position 86 usually encoded in a netpage tag (or Hyperlabel™ tag) can be replaced by a link number, either selectively or over the entire page.

If the page ID is structured (e.g. if it includes an item ID 215), then part of the page ID (e.g. the product ID 214) can be used to identify a Web page directly, i.e. via some rule for encoding the ID as an Uniform Resource Identifier (URI), and the remaining part (e.g. the serial number 213) can be appended to the URI as a unique session ID (transaction ID). The presence of the session ID can allow the corresponding Web server to enforce per-item behavior, such as ensuring that a competition is only entered once. If link numbers are used, then they also form part of the URI.

8.5.9 Local Computer Application Interface

The user interface to a GUI-based computer application running on a multi-tasking computer can be printed as a netpage on a user interface or command "card". The printed user interface can include a "digitizer pad" area for moving the GUI pointer relative to the application. Invoking any function of the application's user interface or moving the GUI pointer, automatically makes the application current—i.e. if the application is running in a windowed GUI system then its window is brought to the front and made current. If the application is not currently running, then it is automatically launched.

The printed user interface for a text-oriented application can contain a printed keyboard, a general-purpose handwriting input text field, or both.

A personal computer system or workstation can thus potentially consist of a screen for displaying GUI output, a number of application-specific printed user interfaces, a sensing device (typically a stylus) for sensing user operations relative to the printed user interfaces, and a computer which receives wired or wireless transmissions from the sensing device, runs applications, and interprets sensed inputs relative to each application.

Each printed user interface "card" can be encoded with a unique page ID specific to the application, and tagged with an attribute which instructs the personal computer or workstation to interpret operations on the page relative to a local instance of the application, even in a global networked netpage environment.

If the computer is a network terminal connected to a LAN, an intranet, or the Internet, any interaction with the printed user interface can launch or interact with a networked instance of the application.

8.5.10 Sensing Device Context

The same netpage may elicit different behavior depending on the type, identity and/or context of the netpage sensing device used to interact with it. For example, a netpage pen or stylus connected to a PC or Web terminal without a netpage printer (or prior to full netpage system deployment) may elicit displayed Web pages or even local application behavior, as described above. In the presence of a netpage printer the same sensing device may elicit printed netpages, possibly with a different format and behavior to the corresponding on-screen versions.

8.6.1 Orientation Determination

It will be appreciated that by providing an interface surface over a substantial portion of a product item or other object, and by utilising the positional information encoded in the coded data provided thereon, this allows the orientation of the product item or object to be determined.

In particular, if the object is scanned by a scanning system whose location is known, such as the scanning system described with respect to FIG. 82, detecting a coded data tag allows the pen server 500 to access the interface surface page description, from the product server 251, and use this to determine the location of the tag on the object.

In addition to this, the tag also encodes orientation information. Accordingly, by determining the orientation of the tag, and combining this with information regarding the position of the sensed tag on the interface surface, this allows the position and orientation of an object to be determined Thus, it will be appreciated that this is similar to determining the position and orientation of a netpage pen 101 with respect to a netpage, albeit with the scanning device remaining stationary whilst the object and the associated interface surface move.

In a variation on the above described technique, particularly where a high degree of accuracy is not required, or if it is merely required to determine which way up an object is, for example to determine on which face a box is resting, each face of the box can be encoded as a respective region provided on the interface surface. This is achieved by assigning a respective region ID to each tag on a respective face of the box or other object.

In this case, the scanner can be positioned so as to detect data tags on one face, such as the top of the object. In this case, the region ID determined from the detected tag will be used to access an interface surface description in the usual way, with description simply indicating a respective surface of the object in accordance with the region ID, thereby allowing the orientation of the object to be determined In a further example, the region ID encoded in the coded data can directly indicate the face of an object, such as the top, side, bottom, as well as an orientation with respect to a nominal reference. This allows the orientation of the object to be determined directly from the coded data without reference to a description of the object, or an interface surface description.

In the event that the absolute position of the tag on the interface surface is not required, then it is possible to use object-indicating tags instead of position-indicating tags.

8.6.2 Assembly/Packing System

It will be appreciated that the orientation determining system described above can be used to pack objects, as well as to assemble objects from component parts.

Figure 104:
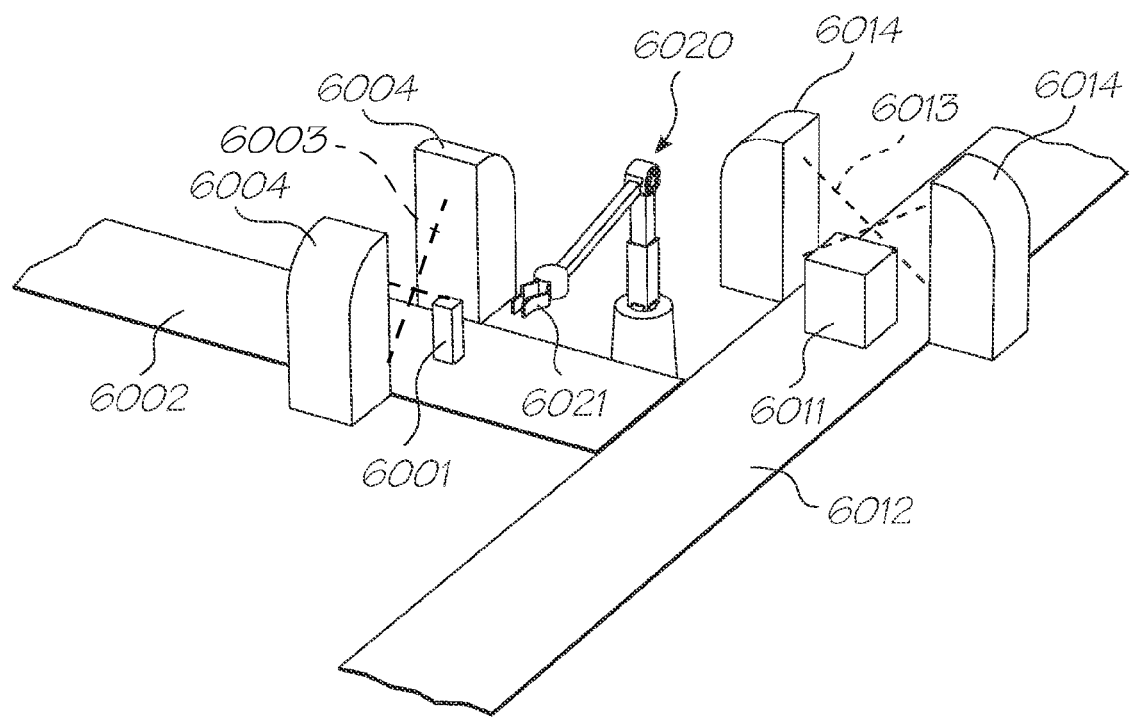
FIG. 104 is a schematic view of an example of a packing system.

An example of this will now be described with reference to FIG. 104, in which an object 6001 is transported on a conveyor 6002 through a sensing region 6003 generated by a scanning device 6004. In this example, the object 6001 is to be packed into a box 6011, transported via a conveyor 6012 through a sensing region 6013 generated by a scanning device 6014. In this example, the scanning devices 6004, 6014 are formed from scanning devices similar to that described with respect to FIG. 82.

In addition to this, a robotic packing system formed from a robot arm 6020, having a manipulator 6021, which is provided to allow the object 6001 to be packed into the box 6011. The arm may be any form of arm, as described for example in U.S. Pat. No. 4,259,876.

In use, this is achieved by having the scanning device 6004 sense Hyperlabel™ tags provided on the surface of the object, thereby allowing orientation and position of the object 6001 to be determined, using the techniques described above. Similarly, the scanning device 6014 is used to determine the orientation and position of the box 6011 using Hyperlabel™ tags provided thereon.

Signals from the sensing devices regarding the orientation and position of the object 6001 and the box 6011 are then transferred to a control system 6022, which operates to cause the robotic arm 6020 to pick up the object 6001 using the manipulator 6021 and insert the object into the box 6011.

It will be appreciated that this form of position determination to allow packing of objects can be utilised in any form of generic packing system as the nature of the robotic system is not important for the purposes of the present invention. It will therefore be appreciated that the techniques can be used in any packing system, such as the packing system described in U.S. Pat. No. 5,165,219, whilst avoiding the need for complex orientation determination as described therein.

It will be appreciated that as a variation, the system can be adapted to assemble complex objects from component parts. Thus, for example, the conveyors 6002, 6012 can be adapted to carry respective component parts, with the scanning devices 6004, 6014 being used to detect the position, orientation and identity of the component parts, as described above. Once the component parts have been determined, the control system 6022 determines in accordance with predetermined assembly instructions, the manner in which the component parts should be combined to form the complex object. The robotic arm 6020 can then be operated to in accordance with the assembly instructions and the orientation and position of the respective component parts, thereby allowing the object to be constructed.

It will be appreciated that in such cases, it is typical to require more than one robotic arm, and potentially other manipulating devices for performing specific operations, such as welding of the component parts.

Thus, this system allows components, such as car parts or the like, to have coded data disposed thereon at certain predetermined locations. The coded data may be disposed by printing, etching, or the like. The car part would then be scanned by an appropriate scanning device to allow its exact orientation to be determined, allowing the parts to be assembled into a car.

It will be appreciated that this form of position determination to allow components to be assembled into an object can be utilised in any form of generic robotic system as the nature of the robotic system is not important for the purposes of the present invention. It will therefore be appreciated that the techniques can be used in any robotic assembly system, such as the system described in US-2004016112.

This therefore prevents the need for precise vision systems, such as that described in U.S. Pat. No. 5,943,476, which are often extremely expensive and often unreliable.

Again, coded data can directly indicate the face of an object or component, such as the top, side, bottom, as well as an orientation with respect to a nominal reference. Similarly, it is possible to use object-indicating tags instead of position-indicating tags, to sense the position and/or orientation of the component or object.

8.7.1 Shopping Receptacle

Figure 105:
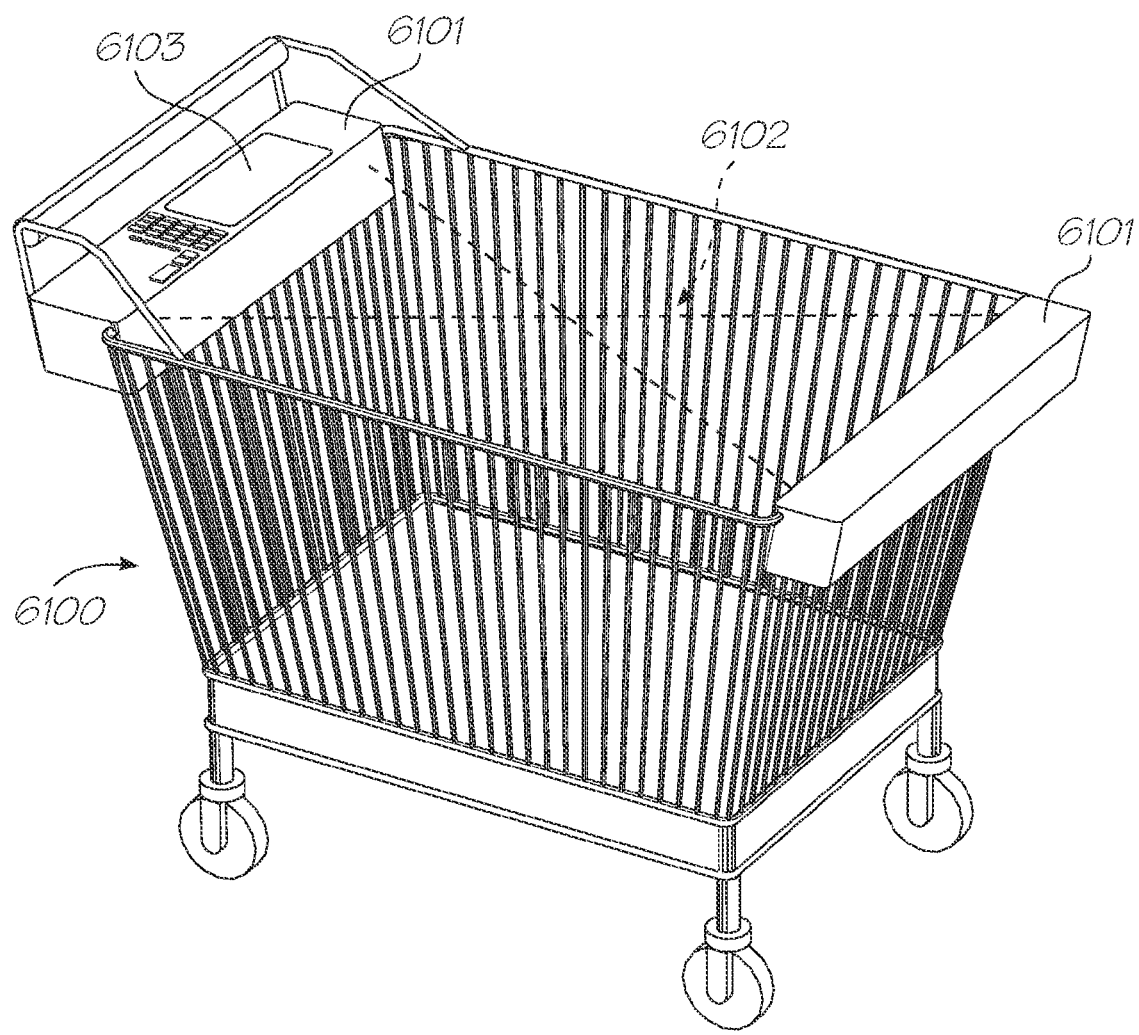
FIG. 105 is a schematic perspective view of a first example of a shopping receptacle adapted to sense product items.
Figure 106:
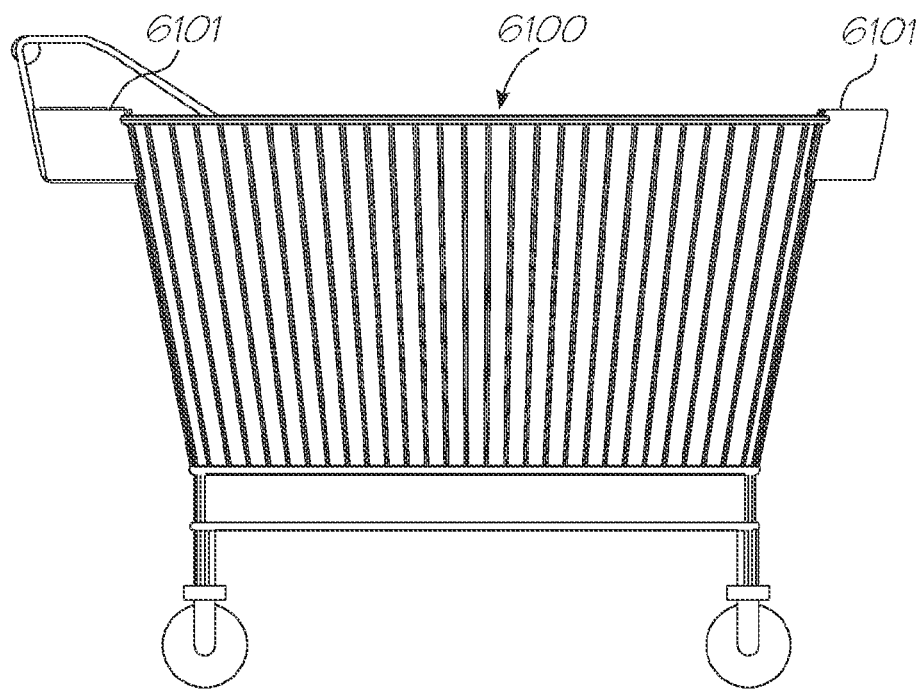
FIG. 106 is a schematic side view of the shopping receptacle of FIG. 105.

FIG. 105 shows a shopping trolley or cart 6100 fitted with one or two scanning devices 6101, which operate to sense product items 201 positioned in a sensing region 6102 corresponding to the opening of the shopping receptacle. It will be appreciated that the scanning device(s) may be similar to the scanning devices described above.

In any event, as product items are inserted into the receptacle 6100, the scanning device(s) 6101 scan the product item and detect coded data tags provided thereon, allowing the item ID of the product item to be determined. It will be appreciated that this may provide a variety of functionality to the shopper.

In particular, in a first example, an associated computer system adds an indication of the scanned product item to a purchase list, which stores an indication of each product item added to the receptacle. This allows the user to automatically scan items when they are placed in the shopping receptacle, allowing them to be subsequently purchased in some manner.

Thus, when a user has selected all the product items required, the scanning device 6101 can be adapted to determine a cost of all the product items thereby allowing payment to be made. It will be appreciated that this may be achieved in any one of a number of manners depending on the situation.

For example, the user may present their receptacle to a cashier who will determine an indication of the cost of the items from the computer system, thereby allowing payment to be collected. In this case, if the computer system is provided on the receptacle itself, this can be achieved by having the cashier interrogate the computer system using a suitable communications system.

Alternatively, the computer system may be provided centrally, thereby allowing a single computer system to monitor lists for each of the receptacles in a store. In this instance, when the scanning device 6101 detects the addition of the product item to the receptacle, an indication of the item ID, together with an identifier associated with the receptacle will be transferred to the computer system, thereby allowing the computer system to maintain a respective list associated with each receptacle. In this instance, the cashier will determine the list for a respective receptacle by providing an indication of the identity of the receptacle to the computer system, thereby allowing the computer system to retrieve the relevant purchase list.

A number of variations on the above are also possible.

For example, the scanning device 6101 can be provided with a user interface, such as a touch sensitive display, thereby allowing the list to be displayed to the user. This also allows product item information to be determined by placing the product item in the sensing region 6102. In this example, the product information may include information such as the:

manufacturer;
  item identity;
  expiry date;
  nutritional information; and,
  or any other appropriate information.

The user interface may also allow the user to make control inputs, such as to select articles on the purchase list, allowing further information to be provided, or the like.

In one example, product items are added to the list when placed into the receptacle and removed from the list once removed from the receptacle. However, as an alternative, the user may be required to enter a special mode to thereby remove items from the list.

Figure 107:
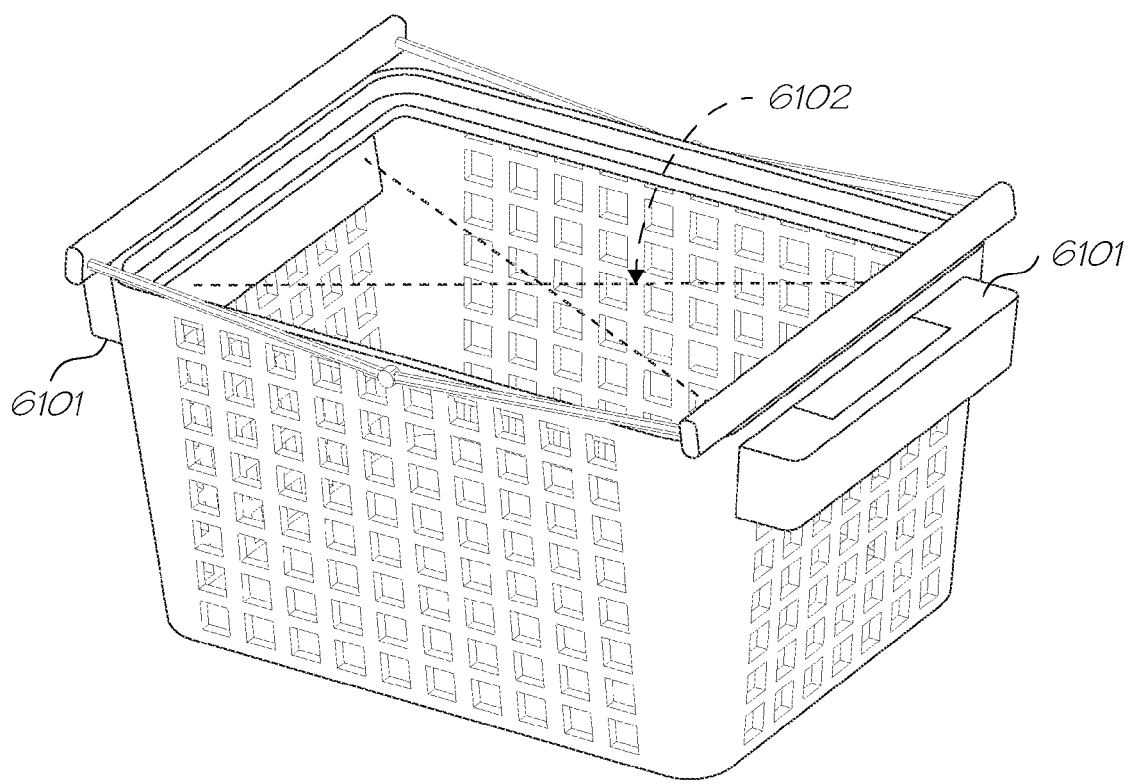
FIG. 107 of a schematic perspective view of a second example of a shopping receptacle adapted to sense product items.

It will be appreciated that the receptacle may be in the form of a basket as shown in FIG. 107.

8.7.2 Shopping Receptacle Incorporating Scales

Figure 108:
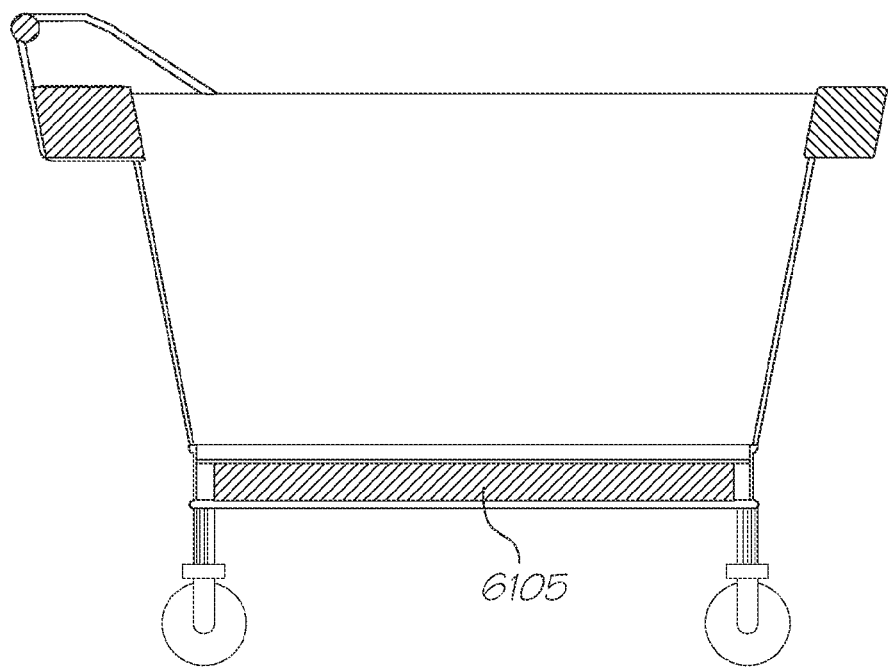
FIG. 108 of a schematic side view of a third example of a shopping receptacle adapted to sense product items.

In a further embodiment of the shopping receptacles, the shopping receptacle is further modified to include a weighing device, such as electronic scales, shown generally at 6105 in FIG. 108. In this example, the weighing device operates to weigh the product items placed in the receptacle as each product item is placed therein. The weight determined by the weighing device is then compared to a predetermined weight indicated for the product item.

Thus, the computer system will use each item ID to access data stored in a store which indicates the weight of the respective product item. It will be appreciated that this may be provided in the product information. The weight determined using the item ID is then compared to the weight determined by the weighing device 6105.

In the event that the scanned product item and weight of product items inserted into the receptacle do not agree, this indicates that there has been a scanning error, or that the user has attempted to insert more than one item into the receptacle, to thereby disguise the presence of one of the items, allowing the item to be fraudulently obtained. In the event that such a disparity is determined then an indication of this will be provided allowing the user to correct the scanning error.

In the event that this is not corrected, an alert can be activated, allowing the contents of the user's receptacle to be checked by shopping assistants in-store, security or the like.

8.7.3 Shopping Receptacle/Scanner Association

In one example, the shopping receptacle 6100 is associated with a user prior to commencing shopping. This may be achieved for example by having the user present an identity card to the scanning device 6101, as described in more detail below.

In this instance, the scanning device 6101, upon determining the user identity, will transfer an indication of this in the form of a user ID, together with a shopping receptacle ID, to a computer system. This may be the same computer system which retains the details of the purchase list. In any event, when the user completes shopping, this allows the total of the product items purchased to be determined from the computer on the basis of the user's identity.

Thus, it will be appreciated from this, that the shopping receptacle becomes associated with the identity of the user so as to define a shopping session. At the end of the shopping session, when the user has selected all the product items required and arranged payment, the receptacle is disassociated from the user.

This allows systems of automated payment to be implemented. For example, the user can place product items for purchase in the shopping receptacle and walk through an exit station. On walking through the exit station, the scanning device 6101 transmits information concerning the product items purchased and the shopping receptacle identity to a payment server. The payment server determines the identity of the user associated with the respective shopping receptacle, and operates to debit an account of the user accordingly, thereby providing an automated checkout facility.

In addition to this, it is possible for the user to be provided with personalised information via the user interface. For example, the user can register details of allergies, such as nut allergies, with the store. In this case, when the user has been associated with a receptacle, if a product item contains a relevant ingredient, such as nuts, a warning can be provided to the user.

In addition to this, advertising, details of special offers, or the like, can be provided via the user interface, with this information being tailored to user preferences, or the like.

As an alternative to providing a scanning device associated with a shopping receptacle, it is also possible to provide a handheld scanning device which is used by users to scan select items placed in a normal receptacle. In this case, a record of the product items scanned for purchase is stored in a memory in the scanning device, or is wirelessly transferred to a suitable computer system which stores a record associated with the identity of the scanning device, or the user. Upon leaving the store, the user relinquishes the scanning device, and is charged accordingly for those product items purchased using the scanning device. This may be achieved, for example, by using the user's identity to determine a charge account which can be used to make payment.

8.7.4 Card Encoding

Figure 109:
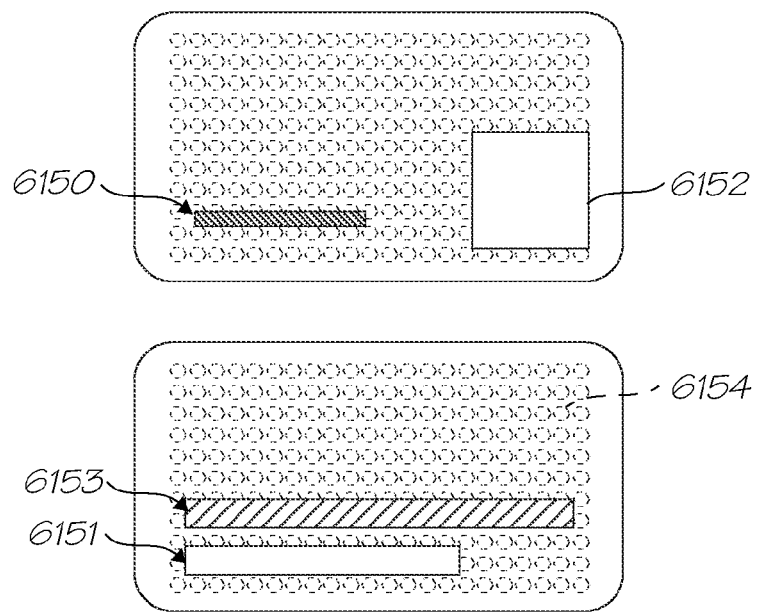
FIG. 109 is a schematic view of a loyalty card incorporating coded data.

An example of a card which may be utilised with the system described above will now be described with respect to FIG. 109. In particular, the loyalty card can be any form of credit card size card formed typically from a plastic substrate, or the like. The card may include information such as the user's name 6150, signature field 6151, and optionally other security information such as holographic tags 6152 or a magnetic stripe 6153 with information encoded thereon.

Coded data 6154 is disposed over a substantial area of the card, as shown at 6154. In use, the coded data is used to encode data indicative of a user identity, such as a netpage user ID or alias ID, as described above.

This is typically achieved by using a card blank, including the security information thereon. The card may then be printed or embossed with the user's name, before or after being printed or embossed with the coded data. In addition to this, the process may also additionally, or alternatively, involve encoding additional information in the magnetic stripe. The card is then issued to the user, allowing the user to sign the card in the signature field.

The card may also include additional information disposed thereon, such as the user information, a logo of a retailer, other security information, a name of a retailer, or the like. This information may again be printed using visible ink, either before or after the printing of the coded data.

In use, the store can use the sensed coded data to identify the user and determine details or payment information, or the like.

8.8 Near-Infrared Dyes

Near-infrared dyes suitable for Hyperlabel™ tagging (and netpage tagging in general) exhibit relatively strong absorption in the near infrared part of the spectrum while exhibiting relatively minimal absorption in the visible part of the spectrum. This facilitates tag acquisition under matched illumination and filtering, while minimising any impact on visible graphics and text.

Figure 93:
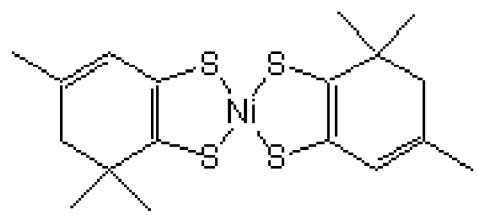
FIG. 93 shows the molecular structure of isophorone nickel dithiolate.
Figure 95:
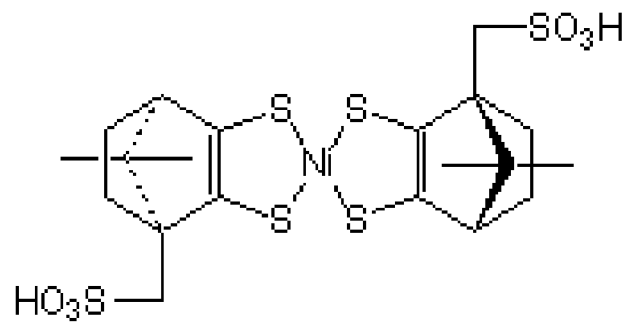
FIG. 95 shows the molecular structure camphor sulfonic nickel dithiolate.

FIG. 93 and FIG. 95 show the molecular structures of a pair of suitable near-infrared dyes.

Figure 94:
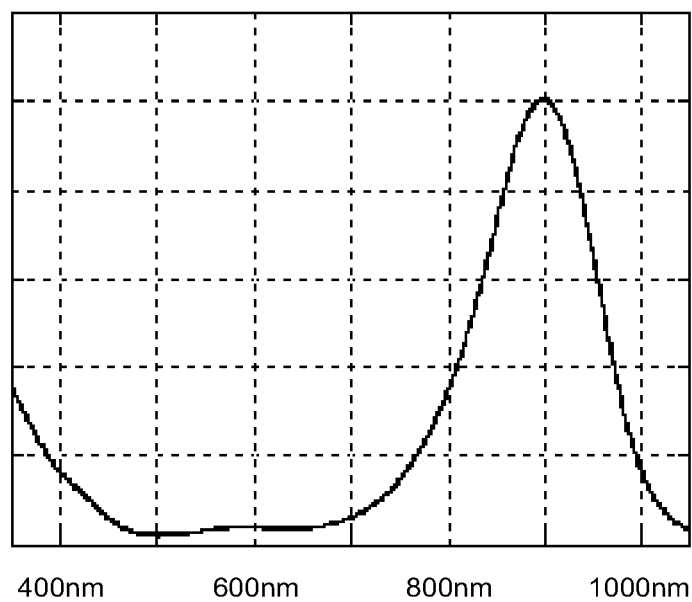
FIG. 94 shows the absorption spectrum of the dye of FIG. 93.

FIG. 93 shows the structure of isophorone nickel dithiolate. As shown in FIG. 94, it exhibits a strong absorption peak around 900 nm in the near infrared, while exhibiting relatively minimal absorption in the visible spectrum.

Figure 96:
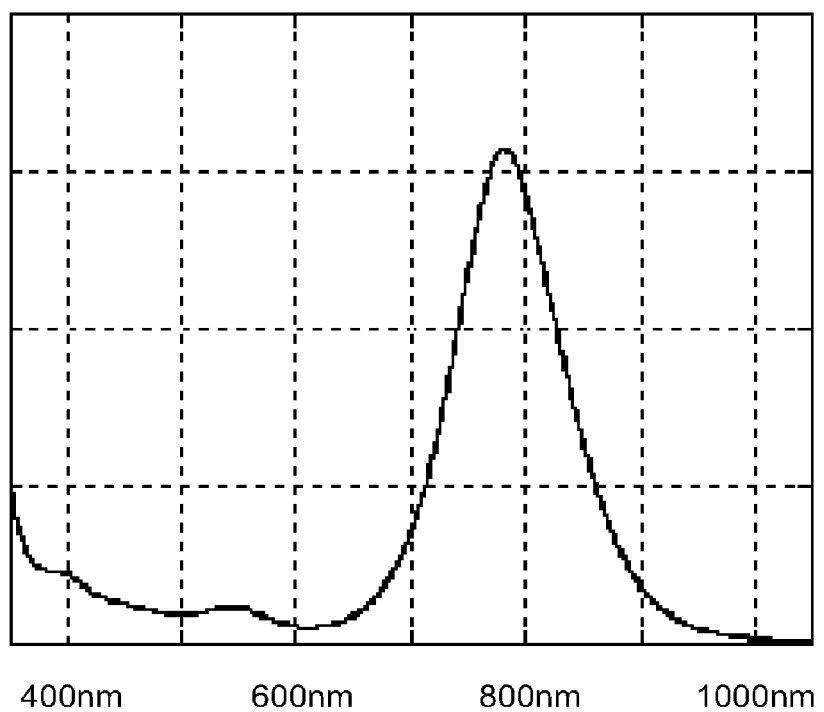
FIG. 96 shows the absorption spectrum of the dye of FIG. 95.

FIG. 95 shows the structure of camphor sulfonic nickel dithiolate. As shown in FIG. 96, it exhibits a strong absorption peak just below 800 nm in the near infrared, while exhibiting relatively minimal absorption in the visible spectrum.

8.6 Hyperlabel™ Tagging Benefits

Some of the benefits of Hyperlabel™ tagging will now be discussed. This will focus on the costs and benefits of item-level tagging using Hyperlabel™ tag-carried EPCs in grocery. Note, however, that Hyperlabel™ tags are also applicable to higher-valued items, and items which are tagged with RFIDs may usefully be Hyperlabel™ tagged as well to allow scanning without RFID infrastructure or after RFID erasure.

Assuming case-level RFID tagging and item-level Hyperlabel™ tagging, an item is accurately recorded into retail store inventory when its corresponding case is received and scanned. Ignoring stocktake-related scanning for the moment, the item is next scanned at the checkout, at which time it is recorded as sold and removed from on-hand store inventory.

A grocery checkout system based on optical reading of Hyperlabel™ tags, such as the system described above can provide equivalent capabilities. Grocery item labels and packaging are particularly well-suited to Hyperlabel™ tagging, where much or all of the visible surface of a product item can be tagged. A Hyperlabel™ reader can reliably scan a Hyperlabel™ tagged product item presented in its field of view, irrespective of the item's orientation. If an item instead carried only a single visible bar code (whether UPC or unique), then reliable scanning would only be achieved by presenting the item's bar code directly to the reader, as occurs at checkouts at present. This would in turn preclude automatic scanning In practice a Hyperlabel™ reader is designed to scan the scanning field from at least two substantially orthogonal directions. This helps the reader scan items which are only partially Hyperlabel™ tagged, such as tins which may have untagged tops and bottoms, and can also help the reader avoid occlusions which may occur in manual presentation scenarios, i.e. due to the hand presenting the item to the reader.

Since partial and incremental item-level RFID tagging of higher-value grocery items is likely, in practice a checkout may incorporate both RFID and Hyperlabel™ readers. Since Hyperlabel™ tagging may itself be introduced incrementally, a checkout may incorporate RFID, Hyperlabel™ and bar code reading ability.

Automatic checkouts bring a number of benefits. They reduce staff costs by reducing reliance on trained checkout operators, both by reducing required skill levels at manned checkout stations, and by facilitating simplified self-checkout by customers, thus increasing its acceptance. In addition, automatic checkouts minimise the possibility of collusion between the operator and the customer, i.e. where the operator deliberately omits scanning selected items, thus resulting in reduced shrinkage.

Self-checkout has the intrinsic benefit that a single operator can oversee multiple self-checkout stations. Since scan errors are more likely during self-checkout than during manned checkout, self-checkout stations incorporate scales which allow an item's weight to be cross-checked against the item's scanned class. This also helps to prevent substitution-based cheating by the customer. Item-level tagging makes scanning more accurate, and makes substitution more difficult, since the substituted item must be an unsold item in the store's inventory, and can only be used once.

Once an item is in the customer's hands, the item's EPC can serve as a link to useful item-related online information. This is discussed in detail later in a companion paper.

When an item is shoplifted or otherwise stolen from a store, it remains recorded as part of the store's on-hand inventory. In the case of item-level RFID tagging, theft can arguably be detected by RFID readers strategically positioned at store exits. However, a shoplifter or thief can exploit RFID readers' problems with radiopacity by shielding the stolen item's RFID tag from exit readers. Once at large, however, the stolen item's EPC acts as a persistent link to information which indicates that the item has not been legitimately obtained. This auditability of any item serves as a powerful deterrent to shoplifting and theft, including the acquisition of goods whose providence is suspect. Note that this applies equally to items shoplifted via an auto-checkout.

If and when the customer decides to return a legitimately-purchased item to a retail store because the item is unwanted, unsuitable or defective, the EPC serves as a link to information which confirms that the item has been legitimately obtained from the same store or the same retail chain. This prevents fraudulent returns, such as the attempted "return" of stolen goods, and ensures that any credit associated with a legitimate return matches not the current price but the original purchase price, which may be substantially different. The EPC also allows the return to be accurately recorded, so that the returned item itself is less likely to be subject to internal loss or theft.

With item-level tagging, inventory records intrinsically become more accurate, with the consequence that automatic reordering and replenishment becomes more reliable and hence relied-upon. This in turn improves stock availability while simultaneously reducing reliance on safety stock. Demand-driven efficiencies then flow back up the supply chain.

Case-level RFID tracking in the backroom, coolroom and freezer, either during case movement or in situ, allows accurate backroom stock monitoring. Case-level RFID tracking onto the sales floor allows accurate recording of shelf-stock additions, and item-level tracking at the checkout allows accurate recording of shelf-stock removals.

Imminent out-of-stock conditions on the sales floor are rapidly detected from on-shelf stock levels, and replacement stock availability in the backroom is rapidly determined from backroom stock levels, as well as the approximate or exact location of the replacement stock in the backroom.

Unlike with UPCs, poor shelf stock rotation is easily detected via item-level tracking at the checkout. If newer stock of a product is inadvertently sold in preference to older stock, then a stock rotation alert can be raised for the product in question. Shop staff can interrogate the shelf stock in question using hand-held scanners to obtain date codes, or can read date codes directly off the stock. Poor stock rotation is thereby addressed before the stock in question becomes unsaleable, leading to a general reduction in the unsaleable rate.

Relatedly, Hyperlabel™ tagging makes it possible to construct smart dispensers for high-value and high-turnover items which incorporate Hyperlabel™ readers and monitor all dispensing and replenishment operations to allow imminent out-of-stocks to be signalled and sweeps to be detected.

Hyperlabel™ tagging, in contrast to RFID tagging, is likely cost significantly less than one cent once established, and to become negligible in the longer term, particularly once digital printing of product labels and packaging becomes established. It is therefore likely that item-level Hyperlabel™ tagging in the grocery sector is justified.

Figure 97:
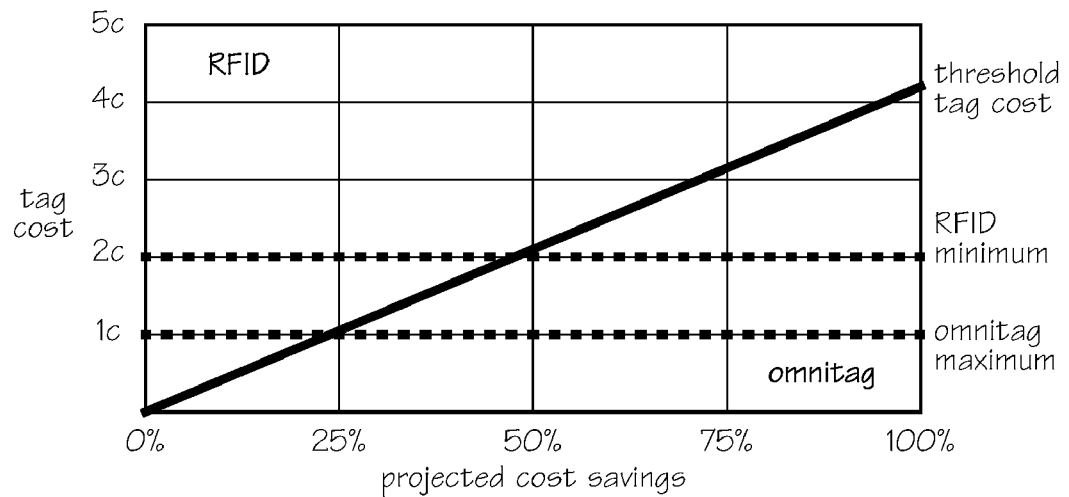
FIG. 97 is a graph of threshold tag cost as a function of projected cost savings.

FIG. 97 shows the threshold cost of a tag as a function of cost savings projected as accruing from item-level tagging. Assuming wildly optimistic cost savings of 50% accruing from item-level tagging, the threshold cost of a tag is just over two cents. Assuming more realistic but still quite optimistic cost savings of 25%, the threshold cost of a tag is just over one cent.

Whilst the read-only nature of most optical tags has been cited as a disadvantage, since status changes cannot be written to a tag as an item progresses through the supply chain.

However, this disadvantage is mitigated by the fact that a read-only tag can refer to information maintained dynamically on a network.

As noted earlier, if incremental tagging of higher-priced grocery items takes place, then the average price of remaining grocery items is reduced, and the threshold cost of a tag is further reduced as well. This makes universal item-level RFID tagging even less likely, and makes a case for the use of Hyperlabel™ tagging as a lower-cost adjunct to RFID tagging.

8.6.1 Shrinkage

The cost of shrinkage in the grocery sector was 1.42% of net sales in 2001-2002, equating to about $7 billion. The cost of shrinkage therefore exceeded net profit. Table 5 summarises sources of shrinkage in the grocery sector.

TABLE 5

Sources of shrinkage in the grocery sector

| source of shrinkage | contribution | approximate cost ($millions) |
|---|---|---|
| internal theft | 62.0% | 4,340 |
| external theft | 23.0% | 1,610 |
| supplier fraud | 7.6% | 530 |
| paper shrinkage | 7.4% | 520 |
| total | 100% | 7,000 |

The largest source of shrinkage in the grocery sector, at 62% or around $4.3 billion, is internal theft, consisting mainly of product theft by employees. This is followed, at 23% or around $1.6 billion, by external theft, consisting mainly of shoplifting. Supplier fraud and paper shrinkage together account for the final 15% or $1 billion.

Table 4 summarises the ways in which item-level RFID tagging can be used to address the various sources of shrinkage, as described in Alexander, K. et al., *Applying Auto-ID to Reduce Losses Associated with Shrink*, MIT Auto-ID Center, November 2002, http://www.autoidcenter.org/research/IBM-AUTOID-BC-003.pdf. The table also shows how item-level Hyperlabel™ tagging can in many cases effectively address the same issues.

As shown in the table, item-level RFID addresses employee theft and shoplifting predominantly via exit-door RFID readers which detect attempts to remove unsold goods, while Hyperlabel™ tagging acts a deterrent to theft since item-level tagging supports downstream auditing of suspected stolen goods.

As described earlier, item-level scanning at point-of-sale improves accuracy and enables automatic scanning, while item-level recording of sales prevents attempted fraudulent returns, both largely independently of tagging method. Automatic checkout scanning in turn reduces collusion between checkout operators and customers.

TABLE 6

Sources of shrinkage, RFID solutions and Hyperlabel™ solutions

| source of shrinkage | pain point | RFID solution | Hyperlabel™ solution |
|---|---|---|---|
| internal theft | product theft | exit door scan<br>N/A | audit deterrent;<br>N/A$^c$ |
|  | collusion with | automatic | automatic |

TABLE 6-continued

Sources of shrinkage, RFID solutions and Hyperlabel™ solutions

| source of shrinkage | pain point | RFID solution | Hyperlabel™ solution |
|---|---|---|---|
|  | customers collusion with vendors | checkout<br>N/A$^c$ | checkout$^d$<br>N/A$^c$ |
| external theft | shoplifting<br>fraudulent returns<br>burglary | exit door scan$^b$<br>item status check<br>audit deterrent;<br>N/A$^c$ | audit deterrent<br>item status check<br>audit deterrent;<br>N/A$^c$ |
| supplier fraud | phantom delivery<br>invoice errors<br>returns | N/A$^c$<br>N/A$^c$<br>item status update | N/A$^c$<br>N/A$^c$<br>item status update |
|  | over/under delivery | N/A$^c$ | N/A$^c$ |
| paper shrinkage | pricing errors | N/A | N/A$^e$ |
|  | scanning errors | automatic checkout$^d$ | automatic checkout$^d$ |
|  | unrecorded returns | item status update | item status update |
|  | incorrect store physical inventory | automatic stocktake$^b$;<br>automatic checkout$^d$ | automatic checkout$^d$ |

8.6.2 Unsaleables

The cost of unsaleables in the grocery sector was 0.95% of net sales in 2001-2002 Lightburn, A., 2002 *Unsaleables Benchmark Report*, Joint Industry Unsaleables Steering Committee 2002, equating to about $5 billion. The cost of unsaleables was therefore almost comparable to net profit. Table 7 summarises sources of unsaleables in the grocery sector.

TABLE 7

Sources of unsaleables in the grocery sector

| source of unsaleable | contribution | approximate cost ($millions) |
|---|---|---|
| damaged | 63% | 3,150 |
| out-of-code | 16% | 800 |
| discontinued | 12% | 600 |
| seasonal | 6% | 300 |
| other | 4% | 200 |
| total | 101% | 5,050 |

The largest cause of unsaleables in grocery, at 63% or over $3 billion, is damaged product. This includes product which is unlabelled, improperly sealed, over- or under-weight, only partially filled, crushed, dented or collapsed, swollen or rusted (cans), moldy, leaking, soiled, stained or sticky.

Much of this damage is due to poor transport and handling, and item-level tagging helps by allowing the supply-chain history of a damaged item to be queried. Over time this can pinpoint a particular problem area, such as a specific distribution center where staff training is inadequate, or a specific forklift operator who needs to take more care. Furthermore, item-level tagging makes it feasible to feed remedial information back to the appropriate point in the supply chain, including as far back as the original manufacturer or one of its suppliers.

The second-largest cause of unsaleables in grocery, at 16% or around $800 million, is out-of-code (i.e. expired) product. Item-level tagging supports better stock rotation, for example via checkout-driven alerts.

Discontinued and seasonal product is more of a problem in retail sectors such as consumer electronics and apparel Alexander, K. et al., *Applying Auto-ID to Reduce Losses Associated with Product Obsolescence*, MIT Auto-ID Center, November 2002, http://www.autoidcenter.org/research/IBM-AUTOID-BC-004.pdf, but still account, at 12% and 6% respectively (or around $600 million and $300 respectively), for a non-trivial proportion of grocery unsaleables. Discontinued product includes product withdrawn by manufacturers, and product made unsaleable by labelling and SKU changes due to mergers and acquisitions.

Item-level tagging helps reduce safety stock and so reduces exposure to discontinued and seasonal product. By improving stock visibility, it makes offloading of soon-to-discontinued or seasonal product more efficient, i.e. without requiring excessive markdowns or manufacturer returns. Finally, by improving auditability, it allows better accounting of discontinued and seasonal stock back to the original manufacturer, rather than forcing reliance on inefficient swell allowances Reilly, D., "Retail returns—a necessary problem, a financial opportunity", Parcel Shipping & Distribution.

8.6.3 Out-of-stocks

Out-of-stocks were estimated to result in a 3% loss in net sales in 2001-2002 [25], which translates into a $200 million reduction in net profit, or about 0.04% of net sales.

Although out-of-stocks have a much smaller effect on the bottom line than shrinkage and unsaleables, they are felt particularly acutely because they demonstrably undermine customer loyalty to brand, store and chain, and are considered eminently correctable.

Table 6 summarises the ways in which case-level and item-level RFID tagging can be used to address the various causes of out-of-stocks, as described in Alexander, K. et al., *Focus on Retail: Applying Auto-ID to Improve Product Availability at the Retail Shelf*, MIT Auto-ID Center, June 2002. The table also shows how item-level Hyperlabel™ tagging, in conjunction with case-level RFID tagging, can in many cases effectively address the same issues.

TABLE 8

Sources of out-of-stocks, RFID solutions and Hyperlabel ™ solutions

| pain point | RFID solution | Hyperlabel ™ solution |
| --- | --- | --- |
| receiving accuracy | case-level tracking and some item-level tracking | case-level tracking[b] |
| on-hand stock visibility | case-level tracking[b] and item-level tracking using smart shelves and at the checkout | case-level tracking[b] and item-level tracking at the checkout |
| replenishment from the backroom | case-level tracking[b] and item-level tracking | case-level tracking[b] |
| plan-o-gram compliance/product lifecycle management | manual and smart shelves[c] | manual |
| cycle counting/manual ordering errors | manual and smart shelves[c] | manual |
| physical inventory counts (preparation and execution) | manual and smart shelves[c] | manual |
| point-of-sale scan accuracy | automatic checkout | automatic checkout[d] |
| inaccurate replenishment algorithms | automatic checkout | automatic checkout[d] |

8.6.4 Privacy Implications Of Item-level Tagging

An RFID tag is promiscuous in that it responds with its ID to a query from an RFID reader without verifying the reader's right to ask. When a uniquely tagged item is travelling through the supply chain and benefits from being tracked, this promiscuity is useful, but once the item is purchased by a customer and no longer needs to be tracked, it can become a problem. The owner of the item may have no idea that the item's RFID tag is being queried surreptitiously, since the reader doesn't require line-of-sight to the tag. Even low-cost passive tags intended for high-volume tagging of product items can be read from a distance of at least a meter, and in many cases much further. If the RFID tag contains a unique item ID, then for tracking purposes the item ID becomes a pointer to the person, particularly if the RFID is embedded in clothing, shoes, a wristwatch or jewellery.

RFIDs typically support a partial or complete self-erasure command, and it is proposed that RFIDs should be at least partially erased at point-of-sale to remove an item's serial number (but not necessarily its product number). It is also proposed, in an "RFID Bill of Rights", that such erasure should be the prerogative of the customer. It is still unclear whether retailers will erase tags by default or even give customers a choice.

Even if serial numbers are erased at point-of-sale, the "constellation" of product codes readable from the various RFID tags carried by a particular person may still constitute a sufficiently unique signature for tracking purposes.

Hyperlabel™ tags are less promiscuous than RFIDs since they require line-of-sight for reading. Unlike RFID tags which are likely to be physically embedded in product during manufacture, Hyperlabel™ tags are likely to only appear on labels and packaging, which in the case of higher-priced items such as clothing and shoes is typically removed from the product prior to use. Where Hyperlabel™ tags persist on higher-priced product items, they typically do so in discreet locations such as on labels sewn into the seams of clothing. For lower-priced items such as grocery, the persistence of item-level tagging is not a threat to privacy.

If privacy advocates succeed in forcing RFIDs to be erased at point-of-sale by default, then dual RFID tagging and Hyperlabel™ tagging provides a way of providing consumers with the downstream benefits of item-level tagging without the privacy concerns of RFID, including online access to item-specific product information, as well as validated returns, warranties and servicing.

8.6.5 Conclusion

Accordingly, Hyperlabel™ tags provide a useful technique for item-level product tagging.

In particular, Hyperlabel™ tagging is inexpensive, making it economically viable for product items priced below a threshold value of a few dollars, such as the average grocery items, unlike RFID tags. In the grocery sector in particular, this provides many benefits such as reducing shrinkage, unsaleables and out-of-stocks.

In addition to this however, Hyperlabel™ tags provide consumers with the downstream benefits of item-level tagging such as the provision of additional interactivity, including the ability to define multiple interactive regions on product labels or packaging, which makes the use of Hyperlabel™ tagging preferable to the use of RFID tags.

It will be appreciated however that in some circumstances Hyperlabel™ tagging can be used in conjunction with RFID tagging.

Although the invention has been described with reference to a number of specific examples, it will be appreciated by those skilled in the art that the invention can be embodied in many other forms.

The invention claimed is:

1. A method of registering a product item, the product item having disposed thereon coded data portions at respective positions on a surface of the product item, each coded data portion encoding a product item identity and the respective position of the coded data portion, wherein the method includes steps of:
   sensing by a sensing device at least one coded data portion;
   generating by the sensing device indicating data indicative of the product item identity and the position of the sensed coded data portion, the product item identity and the position being generated by decoding at least one sensed coded data portion;
   transferring by the sensing device the indicating data to a computer system;
   receiving by the computer system the indicating data;
   identifying by the computer system that the position relates to a registration request;
   obtaining by the computer system owner data associated with the sensing device;
   determining an entity associated with the product item identity; and
   registering by the computer system the owner data with the entity.

2. The method of claim 1, wherein the identifying step includes the sub-steps of:
   retrieving a page description associated with the product item identifier; and
   determining from the page description that the position related to a registration request.

3. The method of claim 1, wherein the surface is partitioned in a plurality of regions, and the coded data in respective regions uniquely identifies the identity of the region.

4. The method of claim 1, wherein the computer system obtains the owner data associated with the sensing device from a storage device.

5. The method of claim 1, wherein step of obtaining the owner data associated with the sensing device includes the sub-steps of:
   printing a form including position indicating coded data;
   sensing by the sensing device the position indicating coded data as the sensing device is moved over the form by a user;
   generating by the sensing device movement data indicative of the movement of the sensing device over the form;
   transferring by the sensing device the movement data to the computer system;
   receiving by the computer system the movement data;
   translating by the computer system the movement data into the owner data.

6. The method of claim 1 further including the steps of:
   determining a communications address of the entity; and
   forwarding to the communications address the owner data.

7. The method of claim 6 further including the steps of:
   receiving a registration acknowledgement from the entity; and
   printing the registration acknowledgement.

* * * * *